US010649309B2

(12) United States Patent
Yoshizawa et al.

(10) Patent No.: US 10,649,309 B2
(45) Date of Patent: May 12, 2020

(54) BLADE DRIVING DEVICE AND IMAGE CAPTURING DEVICE

(71) Applicant: CANON DENSHI KABUSHIKI KAISHA, Chichibu-shi (JP)

(72) Inventors: Takahito Yoshizawa, Kawaguchi (JP); Yusuke Inui, Tokyo (JP); Yasutaka Morikoshi, Tokyo (JP); Shinya Nakawaki, Tokyo (JP); Satoru Yajima, Chichibu-gun (JP); Yoshiyuki Koyama, Tokyo (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 0 days.

(21) Appl. No.: 16/241,096

(22) Filed: Jan. 7, 2019

(65) Prior Publication Data

US 2019/0137845 A1 May 9, 2019

Related U.S. Application Data

(63) Continuation of application No. 15/819,135, filed on Nov. 21, 2017, now Pat. No. 10,209,605, which is a (Continued)

(30) Foreign Application Priority Data

Jun. 12, 2015 (JP) .................................. 2015-118960

(51) Int. Cl.
*G03B 9/06* (2006.01)
*G03B 9/22* (2006.01)
*G03B 11/00* (2006.01)

(52) U.S. Cl.
CPC ................. *G03B 9/06* (2013.01); *G03B 9/22* (2013.01); *G03B 11/00* (2013.01); *G03B 2205/0053* (2013.01)

(58) Field of Classification Search
None
See application file for complete search history.

(56) References Cited

U.S. PATENT DOCUMENTS 5,365,298 A * 11/1994 Fox .......................... G03B 9/22
396/453
5,926,663 A   7/1999 Suzuki
(Continued)

FOREIGN PATENT DOCUMENTS

JP    2000-301607 A    10/2000
JP    2005-037828 A     2/2005
(Continued)

OTHER PUBLICATIONS

Aug. 30, 2016 International Search Report and Written Opinion in International Patent Appln. No. PCT/JP2016/067393.

*Primary Examiner* — William B Perkey
(74) *Attorney, Agent, or Firm* — Venable LLP

(57) ABSTRACT

A blade driving device includes an opening forming member forming an opening portion, a pivotal member pivoting about the opening portion, blades configured to enter or exit from the opening portion upon receiving power transmitted from the pivotal member, a cover member arranged so that the pivotal member and the plurality of blades are located between the cover and the opening forming member, and engaging portions engaging the of blades with the opening forming member. The pivotal member comes into slidable contact with the engaging portions in a process of pivoting. A pivotal position of the pivotal member with respect to the opening forming member is defined by the engaging portions.

14 Claims, 90 Drawing Sheets

Related U.S. Application Data continuation of application No. PCT/JP2016/067393, filed on Jun. 10, 2016.

(56) References Cited

U.S. PATENT DOCUMENTS

| | | |
|---|---|---|
| 6,447,175 B1 | 9/2002 | Ogawa |
| 6,550,987 B2 | 4/2003 | Ogawa |
| 8,475,064 B2 * | 7/2013 | Bai et al. |
| 10,209,605 B2 * | 2/2019 | Yoshizawa ............... G03B 9/06 |
| 2002/0186977 A1 | 12/2002 | Ogawa |
| 2005/0264770 A1 | 12/2005 | Hara et al. |
| 2006/0033974 A1 | 2/2006 | Sato |
| 2012/0063005 A1 | 3/2012 | Aoshima et al. |
| 2012/0076486 A1 | 3/2012 | Bai et al. |
| 2012/0301133 A1 | 11/2012 | Saito |
| 2014/0212123 A1 | 7/2014 | Sato |
| 2016/0139490 A1 | 5/2016 | Nakano et al. |
| 2016/0139491 A1 | 5/2016 | Nakano et al. |
| 2018/0074387 A1 | 3/2018 | Yoshizawa et al. |

FOREIGN PATENT DOCUMENTS

| | | |
|---|---|---|
| JP | 2005-338710 A | 12/2005 |
| JP | 2008-164726 A | 7/2008 |
| JP | 2012-073383 A | 4/2012 |

\* cited by examiner

PRIOR ART

F I G. 36
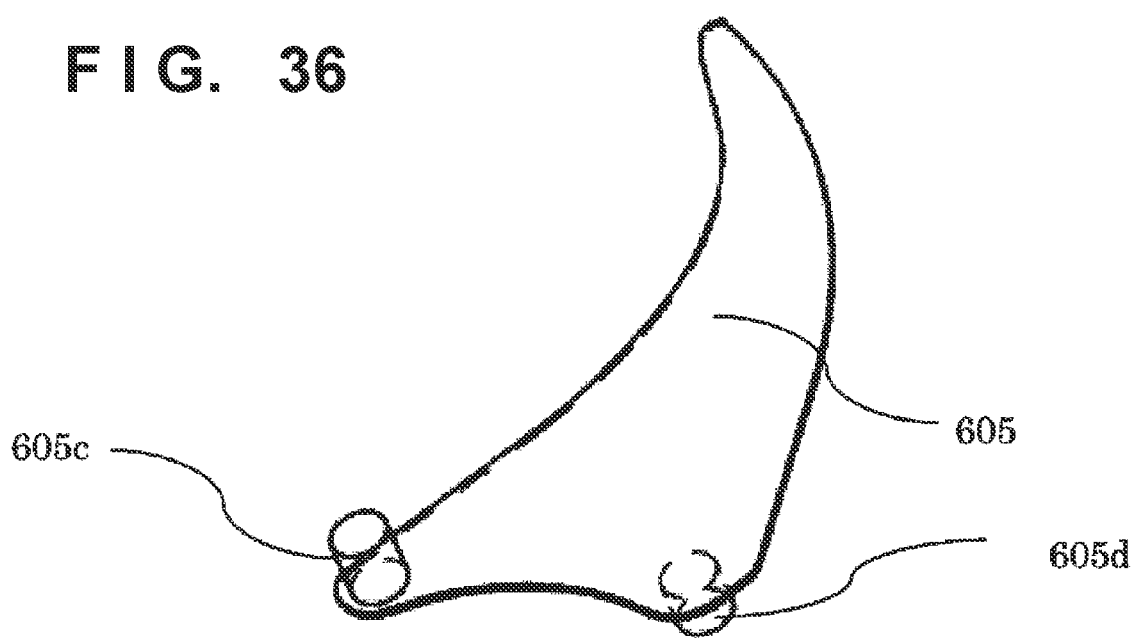
F I G. 37
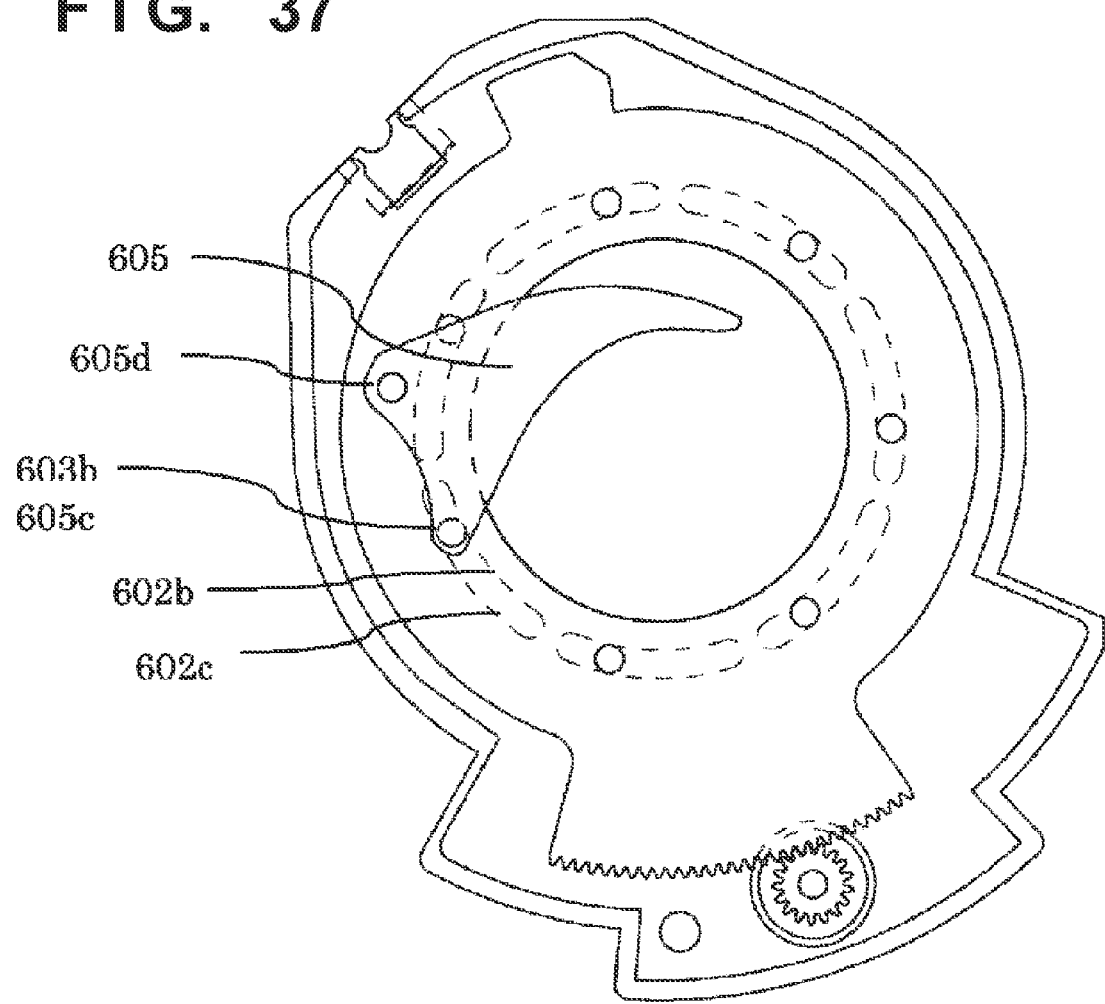

605

605d
606a

FIG. 54
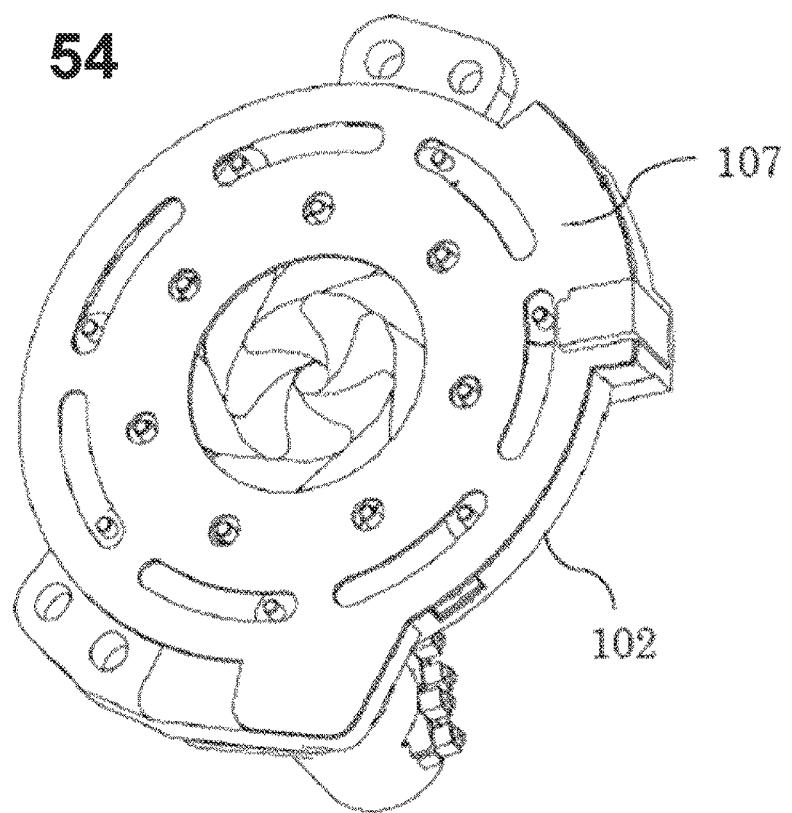
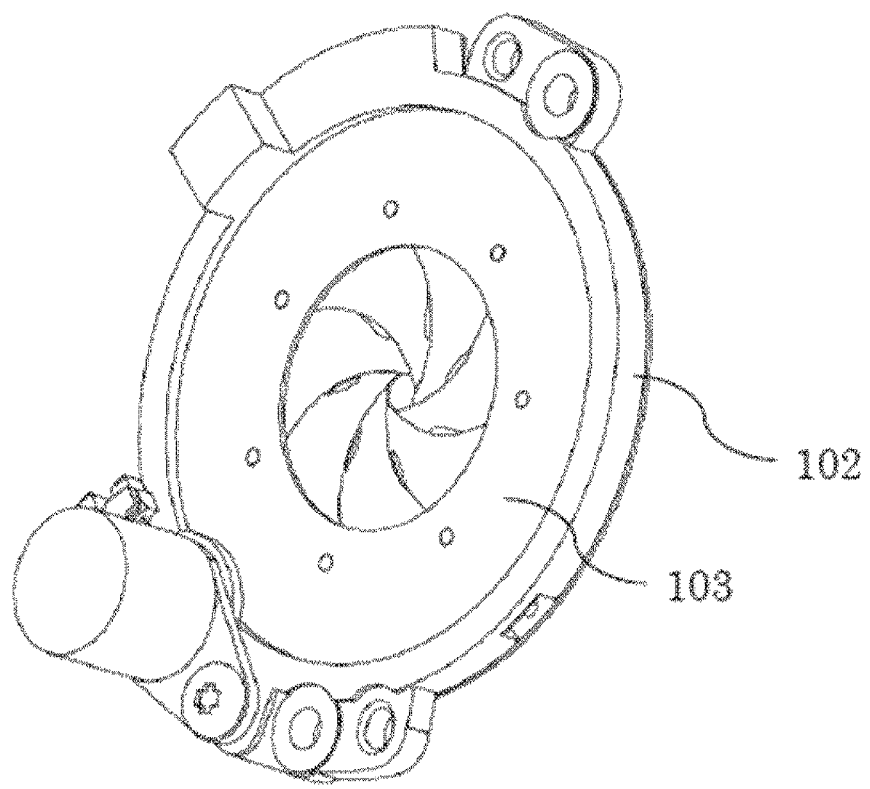

FIG. 60
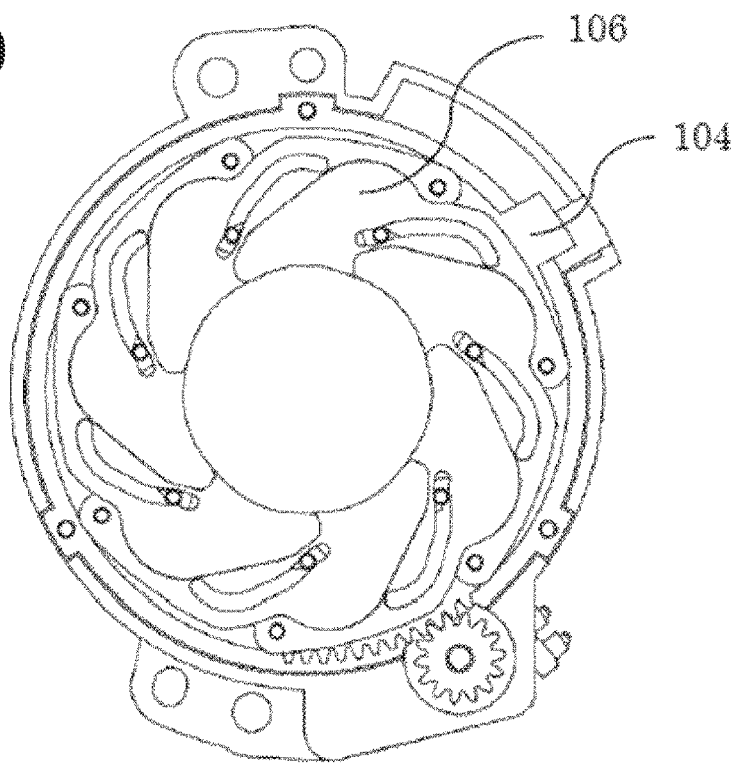
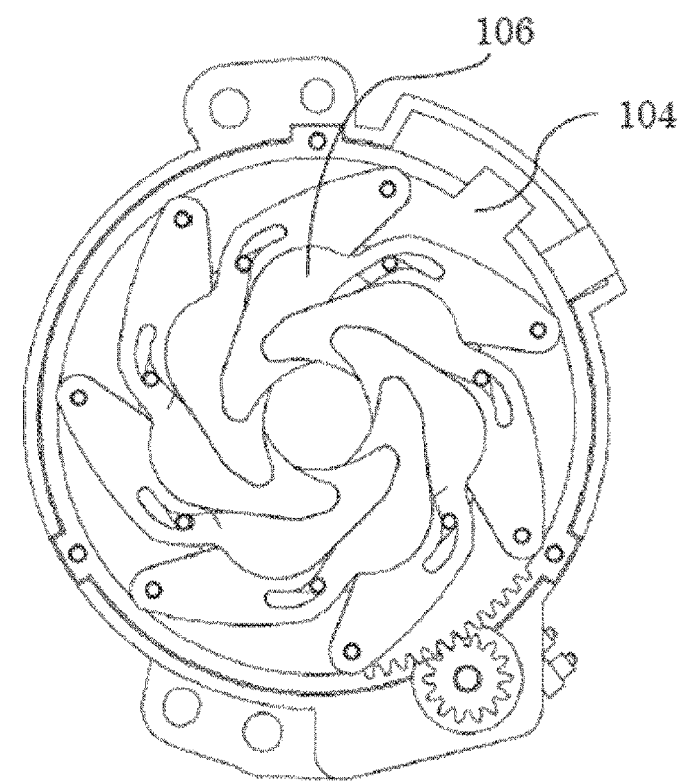

FIG. 63
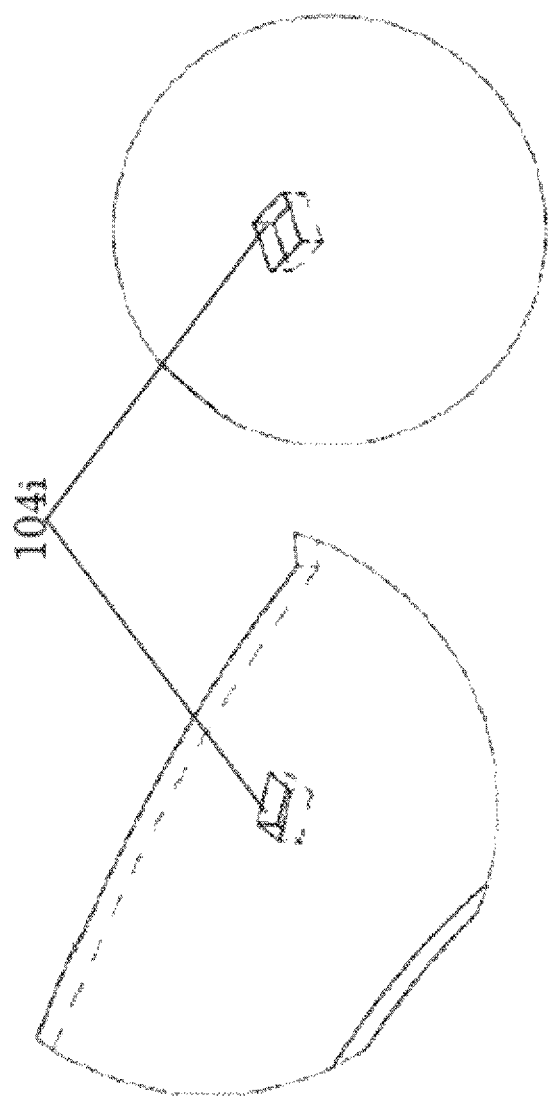
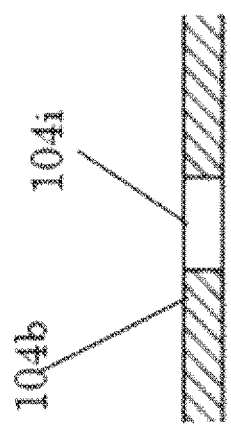

F I G. 65
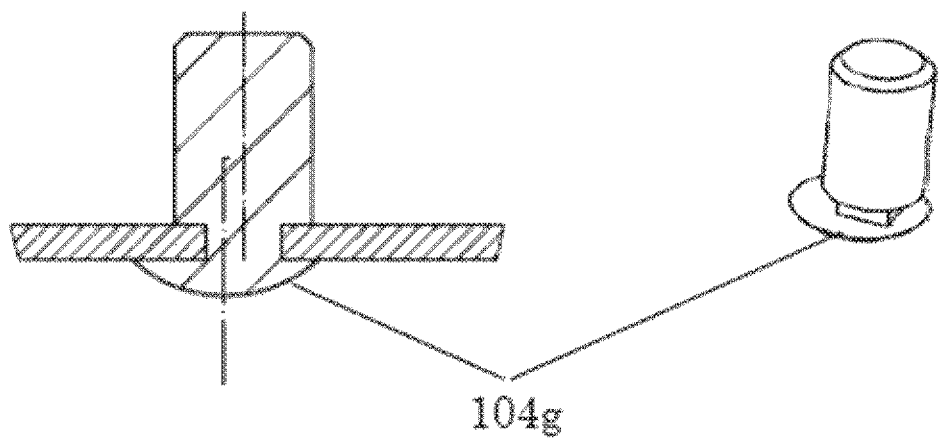

FIG. 89
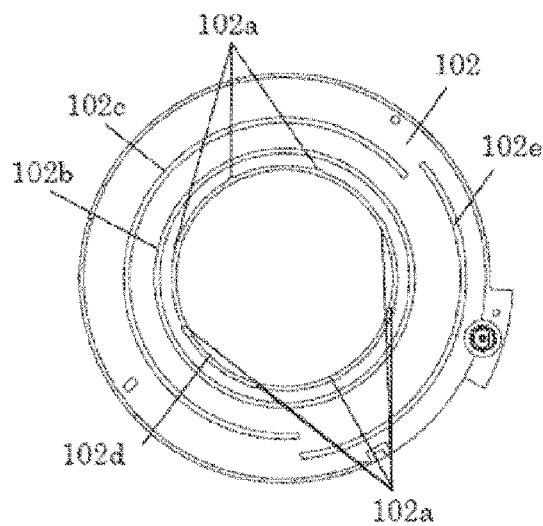
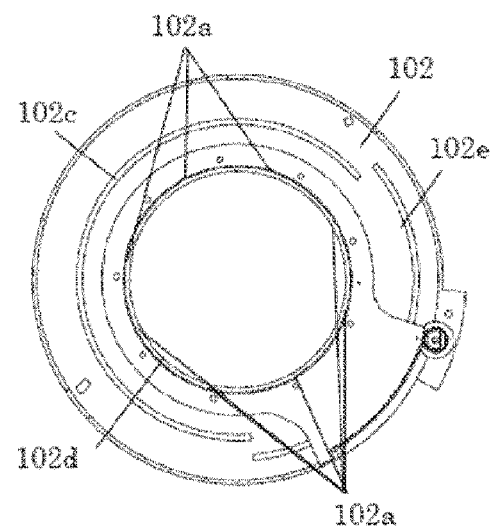
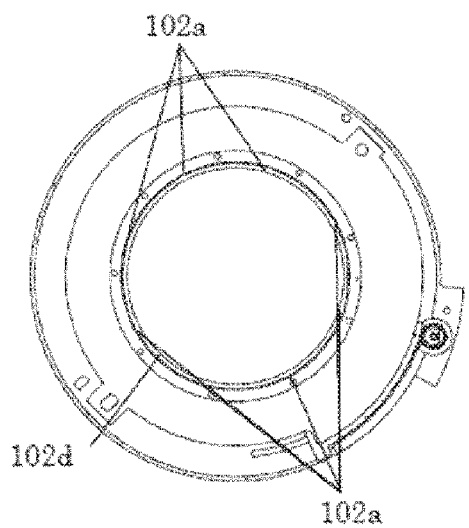
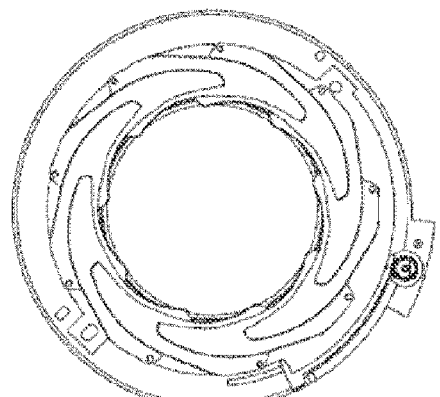

FIG. 90
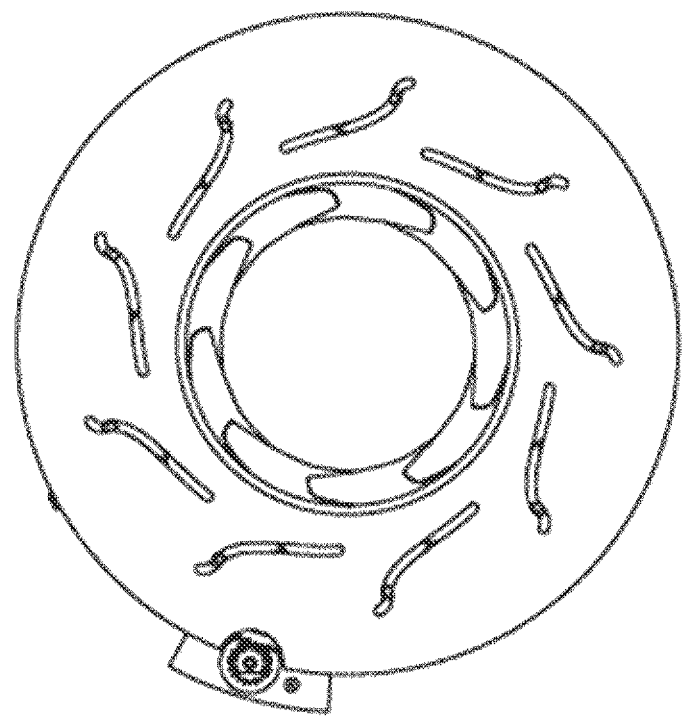
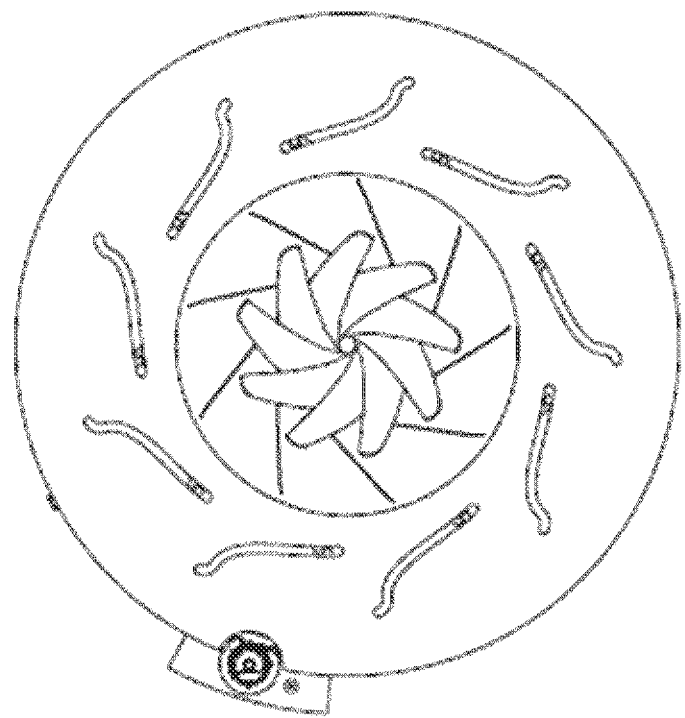

F I G. 104
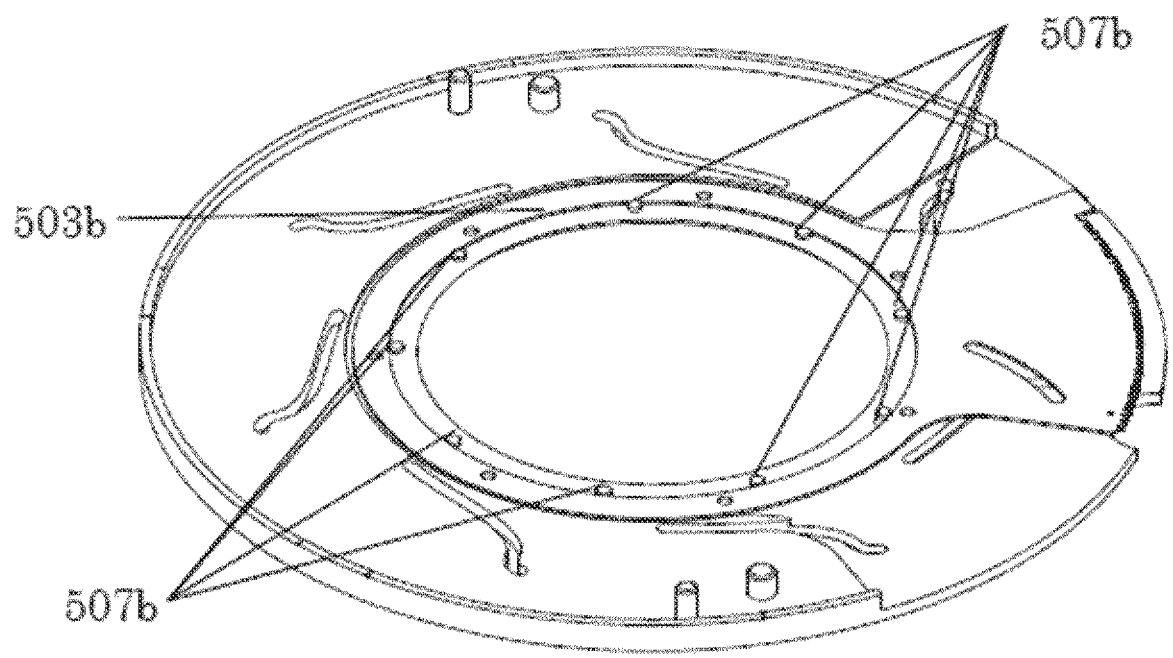

BLADE DRIVING DEVICE AND IMAGE CAPTURING DEVICE

This application is a continuation of application Ser. No. 15/819,135 filed Nov. 21, 2017, which is a continuation of International Patent Application No. PCT/JP2016/067393 filed on Jun. 10, 2016, and claims priority to Japanese Patent Application No. 2015-118960 filed on Jun. 12, 2015, the entire content of both of which is incorporated herein by reference.

TECHNICAL FIELD

The present invention relates to, for example, a blade driving device such as a diaphragm device and an image capturing device such as a camera including the blade driving device.

BACKGROUND ART

Conventionally, as a blade driving device configured to drive blades, a device including a bottom board with an opening portion for an optical path, blades that are supported by the bottom board and operate to open/close the opening portion, and a pivotal member that pivots with respect to the bottom board is known (see Japanese Patent Laid-Open No. 2012-73383).

The blade driving device as described in Japanese Patent Laid-Open No. 2012-73383 is configured to operate the blades in synchronism with the pivotal member that pivots so as to open/close the opening portion for the optical path.

In recent years, the blade driving device is demanded to be thinner because of various requirements such as mounting space reduction and cost reduction of an image capturing device such as a camera in which the device is to be mounted.

SUMMARY OF INVENTION

The present invention provides a blade driving device and an image capturing device advantageous in thickness reduction.

According to an aspect of the present invention, there is provided a blade driving device comprising: an opening forming member configured to form an opening portion to pass light along an optical axis; a pivotal member configured to pivot about an opening portion on one surface of the opening forming member; a plurality of blades configured to enter or exit from the opening portion upon receiving power transmitted from the pivotal member; a cover member arranged so that the pivotal member and the plurality of blades are located between the cover member and the opening forming member; and a plurality of engaging portions configured to engage the plurality of blades with the opening forming member, wherein the pivotal member comes into slidable contact with the plurality of engaging portions in a process of pivoting on one surface of the opening forming member, and a pivotal position of the pivotal member with respect to the opening forming member is defined by the plurality of engaging portions.

According to still another aspect of the present invention, there is provided an image capturing device comprising the above blade driving device.

Other features and advantages of the present invention will be apparent from the following descriptions taken in conjunction with the accompanying drawings.

BRIEF DESCRIPTION OF DRAWINGS

FIG. 36 is a view showing a diaphragm blade according to the embodiment;

FIG. 37 is an exploded front view of the blade driving device according to the embodiment (the arrangement of diaphragm blades);

FIG. 54 is a perspective view of the diaphragm device according to the embodiment;

FIG. 60 is a view showing the diaphragm shape of the blade driving device according to the embodiment;

FIG. 63 shows a sectional view and perspective views of a driving ring base according to the embodiment (Example 1);

FIG. 65 shows a sectional view and a perspective view of the driving ring according to the embodiment (Example 2);

FIG. 89 is an exploded view of the blade driving device according to the embodiment;

FIG. 90 is a view showing the diaphragm shape of the blade driving device according to the embodiment;

FIG. 104 is a perspective view of the blade driving device according to the embodiment;

DESCRIPTION OF EMBODIMENTS

Figure 1:
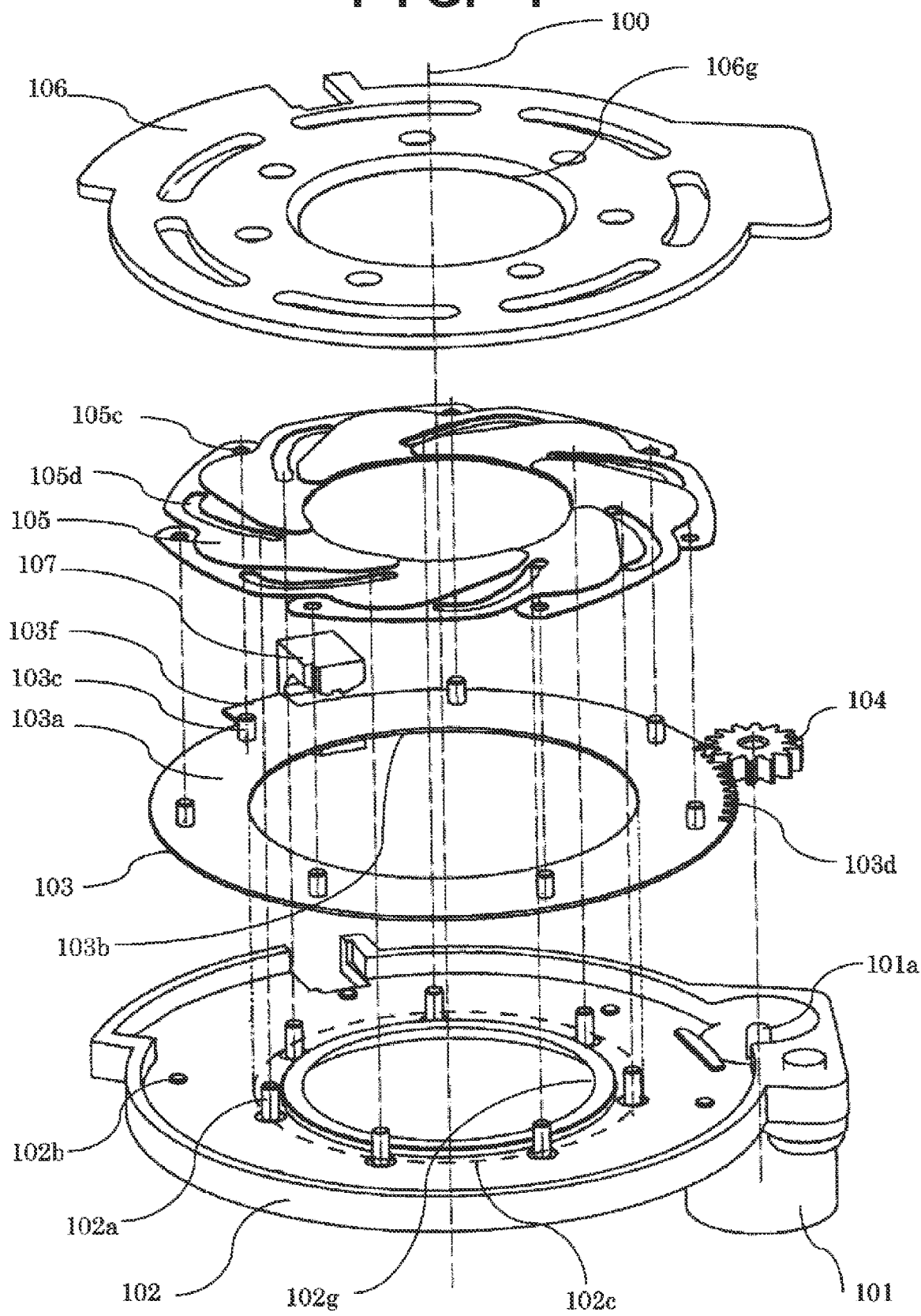
FIG. 1 is an exploded perspective view of a blade driving device according to an embodiment.

The embodiments of the present invention will now be described in detail with reference to the accompanying drawings. The following embodiments are roughly divided into five embodiments, that is, Embodiments A to E. The embodiments and examples and modifications included in the embodiments can appropriately be combined with each other. Note that reference numerals that denote components are uniformly used in Embodiments A, B, C, D, and E unless it is specifically stated otherwise. Hence, for example, the same reference numeral as in Embodiment A may be used as a reference numeral that denotes a different component in Embodiment B.

Embodiment A

First Embodiment

FIG. 1 is an exploded perspective view of a blade driving device according to the first embodiment of the present invention.

Referring to FIG. 1, reference numeral 100 denotes an optical axis center of the blade driving device; 101, a driving unit serving as a driving source for driving the blade driving device; and 102, a base member that is an opening forming member with an opening portion 102g formed at the center. In this embodiment, the base member 102 is formed by, for example, resin molding, and includes a plurality of engaging pins 102a and a plurality of rails 102b. The driving unit 101 is attached to an end of the base member 102. Examples of the driving unit 101 are a stepping motor and a galvanometer. A pinion 104 is attached to a rotating shaft 101a of the driving unit 101.

Reference numeral 103 denotes a pivotal member that is, for example, a circular sheet-shaped member formed by resin molding in this embodiment. This member is an opening forming member (driving ring) with a circular opening portion that is formed at the center and serves as a path to pass light. The pivotal member 103 includes a sheet-shaped base 103a, an inner engaging hole 103b extending through the base 103a in the thickness direction, a plurality of driving pins 103c standing on the upper surface of the base 103a, a driven portion 103d provided at an outer peripheral end of the base 103a and connected to the pinion 104, and a light-shielding portion 103f provided to partially project from an outer peripheral end of the base 103a.

Here, the pivotal member 103 is made by, for example, press-working a resin film (PET sheet material or the like). When making the pivotal member 103 of a resin film, the pivotal member 103 can be made thin and lightweight. In addition, when the pivotal member 103 is made of a resin film, a portion that guides the operation of the pivotal member 103 does not need a strength as compared to a case in which the pivotal member is made by resin molding. For example, the pivotal member 103 can be guided by a thin guide pin that guides a diaphragm blade. If press working is possible, the accuracy of form can be made higher than the accuracy of form of resin molding. For this reason, the diaphragm accuracy can be increased. The pivotal member 103 need not always be formed using a thin sheet-shaped member and may be formed by resin molding, as a matter of course.

Additionally, the pivotal member 103 includes a gear portion that is the driven portion 103d. The driven portion 103d meshes with the pinion 104. A rotating force generated by the driving unit 101 is transmitted from the pinion 104 to the driven portion 103d and, accordingly, the pivotal member 103 rotates. For example, in this embodiment, the rotating force of the driving unit 101 is transmitted from the pinion 104 to the pivotal member 103. A driving lever may be used in place of the pinion. When the driving lever is used, a cam groove or a driven pin is used as the driven portion of the pivotal member 103. Reference numeral 103f denotes the light-shielding portion. The light-shielding portion 103f enters or exits from the slit of a photointerrupter 107, thereby functioning as a sensor. The light-shielding portion 103f is used to detect a position such as the initial position of a light amount adjusting device.

Reference numeral 105 denotes a diaphragm blade. For example, in this embodiment, a plurality of (seven) diaphragm blades 105 are arranged annularly to surround the opening to pass light. An engaging hole 105c and a cam groove 105d which are driven portions are formed in each diaphragm blade 105. Such a diaphragm blade 105 may be made by, for example, press-working a PET sheet material or the like, or may be made by resin molding. In this embodiment, seven diaphragm blades are used. However, the number of diaphragm blades can be arbitrary as long as at least two diaphragm blades are included. Note that in this embodiment, the diaphragm blade 105 will be exemplified. However, the blade driving device may use various kinds of blades such as shutter blades of another type or blades each including an optical filter. Note that the maximum opening of the portion that passes the light may be defined by the base member 102 or an opening portion 106g of a cover member, or may be defined by the ends of the plurality of diaphragm blades 105.

Reference numeral 106 denotes a cover member. A blade chamber is formed between the cover member 106 and the base member 102 in which the above-described plurality of diaphragm blades 105 and the pivotal member 103 for driving these blades are housed, and the blades travel between the cover member 106 and the pivotal member. That is, in the blade chamber (space) formed by the base member 102 and the cover member 106, the plurality of diaphragm blades 105 are made to travel (driven) along with the pivotal movement of the pivotal member 103. The cover member 106 includes the opening portion 106g communicating with the opening portion of the base member 102, and serves as an opening forming member, like the base member 102. The cover member 106 is formed by resin molding or the like, or made by press-working a PET sheet material or the like.

The engaging holes 105c of the diaphragm blades 105 engage with the driving pins 103c of the pivotal member 103, respectively. The pinion 104 rotates, a force is applied to the driven portion 103d of the pivotal member 103, and the pivotal member 103 rotates. Then, a driving force is applied from the driving pins 103c of the pivotal member 103 to the engaging holes 105c of the diaphragm blades 105, and the diaphragm blades 105 are driven. At this time, the cam grooves 105d of the diaphragm blades 105 engage with the engaging pins 102a of the base member 102. For this reason, by the cam grooves 105d, the diaphragm blades 105 enter or exit from the opening of the base member 102. Accordingly, the diaphragm shape of the plurality of diaphragm blades 105 is adjusted in the opening portion 102g of the base member 102, and the amount of light to pass can be adjusted.

Figure 2:
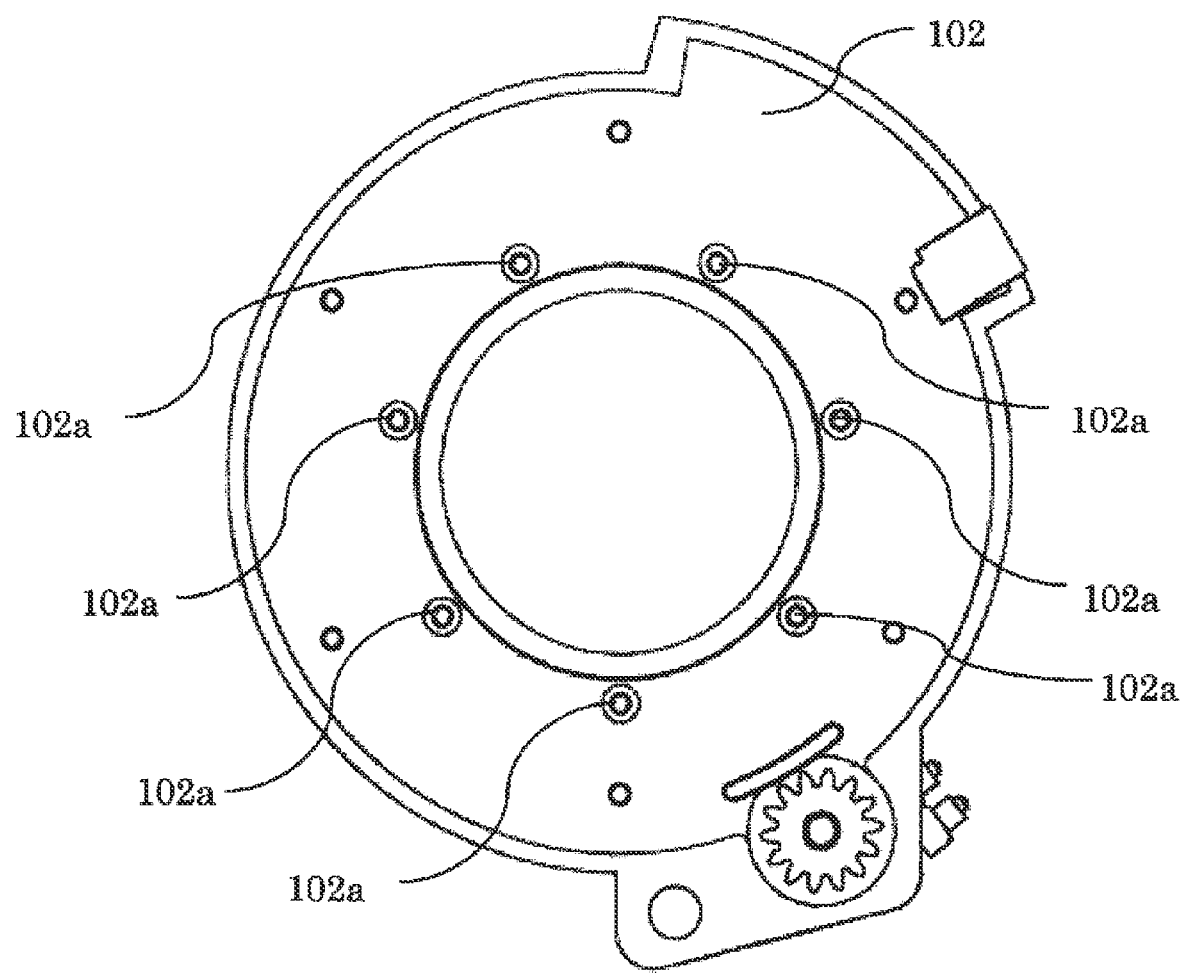
FIG. 2 is an exploded front view of the blade driving device according to the embodiment (base member)
Figure 3:
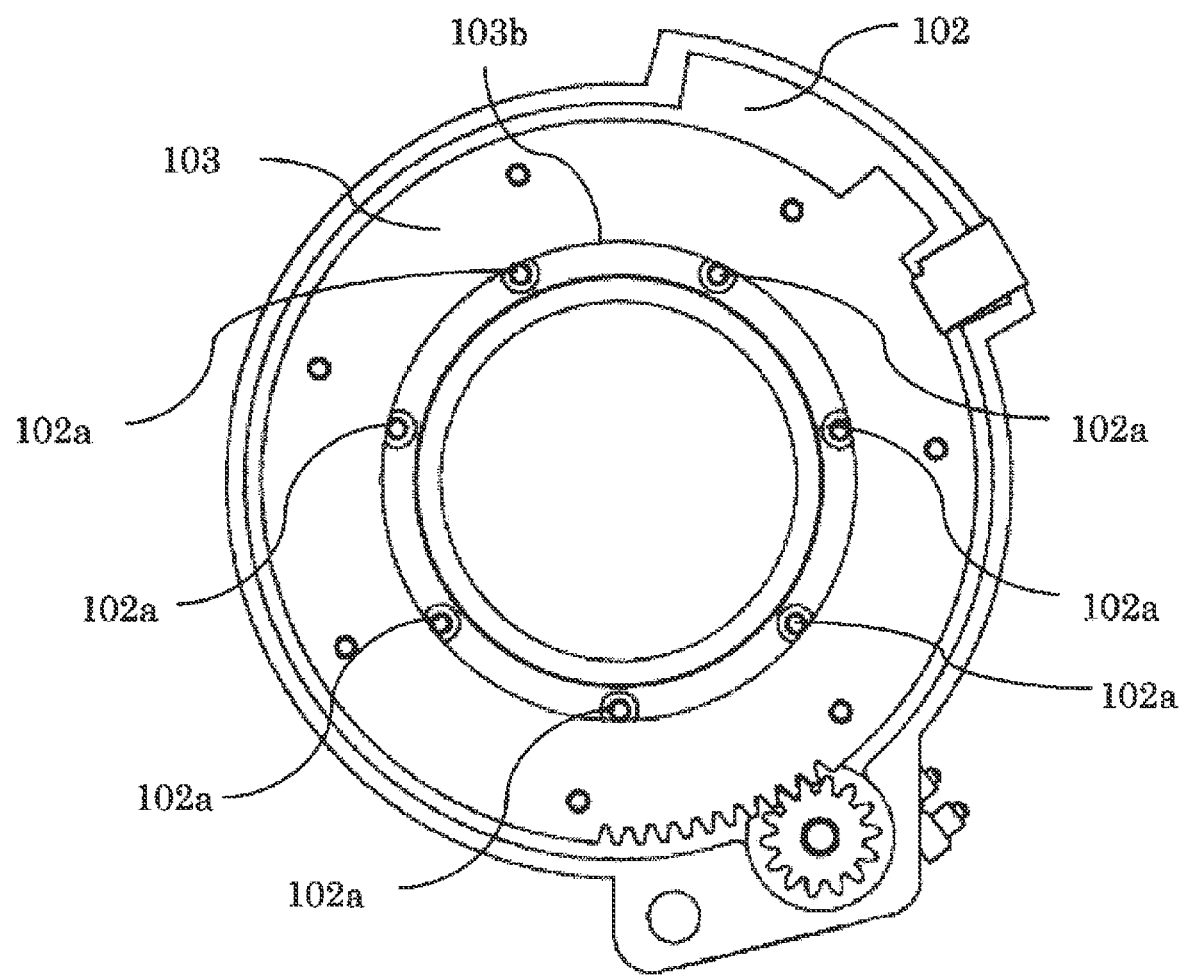
FIG. 3 is an exploded front view of the blade driving device according to the embodiment (the arrangement of a pivotal member)

Radial engagement of the pivotal member, which is a characteristic feature of this embodiment, will be explained here. FIG. 2 is a front view showing a state in which the pivotal member 103, the diaphragm blades 105, and the cover member 106 are detached. FIG. 3 is a front view of the pivotal member 103 that is assembled in the state shown in FIG. 2. In the pivotal member 103, the inner engaging hole 103b is in slidable contact with the plurality of engaging pins 102a of the base member 102 in a rotatable state. In addition, the position of the pivotal member 103 is defined when the inner engaging hole 103b is in slidable contact with the plurality of engaging pins 102a of the base member 102. In this embodiment, the inner engaging hole 103b of the pivotal member 103 engages with a circumscribed circle (102c) formed by the seven engaging pins 102a of the base member. The number of engaging pins 102a can be arbitrary as long as a plurality of engaging pins are included.

Figure 4:
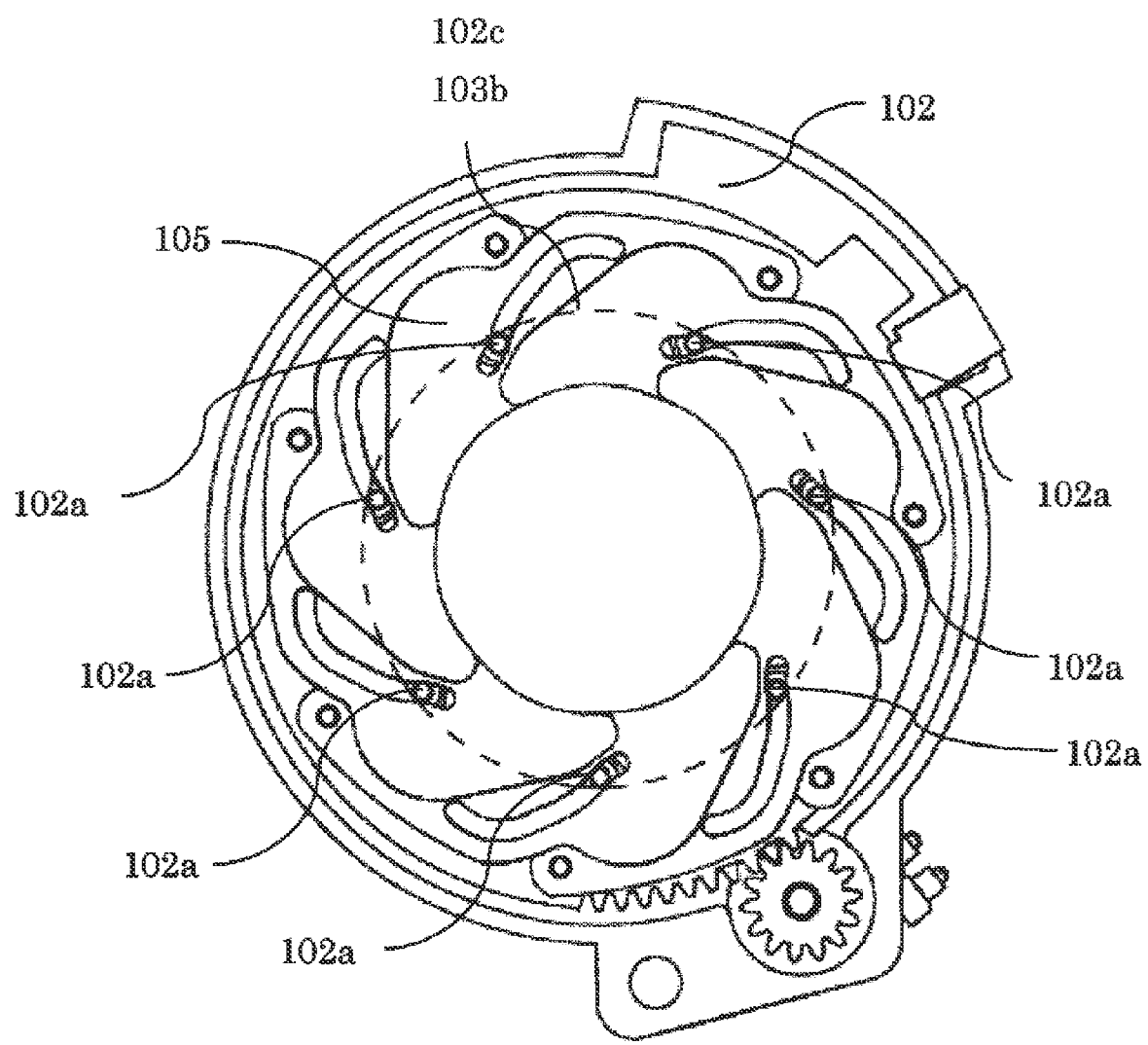
FIG. 4 is an exploded front view of the blade driving device according to the embodiment (the arrangement of diaphragm blades)

FIG. 4 is a front view of the diaphragm blades 105 that are assembled. There exist a plurality of diaphragm blades 105.

Figure 5:
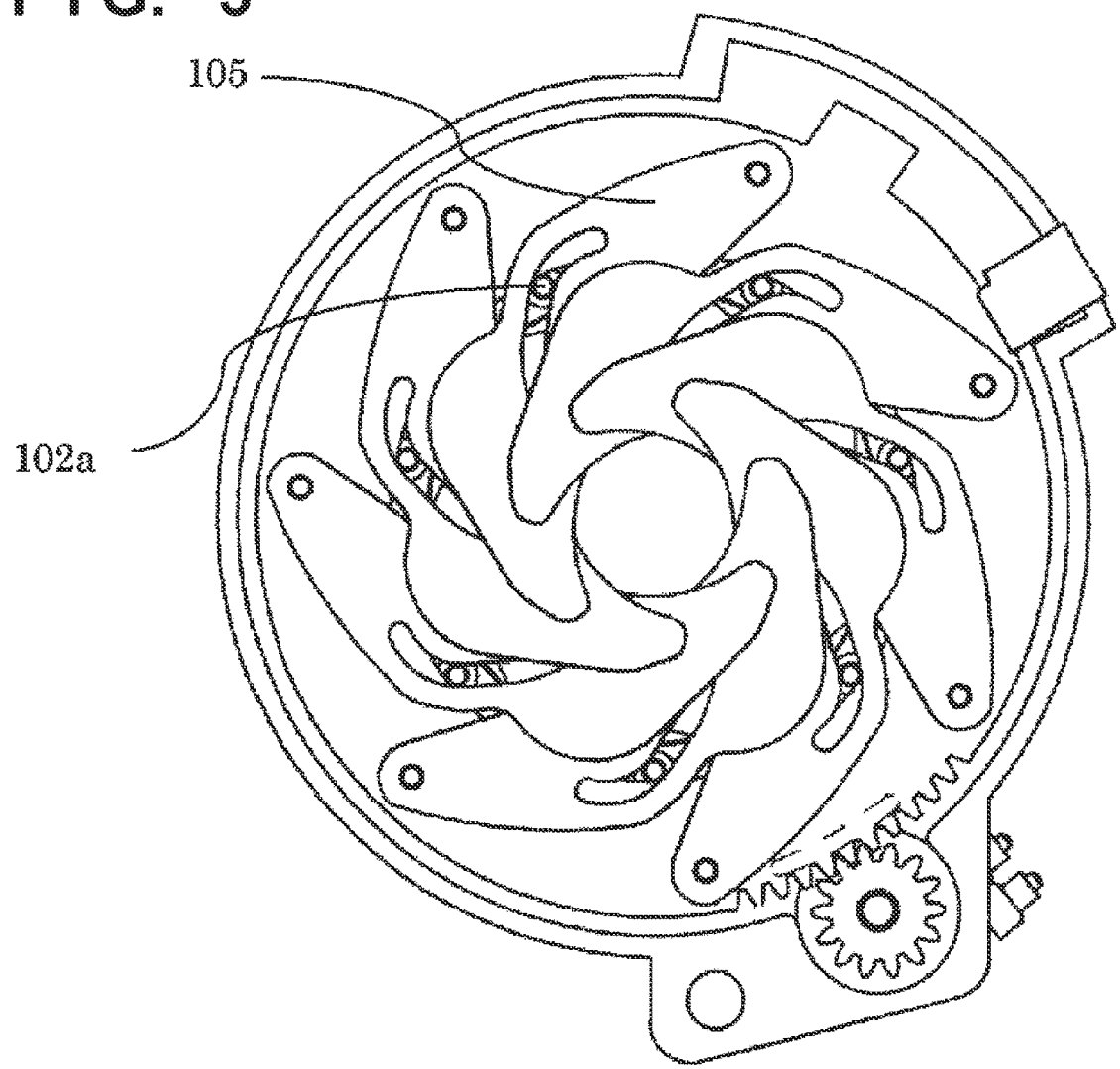
FIG. 5 is an exploded front view of the blade driving device according to the embodiment (the pivotal movement of the diaphragm blades)

In the base member 102, the engaging pins (engaging portions) 102a as many as the diaphragm blades 105 exist. The diaphragm blades 105 and the engaging pins 102a are annularly arranged around the opening portion 102g provided to extend through the base member 102. That is, when the pivotal member 103 is brought into slidable contact with the engaging pins 102a and rotated outside them, the pivotal position of the pivotal member 103 on the base member 102 is defined with respect to the optical axis center 100 as a position reference, the diaphragm blades 105 enter or exit from the opening portion 102g at predetermined positions, and the opening area can be changed, as shown in FIG. 5. Note that the pivotal position of the pivotal member 103 may be defined with respect to the opening portion 102g of the base member 102 that opens based on the optical axis center 100, or may be defined based on another set position reference. Additionally, the pivotal member 103 is in slidable contact with the plurality of engaging pins 102a along the pivotal direction. Since the portion in slidable contact is small, this structure is advantageous in a high-speed operation or durability or in suppressing abrasion powder, as compared to a conventional structure.

Figure 6:
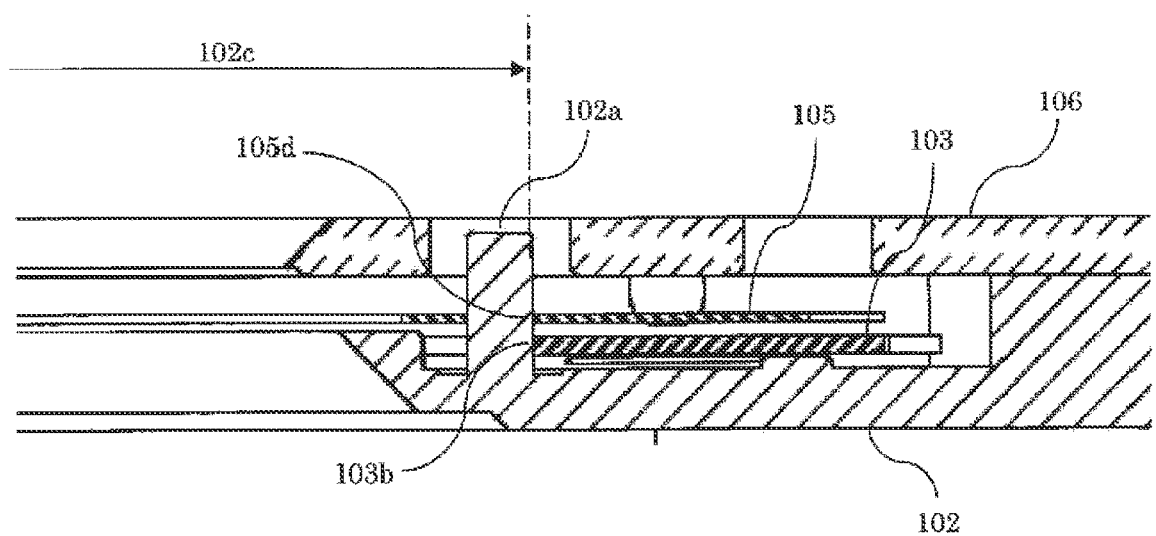
FIG. 6 is a sectional view of the embodiment.

FIG. 6 is a sectional view of a light amount adjusting device according to the first embodiment. The inner engaging hole 103b of the pivotal member 103 is in contact with the circumscribed circle 102c (see FIGS. 4 and 6) formed by the plurality of engaging pins 102a. For this reason, when the pivotal member 103 pivots, it is guided in slidable contact with each of the plurality of engaging pins 102a. Hence, the movements of the pivotal member 103 and the diaphragm blades 105 in the radial direction are regulated by the same engaging pins 102a. That is, the movements of the diaphragm blades 105 and the pivotal member 103 in the radial direction are regulated by the same portions (the plurality of engaging pins 102a). For this reason, the device can be simplified and downsized (particularly, thinned), as will be described later in detail. Additionally, in this embodiment, since the driving space need not be separated for the pivotal member 103 and the diaphragm blades 105, the device can be made thin. Details of the driving space will be described next in comparison with a conventional structure.

Figure 7:
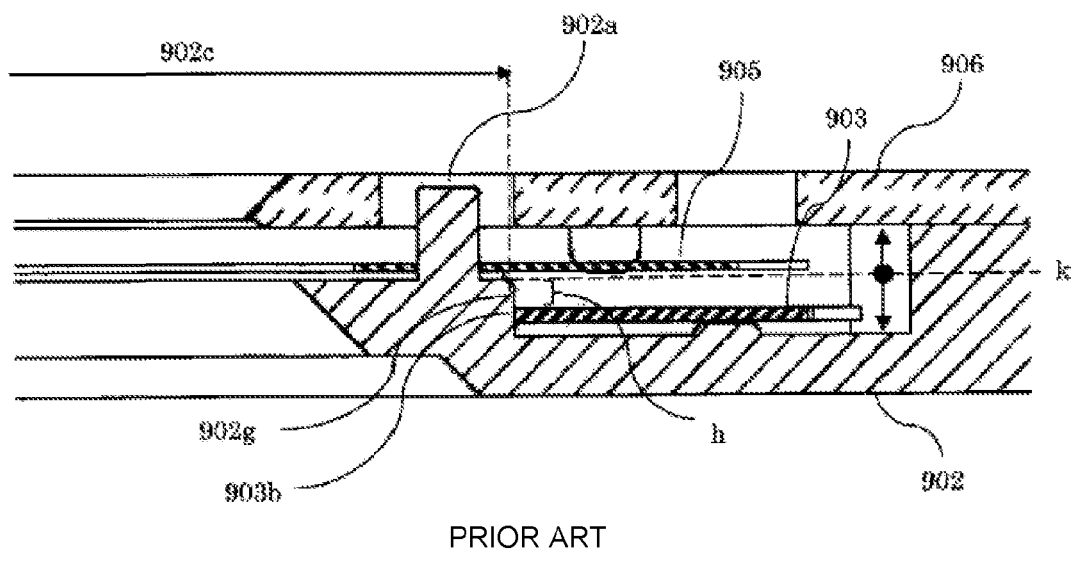
FIG. 7 is a sectional view of a conventional technique.

FIG. 7 is a sectional view of a light amount adjusting device having a conventional structure. In the conventional structure, the regulating position in the radial direction changes between a pivotal member 903 and a diaphragm blade 905. The movement of the pivotal member 903 in the radial direction is regulated by a radial regulating portion 902g that is a concave portion provided in a base member 902. The movement of the diaphragm blade 905 in the radial direction is regulated by an engaging pin 902a of the base member 902. Since separate regulating portions are necessary, the device is complex and bulky.

Furthermore, if the pivotal member 903 and the diaphragm blade 905 have different radial regulating portions, the driving space is separated. Reference symbol k denotes a boundary between the driving spaces. If the pivotal member 903 crosses k, it disengages from the radial regulating portion 902g of the base member 902, and correct radial regulation cannot be performed. For this reason, it is necessary to ensure a sufficient engagement amount h (the depth of the concave portion) so the pivotal member 903 does not cross k. Hence, the conventional blade driving device needs many spaces such as the space for the radial regulating portion 902g and the space for the engagement amount h of the pivotal member 903 to limit the regulation of the pivotal member 903 and the diaphragm blade 905 in the radial direction.

On the other hand, according to this embodiment, since the driving space is not substantially separated for the pivotal member 103 and the diaphragm blade 105, and the radial regulating portion, the space for the engagement amount h, and the like are not needed, unlike the conventional structure, the structure is advantageous in reducing the size and thickness of the device.

The circumscribed circle 102c formed by the plurality of engaging pins 102a according to this embodiment can have a smaller diameter than a circumscribed circle 902c formed by the radial regulating portion 902g of the conventional structure. When the sliding diameter of the pivotal member is reduced, it is possible to decrease the operation load of the pivotal member and reduce power consumption. In addition, the engaging pin 102a according to this embodiment can have a diameter smaller than the radial regulating portion 902g of the conventional structure. When the sliding area to the pivotal member 103 is reduced, it is possible to decrease friction and reduce power consumption.

The pivotal member (driving ring) 103 according to this embodiment will be described here in more detail. The pivotal member 103 according to this embodiment is formed from an extra-thin sheet-shaped member (ultrathin sheet-shaped member) having a structure engaging with the diaphragm blades 105 (to be described later).

Using, as the "thin sheet-shaped member", for example, a sheet thinner than a holding substrate (the base member 102 and the cover member 106) that holds the pivotal member 103 or a sheet having a thickness ½ or less of the holding substrate, or in comparison with the thickness of the blades, a sheet slightly thicker than the blades or a sheet having a thickness substantially equal to or smaller than the thickness of the blades is effective in thickness reduction in the optical axis direction of the diaphragm device.

Note that from the viewpoint of reducing the thickness or weight, the "thin sheet-shaped member" according to this embodiment is preferably, for example, a very thin (extra-thin) sheet-shaped member that is thick (thin) to such an extent that the member is solely relatively easily bent and deformed by only slight physical stress applied from the outside. In addition, the "thin sheet-shaped member" preferably solely has a spring characteristic with a repulsive force against deformation, like a leaf spring. This makes it possible to sufficiently ensure form stability before or upon rotation and also ensure a stable flat pivotal posture. Hence, the pivotal member 103 according to this embodiment is preferably formed from a thin sheet-shaped member having a spring characteristic.

Additionally, for the "thin sheet-shaped member" according to this embodiment, for example, a slidability improving layer formed by coating, an antistatic layer for static control, or an antireflection layer for preventing reflection may be provided as a surface layer on at least one surface of a sheet base made of a resin or a metal. Alternatively, a sheet-shaped member formed by providing the various kinds of surface layers on both surfaces of a sheet base is preferably used. Accordingly, if a slidability improving layer is provided, the slidability between the blades and another member can be increased.

If an antistatic layer is provided, sticking between the blades and the pivotal member 103 caused by static electricity can be prevented. On the other hand, if an antireflection layer is provided, it is possible to suppress reflection of light that has entered the light amount adjusting device and prevent generation of ghosting flare, or the like when the light amount adjusting device is assembled in a lens barrel.

Note that when the surface layer such as the slidability improving layer is provided on an outer peripheral end (an inner end or an outer end or both of them) of the sheet base, the rigidity of the sheet base can be increased, and additionally, the slidability to the holding substrate can sufficiently be increased. As such a surface layer, for example, a thin film made of a material with excellent slidability using coating or various kinds of deposition techniques is usable. The sheet base is preferably provided on both surfaces of the sheet base as the blade side surface or the slidability improving layer.

It is also possible to effectively prevent warping or deformation by adjusting the stress balance of the entire thin sheet-shaped member using a film of tensile stress, compressive stress, or the like in consideration of the internal stress of the sheet base. The surface layers on both surfaces preferably have substantially the same thickness. For example, in a case in which the heat shrinkage ratio of the "thin sheet-shaped member" and that of the surface treatment layer are different, since the "thin sheet-shaped member" receives the same stress (tensile stress or compressive stress) from the obverse and reverse surfaces, the "ultrathin sheet-shaped member" can effectively prevent warping or deformation even if the environment changes.

In addition, the pivotal member 103 according to this embodiment is totally different from a conventional driving ring (a relatively thick driving ring formed by resin molding). Here, for example, the pivotal member 103 is compared with the conventional driving ring only concerning the thickness. A conventional thin driving ring has a thickness of about 0.5 mm. However, the thickness of the driving ring 103 according to this embodiment is preferably about 0.3 mm or less, more preferably, 0.2 mm or less, and much more preferably, about 0.1 mm or less. Note that in the present invention, the conventional driving ring may be used.

However, use of such a thin sheet-shaped member for the pivotal member 103 contributes not only to reduction of the thickness of the pivotal member 103 but also to reduction of the weight of the pivotal member 103, and higher-speed rotation can be implemented. Note that the extra-thin sheet-shaped member may have a single-layer structure or a multilayer structure. In addition, as the pivotal member 103, a transparent member that does not have light-shielding properties may be used. In this case, a structure or coat surface for preventing reflection is preferably provided at a position where the light transmitted through the pivotal member 103 is reflected.

For example, in a multilayer structure, a resin sheet such as a resin film may be used as the base, or a metal sheet such as a metal foil or a thin metal plate may be used as the base. Use of a resin sheet is very effective for weight reduction. On the other hand, when a metal sheet is used, posture stability in rotation can be increased.

Note that when a metal sheet is used, use of an ultralight-weight metal such as duralumin is very effective in implementing high-speed rotation. When a resin sheet or a metal sheet is used, the sheet may solely directly be applied to the pivotal member 103 to form a single-layer structure. However, when considering physical interferences such as slidability to the blades or other members, operation load, friction, high-speed responsiveness, and noise reduction, a surface layer is preferably formed by a surface treatment (a treatment including surface coating) to impart various kinds of functionality.

In particular, although the pivotal member 103 is preferably flat as a whole because it is rotated, engaging portions for the blades need to be provided. For this reason, the engaging portions for the blades are preferably implemented by minimum components in consideration of various factors, for example, air resistance and sufficient engagement. Note that the pivotal member 103 may be formed using the same material as the material that forms the blades. In this case, the blades and the pivotal member 103 have the same thickness. Preferably, when the same material is used for the blades and the pivotal member 103, and the blades and the pivotal member 103 are simultaneously processed, the productivity can be improved. However, considering the rigidity to drive the blades, the pivotal member 103 may be made slightly thicker than the blades. In this case, a material that is the same as the blades and only has a different thickness is preferably selected.

In this embodiment, as for the above-described pivotal member 103, an unnecessary slide movement other than rotation needed for diaphragm adjustment (diaphragm operation), that is, a movement in the planar direction (radial direction) on the base member 102 is limited such that the diaphragm adjustment for the light passing path using the plurality of diaphragm blades 105 can be performed at a predetermined position. In this radial regulation, for example, if a concave portion is provided in the base member 102, and the pivotal member 103 is pivotally buried in the concave portion such that the wall of the concave portion receives the end of the pivotal member 103, the structure of the base member 102 is complicated, resulting in disadvantage in further thickness reduction. In this embodiment, for example, the pivotal member 103 is formed by a thin sheet-shaped member, and the plurality of engaging pins 102a for blade engagement, which are provided on the base member 102, receive the end of the pivotal member 103, thereby performing diaphragm adjustment. Accordingly, when the pivotal member 103 is made thin using the thin sheet-shaped member, the structure is advantageous not only in reducing the thickness of the above-described base member 102 but also in reducing the thickness of the device in turn.

That is, the pivotal member 103 or, in this embodiment, the inner engaging hole 103b of the pivotal member 103 comes into slidable contact with the plurality of engaging pins 102a in the process of pivoting on one surface of the base member 102, and the pivotal position of the pivotal member 103 with respect to the base member 102 is substantially defined. The pivotal position of the pivotal member 103 here means a position where the pivotal member 103 pivots annularly along the opening portion 102g of the base member 102. That is, the pivotal position of the pivotal member 103 with respect to the opening portion 102g of the base member is defined by the slidable contact with the plurality of engaging pins 102a.

As described above, in this embodiment, the plurality of engaging pins 102a with which the diaphragm blades 105 engage are used as the reference of the pivotal position of the pivotal member 103, the structure of the base member 102 can be simplified, and the thickness can further be reduced. In addition, the pivotal position of the pivotal member 103 may be set at a position where the pivotal member 103 pivots about the optical axis center 100. The pivotal position may be set at a position where the pivotal member 103 pivots annularly along the opening portion 106g of the cover member 106.

Note that in this embodiment, when the base member 102 and the plurality of engaging pins 102a are made of the same resin material, the material or structure of the thin sheet-shaped member that forms the pivotal member 103 is preferably appropriately adjusted such that radial regulation can be done by the engaging pins 102a for a long time. For example, if the plurality of engaging pins 102a made of a material different from the base member 102 and having a high strength are separately attached to the base member 102, the number of choices of the material or structure of the thin sheet-shaped member that forms the pivotal member 103 can be increased.

This embodiment is effective for a stable operation as well. As shown in FIG. 7, the conventional structure needs the space for the engagement amount h. Because of the presence of this space, the diaphragm blades 105 or the pivotal member 103 moves in the vertical direction during the operation, and the operation varies. In the first embodiment, since the space for the engagement amount h can be eliminated, the movement of the diaphragm blades 105 or the pivotal member 103 in the vertical direction can substantially be suppressed. Hence, a stable operation can be implemented.

Additionally, when the pivotal member 103 and the diaphragm blades 105 are driven at a high speed, the pivotal member 103 and the diaphragm blades 105 may be bent. In this embodiment, the space for the engagement amount h as in the conventional structure is small. For this reason, the movement of the pivotal member 103 and the diaphragm blades 105 in the optical axis direction is substantially regulated by the base member 102 and the cover 106, and the bending (deformation) caused by the high-speed operation can be suppressed. Hence, a stable operation can be implemented in the high-speed operation.

In the conventional structure, the radial regulating portion of the pivotal member often undergoes slip coating to implement a smooth operation and improve durability. In this embodiment, the engaging portions between the diaphragm blades 105 and the pivotal member 103 are substantially shared, thereby minimizing slip coating and reducing the cost. In addition, if a resin with excellent lubricity is used for the engaging portions, slip coating can easily be eliminated. Since the coating can be eliminated, the structure is effective from the viewpoint of environment.

Modifications of the structure that regulates the pivotal position of the pivotal member 103 in the above-described first embodiment will be described below in detail using the second to seventh embodiments. The basic effects are the same as in the above-described first embodiment, and a repetitive description thereof will be omitted.

Second Embodiment

Figure 8:
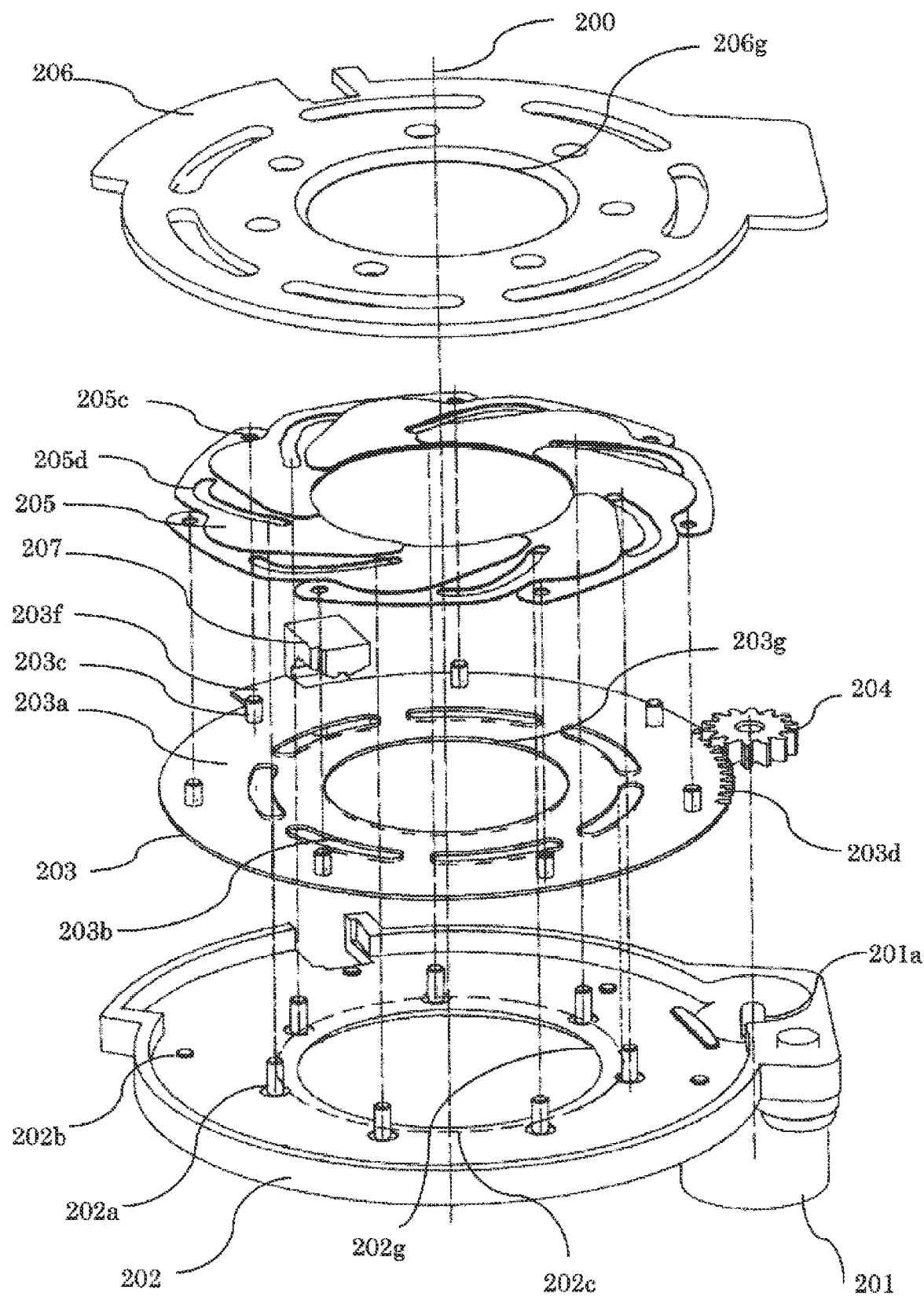
FIG. 8 is an exploded perspective view of a blade driving device according to another embodiment.

FIG. 8 is an exploded perspective view of a blade driving device according to the second embodiment of the present invention. Reference numeral 200 denotes an optical axis center of the blade driving device. In the above-described first embodiment, a structure has been described, in which the inner engaging hole 103b of the pivotal member 103 engages with the circumscribed circle formed by the plurality of engaging pins 102a of the base member 102, thereby implementing radial regulation of the pivotal member 103. In the second embodiment, however, outer engaging portions 203b of a pivotal member 203 engage with an inscribed circle formed by a plurality of engaging pins 202a of a base member 202, thereby implementing radial regulation of the pivotal member 203. The remaining components are basically the same as in the first embodiment. Reference numerals in the drawings are 100s in the first embodiment and 200s in this embodiment.

Reference numeral 203 denotes the pivotal member. The pivotal member 203 includes a base 203a, the engaging portions 203b, engaging portions 203i, an opening portion 203g, driving pins 203c, a driven portion 203d, and a light-shielding portion 203f.

Figure 9:
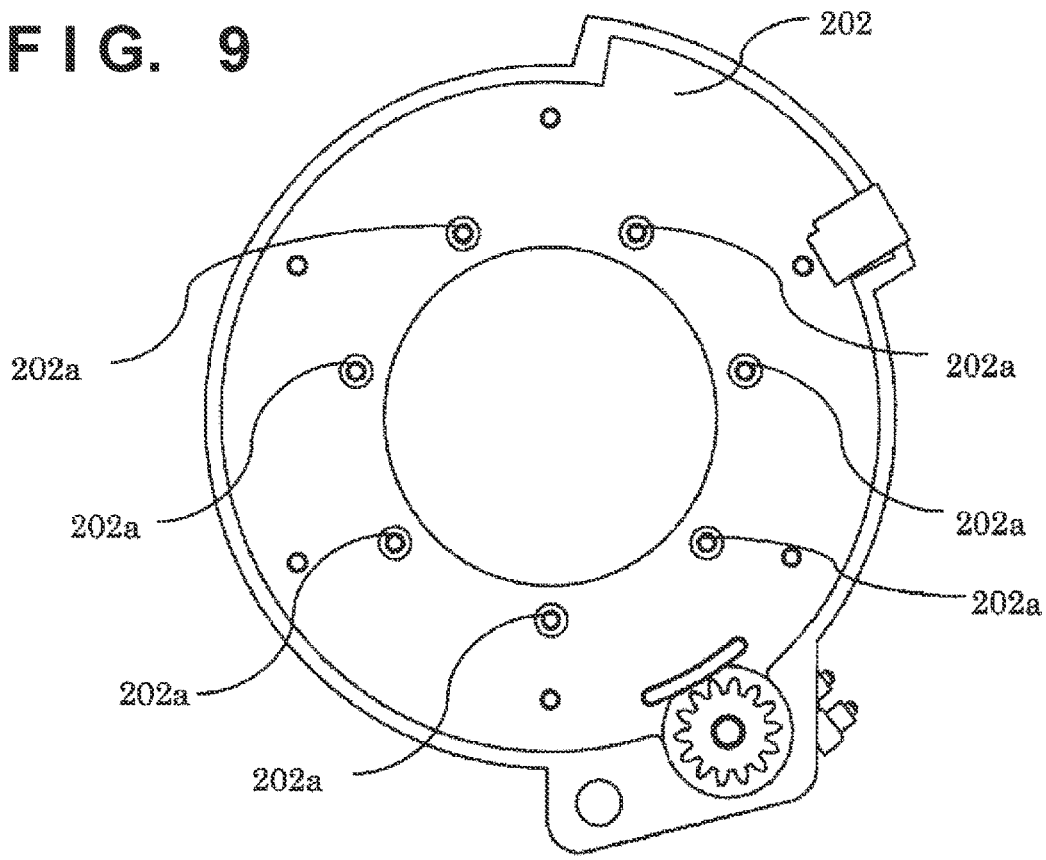
FIG. 9 is an exploded front view of the blade driving device according to the embodiment (base member)
Figure 10:
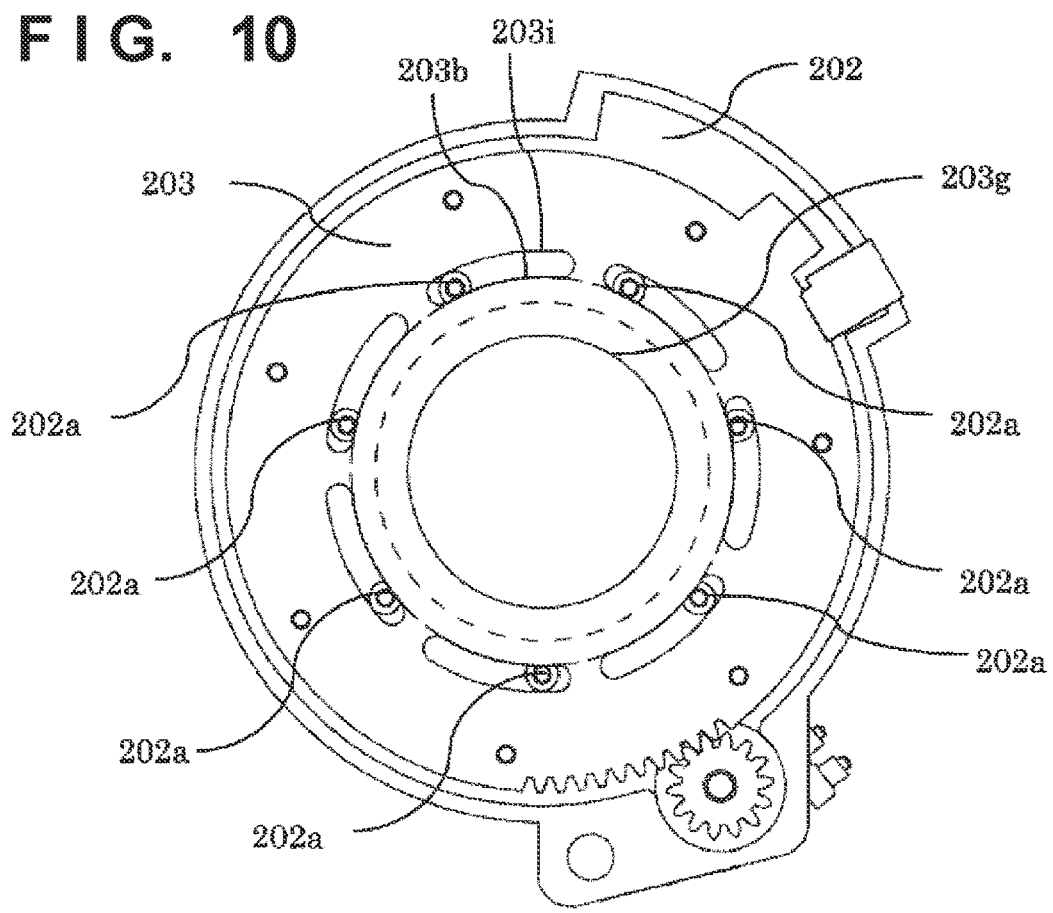
FIG. 10 is an exploded front view of the blade driving device according to the embodiment (the arrangement of a pivotal member)

Radial engagement of the pivotal member 203, which is a characteristic feature of the second embodiment, will be explained here. FIG. 9 is a front view showing a state in which the pivotal member 203, diaphragm blades 205, and a cover member 206 are detached. FIG. 10 is a front view of the pivotal member 203 that is assembled in the state shown in FIG. 9. In the pivotal member 203, the engaging portions 203b are in slidable contact with the plurality of engaging pins 202a of the base member 202 in a rotatable state. In addition, the pivotal position of the pivotal member 203 with respect to the base member 202 is defined when the engaging portions 203b are in slidable contact with the plurality of engaging pins 202a of the base member 202. In this embodiment, the engaging portions (inner engaging holes) 203b of the pivotal member 203 engage with an inscribed circle (202c) formed by the seven engaging pins 202a of the base member. The number of engaging pins 202a can be arbitrary as long as a plurality of engaging pins are included.

Figure 11:
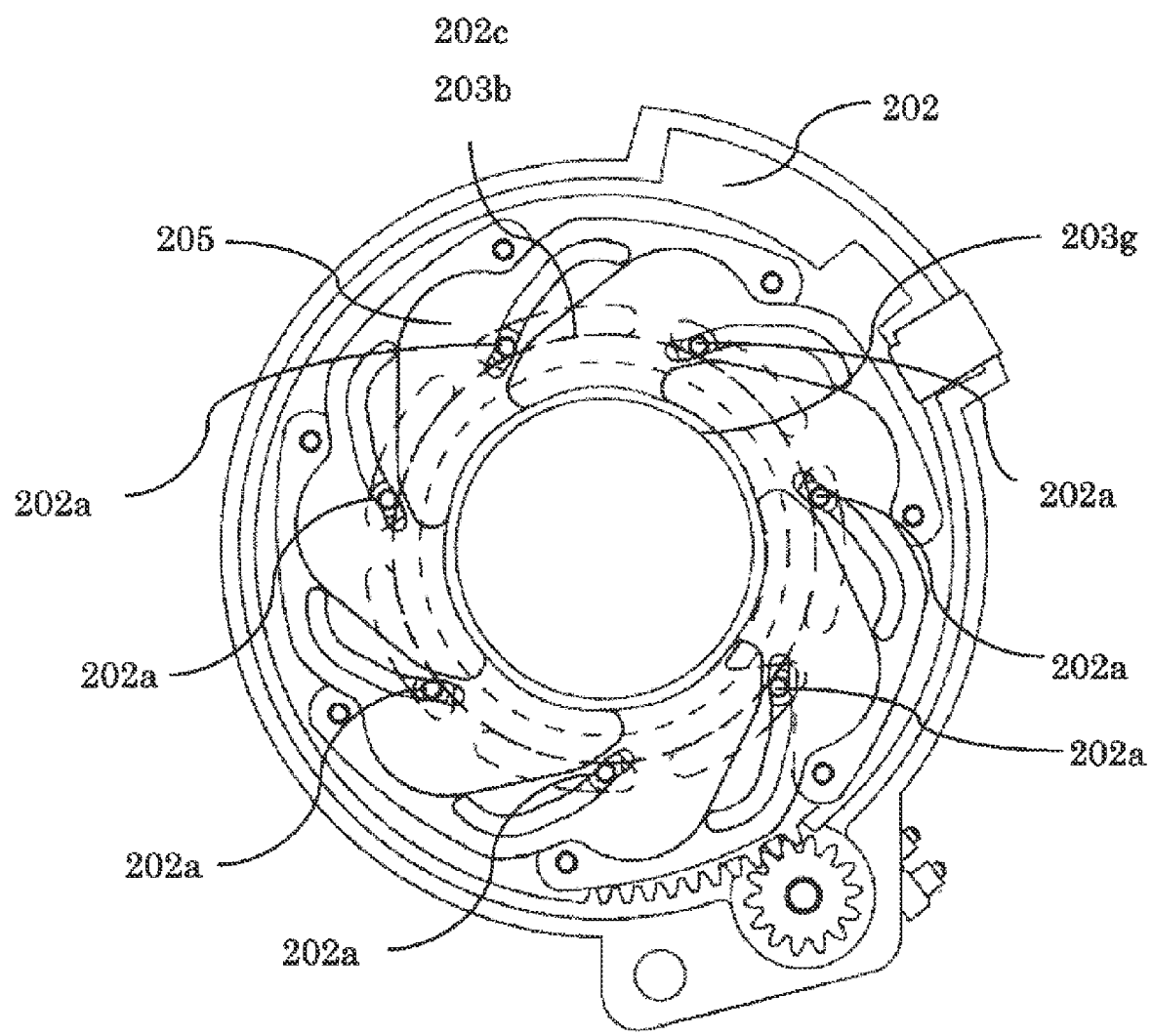
FIG. 11 is an exploded front view of the blade driving device according to the embodiment (the arrangement of diaphragm blades)

FIG. 11 is a front view of the diaphragm blades 205 that are assembled. There exist a plurality of diaphragm blades 205. In the base member 202, the engaging pins 202a as many as the diaphragm blades exist. The diaphragm blades 205 and the engaging pins 202a are arranged annularly around an opening portion provided to extend through the base member 202. When the pivotal member 203 is rotated, the diaphragm blades 205 enter or exit from the opening portion, and the opening area changes, as shown in FIG. 12.

Figure 12:
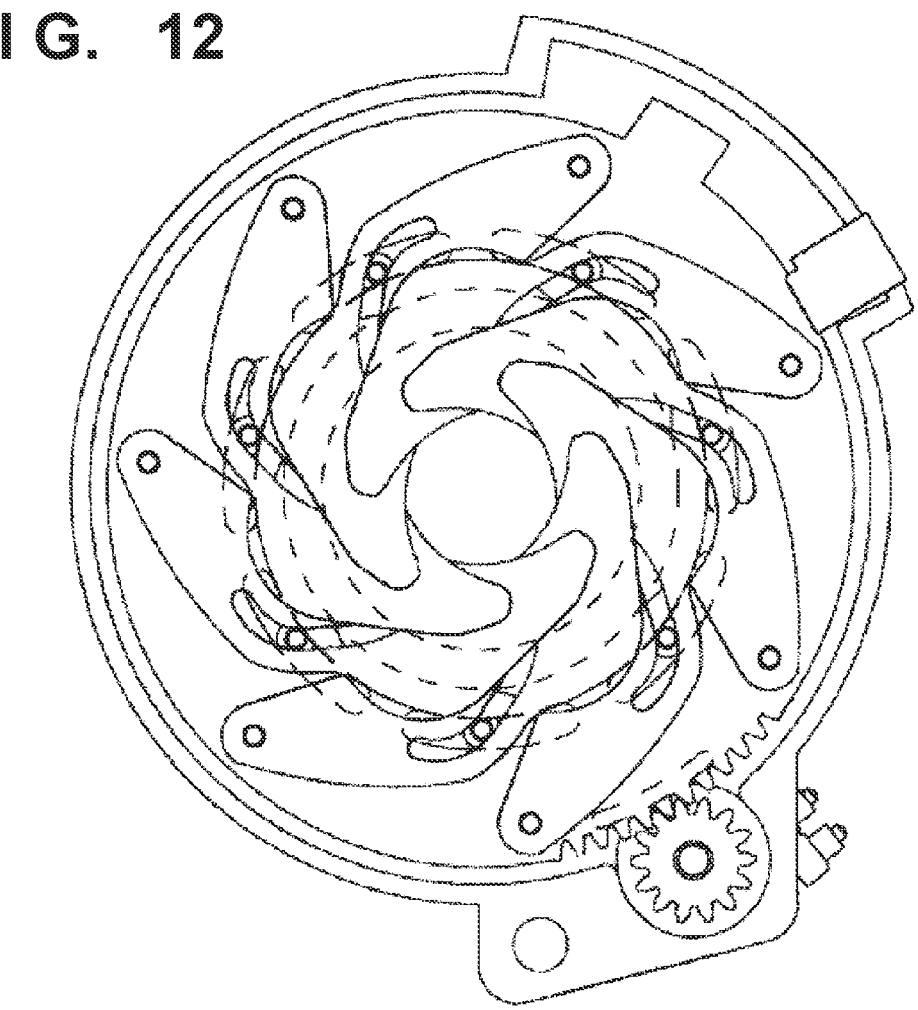
FIG. 12 is an exploded front view of the blade driving device according to the embodiment (the pivotal movement of the diaphragm blades)
Figure 13:
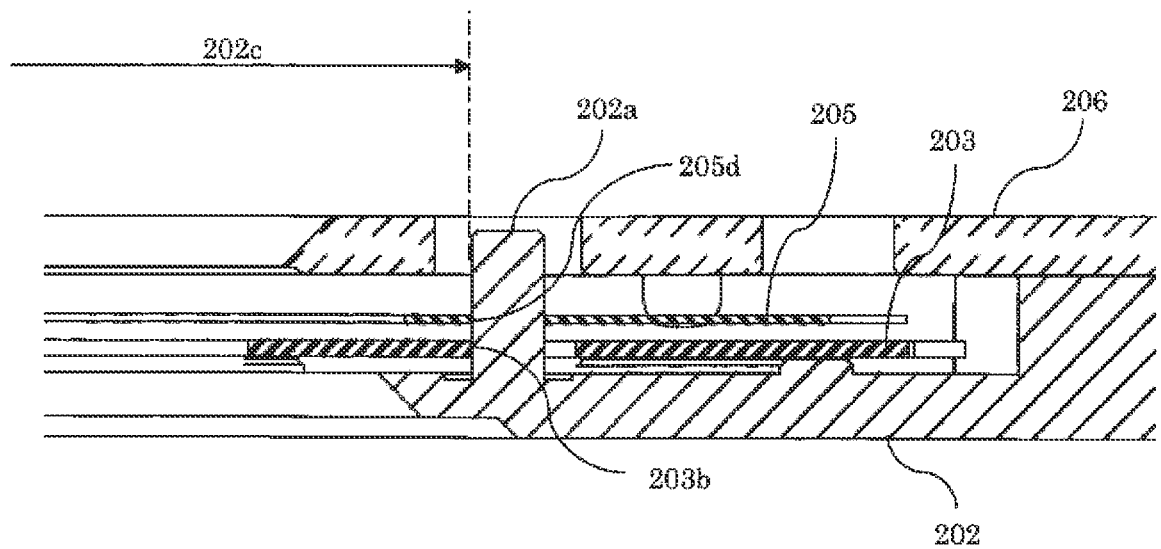
FIG. 13 is a sectional view of the embodiment.

FIG. 12 is a sectional view of a light amount adjusting device according to the second embodiment. The engaging portions 203b of the pivotal member 203 engage with the inscribed circle 202c formed by the plurality of engaging pins 202a. The pivotal member 203 and the diaphragm blades 205 are regulated by the same engaging pins 202a in the radial direction. That is, the radial direction can be regulated by the same portions. For this reason, the device can be made simple and compact. Additionally, since the driving space need not be separated for the pivotal member 203 and the diaphragm blades 205, the device can be made thin. Details of the driving space are the same as the contents described with reference to FIG. 7 as the conventional technique of the first embodiment. As for the effects of the present invention, the same effects as in the first embodiment can be obtained.

In this embodiment, the engaging portions 203b of the pivotal member 203 are inscribed in the plurality of engaging pins 202a. However, even if the engaging pins 202a of the base member circumscribe the engaging portion 203i, the same effects as described above can be obtained. Alternatively, the engaging portions 203b and 203i may be mixed and combined such that they are in contact with the plurality of engaging pins 202a.

The open diameter of the blade driving device can be defined by any of the opening portion 202g of the base member, an opening portion 206g of the cover member, the opening portion 203g of the pivotal member, and a diaphragm opening shape formed by the plurality of diaphragm blades. If the pivotal member 203 is made using a resin film, the pivotal member 203 can be made thin. For this reason, forming the open diameter of the blade driving device by the opening portion 203g of the pivotal member is effective in making the device thin.

Third Embodiment

Figure 14:
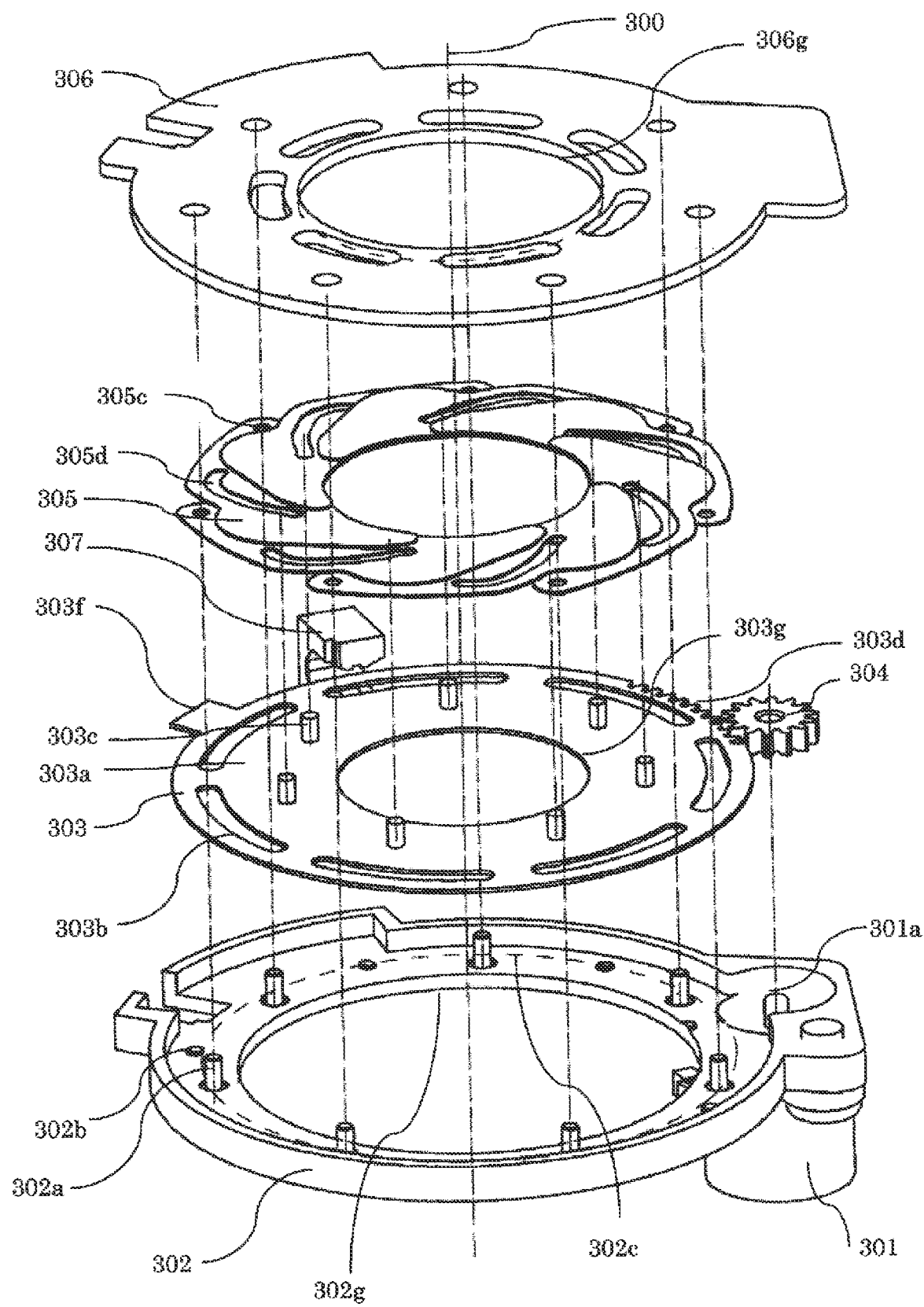
FIG. 14 is an exploded perspective view of a blade driving device according to still another embodiment.

FIG. 14 is an exploded perspective view of a blade driving device according to the third embodiment of the present invention. Reference numeral 300 denotes an optical axis center of the blade driving device. The constituent components are basically the same as in the first embodiment. As for reference numerals in the drawings, the components given reference numerals in 300s will be described in this embodiment.

Reference numeral 303 denotes a pivotal member. The pivotal member 303 includes a base 303a, engaging portions 303b, an opening portion 303g, driving pins 303c, a driven portion 303d, and a light-shielding portion 303f. The pivotal member 303 is made by resin molding.

Engaging holes 305c of diaphragm blades 305 engage with engaging pins 302a of a base member 302, respectively. In addition, cam grooves 305d of the diaphragm blades 305 engage with the driving pins 303c of the pivotal member 303. A pinion 304 rotates, a force is applied to the driven portion 303d of the pivotal member 303, and the pivotal member 303 rotates. When the pivotal member 303 rotates, a driving force is applied from the driving pins 303c of the pivotal member 303 to the cam grooves 305d of the diaphragm blades 305, and the diaphragm blades 305 rotate about the engaging pins 302a. By the cam grooves 305d, the diaphragm blades 305 enter or exit from the opening of the base member 302. The diaphragm shape can be adjusted by the plurality of diaphragm blades 305.

Figure 15:
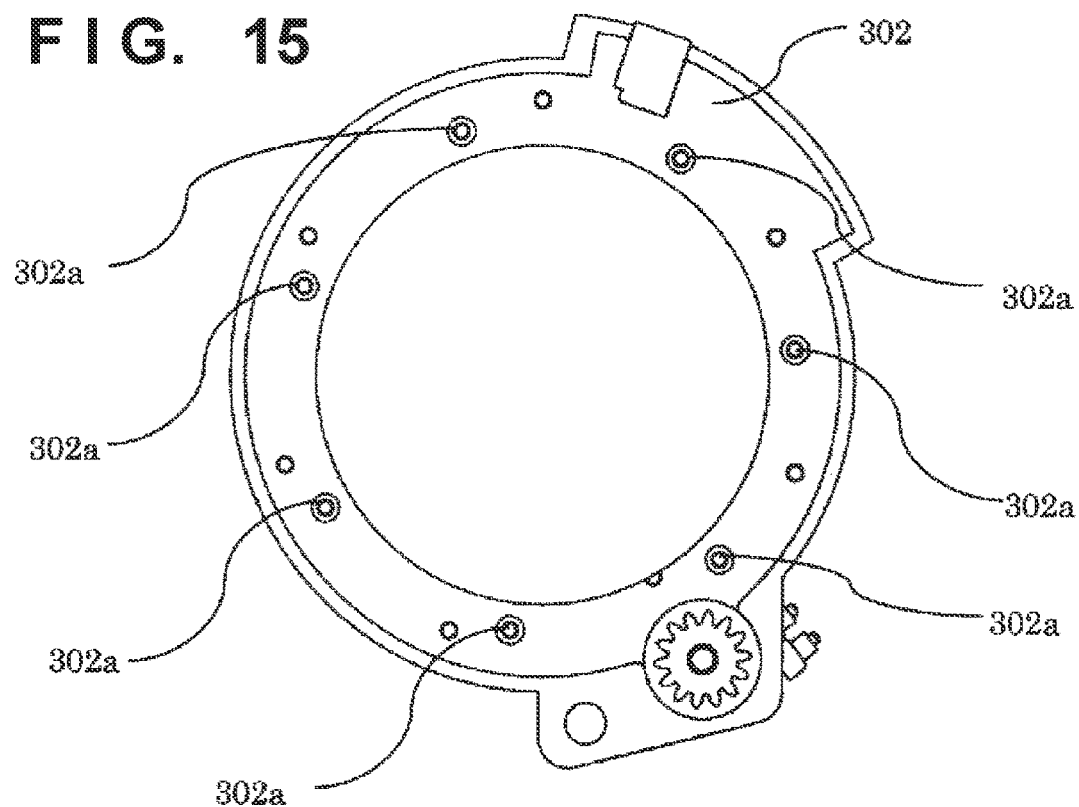
FIG. 15 is an exploded front view of the blade driving device according to the embodiment (base member)
Figure 16:
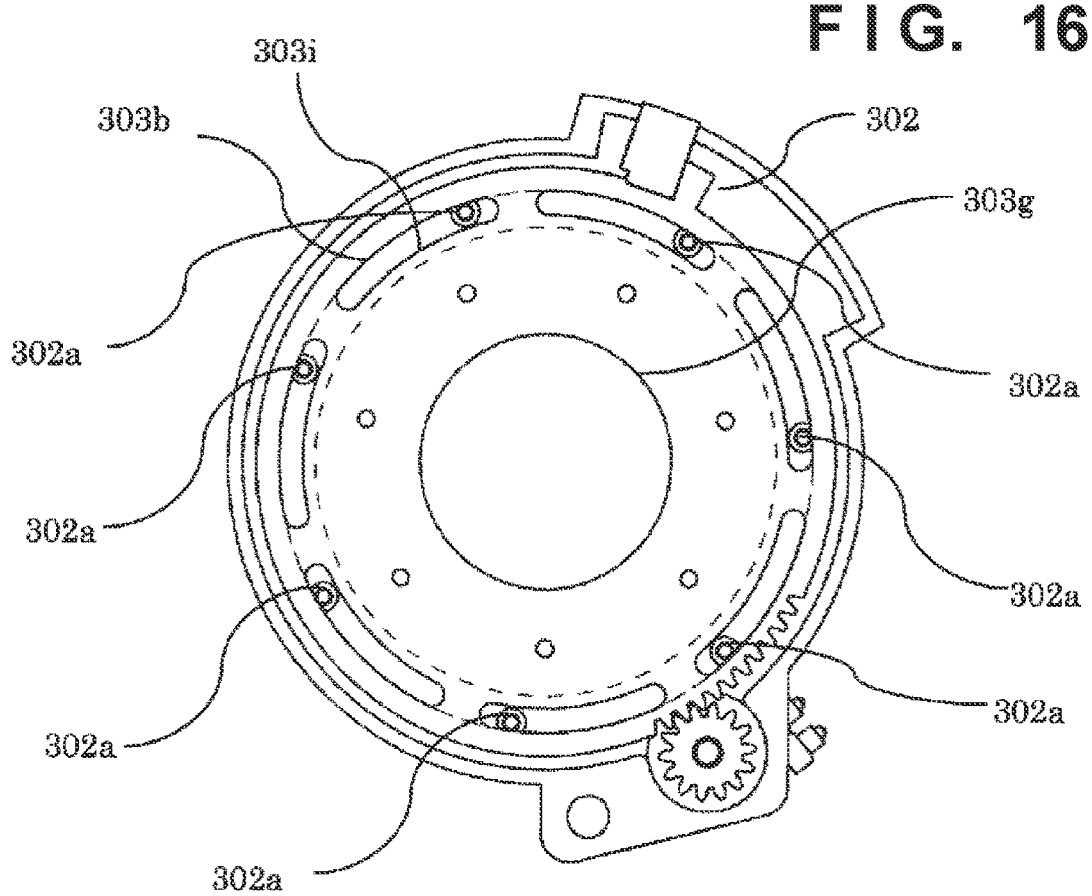
FIG. 16 is an exploded front view of the blade driving device according to the embodiment (the arrangement of a pivotal member)

Radial engagement of the pivotal member 303, which is a characteristic feature of this embodiment, will be explained here. FIG. 15 is a front view showing a state in which the pivotal member 303, the diaphragm blades 305, and a cover member 306 are detached. FIG. 16 is a front view of the pivotal member 303 that is assembled in the state shown in FIG. 15. In the pivotal member 303, the engaging portions 303b are in slidable contact with the plurality of engaging pins 302a of the base member 302 in a rotatable state. In addition, the position of the pivotal member 303 is defined when the engaging portions 303b are in slidable contact with the plurality of engaging pins 302a of the base member 302. The engaging portions 303b of the pivotal member 303 engage with the plurality of engaging pins 302a of the base member 302. In this embodiment, the engaging portions 303b of the pivotal member 303 engage with a circumscribed circle (302c) formed by the seven engaging pins 302a of the base member. The number of engaging pins 302a can be arbitrary as long as a plurality of engaging pins are included.

Figure 17:
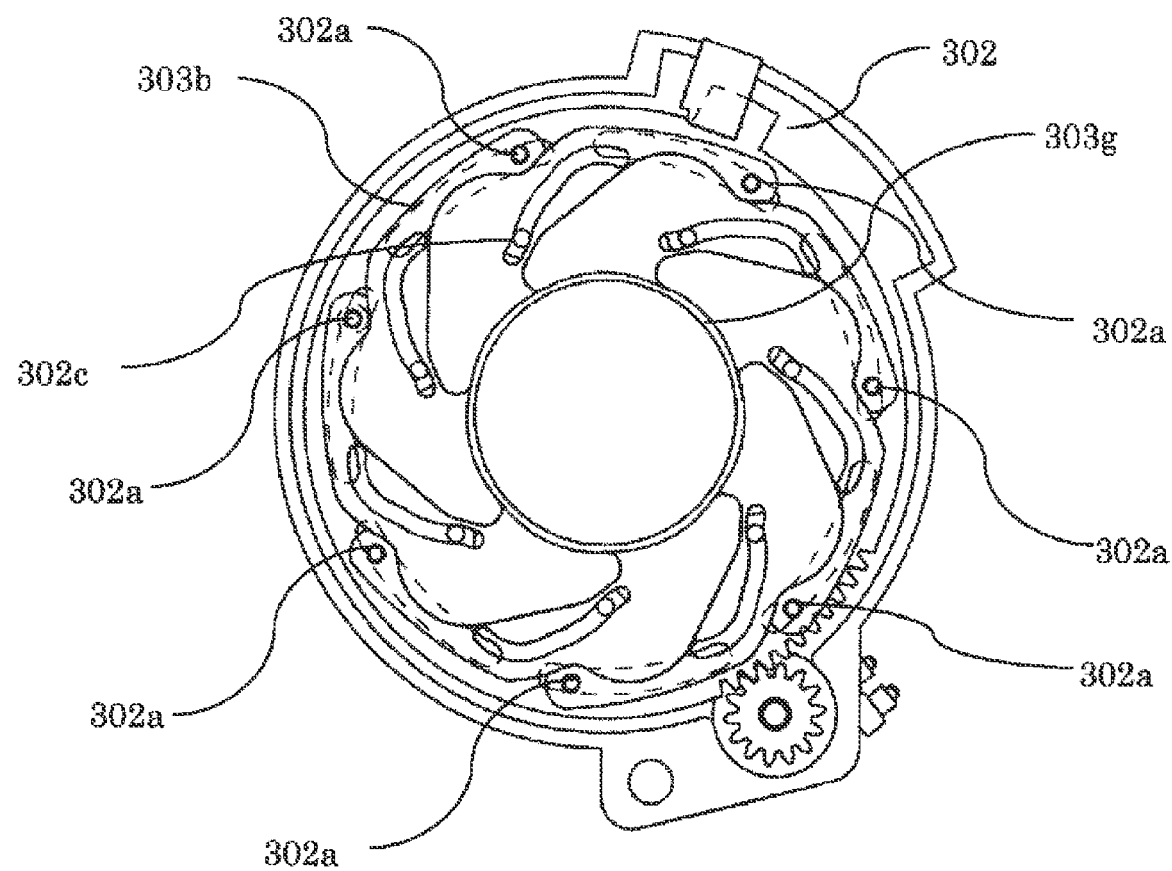
FIG. 17 is an exploded front view of the blade driving device according to the embodiment (the arrangement of diaphragm blades)
Figure 18:
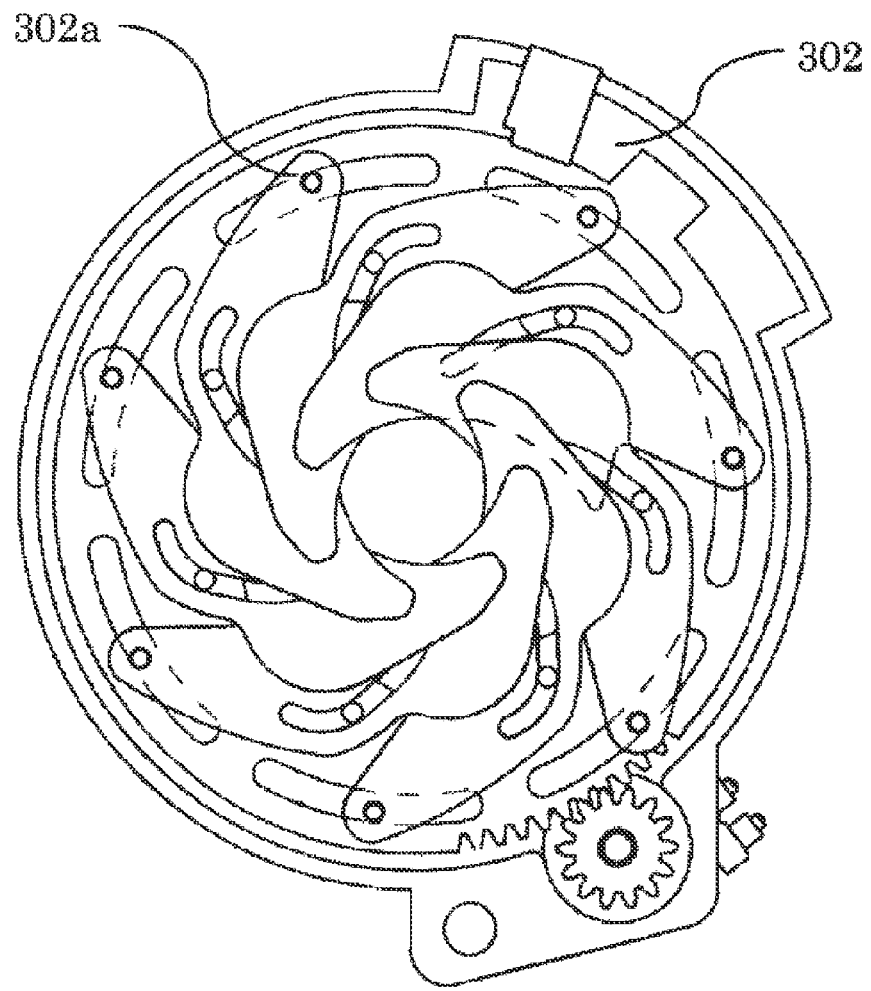
FIG. 18 is an exploded front view of the blade driving device according to the embodiment (the pivotal movement of the diaphragm blades)

FIG. 17 is a front view of the diaphragm blades 305 that are assembled. There exist a plurality of diaphragm blades 305. In the base member 302, the engaging pins 302a as many as the diaphragm blades exist. The diaphragm blades 305 and the engaging pins 302a are arranged annularly around an opening portion 302g provided to extend through the base member 302. When the pivotal member 303 is rotated, the diaphragm blades 305 enter or exit from the opening, and the opening area changes, as shown in FIG. 18.

Figure 19:
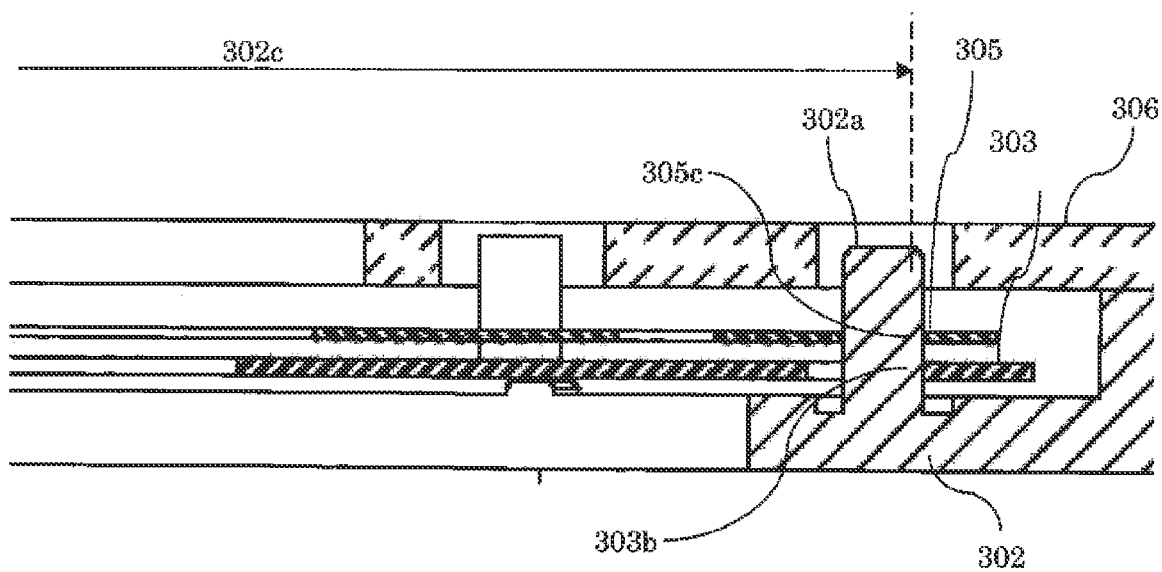
FIG. 19 is a sectional view of the embodiment.

FIG. 19 is a sectional view of a light amount adjusting device according to the third embodiment. The engaging portion 303b of the pivotal member 303 engages with the circumscribed circle 302c formed by the plurality of engaging pins 302a. The pivotal member 303 and the diaphragm blades 305 are regulated by the same engaging pins 302a in the radial direction. That is, the radial direction can be regulated by the same portions. For this reason, the device can be made simple and compact. Additionally, since the driving space need not be separated for the pivotal member 303 and the diaphragm blades 305, the device can be made thin. Details of the driving space are the same as the contents described with reference to FIG. 7 as the conventional technique of the first embodiment. As for the effects of the present invention, the same effects as in the first embodiment can be obtained.

In this embodiment, the engaging portions 303b of the pivotal member 303 are inscribed in the plurality of engaging pins 302a. However, even if the engaging pins 302a of the base member circumscribe the engaging portion 303i, the same effects as described above can be obtained. Alternatively, the engaging portions 303b and 303i may be mixed and combined such that they are in contact with the plurality of engaging pins 302a.

The open diameter of the blade driving device can be defined by any of the opening portion 302g of the base member 302, an opening portion 306g of the cover member, the opening portion 303g of the pivotal member, and a diaphragm opening shape formed by the plurality of diaphragm blades. If the pivotal member 303 is made using a resin film, the pivotal member 303 can be made thin. For this reason, forming the open diameter of the blade driving device by the opening portion 303a of the pivotal member is effective in making the device thin.

Fourth Embodiment

Figure 20:
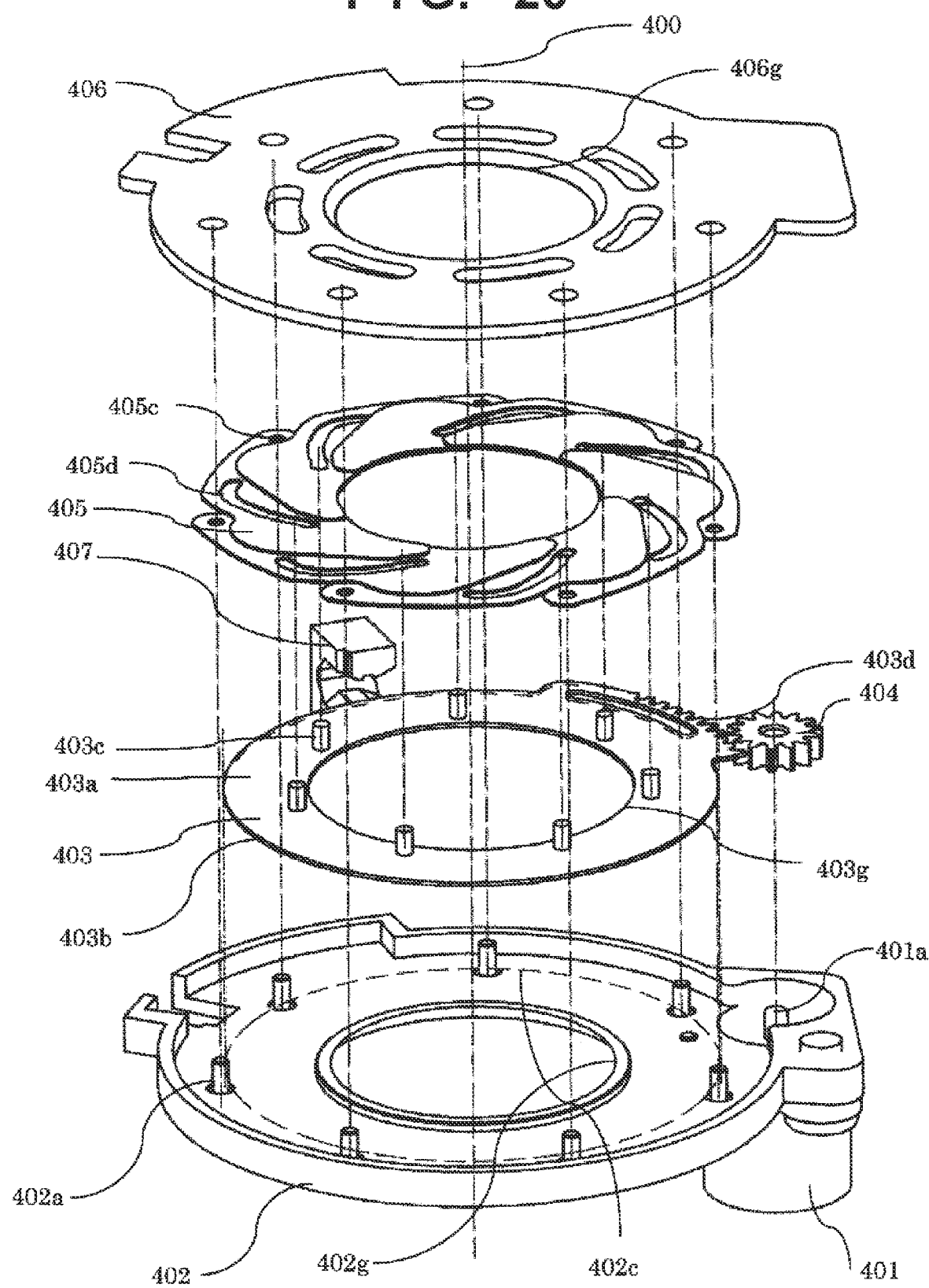
FIG. 20 is an exploded perspective view of a blade driving device according to still another embodiment.

FIG. 20 is an exploded perspective view of a blade driving device according to the fourth embodiment of the present invention. Reference numeral 400 denotes an optical axis center of the blade driving device. The constituent components are basically the same as in the first embodiment. Note that in this embodiment, the components given reference numerals in 400s will be described.

Reference numeral 403 denotes a pivotal member. The pivotal member 403 includes a base 403a, an engaging portion 403b, driving pins 403c, and a driven portion 403d.

Engaging holes 405c of diaphragm blades 405 engage with engaging pins 402a of a base member 402, respectively. In addition, cam grooves 405d of the diaphragm blades 405 engage with the driving pins 403c of the pivotal member 403. A pinion 404 rotates, a force is applied to the driven portion 403d of the pivotal member 403, and the pivotal member 403 rotates. When the pivotal member 403 rotates, a driving force is applied from the driving pins 403c of the pivotal member 403 to the cam grooves 405d of the diaphragm blades 405, and the diaphragm blades 405 rotate about the engaging pins 402a. By the cam grooves 405d, the diaphragm blades 405 enter or exit from the opening of the base member 402. The diaphragm shape can be adjusted by the plurality of diaphragm blades 405.

Figure 21:
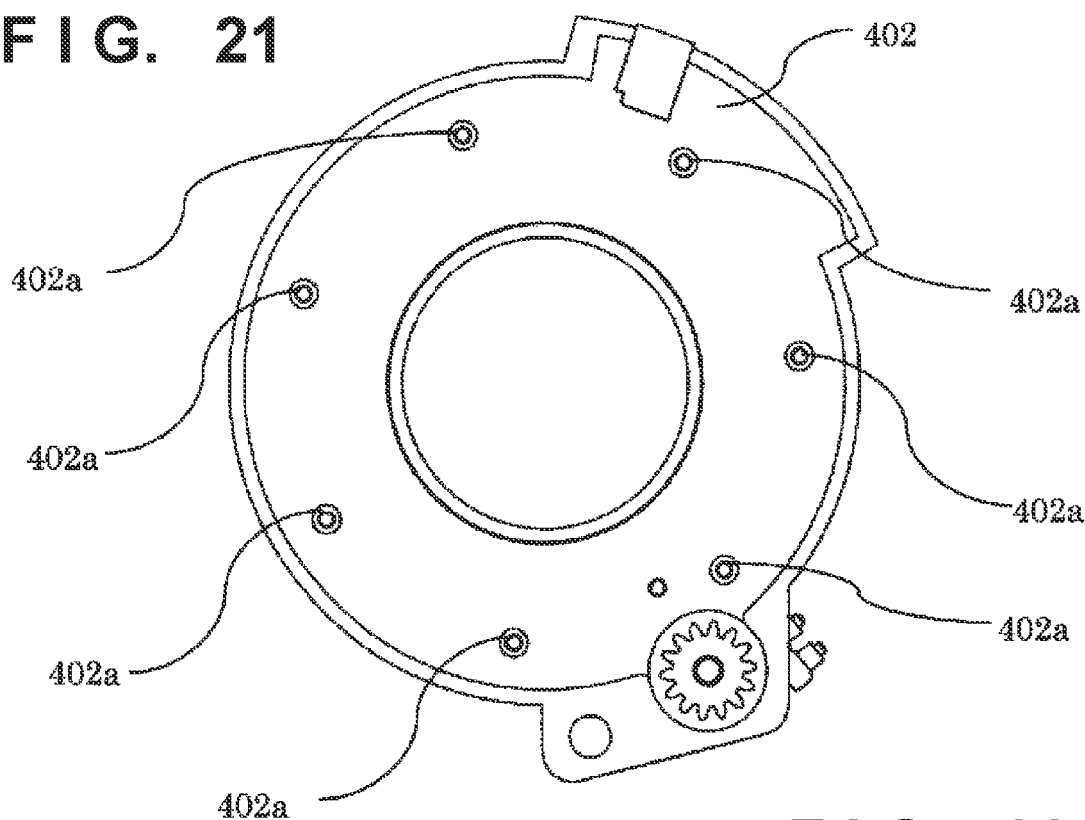
FIG. 21 is an exploded front view of the blade driving device according to the embodiment (base member)
Figure 22:
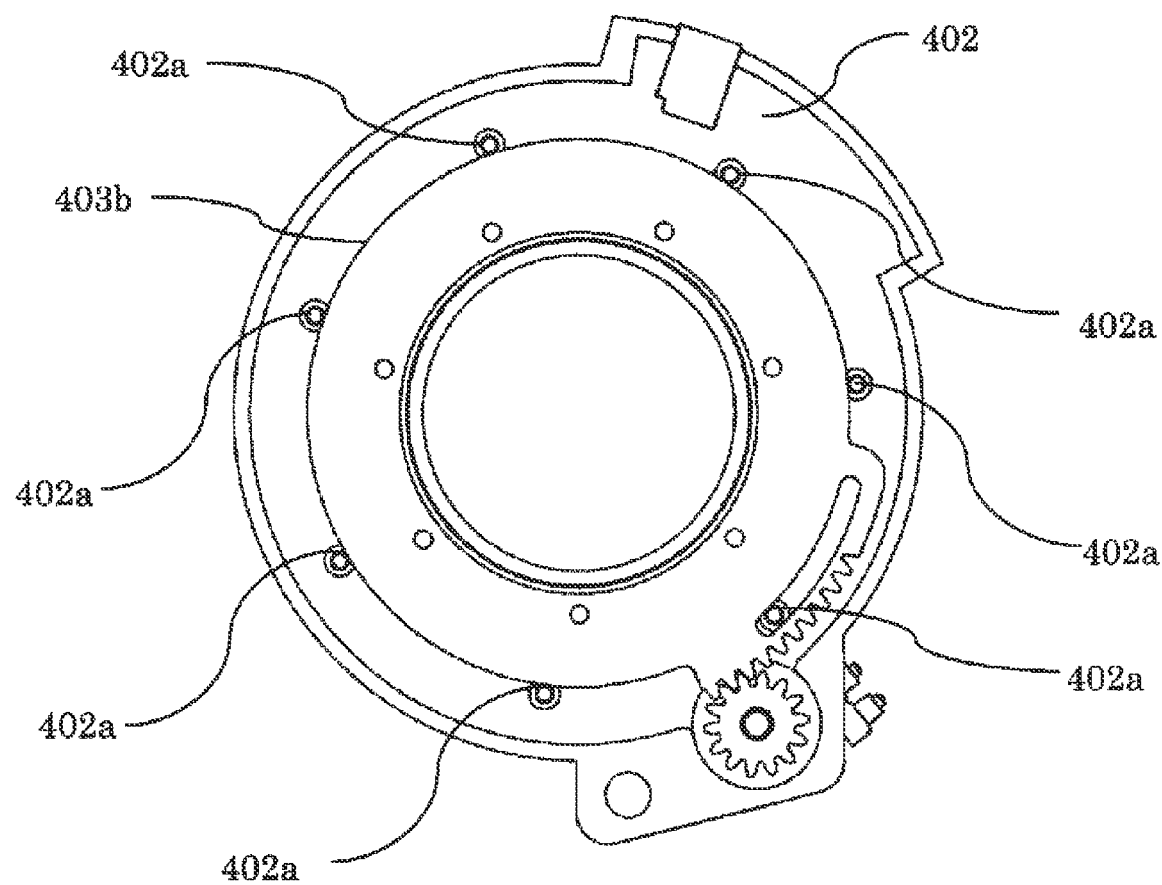
FIG. 22 is an exploded front view of the blade driving device according to the embodiment (the arrangement of a pivotal member)

Radial engagement of the pivotal member, which is a characteristic feature of the fourth embodiment, will be explained here. FIG. 21 is a front view showing a state in which the pivotal member 403, the diaphragm blades 405, and a cover member 406 are detached. FIG. 22 is a front view of the pivotal member 403 that is assembled in the state shown in FIG. 21. In the pivotal member 403, the engaging portion 403b is in slidable contact with the plurality of engaging pins 402a of the base member 402 in a rotatable state. In addition, the position of the pivotal member 403 is defined when the engaging portion 403b is in slidable contact with the plurality of engaging pins 402a of the base member 402. The engaging portion 403b of the pivotal member 403 engages with the plurality of engaging pins 402a of the base member 402. In this embodiment, the engaging portions 403b of the pivotal member 403 engage with a circumscribed circle (402c) formed by the seven engaging pins 402a of the base member. The number of engaging pins 402a can be arbitrary as long as a plurality of engaging pins are included.

Figure 23:
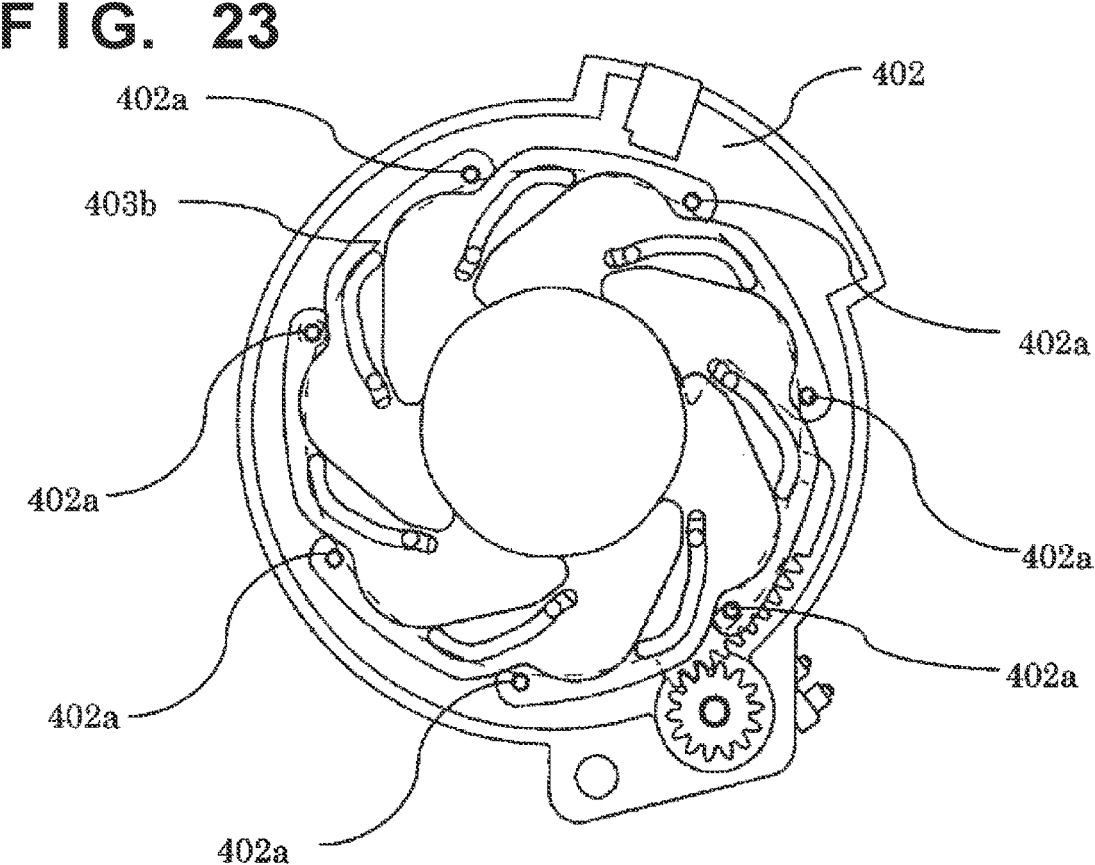
FIG. 23 is an exploded front view of the blade driving device according to the embodiment (the arrangement of diaphragm blades)
Figure 24:
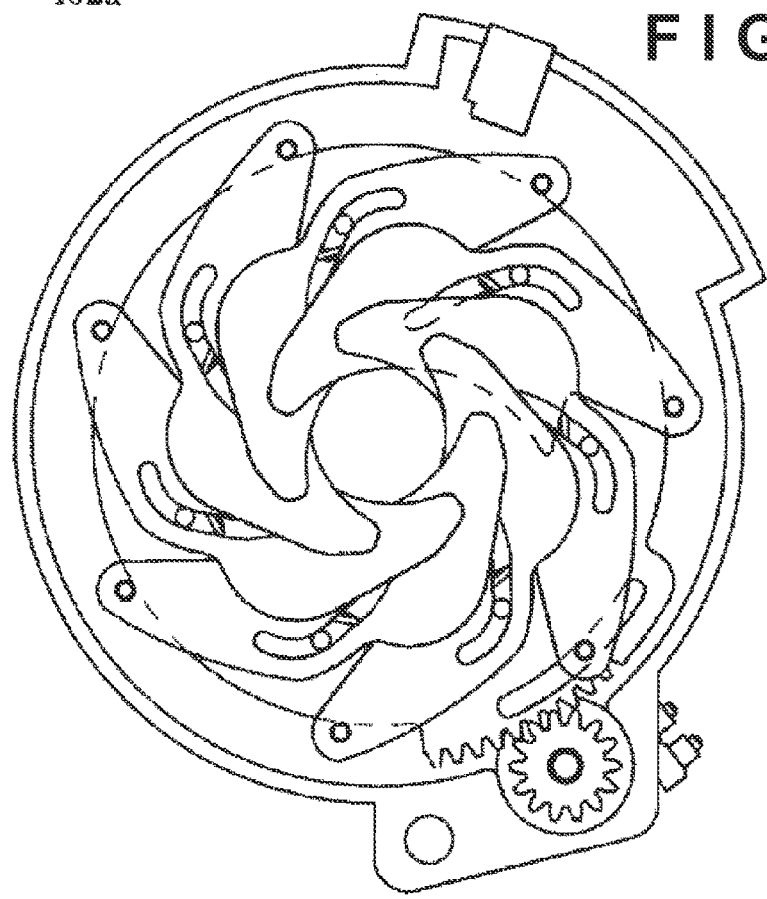
FIG. 24 is an exploded front view of the blade driving device according to the embodiment (the pivotal movement of the diaphragm blades)

FIG. 23 is a front view of the diaphragm blades 405 that are assembled. There exist a plurality of diaphragm blades 405. In the base member 402, the engaging pins 402a as many as the diaphragm blades exist. The diaphragm blades 405 and the engaging pins 402a are arranged annularly around an opening portion provided to extend through the base member 402. When the pivotal member 403 is rotated, the diaphragm blades 405 enter or exit from the opening, and the opening area changes, as shown in FIG. 24.

Figure 25:
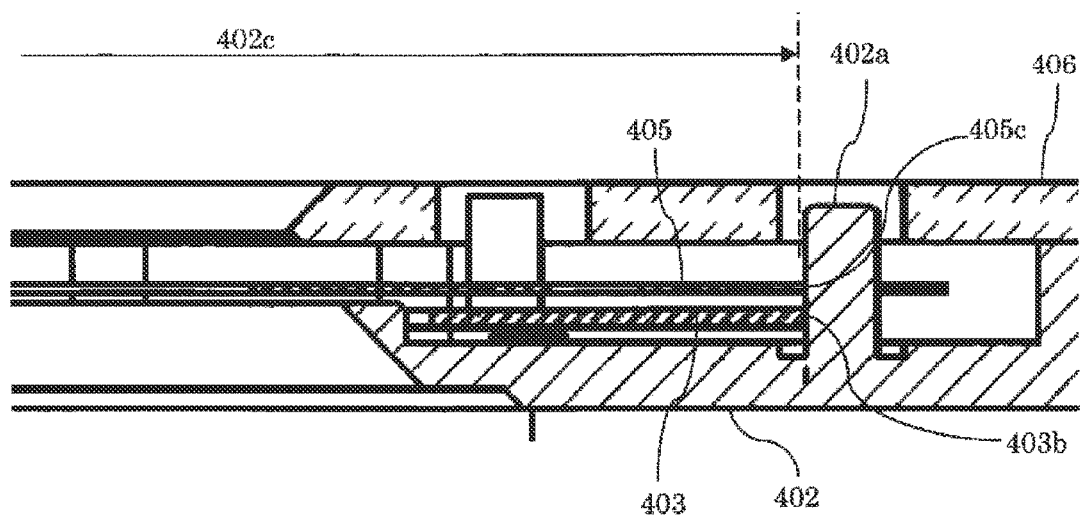
FIG. 25 is a sectional view of the embodiment.

FIG. 25 is a sectional view of a light amount adjusting device according to the fourth embodiment. The engaging portion 403b of the pivotal member 403 engages with the circumscribed circle 402c formed by the plurality of engaging pins 402a. The pivotal member 403 and the diaphragm blades 405 are regulated by the same engaging pins 402a in the radial direction. That is, the radial direction can be regulated by the same portions. For this reason, the device can be made simple and compact. Additionally, since the driving space need not be separated for the pivotal member 403 and the diaphragm blades 405, the device can be made thin. Details of the driving space are the same as the contents described with reference to FIG. 7 as the conventional technique of the first embodiment. As for the effects of the present invention, the same effects as in the first embodiment can be obtained.

Fifth Embodiment

Figure 26:
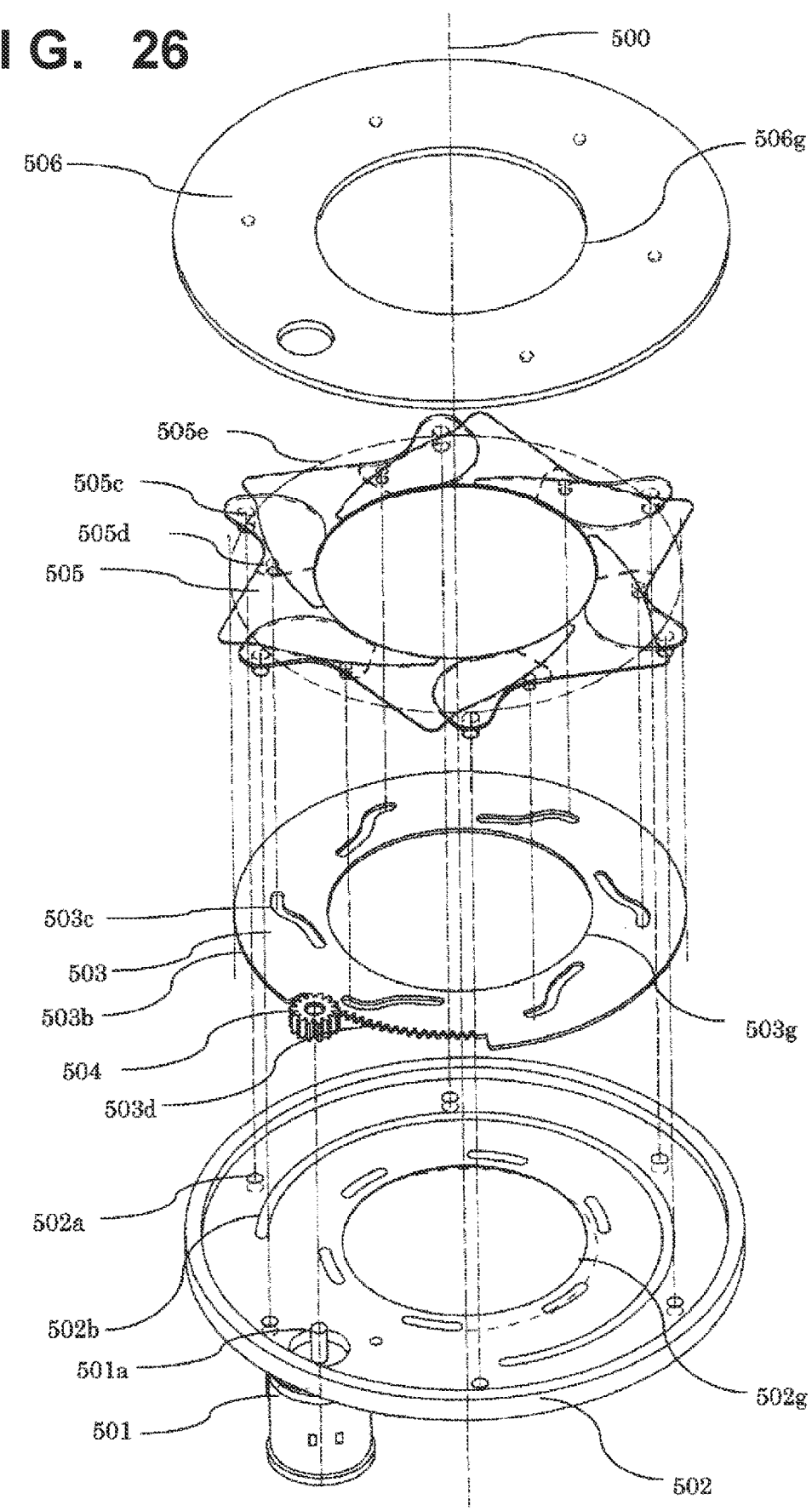
FIG. 26 is an exploded perspective view of a blade driving device according to still another embodiment.

FIG. 26 is an exploded perspective view of a blade driving device according to the fifth embodiment of the present invention. Reference numeral 500 denotes an optical axis center of the blade driving device. The constituent components are basically the same as in the first embodiment. Note that in this embodiment, the components given reference numerals in 500s will be described.

Reference numeral 503 denotes a pivotal member. The pivotal member 503 includes a base 503a, an engaging portion 503b, cam grooves 503c, and a driven portion 503d.

Reference numeral 505 denotes a diaphragm blade. An engaging pin 505c and a driving pin 505d that is a driven portion are formed on the diaphragm blade 505. The diaphragm blade 505 is made by, for example, bonding, welding, insert-molding, or outsert-molding the engaging pin and the driving pin on a press-worked PET sheet material. The diaphragm blade 505 may be made by resin molding or the like. In the fifth embodiment, seven diaphragm blades are used. However, the number of diaphragm blades can be arbitrary as long as at least two diaphragm blades are included.

The engaging pins 505c of the diaphragm blades 505 engage with engaging holes 502a of a base member 502, respectively. In addition, the driving pins 505d of the diaphragm blades 505 engage with the cam grooves 503c of the pivotal member 503, respectively. A pinion 504 rotates, a force is applied to the driven portion 503d of the pivotal member 503, and the pivotal member 503 rotates. When the pivotal member 503 rotates, a driving force is given from the cam grooves 503c of the pivotal member 503 to the driving pins 505d of the diaphragm blades 505, and the diaphragm blades 505 rotate about the engaging pins 505c. By the cam grooves 503c, the diaphragm blades 505 enter or exit from the opening of the base member 502. The diaphragm shape can be adjusted by the plurality of diaphragm blades 505.

Figure 27:
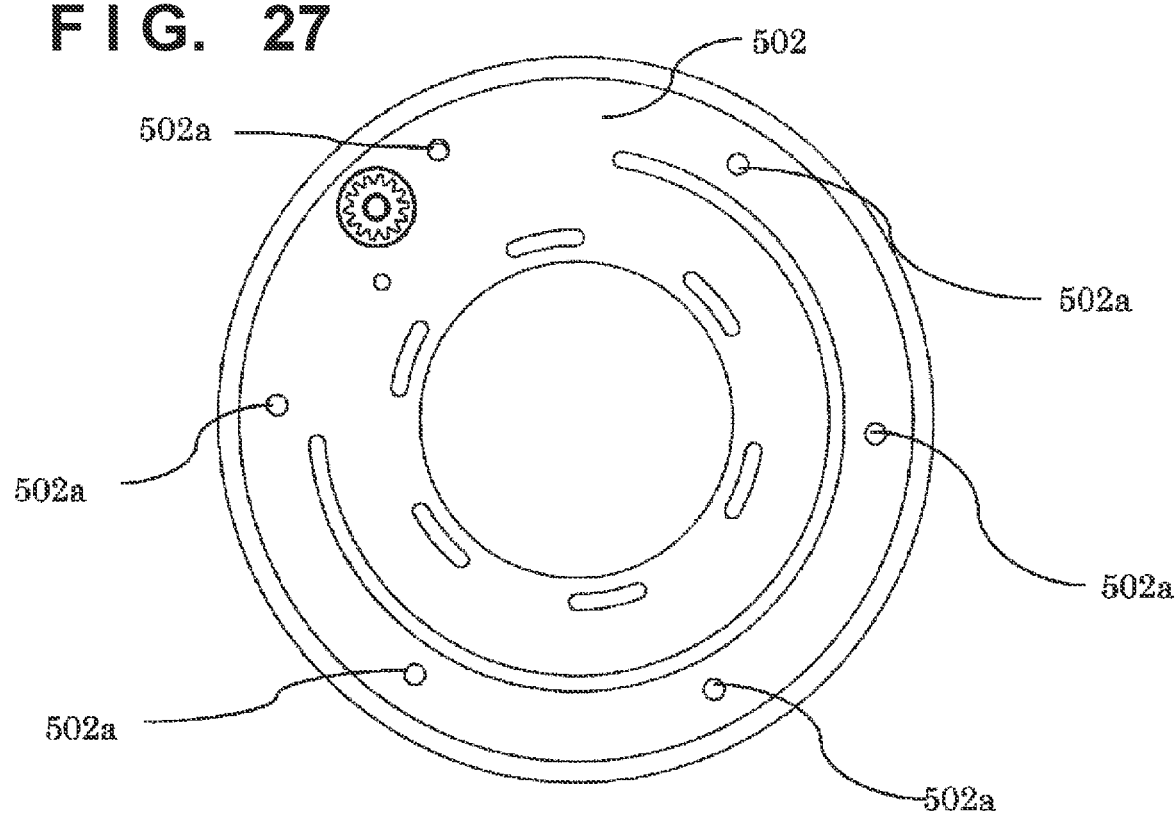
FIG. 27 is an exploded front view of the blade driving device according to the embodiment (base member)
Figure 28:
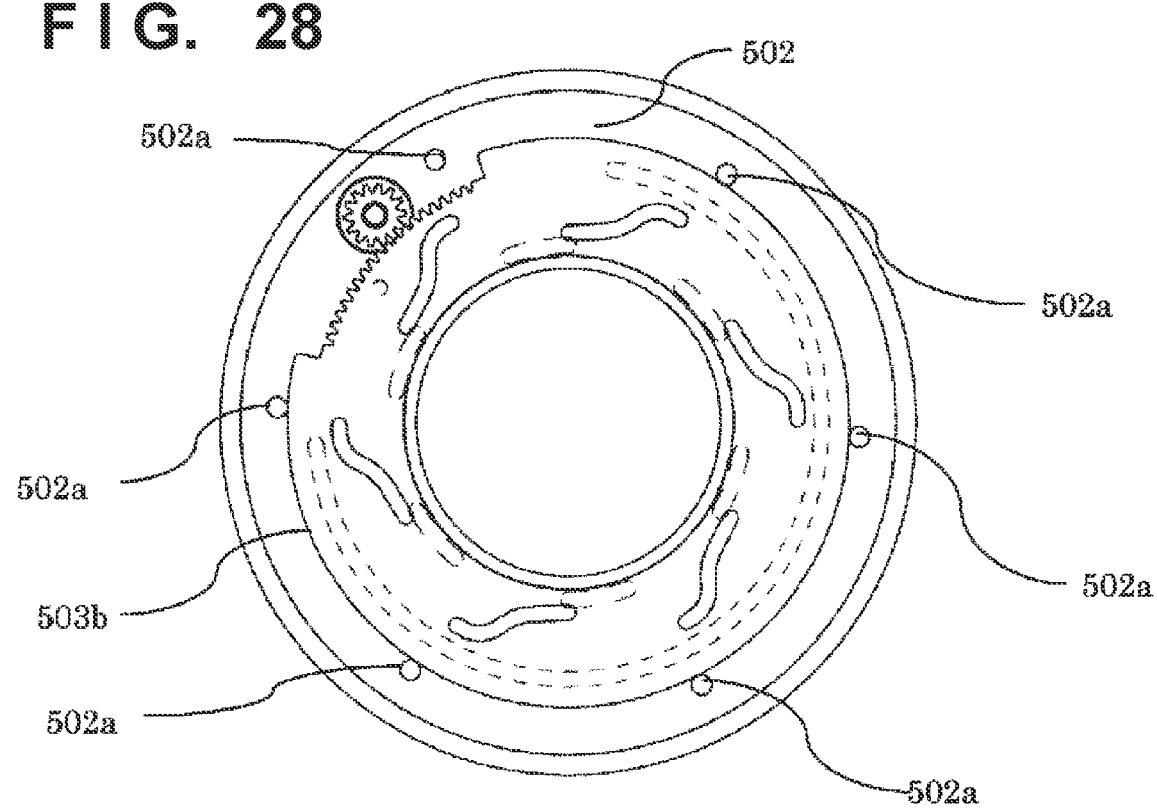
FIG. 28 is an exploded front view of the blade driving device according to the embodiment (the arrangement of a pivotal member)

Radial engagement of the pivotal member, which is a characteristic feature of this embodiment, will be explained here. FIG. 27 is a front view showing a state in which the pivotal member 503, the diaphragm blades 505, and a cover member 506 are detached. FIG. 28 is a front view of the pivotal member 503 that is assembled in the state shown in FIG. 27. In a projected state, the engaging portion 503b of the pivotal member 503 is in contact with the plurality of engaging holes 502a of the base member 502.

Figure 29:
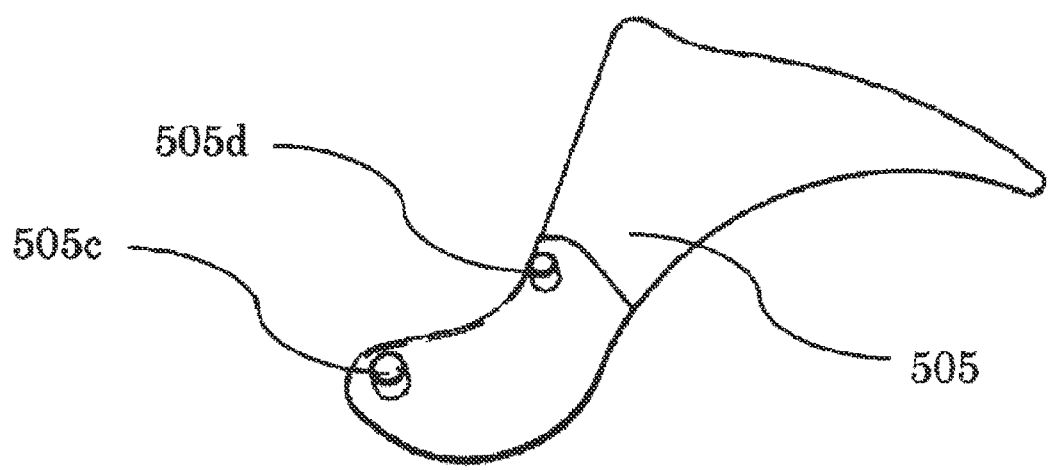
FIG. 29 is a view showing a diaphragm blade according to the embodiment.
Figure 30:
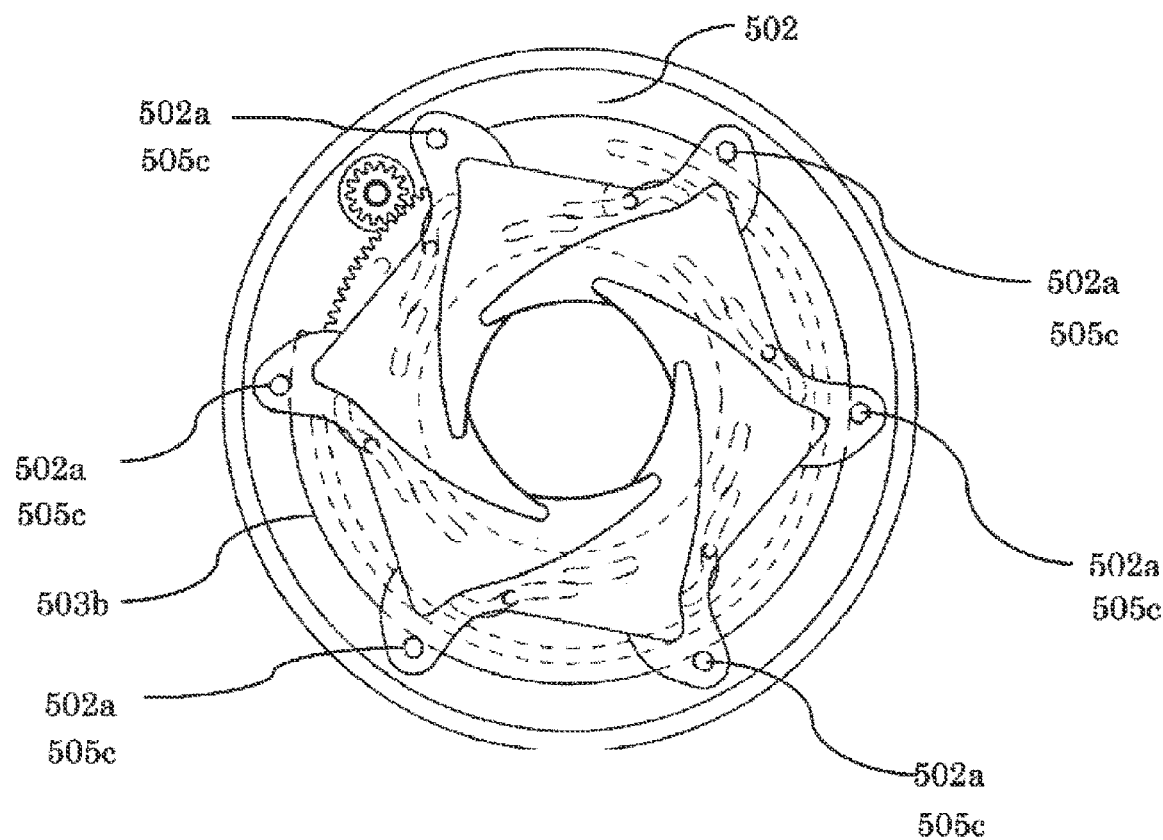
FIG. 30 is an exploded front view of the blade driving device according to the embodiment (the arrangement of diaphragm blades)

FIG. 29 shows the diaphragm blade 505. The diaphragm blade 505 includes the engaging pin 505c and the driving pin 505d. FIG. 30 is a front view of the diaphragm blades 505 that are assembled. There exist a plurality of diaphragm blades 505. In the base member 502, the engaging holes 502a as many as the diaphragm blades exist. The diaphragm blades 505 and the engaging holes 502a of the base member 502 are arranged annularly around the opening portion provided to extend through the base member 502. At this time, the radial engaging portion 503b of the pivotal member 503 is in slidable contact with the engaging pins 505c of the plurality of diaphragm blades 505 in a rotatable state. In addition, the position of the pivotal member 503 is defined when the pivotal member 503 is in slidable contact with the engaging pins 505c of the plurality of diaphragm blades 505. The pivotal member 503 is rotatably supported by the engaging pins 505c of the plurality of diaphragm blades 505.

Figure 31:
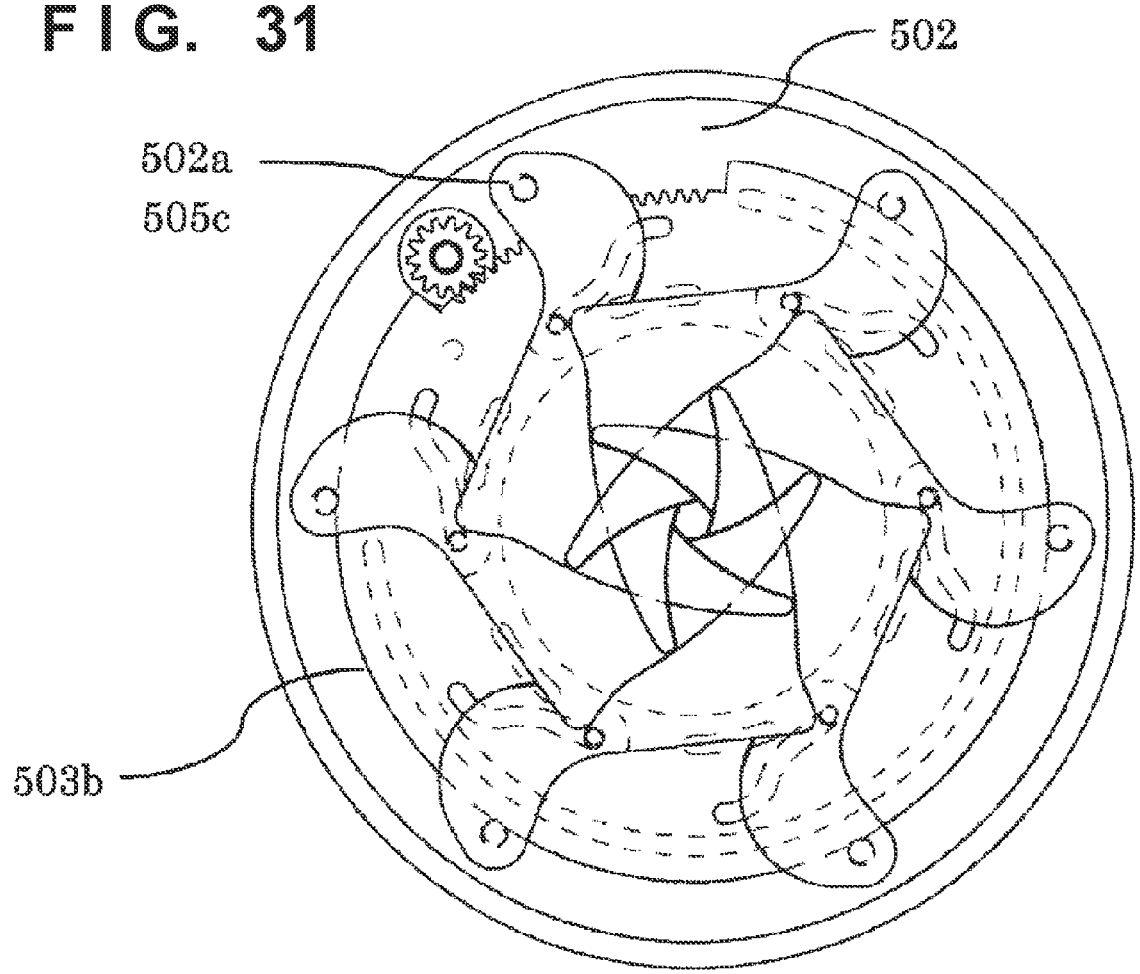
FIG. 31 is an exploded front view of the blade driving device according to the embodiment (the pivotal movement of the diaphragm blades)

In this embodiment, the engaging portion 503b of the pivotal member 503 engages with an inscribed circle (505e) formed by the seven engaging pins 505c of the diaphragm blades 505. The number of engaging pins 505c can be arbitrary as long as a plurality of engaging pins are included. When the pivotal member 503 is rotated, the diaphragm blades 505 enter or exit from the opening portion, and the opening area changes, as shown in FIG. 31.

Figure 32:
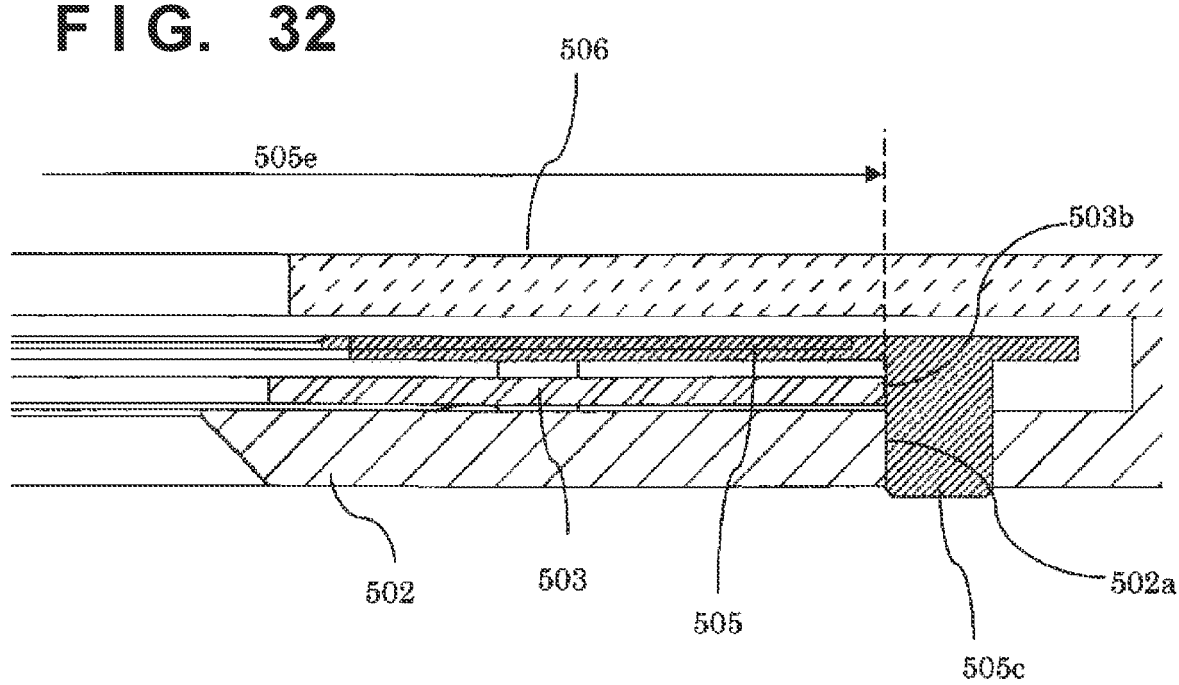
FIG. 32 is a sectional view of the embodiment.

FIG. 32 is a sectional view of a light amount adjusting device according to the fifth embodiment. The engaging portion 503b of the pivotal member 503 engages with the inscribed circle 505e formed by the plurality of engaging pins 505c. The pivotal member 503 and the diaphragm blades 505 are regulated by the same engaging pins 505c in the radial direction. That is, the radial direction can be regulated by the same portions. For this reason, the device can be made simple and compact. Additionally, since the driving space need not be separated for the pivotal member 503 and the diaphragm blades 505, the device can be made thin. Details of the driving space are the same as the contents described with reference to FIG. 7 as the conventional technique of the first embodiment. As for the effects of the present invention, the same effects as in the first embodiment can be obtained.

In the fifth embodiment, the engaging portion 503b of the pivotal member 503 inscribed in the engaging pins 505c has been described. However, the same effect as described above can be obtained even if an engaging portion of the pivotal member that circumscribes the engaging pins 505c is used.

The open diameter of the blade driving device can be defined by any of an opening portion 502g of the base member 502, an opening portion 506g of the cover member 506, an opening portion 503g of the pivotal member 503, and a diaphragm opening shape formed by the plurality of diaphragm blades. If the pivotal member 503 is made using a resin film, the pivotal member 503 can be made thin. For this reason, forming the open diameter of the blade driving device by the pivotal member is effective in making the device thin.

Sixth Embodiment

Figure 33:
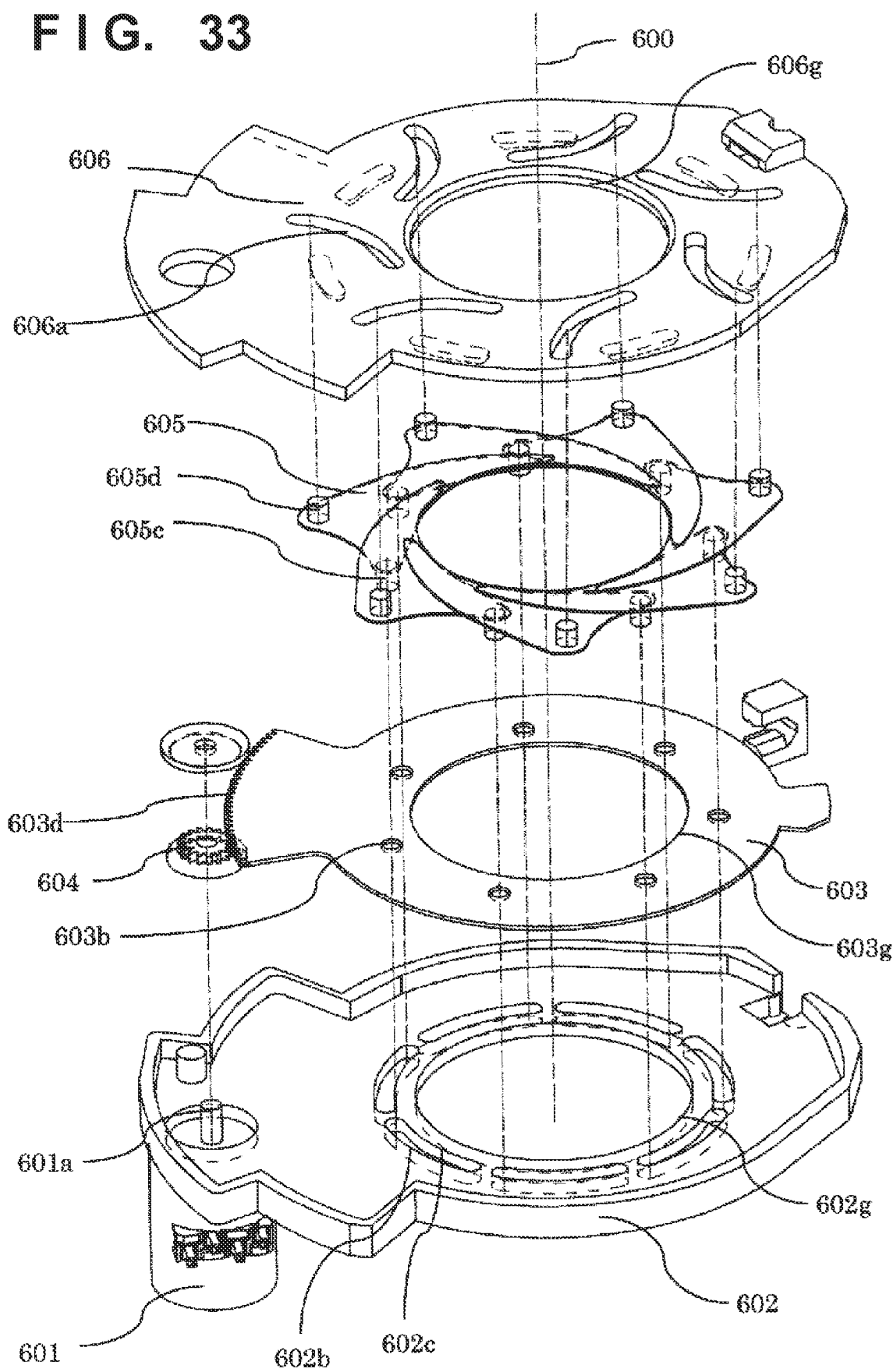
FIG. 33 is an exploded perspective view of a blade driving device according to still another embodiment.

FIG. 33 is an exploded perspective view of a blade driving device according to the sixth embodiment of the present invention. Reference numeral 600 denotes an optical axis center of the blade driving device. The constituent components are basically the same as in the first embodiment. Note that in this embodiment, the components given reference numerals in 600s will be described.

Reference numeral 603 denotes a pivotal member. The pivotal member 603 includes engaging portions 603b and a driven portion 603d.

Reference numeral 605 denotes a diaphragm blade. An engaging pin 605c and a driving pin 605d that is a driven portion are formed on the diaphragm blade 605. The diaphragm blade 605 is made by, for example, bonding, welding, insert-molding, or outsert-molding the engaging pin and the driving pin on a press-worked PET sheet material. The diaphragm blade 605 may be made by resin molding or the like. In this embodiment, seven diaphragm blades are used. However, the number of diaphragm blades can be arbitrary as long as at least two diaphragm blades are included.

The engaging pins 605c of the diaphragm blades 605 engage with engaging holes 603a of the pivotal member, respectively. In addition, the engaging pin 605c of the diaphragm blade 605 engages with an engaging portion 602b or 602c or both of the engaging portions 602b and 602c of a base member 602. The driving pin 605d of the diaphragm blade 605 engages with a cam groove 606a of a cover member 606. A pinion 604 rotates, a force is applied to the driven portion 603d of the pivotal member 603, and the pivotal member 603 rotates. When the pivotal member 603 rotates, a driving force is given from the engaging holes 603a of the pivotal member 603 to the engaging pins 605c of the diaphragm blades 605. Since the engaging pins 605c engage with the engaging portions 602b or 602c of the base member 602, the pivotal member 603 and the plurality of diaphragm blades 605 rotate about the opening portion of the base member. By the cam grooves 606a, the diaphragm blades 605 enter or exit from the opening of the base member 602. The diaphragm shape can be adjusted by the plurality of diaphragm blades 605.

Figure 34:
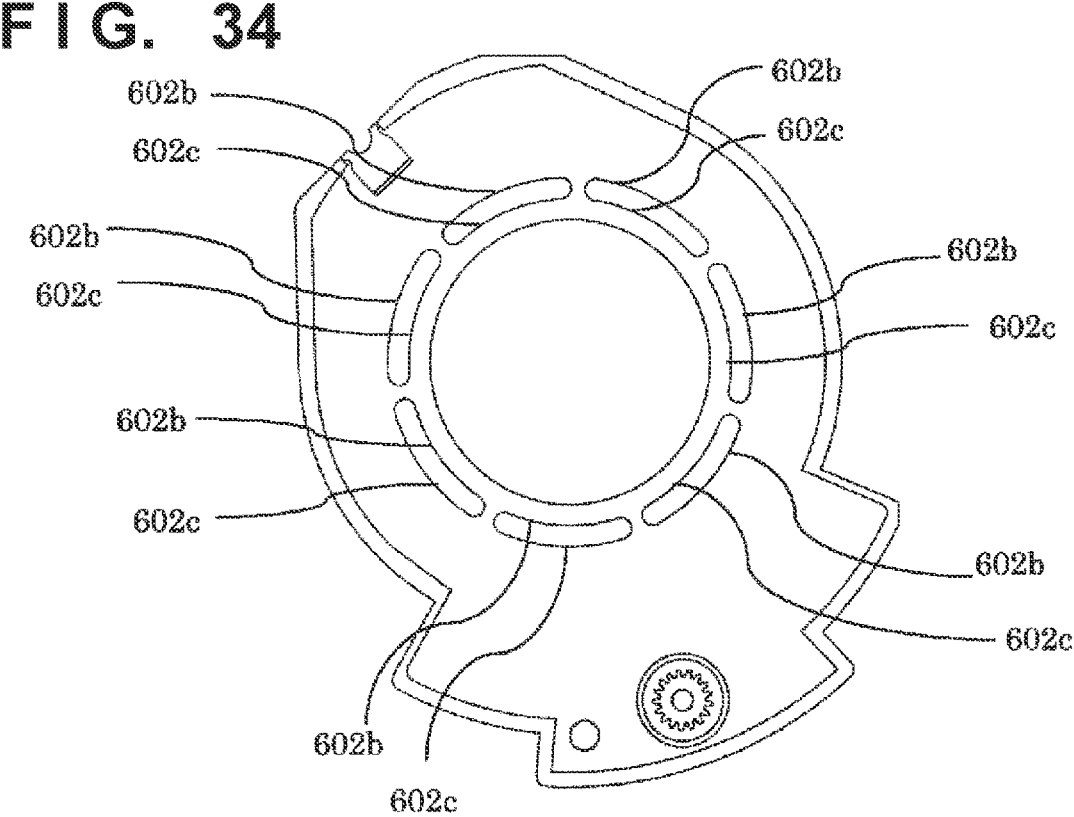
FIG. 34 is an exploded front view of the blade driving device according to the embodiment (base member)
Figure 35:
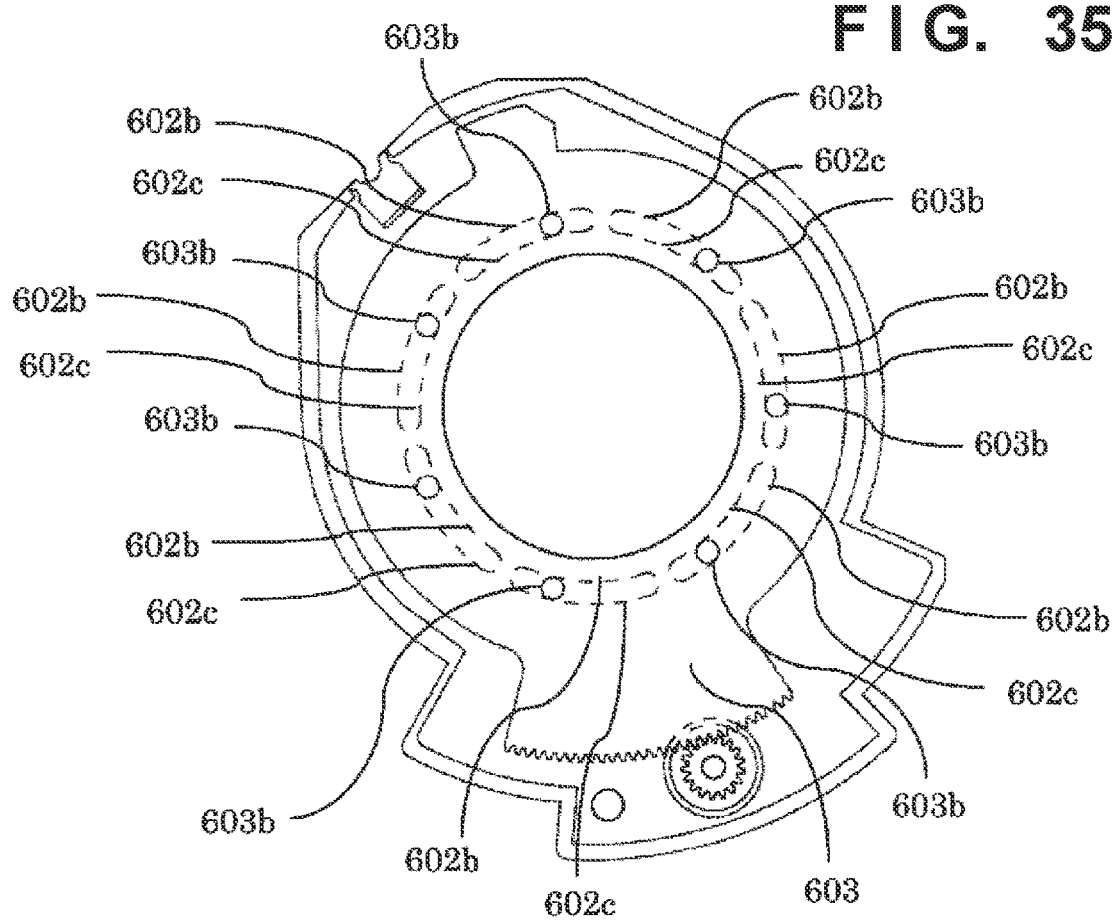
FIG. 35 is an exploded front view of the blade driving device according to the embodiment (the arrangement of a pivotal member)

Radial engagement of the pivotal member, which is a characteristic feature of this embodiment, will be explained here. FIG. 34 is a front view showing a state in which the pivotal member 603, the diaphragm blades 605, and the cover member 606 are detached. FIG. 35 is a front view of the pivotal member 603 that is assembled in the state shown in FIG. 34. In a projected state, each engaging portion 603b of the pivotal member 603 is in contact with at least one of a corresponding one of the plurality of engaging portions 602b and a corresponding one of the plurality of engaging portions 602c of the base member 602.

Figure 38:
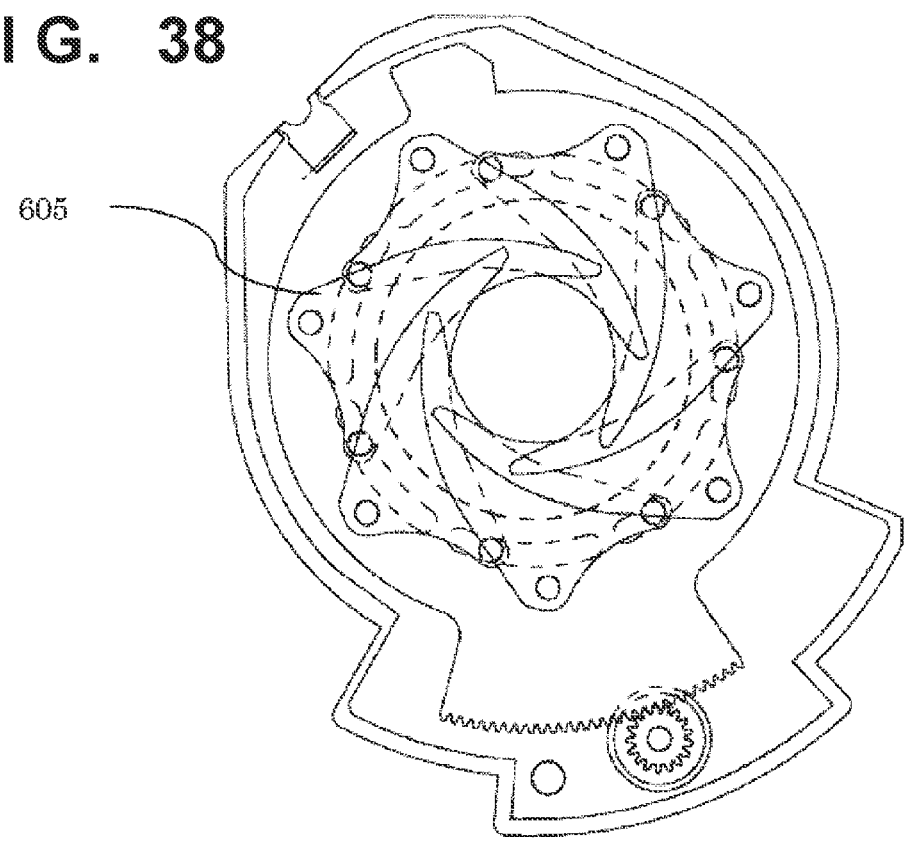
FIG. 38 is an exploded front view of the blade driving device according to the embodiment (the pivotal movement of the diaphragm blades)
Figure 39:
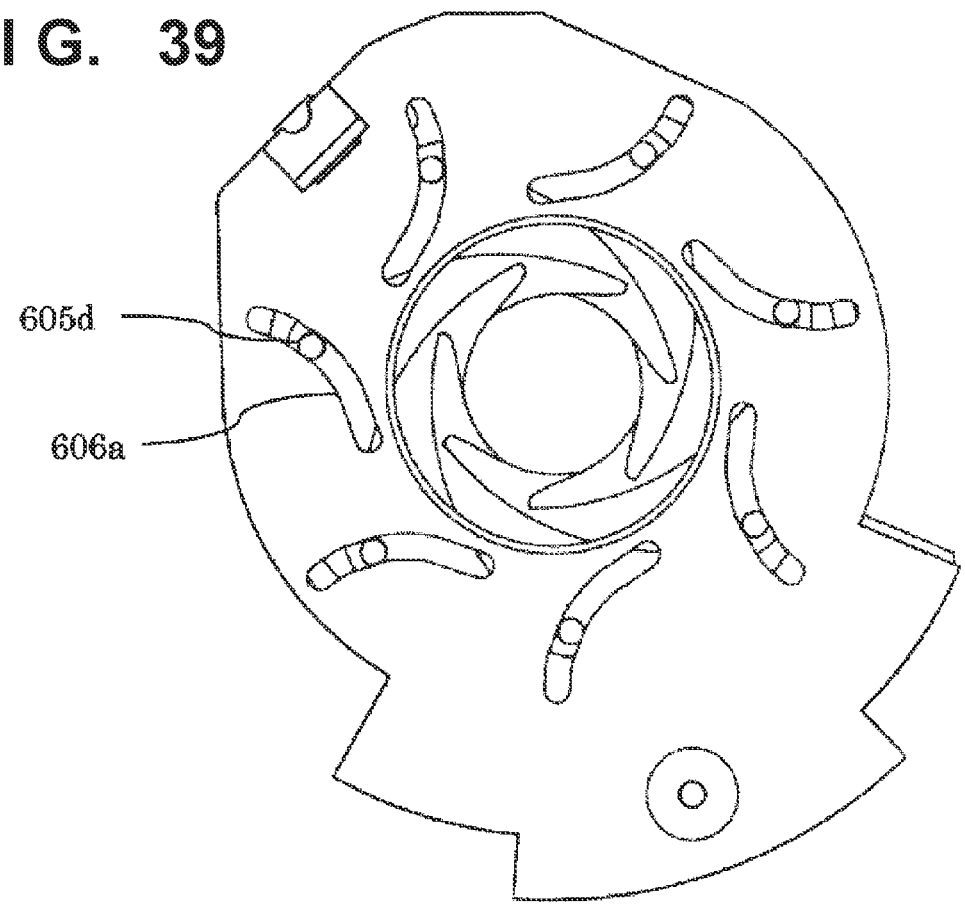
FIG. 39 is a front view of the blade driving device according to the embodiment (base member)

FIG. 36 shows the diaphragm blade 605. The diaphragm blade 605 includes the engaging pin 605c and the driving pin 605d. FIG. 37 is a front view of one diaphragm blade 605 that is assembled. FIG. 38 is a front view of seven diaphragm blades 605 that are assembled. FIG. 39 is a front view of the cover member 606 that is assembled in the state shown in FIG. 38.

Figure 40:
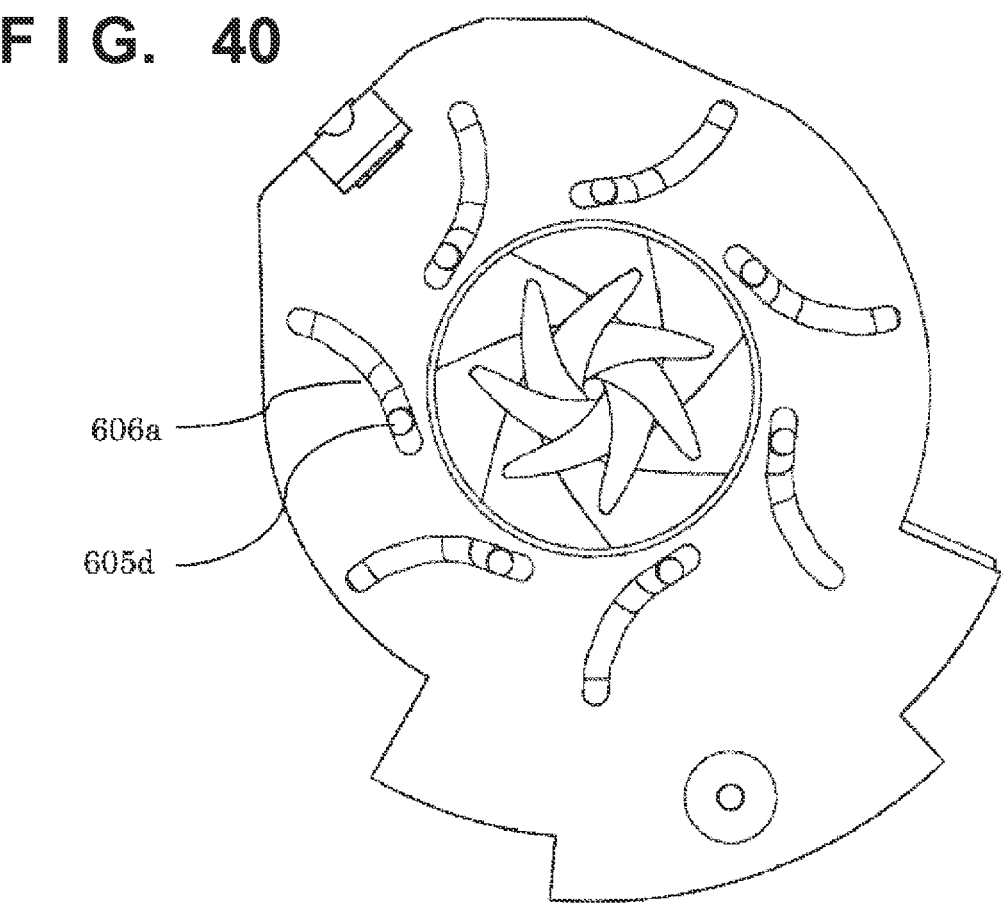
FIG. 40 is a front view of the blade driving device according to the embodiment (the arrangement of the pivotal member)

There exist a plurality of diaphragm blades 605. In the base member 602, the engaging portions 602b or 602c as many as the diaphragm blades exist. The diaphragm blades 605 and the engaging portions 602b or 602c of the base member 602 are arranged annularly around the opening portion provided to extend through the base member 602. At this time, the engaging pins 605c of the diaphragm blades 605 are in slidable contact with the engaging holes 603b of the pivotal member 603 in a rotatable state, respectively. Additionally, the engaging pin 605c of each diaphragm blade 605 engages with the engaging portion 602b or 602c or both of the engaging portions 602b and 602c of the base member 602. The engaging portions 602b may completely be eliminated, and the engaging portions 602c may be connected in a circle and engaged with the engaging pins 605c. At this time, in the pivotal member 603, the radial engaging portions 603b are in slidable contact with the engaging pins 605c of the plurality of diaphragm blades 605 in a rotatable state. Furthermore, the position of the pivotal member 603 is defined when the pivotal member 603 is in slidable contact with the engaging pins 605c of the plurality of diaphragm blades 605. The pivotal member 603 is rotatably supported by the engaging pins 605c of the plurality of diaphragm blades 605. In this embodiment, the engaging holes 603b of the pivotal member 603 engage with the seven engaging pins 605c of the diaphragm blades 605. The number of engaging pins 605c can be arbitrary as long as a plurality of engaging pins are included. In addition, the number of engaging portions 602b or 602c of the base member 602 can be arbitrary as long as a plurality of engaging portions are included. When the pivotal member 603 is rotated, the diaphragm blades 605 enter or exit from the opening portion, and the opening area changes, as shown in FIG. 40.

Figure 41:
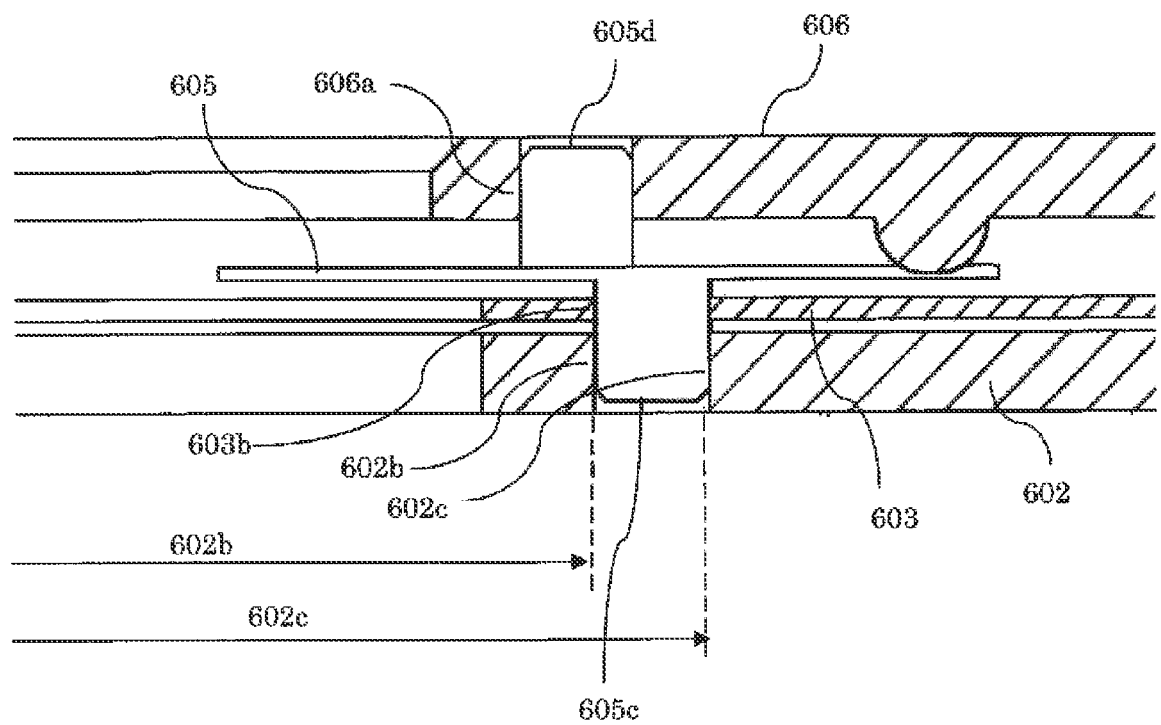
FIG. 41 is a sectional view of the embodiment.

FIG. 41 is a sectional view of a light amount adjusting device according to this embodiment. The engaging pins 605c of the diaphragm blades 605 engage with the engaging holes 603b of the pivotal member 603, respectively. In addition, the engaging pin 605c of each diaphragm blade 605 engages with at least one of the engaging portions 602b and 602c of the base member 602. The pivotal member 603 and the diaphragm blades 605 are regulated by the same engaging pins 605c in the radial direction. That is, the radial direction can be regulated by the same portions. For this reason, the device can be made simple and compact. Additionally, since the driving space need not be separated for the pivotal member 603 and the diaphragm blades 605, the device can be made thin. Details of the driving space are the same as the contents described with reference to FIG. 7 as the conventional technique of the first embodiment. As for the effects of the present invention, the same effects as in the first embodiment can be obtained.

In this embodiment, the engaging pins 605c of the diaphragm blades 605 engage with the plurality of engaging portions 602b and the plurality of engaging portions 602c of the base member 602. Alternatively, the engaging pins 605c of the diaphragm blades 605 may engage with only the plurality of engaging portions 602b. Otherwise, the engaging pins 605c of the diaphragm blades 605 may engage with only the plurality of engaging portions 602c. Else, the engaging pins 605c of the diaphragm blades 605 may engage with an opening portion 602g of the base member 602.

The open diameter of the blade driving device can be defined by any of the opening portion 602g of the base member 602, an opening portion 606g of the cover member 606, an opening portion 603g of the pivotal member 603, and a diaphragm opening shape formed by the plurality of diaphragm blades. If the pivotal member 603 is made using a resin film, the pivotal member 603 can be made thin. For this reason, forming the open diameter of the blade driving device by the pivotal member is effective in making the device thin.

Seventh Embodiment

Figure 42:
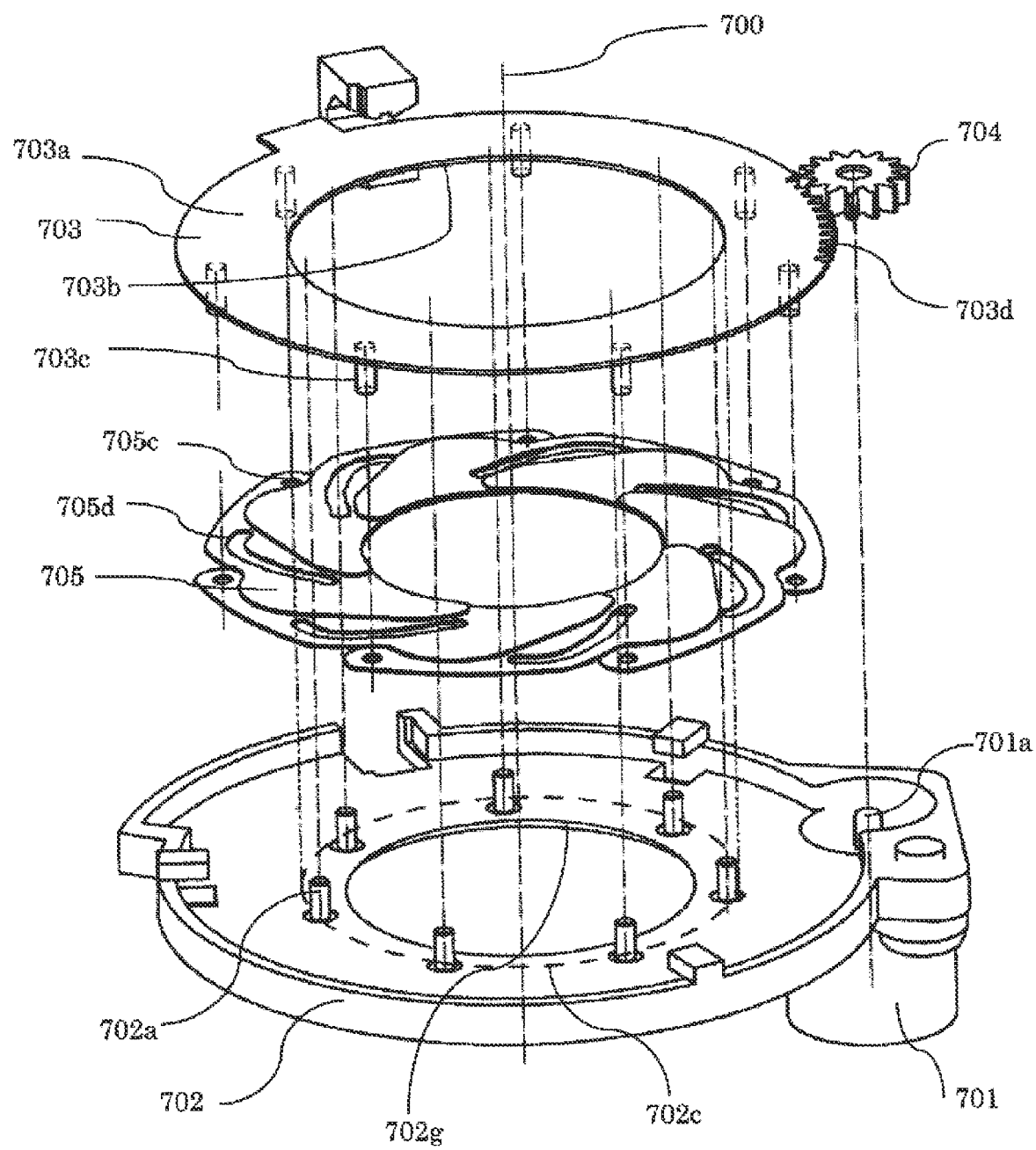
FIG. 42 is an exploded perspective view of a blade driving device according to still another embodiment.
Figure 43:
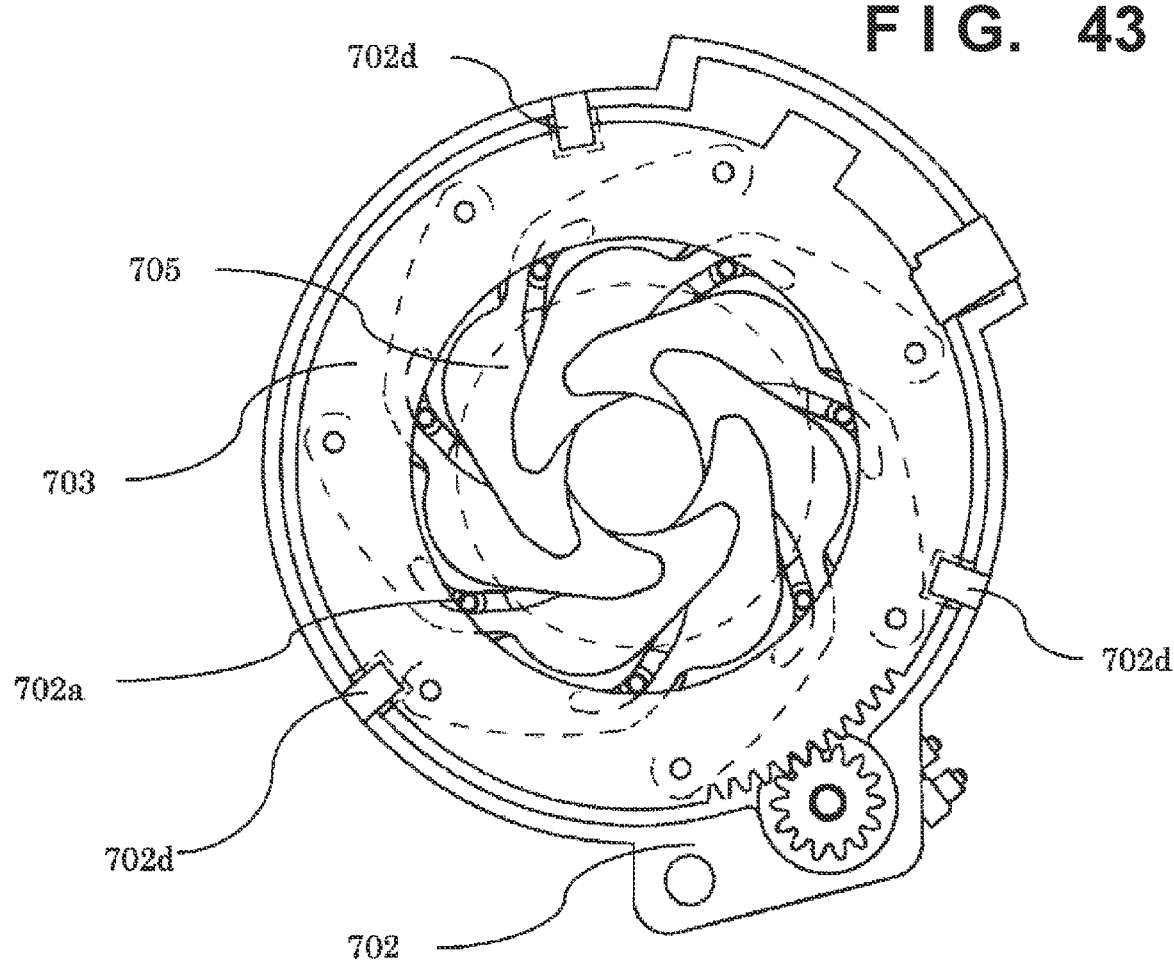
FIG. 43 is a front view of the blade driving device according to the embodiment (base member)
Figure 44:
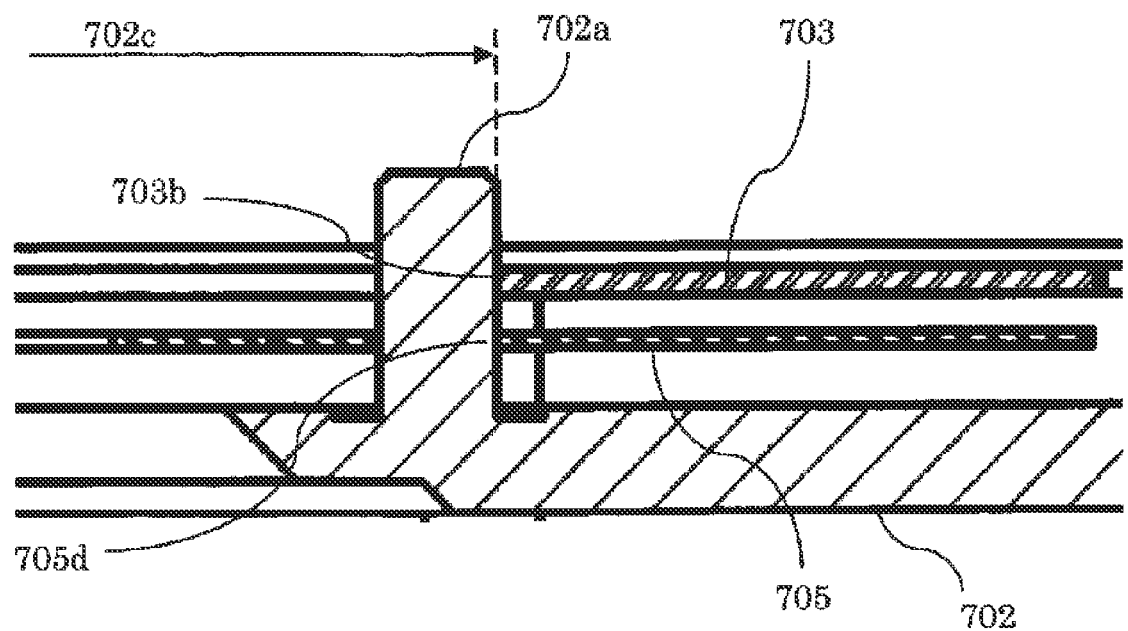
FIG. 44 is a sectional view of the embodiment.

FIG. 42 is an exploded perspective view of a blade driving device according to the seventh embodiment of the present invention. Reference numeral 700 denotes an optical axis center of the blade driving device. The seventh embodiment is an example in which the positional relationship of the diaphragm blades and the pivotal member in the first embodiment is reversed. Diaphragm blades 705 are located between a base member 702 and a pivotal member 703 which are opening forming members. FIG. 43 is a front view of the seventh embodiment. A cover member may be attached, as in the first embodiment. However, even in the absence of the cover member, when hook portions 702d and the like of the base member 702 are provided to hold the pivotal member 703, the cover member can be eliminated. Hence, in the seventh embodiment, the cover member can be eliminated, and the device can be made thin. The structure is also effective in reducing the cost.

Even in the second to sixth embodiments, the same effects as described above can be obtained by reversing the positional relationship of the diaphragm blades and the pivotal member.

Eighth Embodiment

Figure 45:
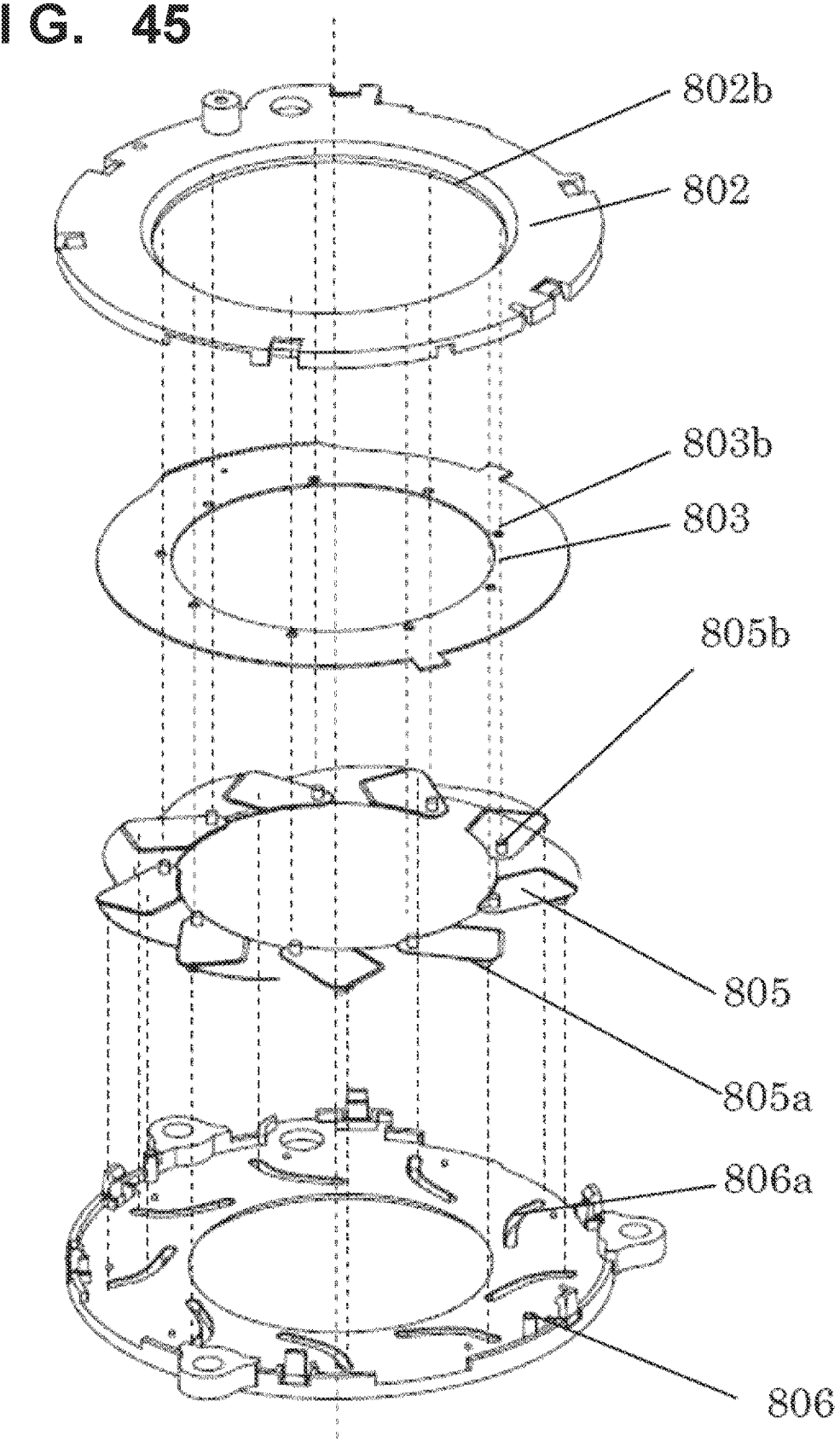
FIG. 45 is an exploded perspective view of a diaphragm device according to still another embodiment.
Figure 46:
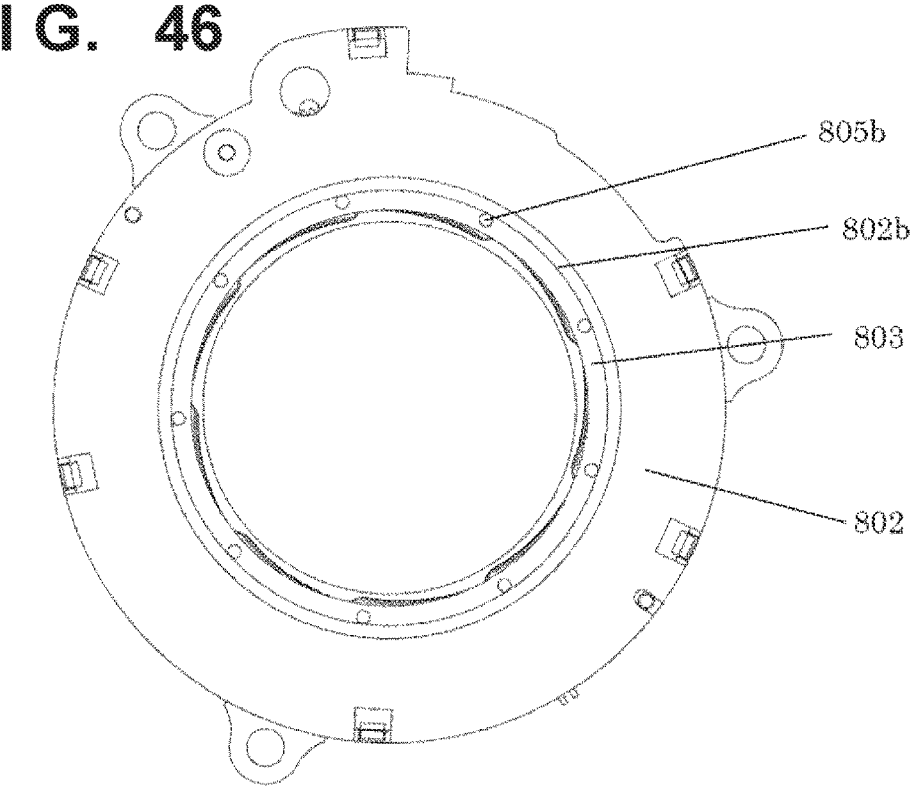
FIG. 46 is a plan view of the diaphragm device according to the embodiment (cover member side)
Figure 47:
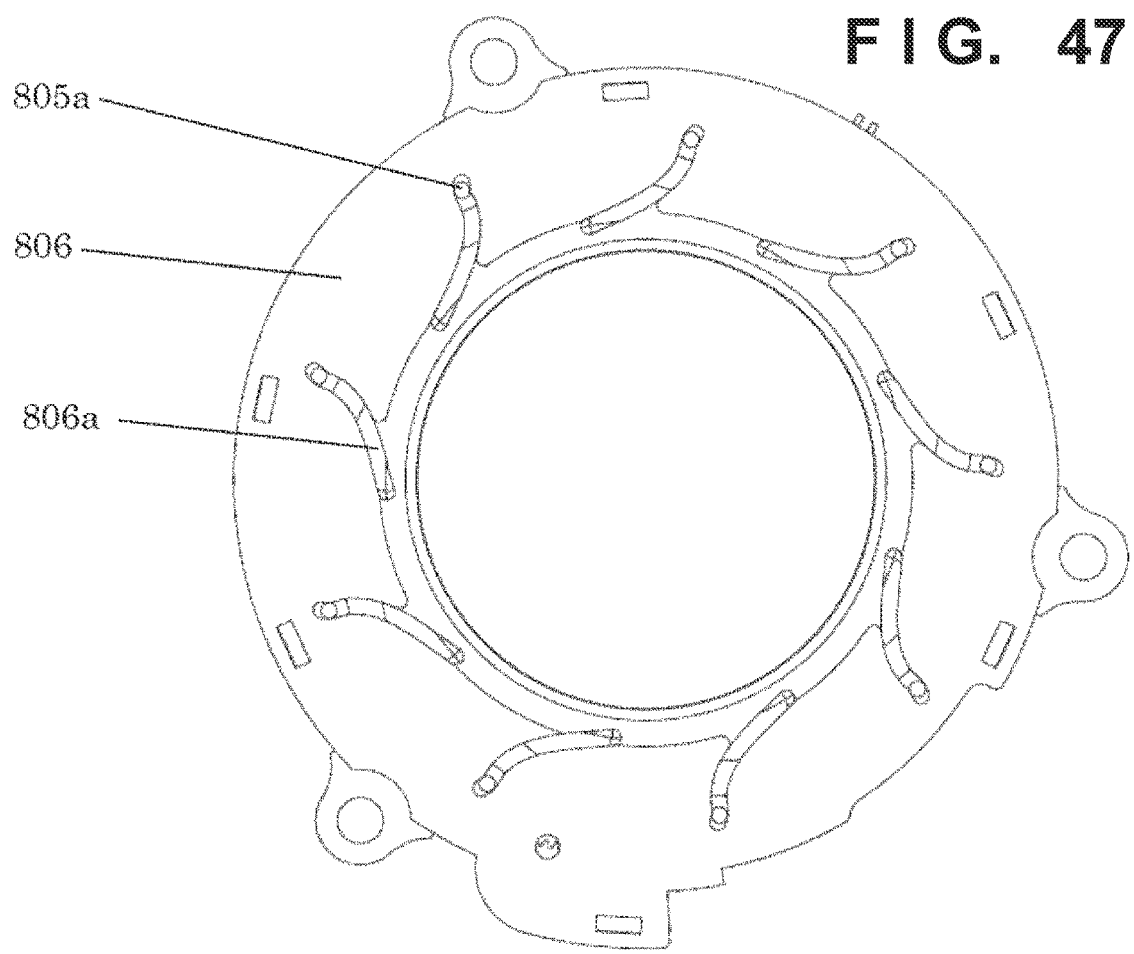
FIG. 47 is a bottom view of the diaphragm device according to the embodiment (base member side)
Figure 48:
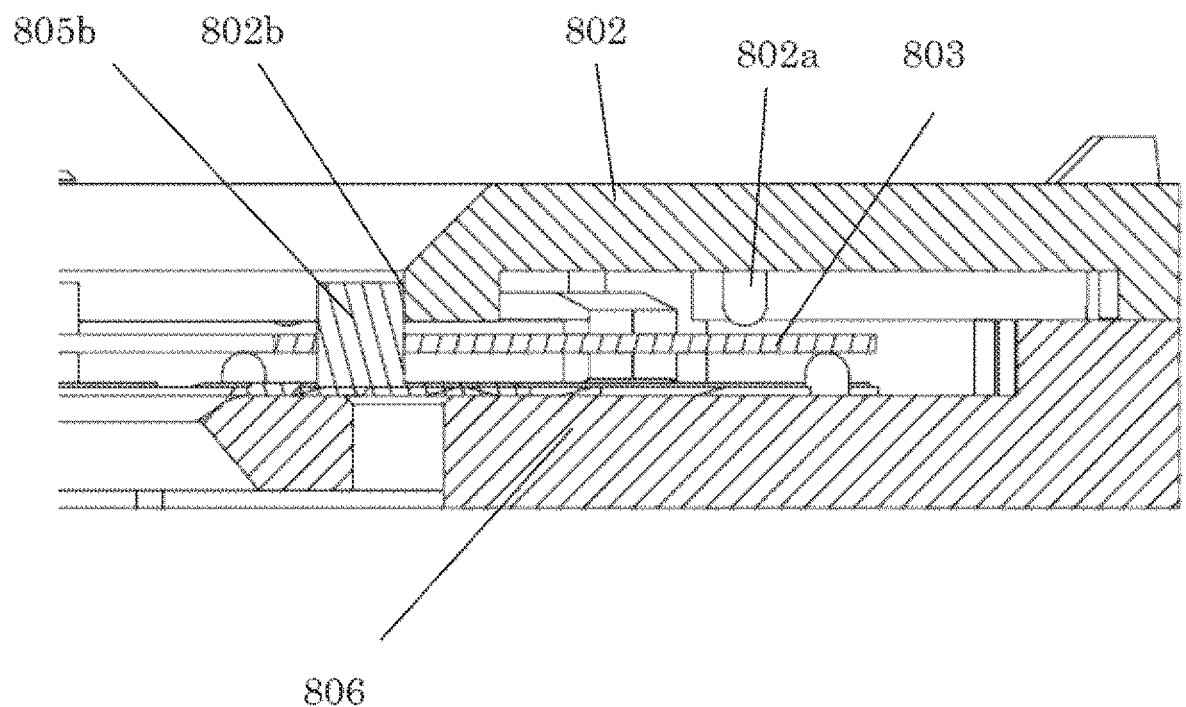
FIG. 48 is a sectional view of the diaphragm device according to the embodiment.

FIG. 45 is an exploded perspective view of a diaphragm device serving as a light amount adjusting device according to the eighth embodiment of the present invention. FIG. 46 is a plan view of the diaphragm device (a view seen from the side of a cover member 802). FIG. 47 is a bottom view of the diaphragm device (a view seen from the side of a base member 806). FIG. 48 is a partial sectional view of the diaphragm device. The constituent components are basically the same as in the first embodiment. In this embodiment, the components given reference numerals in 800s will be described.

As shown in FIGS. 45, 46, and 47, in the diaphragm device according to this embodiment, a plurality of cam grooves 806a corresponding to diaphragm blades 805 are provided in the base member 806. Each diaphragm blade 805 is provided with an engaging pin 805a engaging with each cam groove 806a and a driving pin 805b engaging with an engaging portion 803b provided in a rotation member 803. The driving pins 805b extend through the rotation member 803. In a state in which the pivotal member 803 is sandwiched between the cover member 802 and the diaphragm blades 805, the driving pins 805b are in slidable contact with an inner diameter portion 802b of the cover member 802. In addition, when a projection 802a provided on the cover member 802 shown in FIG. 48 abuts against the rotation member 803 in the optical axis direction, the positions of the pivotal member and the diaphragm blades are defined. Although not illustrated, a motor is fixed to the cover member. When the pivotal member 803 receives a driving force generated by the motor and rotates about the opening portion, the diaphragm blades 805 enter or exit from the opening portion to adjust the diaphragm aperture. The position of the pivotal member can also be defined between the driving pins 805b of the pivoting diaphragm blades 805 and the inner diameter portion 802b of the fixed cover member 802. The engaging pins 805a of the diaphragm blades 805 need to be long to prevent the pivotal member 803 from being disengaged. When the driving pins 805b of the diaphragm blades 805 are in slidable contact with the inner diameter portion 802b of the cover member 802, the pivotal member 803 is hardly disengaged from the driving pins 805b of the diaphragm blades 805. This enables stable driving. In addition, since the length of the driving pins 805b can be minimized, the structure is effective in making the unit thin.

In the light amount adjusting device according to the eighth embodiment, the driving pins 805b of the diaphragm blades 805 are fitted in the inner diameter portion 802b of the cover member 802. Accordingly, the blade traveling space formed by the rotation member and the cover member need not be made large, and a characteristic change caused by the posture difference can be suppressed.

Ninth Embodiment

Figure 49:
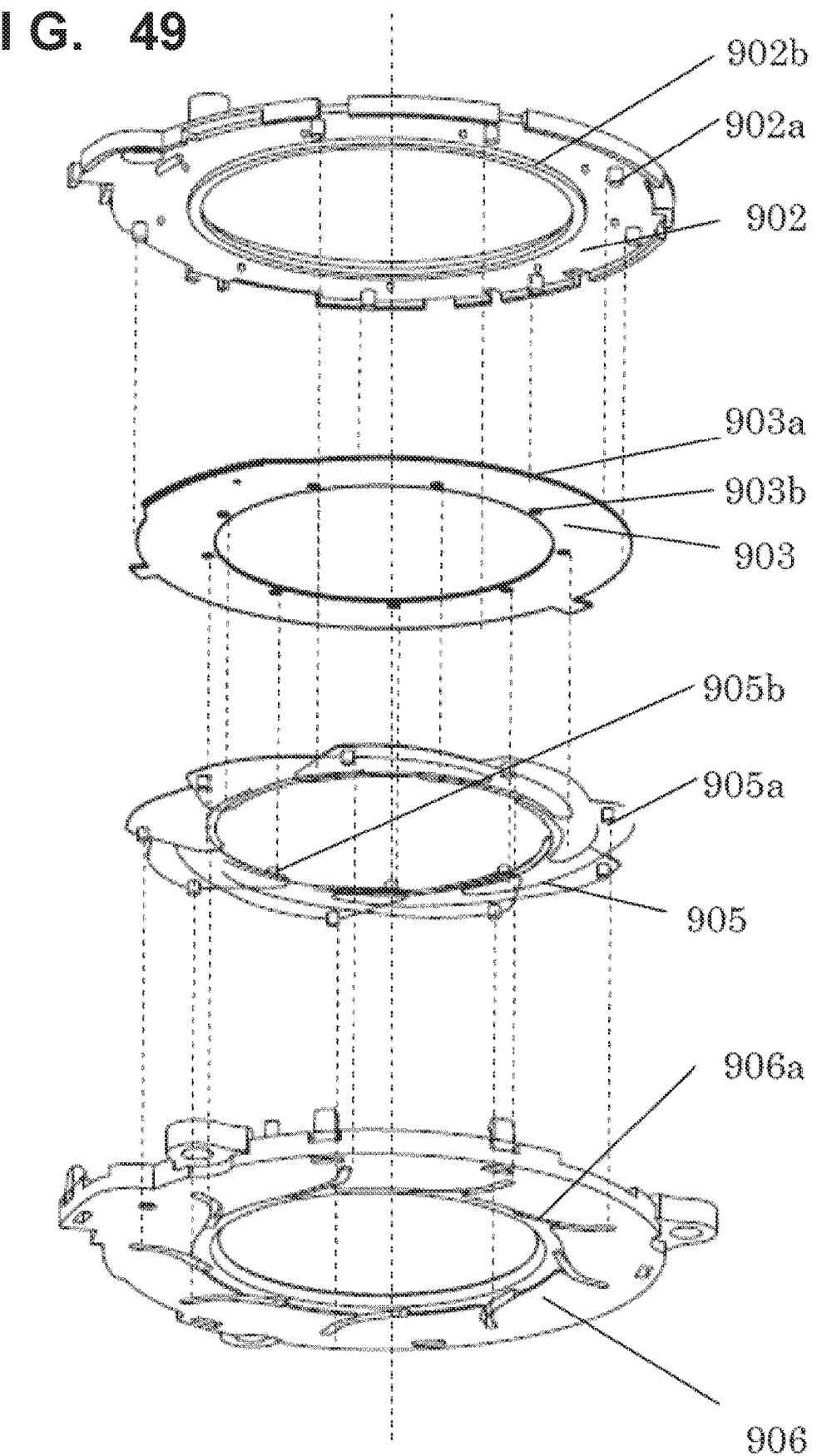
FIG. 49 is an exploded perspective view of a diaphragm device according to still another embodiment.
Figure 50:
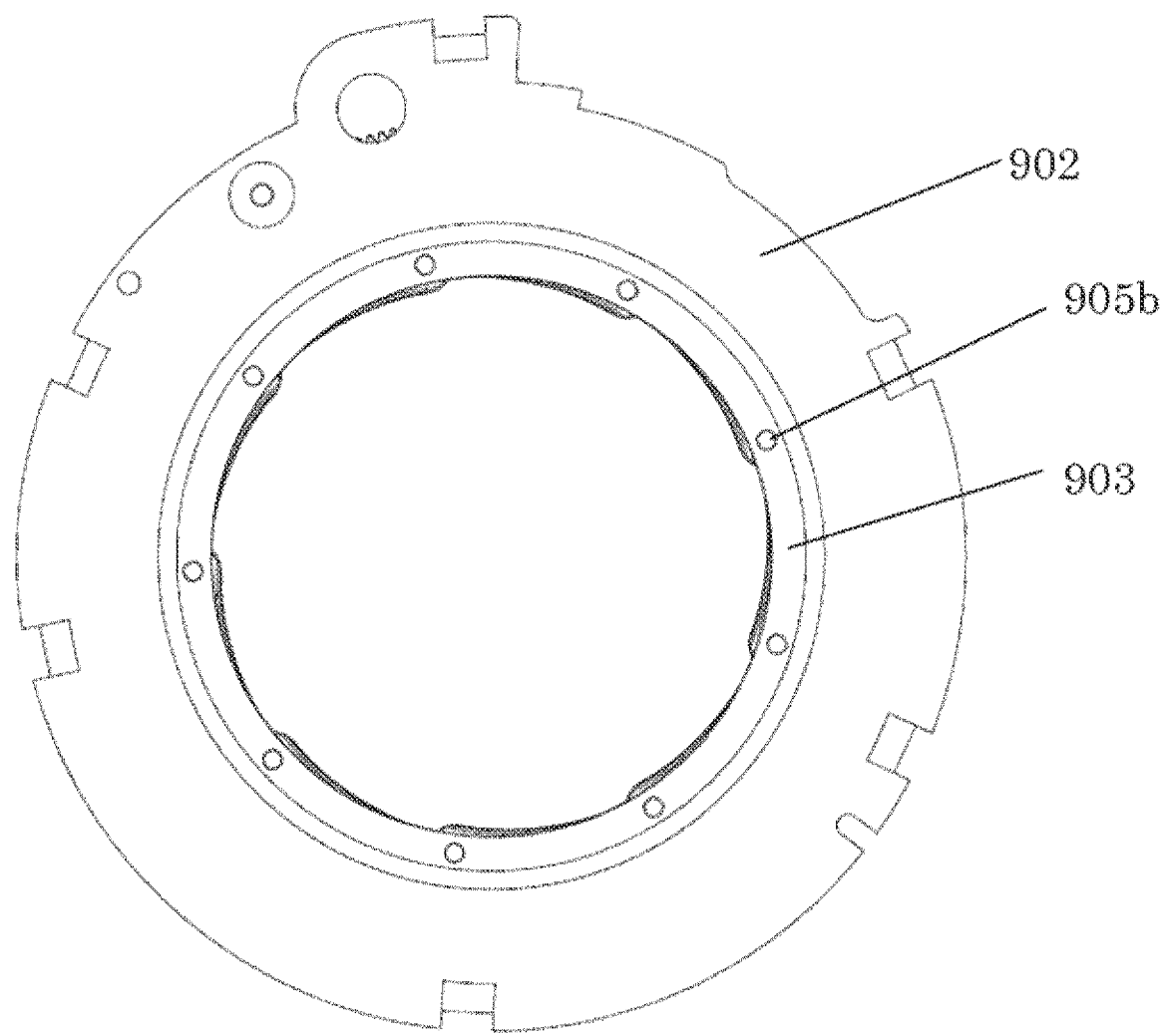
FIG. 50 is a plan view of the diaphragm device according to the embodiment (cover member side)
Figure 51:
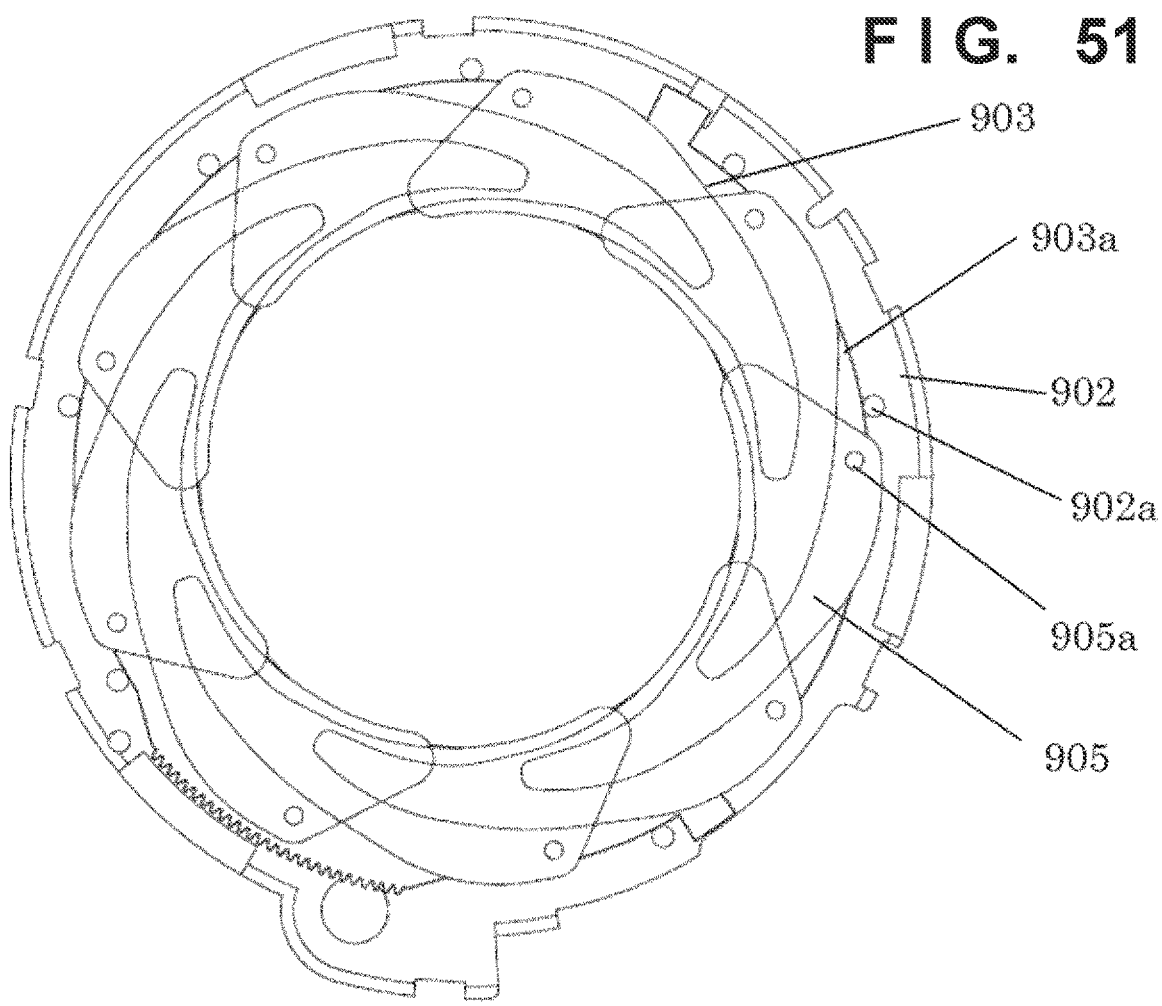
FIG. 51 is a perspective view of the diaphragm device according to the embodiment (diaphragm blades and a rotation member)
Figure 52:
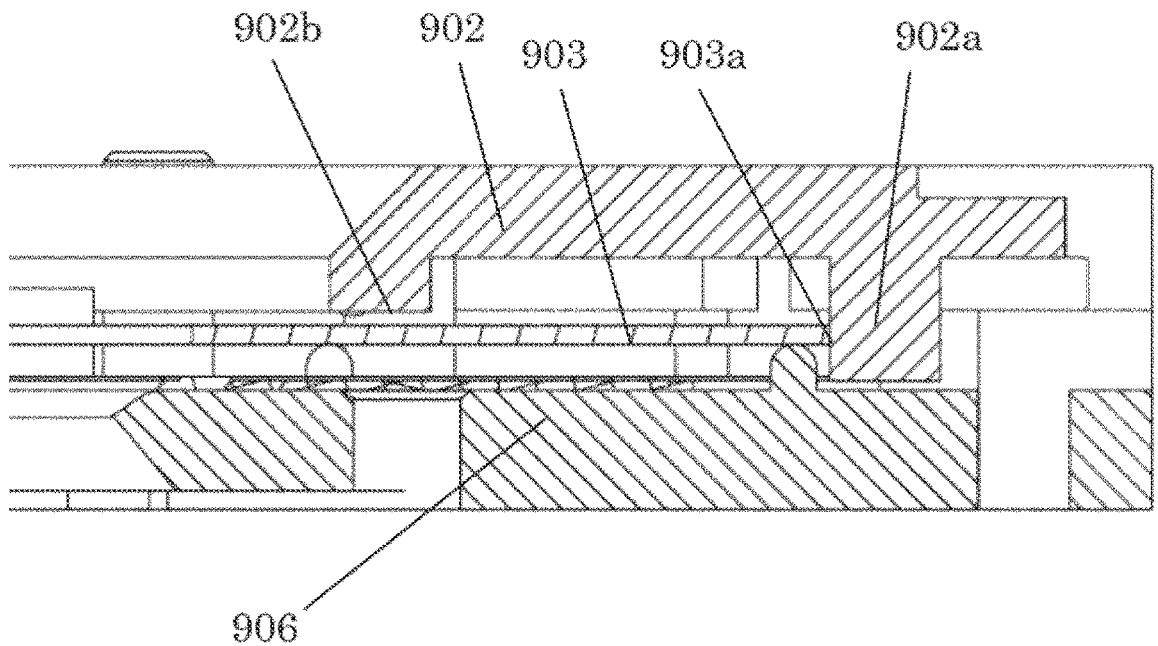
FIG. 52 is a sectional view of the diaphragm device according to the embodiment.

FIG. 49 is an exploded perspective view of a diaphragm device serving as a light amount adjusting device according to the ninth embodiment of the present invention. FIG. 50 is a plan view of the diaphragm device (a view seen from the side of a cover member 902). FIG. 51 is a perspective view of the diaphragm device (diaphragm blade 905 and a rotation member 903 in a planar view). FIG. 52 is a partial sectional view of the diaphragm device. The constituent components are basically the same as in the first embodiment. In this embodiment, the components given reference numerals in 900s will be described.

As shown in FIG. 49, in the diaphragm device according to this embodiment, a plurality of cam grooves 906a corresponding to the diaphragm blades 905 are provided in a base member 906. Each diaphragm blade 905 is provided with an engaging pin 905a engaging with each cam groove 906a and a driving pin 905b engaging with an engaging portion 903b provided in the pivotal member 903. The driving pins 905b extend through the pivotal member 903. In a state in which the pivotal member 903 is sandwiched between the cover member 902 and the diaphragm blades 905, an outer periphery 903a of the pivotal member and a projection 902a provided on the cover member 902 are in slidable contact. In addition, when a flat portion 902b provided on the cover member 902 shown in FIG. 52 abuts against the pivotal member 903 in the optical axis direction, the positions of the pivotal member and the diaphragm blades are defined. Although not illustrated, a motor is fixed to the cover member. When the pivotal member 903 receives a driving force generated by the motor and rotates about the opening portion, the diaphragm blades 905 enter or exit from the opening portion to adjust the diaphragm aperture. The position is defined by bringing the outer periphery 903a of the pivotal member into slidable contact with the projection 902a of the cover member. It is possible to easily correct the positions of the driving pins 905b, and the structure is effective in improving the diaphragm characteristic.

As shown in FIGS. 51 and 52, in the diaphragm device according to the ninth embodiment, the plurality of cam grooves 906a corresponding to the blades 905 are provided in the base member 906. Each blade 905 is provided with the driving pin 905a engaging with each cam groove 906a and the driving pin 905b engaging with the bearing portion 903b provided in the rotation member 903. The outer periphery 903a of the rotation member and the projection 902a provided on the cover member 902 are radially fitted.

Note that the member fitted on the outer periphery 903a of the rotation member 903 may be the base member 906.

Summary of Embodiment A

A blade driving device according to this embodiment is comprising an opening forming member configured to form an opening portion to pass light, a pivotal member configured to pivot about the opening portion on one surface of the opening forming member, and a plurality of blades configured to engage with the pivotal member and enter or exit from the opening portion, wherein the blade driving device includes a plurality of engaging portions configured to engage the plurality of blades with the opening forming member, the pivotal member comes into slidable contact with the plurality of engaging portions in a process of pivoting on the one surface of the opening forming member, and a pivotal position of the pivotal member with respect to the opening forming member is defined by the plurality of engaging portions.

According to the embodiment, the pivotal position of the pivotal member with respect to the opening forming member is defined using the engaging portions of the blades, thereby effectively reducing the thickness of the device in a light passing direction.

In this embodiment, the blade driving device is wherein the plurality of engaging portions comprise engaging pins that stand, as rotating shafts of the blades, on the one surface of the opening forming member and circumscribe or extend through the pivotal member to engage with engaging holes of the blades.

According to the embodiment, the engaging pins standing on the opening forming member are used as the engaging portions of the blades, and the pivotal position of the pivotal member is defined using the engaging pins, thereby effectively reducing the thickness of the device in a light passing direction.

In this embodiment, the blade driving device is wherein the plurality of engaging portions comprise engaging pins that stand, as rotating shafts of the blades, at ends of the blades and circumscribe or extend through the pivotal member to engage with engaging holes provided in the opening forming member.

According to the embodiment, the engaging pins standing on the blades are used as the engaging portions of the blades, and the pivotal position of the pivotal member is defined using the engaging pins, thereby effectively reducing the thickness of the device in a light passing direction.

In this embodiment, the blade driving device is wherein the pivotal member pivots about the opening portion while being in slidable contact with the plurality of engaging portions arranged annularly along an opening edge of the opening portion.

According to the embodiment, it is possible to bring the pivotal member into slidable contact along the plurality of engaging portions arranged annularly, and define the pivotal position of the pivotal member along the opening edge of the opening portion.

In this embodiment, the blade driving device is wherein the plurality of blades travel in a blade chamber formed between the pivotal member and the opening forming member.

According to the embodiment, it is possible to form the blade chamber between the pivotal member and the opening forming member and make the plurality of blades travel in the blade chamber along with the pivotal movement of the pivotal member.

In this embodiment, the blade driving device is wherein the pivotal member is arranged on the opening forming member, and the plurality of blades travel on a side of a surface of the pivotal member opposite to a side of the opening forming member.

According to the aspect of the present invention, it is possible to make the plurality of blades travel on the pivotal member whose pivotal position is defined on the opening forming member.

In this embodiment, the blade driving device is wherein the pivotal member is formed from a thin sheet-shaped member whose thickness is substantially not less than a thickness of the blades.

According to the aspect of the present invention, the pivotal member is formed from the thin sheet-shaped member, thereby reducing the load received by the plurality of engaging portions.

In this embodiment, the blade driving device is wherein the opening forming member and the plurality of engaging portions are made of the same resin material, and the pivotal member is formed from the thin sheet-shaped member made of a resin.

According to the aspect of the present invention, it is possible to integrally mold the opening forming member and the plurality of engaging portions using the same resin material.

A blade driving device according to this embodiment is comprising an opening forming member configured to form an opening portion to pass light, a pivotal member configured to pivot about the opening portion on one surface of the opening forming member, and a plurality of blades configured to engage with the pivotal member and enter or exit from the opening portion, wherein the blade driving device includes a plurality of engaging portions configured to engage the plurality of blades with the opening forming member, the pivotal member is formed from a thin sheet-shaped member whose thickness is substantially not less than a thickness of the blades, and the pivotal member comes into slidable contact with the plurality of engaging portions arranged annularly along an opening edge of the opening portion in a process of pivoting about the opening portion, and a pivotal position of the pivotal member with respect to the opening forming member is defined by the plurality of engaging portions.

According to the embodiment, the pivotal member is formed from the thin sheet-shaped member, and the pivotal position is defined by bringing the pivotal member into slidable contact with the plurality of engaging portions, thereby implementing a blade driving device having excellent durability and advantageous in reducing the thickness.

Note that the embodiment is not limited to the blade driving device, and can also be applied to a blade driving system in an image capturing device such as a camera and broadly includes image capturing devices in the target.

Embodiment B

First Embodiment

Figure 53:
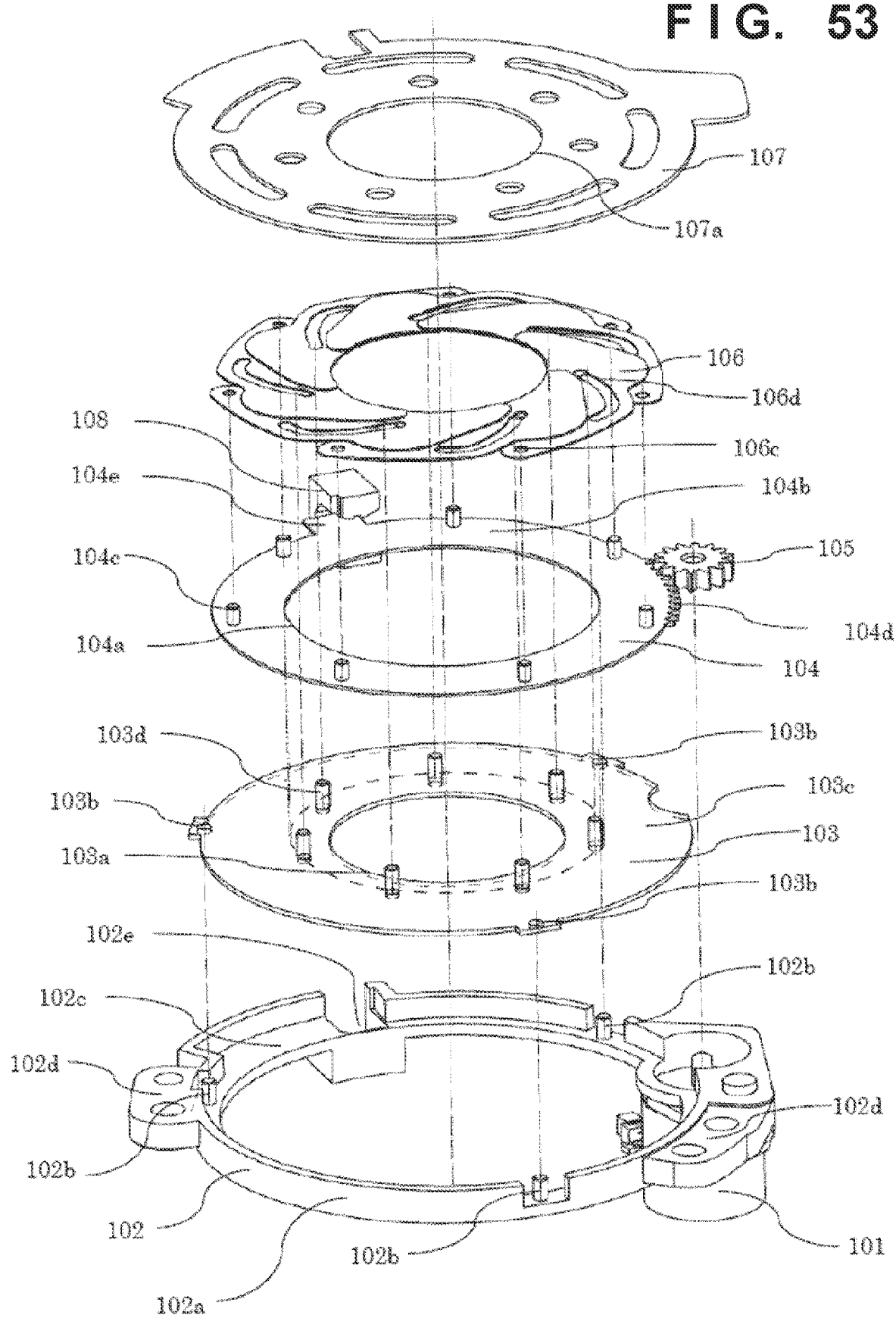
FIG. 53 is an exploded perspective view of a diaphragm device according to still another embodiment.

FIG. 53 is an exploded perspective view of a diaphragm device serving as a light amount adjusting device according to the first embodiment of the present invention. FIG. 54 is a perspective view of the diaphragm device serving as the light amount adjusting device according to the first embodiment of the present invention.

Figure 55:
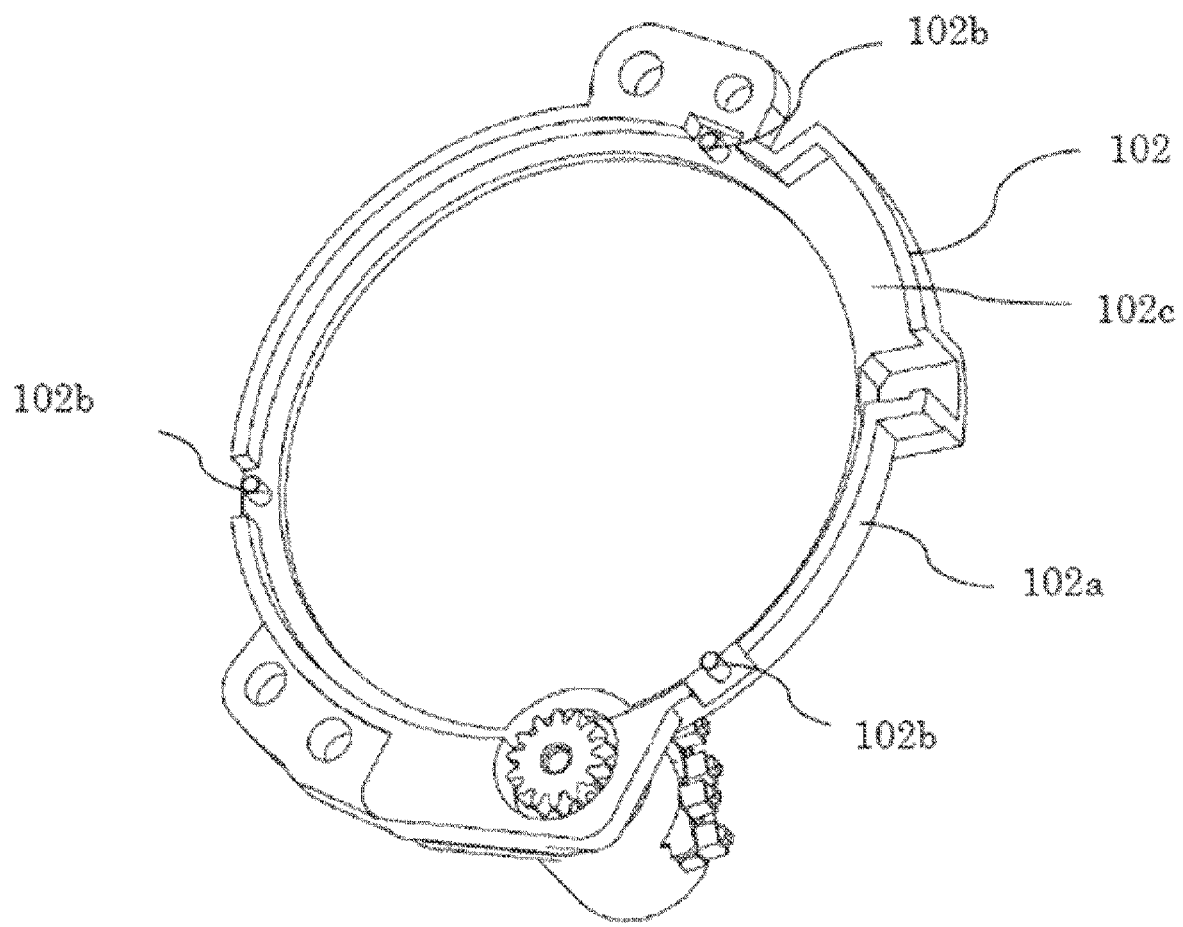
FIG. 55 is a perspective view of a fixing ring, a driving unit, and a gear used in a blade driving device according to the embodiment.

A fixing ring 102 shown in FIG. 53 has an opening portion formed at the center. The fixing ring 102 is made using resin molding or made by cutting a metal material. The fixing ring 102 includes fixed pins 102b, a receiving surface 102c, and an outer wall 102a. A driving unit 101 is attached to the fixing ring 102. As the driving unit 101, for example, a stepping motor, a galvanometer, or the like is used. A pinion 105 is attached to the rotating shaft of the driving unit 101. FIG. 55 is a perspective view of the fixing ring 102 to which the driving unit 101 and the pinion 105 are attached. In addition, a holding sheet member 103 is attached to the fixing ring 102.

Figure 56:
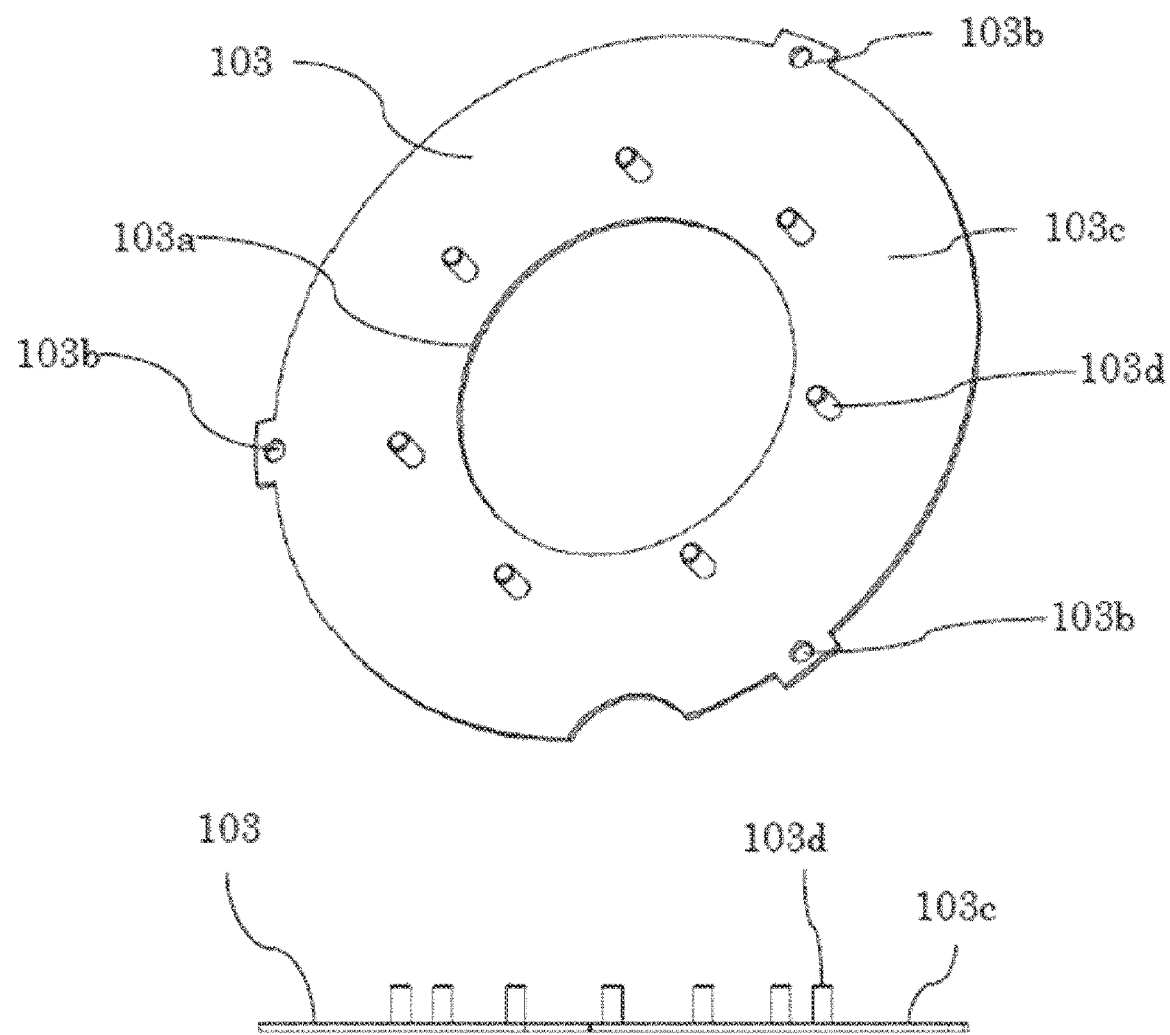
FIG. 56 shows a perspective view and a side view of a holding sheet member used in the blade driving device according to the embodiment.

FIG. 56 shows a perspective view and a side view of the holding sheet member 103. The holding sheet member 103 includes a base 103c, an opening portion 103a, guide pins 103d, and positioning holes 103b. The holding sheet member 103 is made by, for example, press-working a resin film (PET sheet material or the like). If press working is possible, the accuracy of form can be made higher than the accuracy of form of resin molding. For this reason, the diaphragm accuracy can be increased.

The holding sheet member 103 is positioned by engaging the fixed pins 102b of the fixing ring 102 with the positioning holes 103b of the holding sheet member 103. In addition, the position of the holding sheet member 103 in the optical axis direction is fixed by abutting the holding sheet member 103 against the receiving surface 102c of the fixing ring 102. Here, the fixing ring 102 holds the holding sheet member 103 so as to surround the outer periphery of the holding sheet member 103. For this reason, even if the holding sheet member 103 is extremely thin, it can maintain the shape. As for the thickness of the resin film, a material having a thickness of 0.01 mm to 0.30 mm can be used. For this reason, when the base 103c is made as thin as possible, a thin diaphragm device can be implemented.

Figure 57:
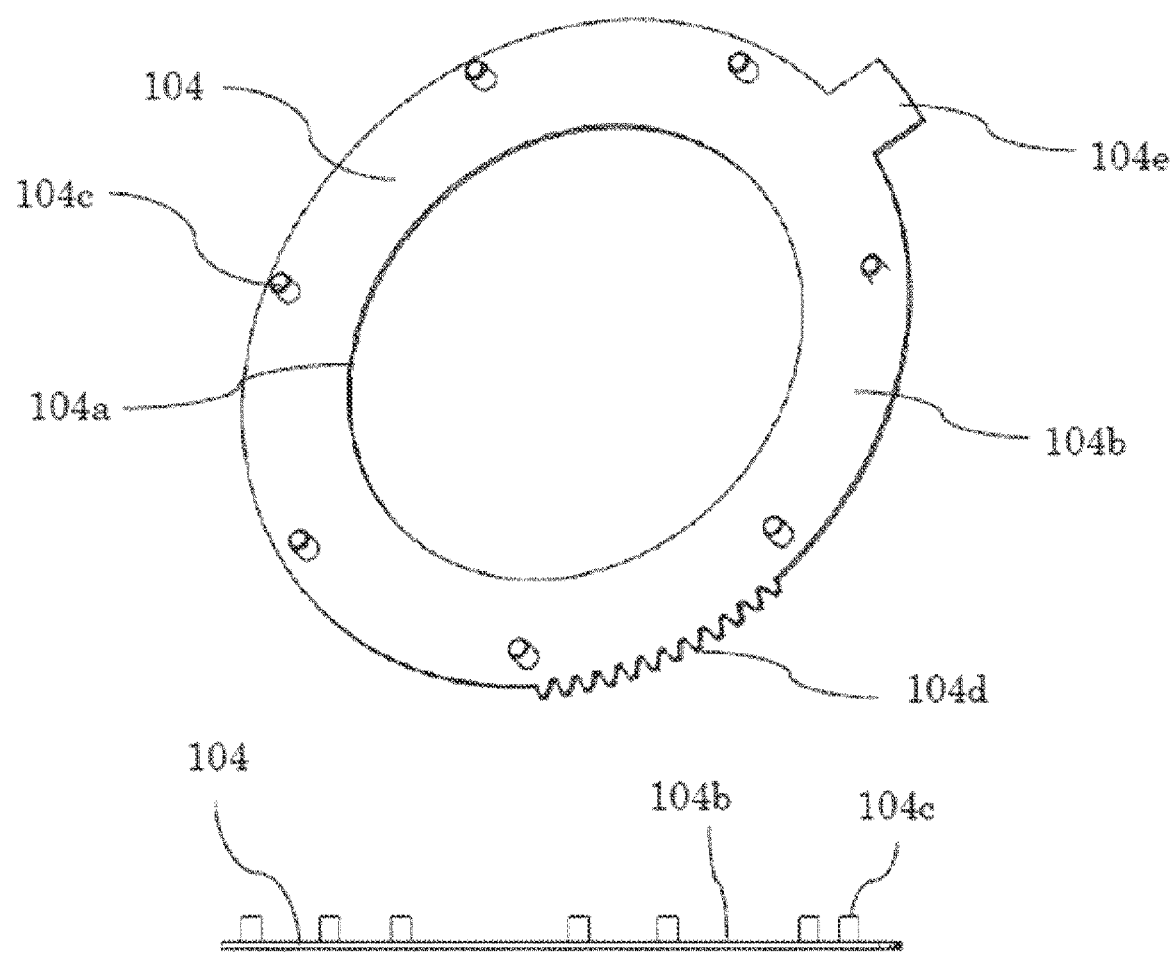
FIG. 57 shows a perspective view and a side view of a driving ring used in the blade driving device according to the embodiment.

FIG. 57 shows a perspective view and a side view of a driving ring 104. The driving ring 104 includes a base 104b, an inner engaging portion 104a, driving pins 104c, a driven portion 104d, and a light-shielding portion 104e. When the base 104b has an even thickness, the influence of air resistance upon rotation of the driving ring hardly exerts. It is therefore possible to reduce the operation load and improve high-speed responsiveness and noise reduction. The driving ring 104 is made by resin molding. Alternatively, the driving ring 104 is made by, for example, press-working a resin film (PET sheet material or the like). If press working is possible, the accuracy of form can be made higher than the accuracy of form of resin molding. For this reason, the diaphragm accuracy can be increased.

As for the thickness of the resin film, a material having a thickness of 0.01 mm to 0.30 mm can be used. When the base 104b is made as thin as possible, the inertia in rotation can be decreased, and the diaphragm device can perform a high-speed operation.

The driving ring 104 is supported by the holding sheet member 103 and a cover member 107 or by the fixing ring 102 and a diaphragm member so as to be optimally movable in both the thrust direction and the radial direction. This minimizes the deformation of the driving ring 104 even if the base 104b is made thin.

For the base 104b of the driving ring 104, a material whose one surface or both surfaces have undergone a surface treatment is preferably used. Examples of the surface treatment are slip coating, antistatic treatment, and antireflection treatment. When slip coating is performed, friction with the holding sheet member 103, diaphragm blades 106 to be described later, and the cover member 107, which are components sliding with respect to the driving ring, can be reduced, and an operation at lower power can be performed. When an antireflection treatment is performed, it is possible to suppress reflection of light that has entered the light amount adjusting device and prevent generation of ghosting, flare, or the like when the light amount adjusting device is assembled in a lens barrel.

The inner engaging portion 104a of the driving ring 104 engages with the plurality of guide pins 103d of the holding sheet member 103. The driving ring 104 and the holding sheet member 103 are engaged in a relationship in which the driving ring 104 is arranged outside, and the holding sheet member 103 is arranged inside. Since the inner engaging portion 104a of the driving ring 104 is supported by the plurality of guide pins 103d of the holding sheet member 103 in this relationship, the deformation of the driving ring 104 in the circumferential direction can be suppressed. It is therefore possible to perform an operation without deformation even if the base 104b of the driving ring 104 is thin.

Since the engagement length between the driving ring 104 and the holding sheet member 103 in the radial direction can be decreased to the thickness (0.01 mm to 0.3 mm) of the base 104b of the driving ring 104, the frictional resistance can be reduced, and a smooth operation and an operation at low power can be implemented.

The driving ring 104 includes a gear portion that is the driven portion 104d. The driven portion 104d meshes with the pinion 105. When a rotating force generated by the driving unit 101 is transmitted from the pinion 105 to the driven portion 104d, the driving ring 104 rotates. In the meshing between the gear portion 104d of the driving ring 104 and the gear of the pinion 105, since the gear portion 104d is thin, and the gear meshing area is small, the meshing sound between the gears is small. Additionally, since the mass difference between the pinion 105 and the driving ring 104 is large, the meshing sound, reversing sound, and the like between the gears are small even if the pinion 105 has backlash to the gear portion 104d.

Reference numeral 104e denotes the light-shielding portion. The light-shielding portion 104e enters or exits from the slit of a photointerrupter 108, thereby functioning as a sensor. The light-shielding portion 104e is used to detect a position such as the initial position of the light amount adjusting device.

Figure 58:
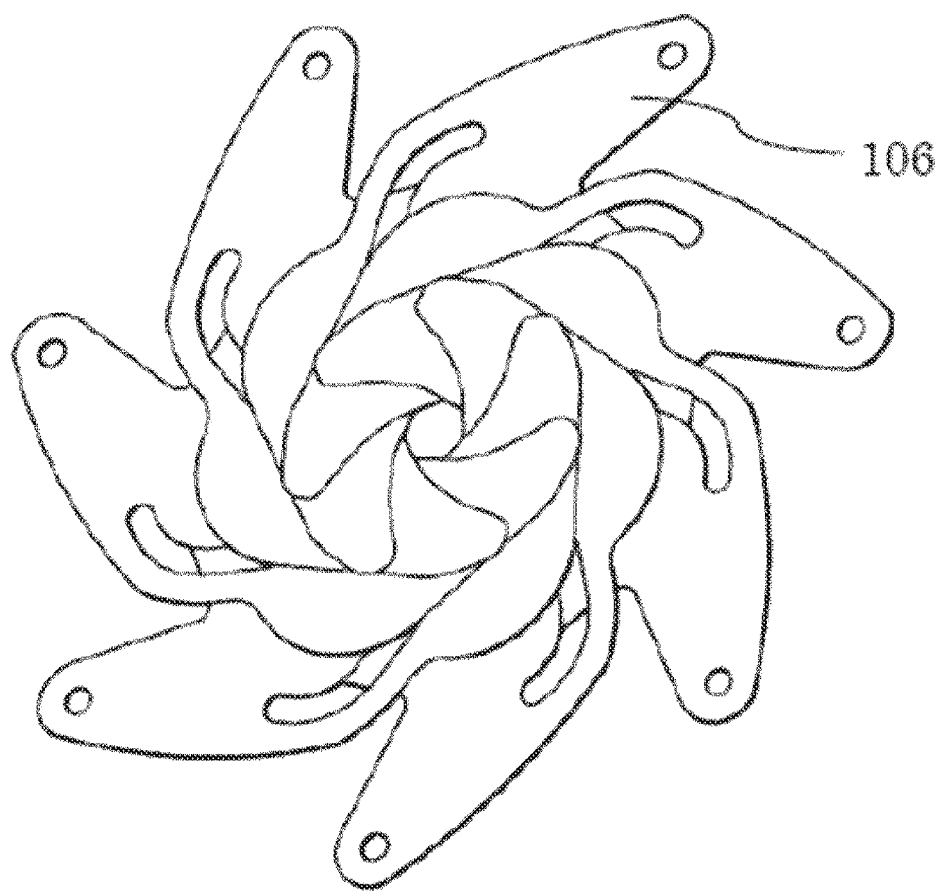
FIG. 58 is a perspective view of diaphragm blades used in the blade driving device according to the embodiment.

Reference numeral 106 denotes the diaphragm blade. An engaging hole 106c and a cam groove 106d which are driven portions are formed in each diaphragm blade 106. The diaphragm blade 106 is made by, for example, press-working a PET sheet material or the like. FIG. 58 is a perspective view of seven diaphragm blades.

Figure 59:
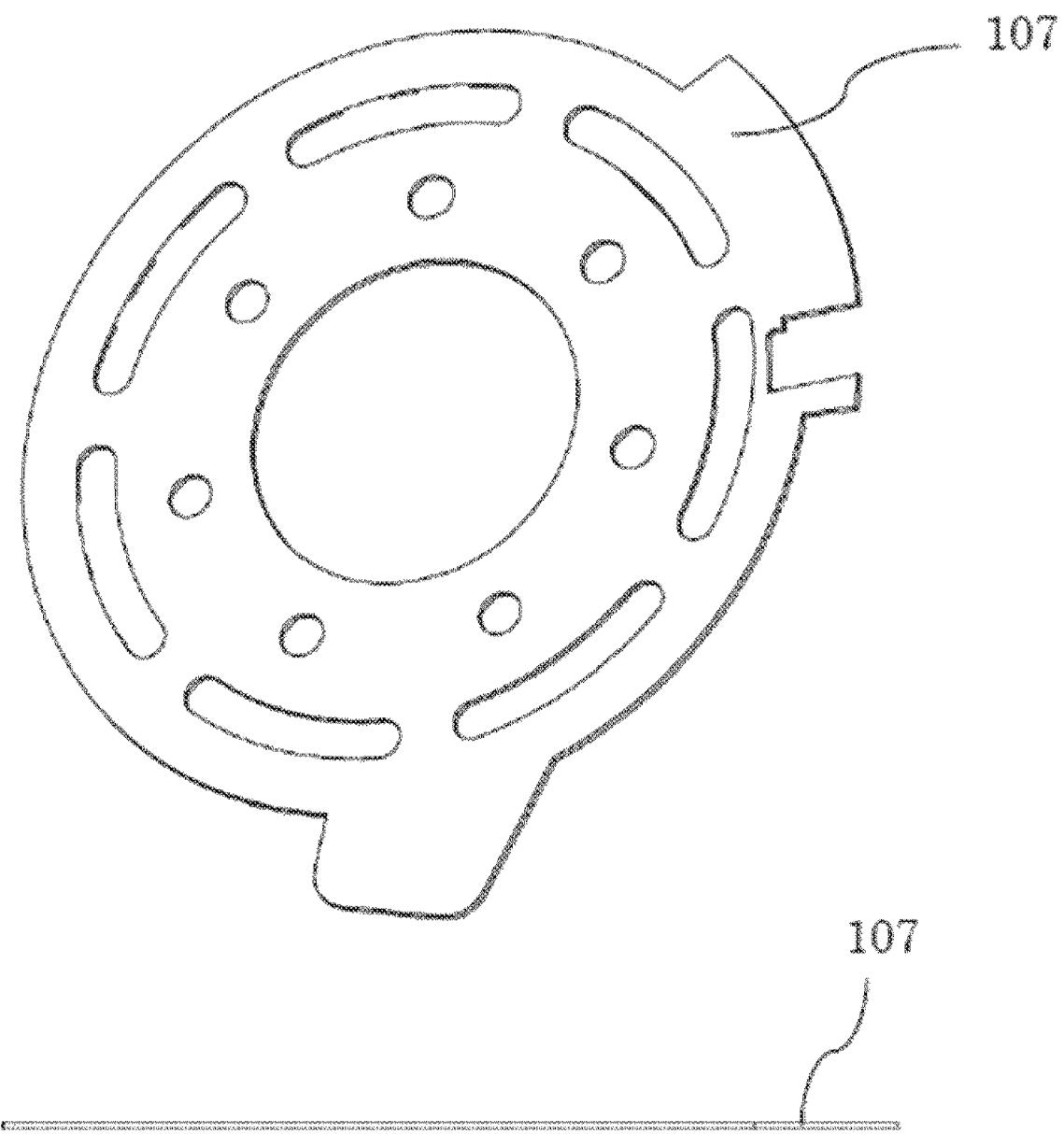
FIG. 59 shows a perspective view and a side view of a cover member used in the blade driving device according to the embodiment.

FIG. 59 shows a perspective view and a side view of the cover member 107. The cover member 107 is made by, for example, press-working a resin film (PET sheet material or the like). If press working is possible, the accuracy of form can be made higher than the accuracy of form of resin molding. For this reason, the diaphragm accuracy can be increased. The cover member 107 is attached to the fixing ring 102. The driving ring 104 and the diaphragm blades 106 are driven in a space formed by the holding sheet member 103 and the cover member 107.

The engaging holes 106c of the diaphragm blades 106 engage with the driving pins 104c of the driving ring 104, respectively. The pinion 105 rotates, a force is applied to the driven portion 104d of the driving ring 104, and the driving ring 104 rotates. When the driving ring 104d rotates, a driving force is applied from the driving pins 104c of the driving ring 104d to the engaging holes 106c of the diaphragm blades 106, and the diaphragm blades 106 are driven. The cam grooves 106d of the diaphragm blades 106 engage with the guide pins 103d of the holding sheet member 103. For this reason, by the cam grooves 106d, the diaphragm blades 106 enter or exit from the opening of the holding sheet member 103. The diaphragm shape can be adjusted by the plurality of diaphragm blades 106. FIG. 60 is a view showing a state in which the diaphragm blades are opened and a state in which the diaphragm blades are closed.

The base 104b of the driving ring 104 has an even thickness, and extra unevenness or holes do not exist. It is therefore possible to prevent an operation error from occurring due to, for example, the diaphragm blades 106 caught on the driving ring 104 during an opening/closing operation.

Figure 61:
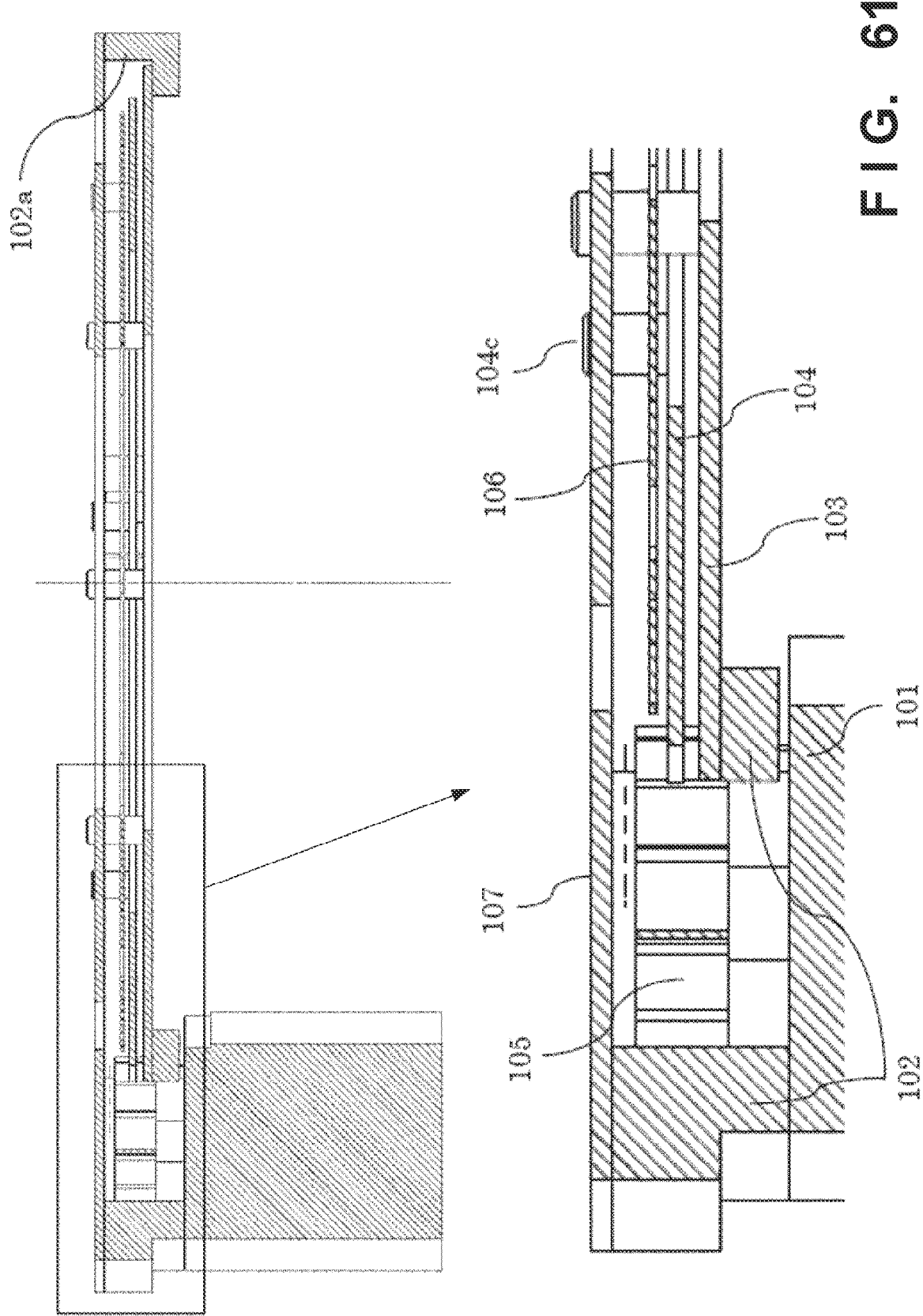
FIG. 61 is a sectional view of the blade driving device according to the embodiment.

FIG. 61 is a sectional view of the light amount adjusting device according to the first embodiment. The driving ring 104 is rotatably supported in the space formed by the holding sheet member 103 and the cover member 107. Here, the outer periphery of the driving range of the driving ring 104 and the diaphragm blades 106 is surrounded by the outer wall 102a of the fixing ring 102. Since the device is surrounded by the outer wall 102a, a strength necessary for the device can be maintained. It is also possible to prevent a foreign substance from entering the device. In the first embodiment, the thickness of the peripheral portion of the light passing opening can largely be decreased as compared to a diaphragm device of a conventional technique. The thickness of the peripheral portion of the light passing opening is the sum of the total thickness of the holding sheet member 103, the driving ring 104, the diaphragm blades 106, and the cover member 107 and a space needed for driving of the driving ring 104 and the diaphragm blades 106. In the first embodiment, all the holding sheet member 103, the driving ring 104, the diaphragm blades 106, and the cover member 107 are formed by thin sheet-shaped members. For this reason, the thickness can be ½ or less as compared to the diaphragm device of the conventional technique.

Additionally, in the first embodiment, the weight can be reduced as compared to the diaphragm device of the conventional technique. Since the thickness of each component is ½ or less, the weight can be reduced to ½ or less as compared to the conventional technique. Since the material weight used in the diaphragm device is small, the material cost can be reduced.

Furthermore, in the first embodiment, the shock resistance improves as compared to the conventional technique. For example, the weight of the driving ring 104 is ½ or less of the weight of a driving ring of the conventional technique. An impact force F to the driving ring 104 generated by applying an impact to a diaphragm unit is represented by F=ma (m: weight, a: acceleration). Since the weight of the driving ring 104 according to the first embodiment is ½ or less of the weight of the driving ring of the conventional technique, the impact force obtained by applying the impact is ½ or less. For this reason, in the first embodiment, the shock resistance is higher by twice or more than in the conventional technique. Additionally, in the first embodiment, the weights of the holding sheet member 103 and the cover member 107 are also ½ or less as compared to the conventional technique. For this reason, concerning the holding sheet member 103 and the cover member 107 as well, the shock resistance is higher by twice or more than in the diaphragm device of the conventional technique. Furthermore, since the thin sheet-shaped members used for the holding sheet member 103, the driving ring 104, the diaphragm blades 106, and the cover member 107 in the first embodiment are elastic members, the structure is superior to the conventional technique from the viewpoint of shock absorbency as well.

The diaphragm device according to the first embodiment can be mounted in a wearable camera (a camera attached to the body) or an action camera, which requires a strict shock resistance and rarely include a diaphragm device.

The holding sheet member 103, the driving ring 104, and the cover member 107 according to this embodiment will be described here in more detail. Each of the holding sheet member 103 and the driving ring 104 according to this embodiment is formed from an ultrathin sheet-shaped member having a structure engaging with the diaphragm blades 106.

Using, as the "ultrathin sheet-shaped member", for example, a sheet whose thickness is smaller than the thickness, in the optical axis direction, of the fixing ring 102 that holds the holding sheet member 103, or in comparison with the thickness of the blades, a sheet slightly thicker than the blades or a sheet having a thickness substantially equal to or smaller than the thickness of the blades is effective in thickness reduction in the optical axis direction of the diaphragm device.

Note that from the viewpoint of reducing the thickness or weight, the "ultrathin sheet-shaped member" according to this embodiment is preferably, for example, a very thin sheet-shaped member that is thick (thin) to such an extent that the member is solely relatively easily bent and deformed by only slight physical stress applied from the outside. In addition, the "ultrathin sheet-shaped member" preferably solely has a spring characteristic with a repulsive force against deformation, like a leaf spring. In a case of the driving ring 104, this makes it possible to sufficiently ensure form stability before or upon rotation and also ensure a stable flat pivotal posture. Hence, the driving ring 104 according to this embodiment is preferably formed from an ultrathin sheet-shaped member having a spring characteristic.

Additionally, for the "ultrathin sheet-shaped member" according to this embodiment, for example, a slidability improving layer formed by slip coating, an antistatic layer for static control, or an antireflection layer for preventing reflection may be provided as a surface layer on at least one surface of a sheet base made of a resin or a metal. Alternatively, a sheet-shaped member formed by providing the various kinds of surface layers on both surfaces of a sheet base is preferably used. Accordingly, if a slidability improving layer is provided, the slidability between the blades and another member can be increased. If an antistatic layer is provided, sticking between the blades and the driving ring 104 caused by static electricity can be prevented. In addition, if an antireflection layer is provided, it is possible to suppress reflection of light that has entered the light amount adjusting device and prevent generation of ghosting flare, or the like when the light amount adjusting device is assembled in a lens barrel. Note that when the surface layer such as the slidability improving layer is provided on an outer peripheral end (an inner end or an outer end or both of them) of the sheet base, the rigidity of the sheet base can be increased, and additionally, the slidability to the holding substrate can sufficiently be increased. As such a surface layer, for example, a thin film made of a material with excellent slidability using coating or various kinds of deposition techniques is usable. It is also possible to effectively prevent warping or deformation by adjusting the stress balance of the entire ultrathin sheet-shaped member using a film of tensile stress, compressive stress, or the like in consideration of the internal stress of the sheet base. The surface layers on both surfaces preferably have substantially the same thickness. For example, in a case in which the heat shrinkage ratio of the "ultrathin sheet-shaped member" and that of the surface treatment layer are different, since the "ultrathin sheet-shaped member" receives the same stress (tensile stress or compressive stress) from the obverse and reverse surfaces, the "ultrathin sheet-shaped member" can effectively prevent warping or deformation even if the environment changes.

In addition, the driving ring 104 according to this embodiment is totally different from a conventional driving ring (a relatively thick driving ring formed by resin molding). Here, for example, the driving ring 104 is compared with the conventional driving ring only concerning the thickness. A conventional thin driving ring has a thickness of about 0.5 mm. However, the thickness of the driving ring 104 according to this embodiment is preferably about 0.3 mm or less, more preferably, 0.2 mm or less, and much more preferably, about 0.1 mm or less.

Use of such an ultrathin sheet-shaped member for the driving ring 104 contributes not only to reduction of the thickness of the driving ring 104 but also to reduction of the weight of the driving ring 104, and higher-speed rotation can be implemented. Note that the ultrathin sheet-shaped member may have a single-layer structure or a multilayer structure.

For example, in a multilayer structure, a resin sheet such as a resin film may be used as the base, or a metal sheet such as a metal foil or a thin metal plate may be used as the base. Use of a resin sheet is very effective for weight reduction. On the other hand, when a metal sheet is used, posture stability in rotation can be increased.

Note that when a metal sheet is used, use of an ultralight-weight metal such as duralumin is very effective in implementing high-speed rotation. When a resin sheet or a metal sheet is used, the sheet may solely directly be applied to the driving ring 104 to form a single-layer structure. However, when considering physical interferences such as slidability to the blades or other members, operation load, friction, high-speed responsiveness, and noise reduction, a surface layer is preferably formed by a surface treatment (a treatment including surface coating) to impart various kinds of functionality.

In particular, although the driving ring 104 is preferably flat as a whole because it is rotated, engaging portions for the blades need to be provided. For this reason, the engaging portions for the blades are preferably implemented by minimum components in consideration of various factors, for example, air resistance and sufficient engagement. Note that the driving ring 104 may be formed using the same material as the material that forms the blades. In this case, the blades and the driving ring 104 have the same thickness.

In addition, the combination of the fixing ring 102 and the holding sheet member 103 according to this embodiment is totally different from a conventional holding substrate (a relatively thick ring formed by resin molding). Here, for example, the holding sheet member 103 is compared with the conventional holding substrate only concerning the thickness. A conventional thin holding substrate has a thickness of about 0.5 mm. However, the thickness of the holding sheet member 103 according to this embodiment is preferably about 0.3 mm or less, more preferably, 0.2 mm or less, and much more preferably, about 0.1 mm or less.

The holding sheet member 103 is fixed by the fixing ring 102. The fixing ring 102 is an annular member with an opening. The holding sheet member 103 is fixed in the opening. Since the outer periphery of the holding sheet member 103 is fixed by the fixing ring 102, the shape can be maintained even if the holding sheet member 103 is thin.

Use of such an ultrathin sheet-shaped member for the holding sheet member 103 contributes not only to reduction of the thickness of the holding substrate but also to reduction of the weight of the holding sheet member 103. Note that the ultrathin sheet-shaped member may have a single-layer structure or a multilayer structure.

For example, in a multilayer structure, a resin sheet such as a resin film may be used as the base, or a metal sheet such as a metal foil or a thin metal plate may be used as the base. Use of a resin sheet is very effective for weight reduction.

Note that when a metal sheet is used, use of an ultralight-weight metal such as duralumin is very effective in implementing high-speed rotation. When a resin sheet or a metal sheet is used, the sheet may directly be applied to the holding sheet member 103 to form a single-layer structure. However, when considering physical interferences such as slidability to the blades or other members, operation load, friction, high-speed responsiveness, and noise reduction, a surface layer is preferably formed by a surface treatment (a treatment including surface coating) to impart various kinds of functionality.

In particular, although the holding sheet member 103 is preferably flat as a whole because the driving ring 104 is rotated, engaging portions for the blades need to be provided. For this reason, the engaging portions for the blades are preferably implemented by minimum components in consideration of various factors, for example, sufficient engagement. Note that the holding sheet member 103 may be formed using the same material as the material that forms the blades. In this case, the blades and the driving ring 104 have the same thickness.

Additionally, for the cover member 107 according to this embodiment as well, an ultrathin sheet-shaped member is preferably used. The cover member 107 is compared with a relatively thick cover member formed by resin molding only concerning the thickness. A thin cover member made by resin molding has a thickness of about 0.5 mm. However, the thickness of the cover member 107 according to this embodiment is preferably about 0.3 mm or less, more preferably, 0.2 mm or less, and much more preferably, about 0.1 mm or less.

The cover member 107 is fixed to the fixing ring 102. The fixing ring 102 is an annular member with an opening. The cover member 107 is fixed so as to cover the opening. Since the outer periphery of the cover member 107 is fixed to the fixing ring 102, the shape can be maintained even if the cover member 107 is thin. The cover member 107 is fixed to the fixing ring 102 by bonding, fixing using a double-sided adhesive tape, screw fastening, or welding.

Use of such an ultrathin sheet-shaped member for the cover member 107 contributes not only to reduction of the thickness of the cover member but also to reduction of the weight of the cover member 107. Note that the ultrathin sheet-shaped member may have a single-layer structure or a multilayer structure.

The support of the driving ring 104 on the side of the holding sheet member 103 will be described. As shown in FIG. 60, the plurality of diaphragm blades 106 are arranged evenly in the circumferential direction. Hence, the driving ring 104 is supported by the plurality of diaphragm blades 106 not partially but evenly as a whole. Hence, instead of partially applying a large force, a force is applied to the driving ring 104 distributively as a whole. For this reason, even if the driving ring 104 is thin, it can implement stable driving without being deformed. Here, to reduce the frictional resistance between the driving ring 104 and the holding sheet member 103, an embossed shape may be formed on the sliding surfaces of the driving ring 104 and the holding sheet member 103. The embossed shape can be formed on either of the driving ring 104 and the holding sheet member 103.

The support of the driving ring 104 on the side of the diaphragm blades will be described. As shown in FIG. 60, the plurality of diaphragm blades 106 are arranged evenly in the circumferential direction. Hence, the driving ring 104 is supported by the plurality of diaphragm blades 106 not partially but evenly as a whole. Hence, instead of partially applying a large force, a force is applied to the driving ring 104 distributively as a whole. For this reason, even if the driving ring 104 is thin, it can implement stable driving without being deformed. Here, to reduce the frictional resistance between the driving ring 104 and the diaphragm blades 106, an embossed shape may be formed on the sliding surfaces of the driving ring 104 and the diaphragm blades 106. The embossed shape can be formed on either of the driving ring 104 and the diaphragm blades 106.

Figure 62:
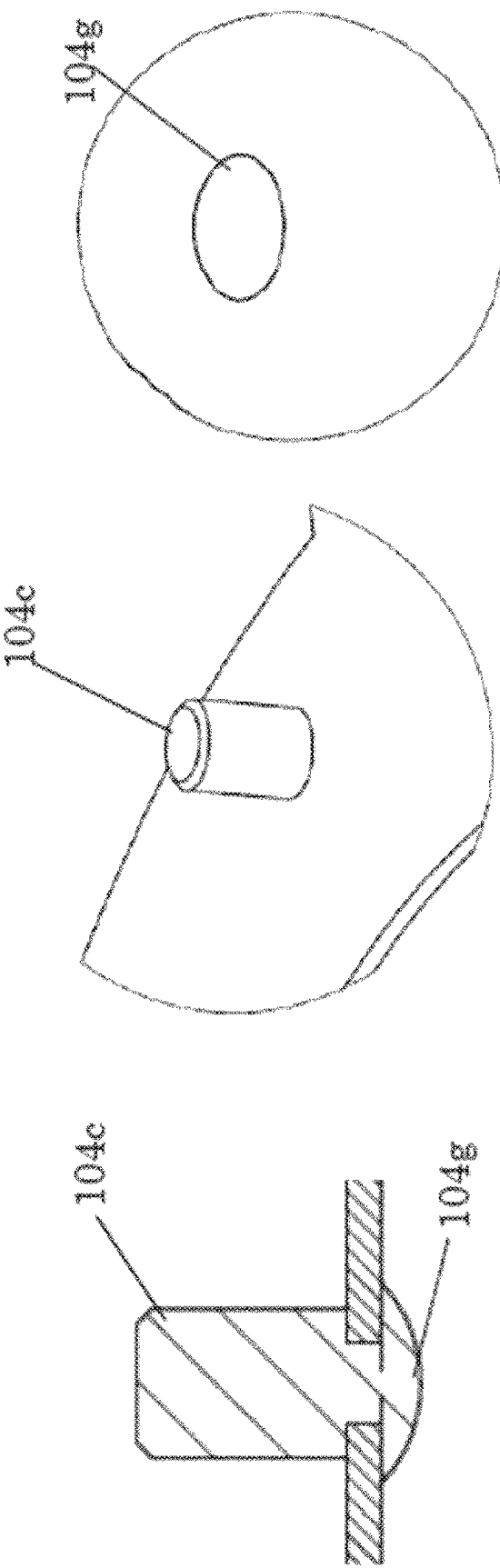
FIG. 62 shows a sectional view and perspective views of the driving ring according to the embodiment (Example 1)
Figure 64:
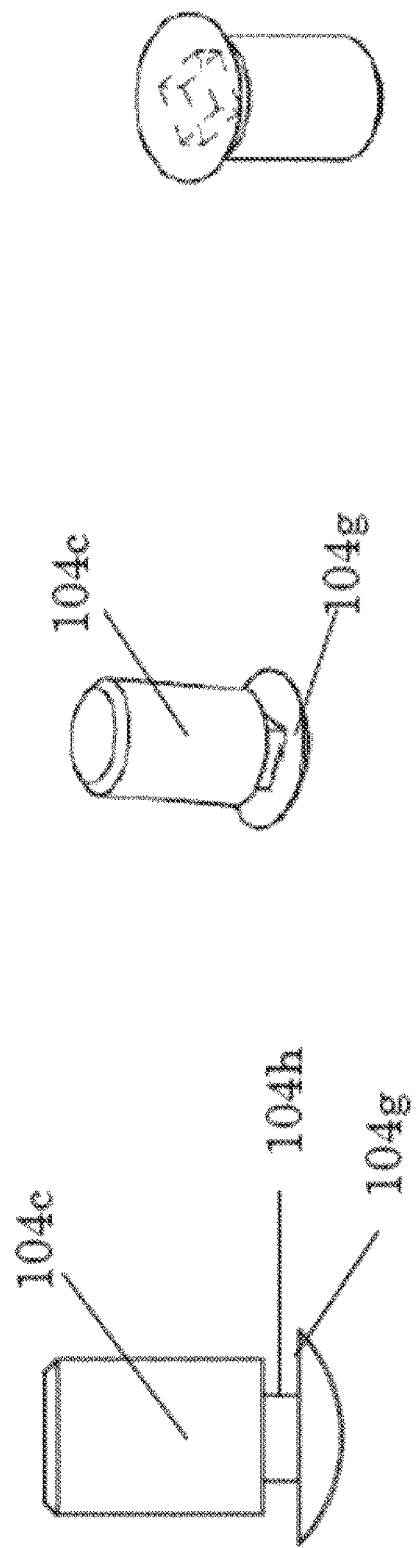
FIG. 64 shows a sectional view and perspective views of a driving pin of the driving ring according to the embodiment (Example 1)
Figure 66:
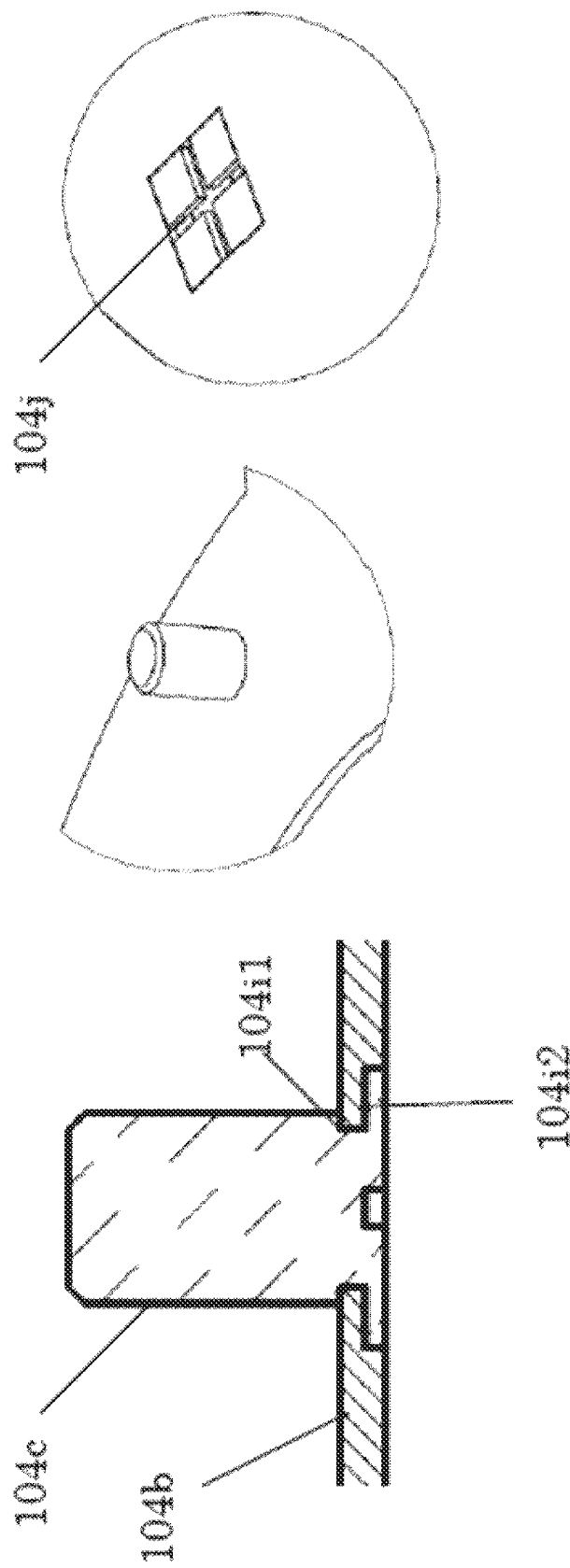
FIG. 66 shows a sectional view and perspective views of the driving ring according to the embodiment (Example 3)

FIG. 62 shows a sectional view and perspective views of the driving pin 104c of the driving ring 104. FIG. 63 shows a sectional view and perspective views of the base 104b. FIG. 64 shows perspective views of the driving pin 104c and a sliding portion 104g.

The driving pin 104c and the sliding portion 104g are formed on the base 104b by outsert-molding or formed by bonding or thermal caulking. The driving pin 104c can be made of either of a resin and a metal. As for the positional relationship, the driving pin 104c and the sliding portion 104g are located on the obverse and reverse sides of the base 104b. In addition, the driving pin 104c and the sliding portion 104g are connected via a hole 104i formed in the base 104b in advance. When the driving pin 104c and the sliding portion 104g sandwich the base 104b, the attachment strength between the driving pin 104c and the base 104b increases. Even if the base 104b is as thin as 0.01 mm to 0.3 mm, a high attachment strength can be maintained.

The hole 104i may be a circular hole. However, it may have, for example, a polygonal, elliptical, or semicircular shape to prevent rotation of the driving pin 104c.

In the driving ring 104, loads are applied to the portions of the driving pins 104c engaging with the diaphragm blades 106. Particularly, in a small open state, the diaphragm blades are knitted, and therefore, large loads are applied to the movable pins 104c serving as the support portions of the diaphragm blades 106. For this reason, the driving ring 104 is deformed in the direction of the holding sheet member 103. In the driving ring 104, however, the sliding portions 104g exist on the surface opposite to the movable pins 104c with respect to the base 104b. Hence, the loads generated by the knitting of the diaphragm blades are directly transmitted from the movable pins 104c to the sliding portions 104g. For this reason, the base 104b is rarely influenced by the loads of the knitting of the diaphragm blades 106. It is therefore possible to use a thin material with a low strength for the base 102b.

As for the driving ring 104 and the holding sheet member 103, the sliding portions 104g of the driving ring 104 slide on the holding sheet member 103.

FIG. 65 shows a second example of a sectional view and perspective views of the periphery of the driving pin 104c of the driving ring 104. Unlike FIG. 62, the central axis of the driving pin 104c and the central axis of the sliding portion 104g are intentionally shifted. In a case in which the central axis of the sliding portion 104g matches that of the driving pin 104c, when the sliding portion 104g slides on the holding sheet member 103, the driving pin 104c readily tilts because the sliding portion 104g and the driving pin 104c are integrated. When the central axes of the sliding portion 104g and the driving pin 104c are shifted, runout of the driving pin 104c can be suppressed, and more accurate control can be performed.

Figure 67:
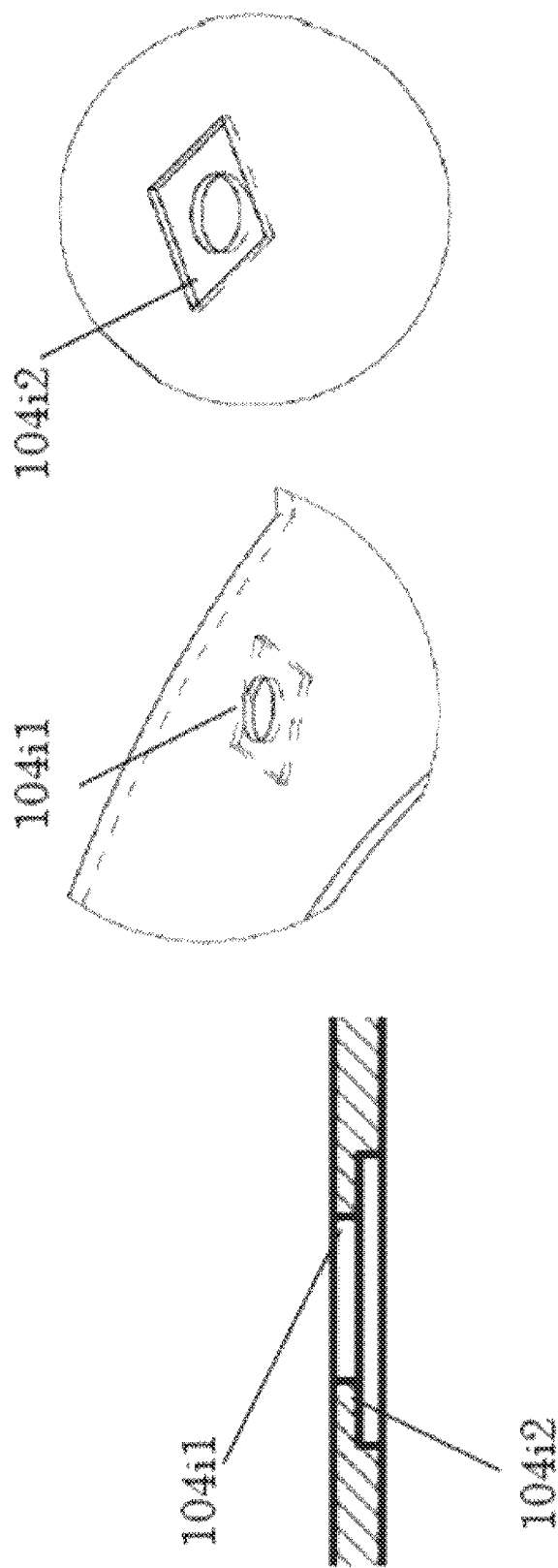
FIG. 67 shows a sectional view and perspective views of the driving ring base according to the embodiment (Example 3)
Figure 68:
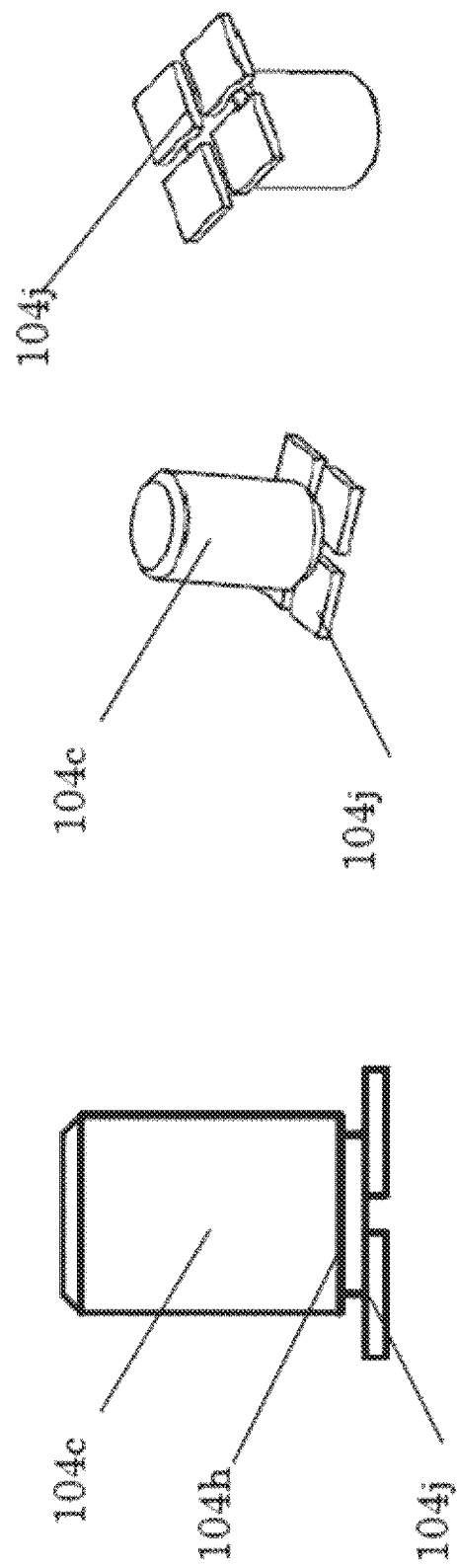
FIG. 68 shows a sectional view and perspective views of the driving pin of the driving ring according to the embodiment (Example 3)

FIG. 67 shows a third example of a sectional view and perspective views of the periphery of the driving pin 104c of the driving ring 104. FIG. 68 shows a sectional view and perspective views of the base 104b. FIG. 68 shows perspective views of the driving pin 104c and a fixed portion 104j. The driving pin 104c and the fixed portion 104j are formed on the base 104b by outsert-molding.

As for the positional relationship, the driving pin 104c and the fixed portion 104j are located on the obverse and reverse sides of the base 104b. In addition, the driving pin 104c and the fixed portion 104j are connected via a hole 104i1 formed in the base 104b in advance. When the driving pin 104c and the fixed portion 104j sandwich the base 104b, the attachment strength between the driving pin 104c and the base 104b increases. Even if the base 104b is as thin as 0.01 mm to 0.3 mm, a high attachment strength can be maintained.

In addition to the hole 104i1, a concave portion 104i2 is formed in the base 104b. This shape is formed by forming the hole 104i1 in a resin film (PET sheet material or the like) and then forming a concave portion in the resin film. When the hole is formed first, a place to release the resin can be made, and a concave shape can be formed in the resin film. At this time, the hole 104i1 or the concave portion 104i2 may have a circular shape. However, it may have, for example, a polygonal, elliptical, or semicircular shape to prevent rotation of the driving pin 104c. The fixed portion 104j is a shape formed when pressing the base 104b at the time of outsert-molding.

The fixed portion 104j of the driving pin 104c can be formed in the concave portion 104i2. For this reason, in the driving ring 104, the fixed portion 104j can be buried in the surface opposite to the driving pin 104c with respect to the base 104b without forming a convex shape. Additionally, with this method, the driving pin 104c having a small diameter can be formed independently of the thickness of the base 104b.

An example of attaching the driving pins 104c to the driving ring 104 has been described. However, the driving pins 104c may be attached by a method other than the above-described method. In addition, as a method of attaching the guide pins 103d to the holding sheet member 103, the same method as that for the driving ring 104 can be used.

The arrangement according to the first embodiment is a versatile arrangement. For example, if a lens barrel member to attach the diaphragm unit is changed, the diaphragm unit can be attached to another lens barrel member only by changing or exchanging the shape of the fixing ring 102. Reference numeral 102d provided on the fixing ring 102 denotes an attachment shape to a lens barrel member. Only by changing the shape of the fixing ring 102, the diaphragm unit according to the first embodiment can be attached to another lens barrel member. That is, the holding sheet member 103, the driving ring 104, the pinion gear 105, the diaphragm blades 106, and the cover member 107 can directly be diverted.

In addition, when changing the maximum aperture of the diaphragm unit, a device according to the specifications of another lens barrel member can be formed only by changing one of the components (the holding sheet member 103, the diaphragm blades 106, and the cover member 107) for changing the maximum aperture. That is, the arrangement according to the first embodiment can be applied to various lens barrel members only by changing the combination of members.

In the first embodiment, an arrangement has been described in which the driving pins of the driving ring engage with the driving holes of the diaphragm blades on the outer side of the guide pins of the holding sheet member and rotate, and the guide pins of the holding sheet member engage with the cam grooves of the diaphragm blades on the inner side of the driving pins of the driving ring, thereby adjusting the diaphragm opening shape. The first embodiment can also be applied to an arrangement in which the driving pins of the driving ring engage with the cam grooves of the diaphragm blades on the inner side of the guide pins of the holding sheet member and rotate, and the guide pins of the holding sheet member engage with the engaging holes of the diaphragm blades on the outer side of the driving pins of the driving ring, thereby adjusting the diaphragm opening shape.

With these arrangements, it is possible to provide a compact light amount adjusting device that has a high shock resistance and implements high-speed responsiveness, power saving, noise reduction, and versatility, and a compact optical device including the light amount adjusting device.

Second Embodiment

The second embodiment of the present invention will be described below in detail with reference to the accompanying drawings.

Figure 69:
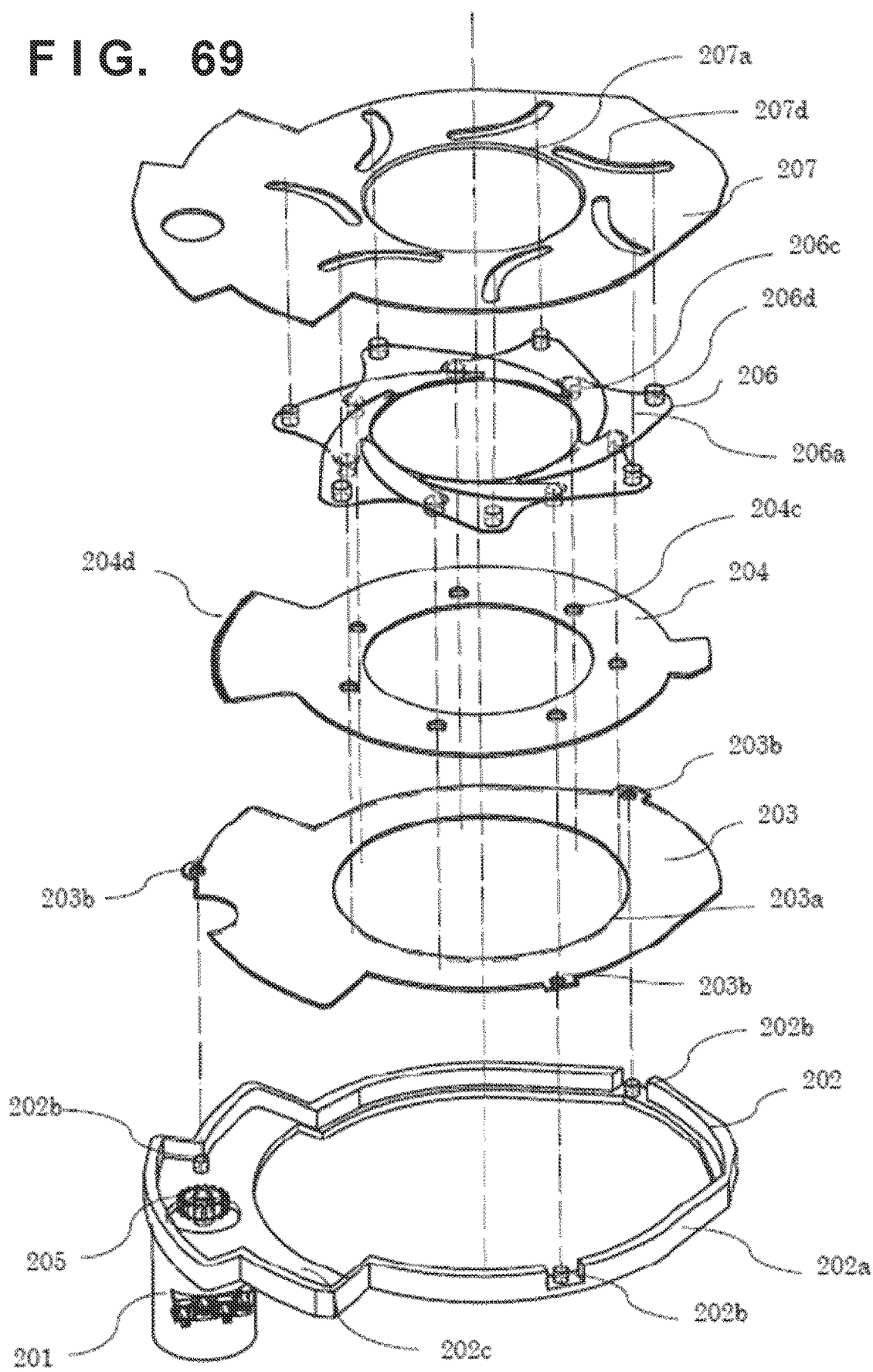
FIG. 69 is an exploded perspective view of a diaphragm device according to still another embodiment.

FIG. 69 is an exploded perspective view of a diaphragm device serving as a light amount adjusting device according to the second embodiment of the present invention.

The basic arrangement is the same as in the first embodiment, and reference numerals in 200s are used. The diaphragm device includes a driving unit 201, a fixing ring 202, a holding sheet member 203, a driving ring 204, a pinion gear 205, diaphragm blades 206, and a cover member 207. The driving ring 204 includes engaging holes 204c. Each diaphragm blade 206 includes a driving pin 206c and a cam pin 206d. The cover member 207 includes cam grooves 207d.

When the driving unit 201 rotates, the pinion gear 205 rotates. The pinion gear 205 applies a force to a driven portion 204d of the driving ring 204, and the driving ring 204 rotates about a light passing opening. Since the driving pins 206c of the diaphragm blades 206 engage with the engaging holes 204c of the driving ring 204, the driving ring 204 rotates about the light passing opening, and simultaneously, the plurality of diaphragm blades 206 also rotate about the light passing opening. Since the cam pins 206d of the diaphragm blades 206 engage with the cam grooves 207d of the cover member 207, the diaphragm blades 206 enter or exit from the light passing opening in accordance with the shapes of the cam grooves 207d.

Figure 70:
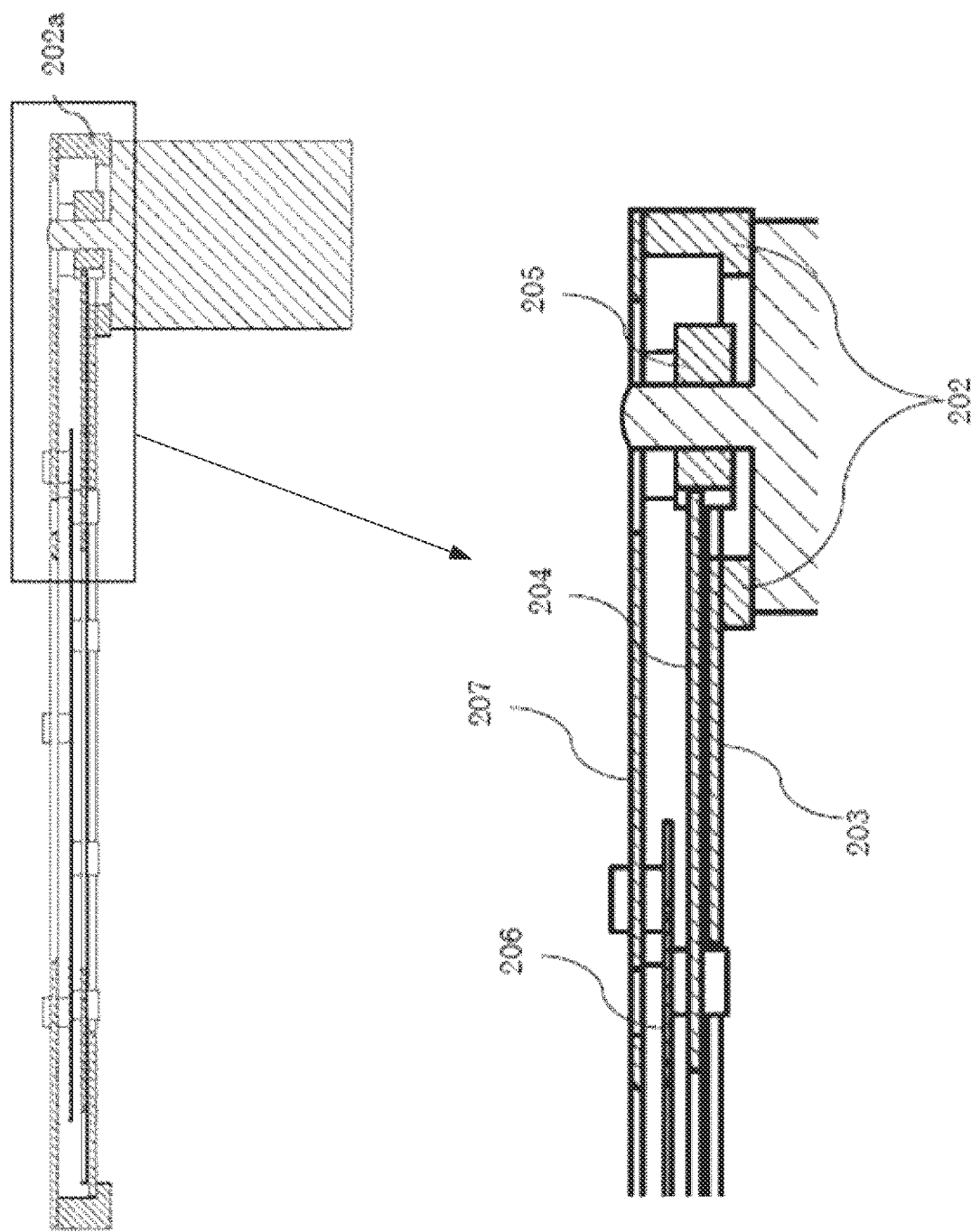
FIG. 70 is a sectional view of a blade driving device according to the embodiment.

The relationship between the fixing ring 202 and the holding sheet member 203 is the same as in the first embodiment. FIG. 70 is a sectional view of the second embodiment. As in the first embodiment, the holding sheet member 203, the driving ring 204, and the cover member 207 are formed by ultrathin sheet-shaped members. In the second embodiment as well, the thickness and weight of the diaphragm device can be reduced. Since the same effects as in the first embodiment can be obtained, an excellent shock resistance and noise reduction can be attained.

In addition, since the driving ring 204 according to the second embodiment need only have the engaging holes 204c with which the driving pins of the diaphragm blades 206 engage, the structure of the driving ring can be simplified.

As for the diaphragm blade 206, the blade portion may be made using an ultrathin sheet-shaped member, and the driving pin 206c and the cam pin 206d may be made by outsert-molding using a resin material. As the attachment method for the blade portion, the driving pin 206c, and the cam pin 206d, the attachment method for the holding sheet member and the guide pin or the attachment method for the driving ring and the driving pin described in the first embodiment may be used. Alternatively, a metal pin or a resin pin may be made by press-fitting, bonding, or welding. The diaphragm blade 206 may be made by integrally molding the blade portion, the driving pin 206c, and the cam pin 206d by resin molding.

According to these arrangements, it is possible to provide a compact light amount adjusting device that has a high shock resistance and implements high-speed responsiveness, power saving, noise reduction, and versatility, and a compact optical device including the light amount adjusting device.

Third Embodiment

The third embodiment of the present invention will be described below in detail with reference to the accompanying drawings.

Figure 71:
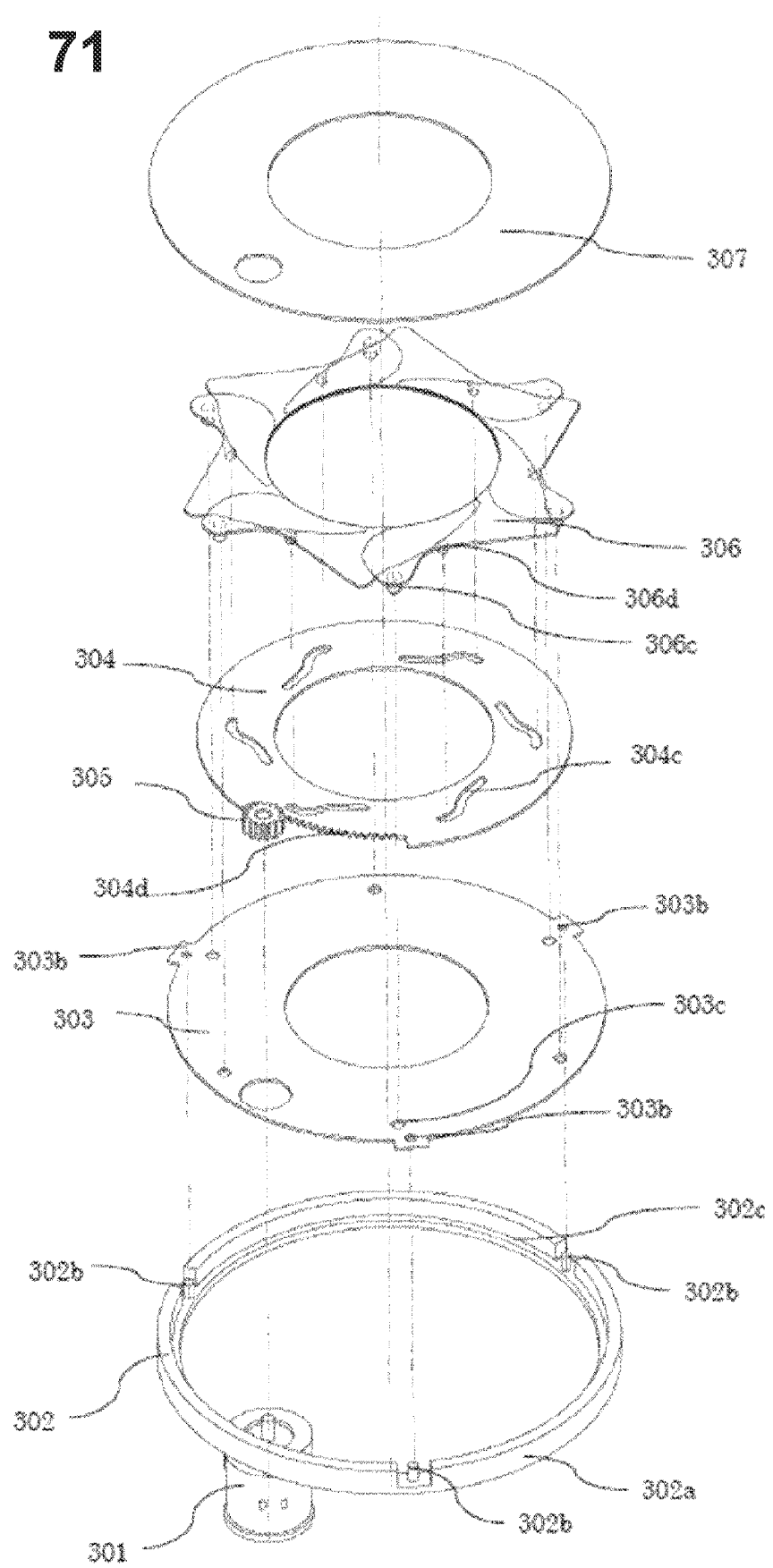
FIG. 71 is an exploded perspective view of a diaphragm device according to still another embodiment.

FIG. 71 is an exploded perspective view of a diaphragm device serving as a light amount adjusting device according to the third embodiment of the present invention.

The basic arrangement is the same as in the first embodiment, and reference numerals in 300s are used. The diaphragm device includes a driving unit 301, a fixing ring 302, a holding sheet member 303, a driving ring 304, a pinion gear 305, diaphragm blades 306, and a cover member 307. The holding sheet member 303 includes rotation center holes 303c. The driving ring 304 includes cam grooves 304c. Each diaphragm blade 306 includes a guide pin 306c and a cam pin 306d.

When the driving unit 301 rotates, the pinion gear 305 rotates. The pinion gear 305 applies a force to a driven portion 304d of the driving ring 304, and the driving ring 304 rotates about a light passing opening. Since the cam pins 306d of the diaphragm blades 306 engage with the cam grooves 304c of the driving ring 304, the diaphragm blades 306 enter or exit from the light passing opening in accordance with the shapes of the cam grooves 304c. Since the guide pins 306c of the diaphragm blades 306 engage with the rotation center holes 303c of the holding sheet member 303, the diaphragm blades 306 rotate about the guide pins 306c.

Figure 72:
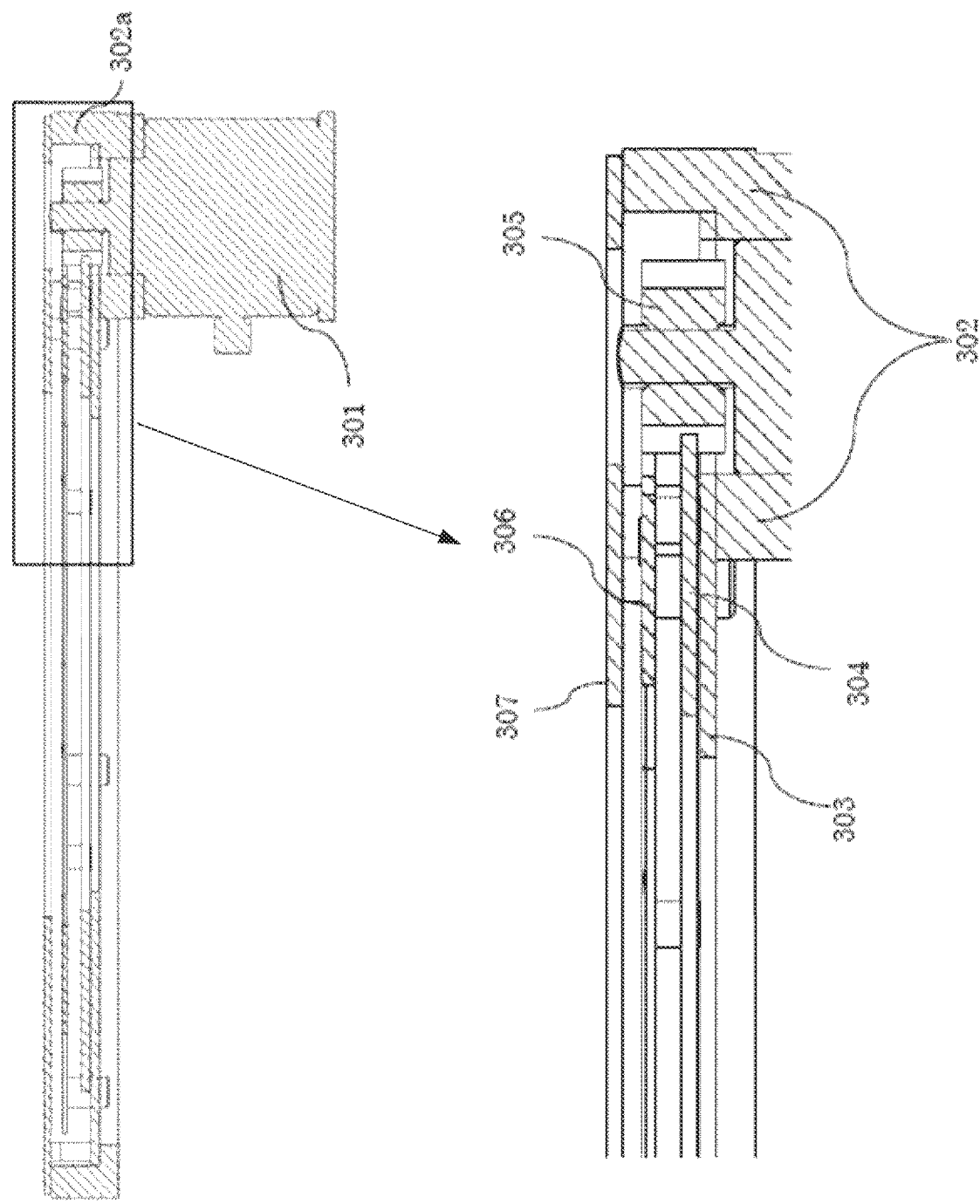
FIG. 72 is a sectional view of a blade driving device according to the embodiment.

The relationship between the fixing ring 302 and the holding sheet member 303 is the same as in the first embodiment. FIG. 72 is a sectional view of the third embodiment. As in the first embodiment, the holding sheet member 303, the driving ring 304, and the cover member 307 are formed by ultrathin sheet-shaped members. In the third embodiment as well, the thickness and weight of the diaphragm device can be reduced. Since the same effects as in the first embodiment can be obtained, an excellent shock resistance and noise reduction can be attained.

In addition, since the driving ring 304 according to the third embodiment need only have the cam grooves 304c with which the cam pins of the diaphragm blades 306 engage, the structure of the driving ring can be simplified. In addition, when the cam grooves 304c are provided, the weight of the driving ring can further be reduced, and the structure is effective for a high-speed operation.

As for the diaphragm blade 306, the blade portion may be made using an ultrathin sheet-shaped member, and the guide pin 306c and the cam pin 306d may be made by outsert-molding using a resin material. As the attachment method for the blade portion, the guide pin 306c, and the cam pin 306d, the attachment method for the holding sheet member and the guide pin or the attachment method for the driving ring and the driving pin described in the first embodiment may be used. Alternatively, a metal pin or a resin pin may be made by press-fitting, bonding, or welding. The diaphragm blade 306 may be made by integrally molding the blade portion, the guide pin 306c, and the cam pin 306d by resin molding.

According to these arrangements, it is possible to provide a compact light amount adjusting device that has a high shock resistance and implements high-speed responsiveness, power saving, noise reduction, and versatility, and a compact optical device including the light amount adjusting device.

Fourth Embodiment

Figure 109:
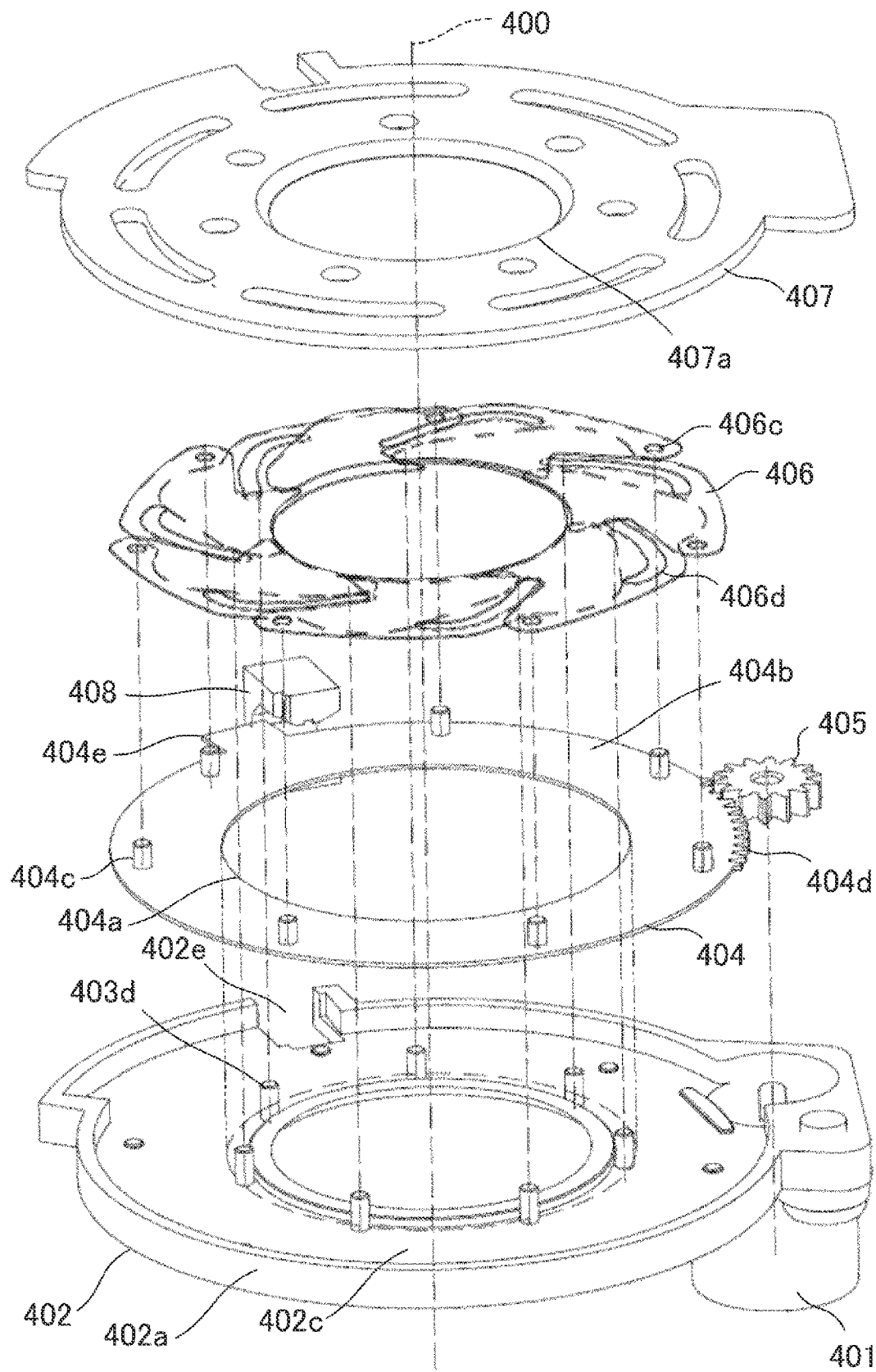
FIG. 109 is an exploded perspective view of a diaphragm device according to still another embodiment.
Figure 110:
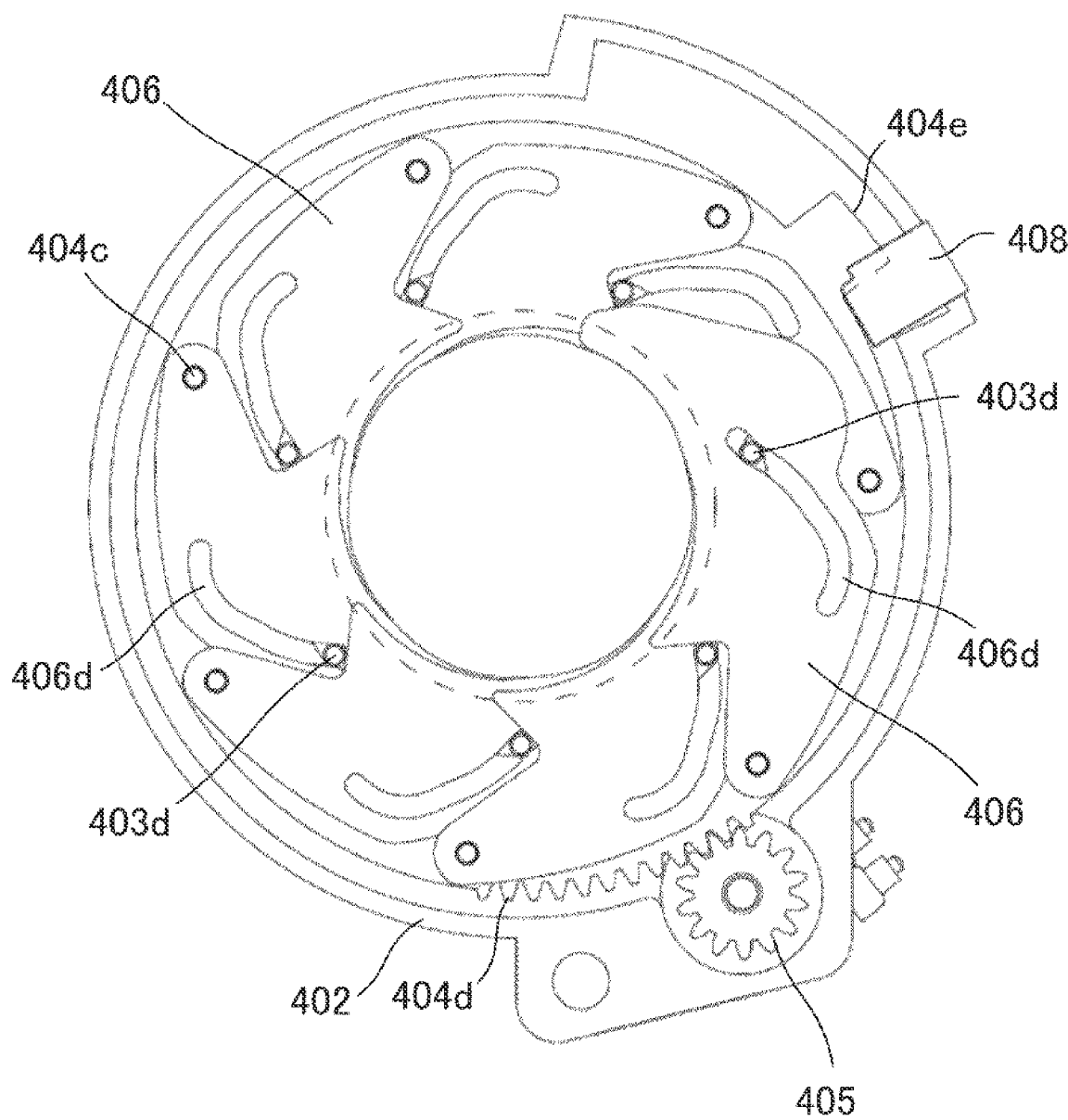
FIG. 110 is an explanatory view of the operation of the diaphragm device according to the embodiment.
Figure 111:
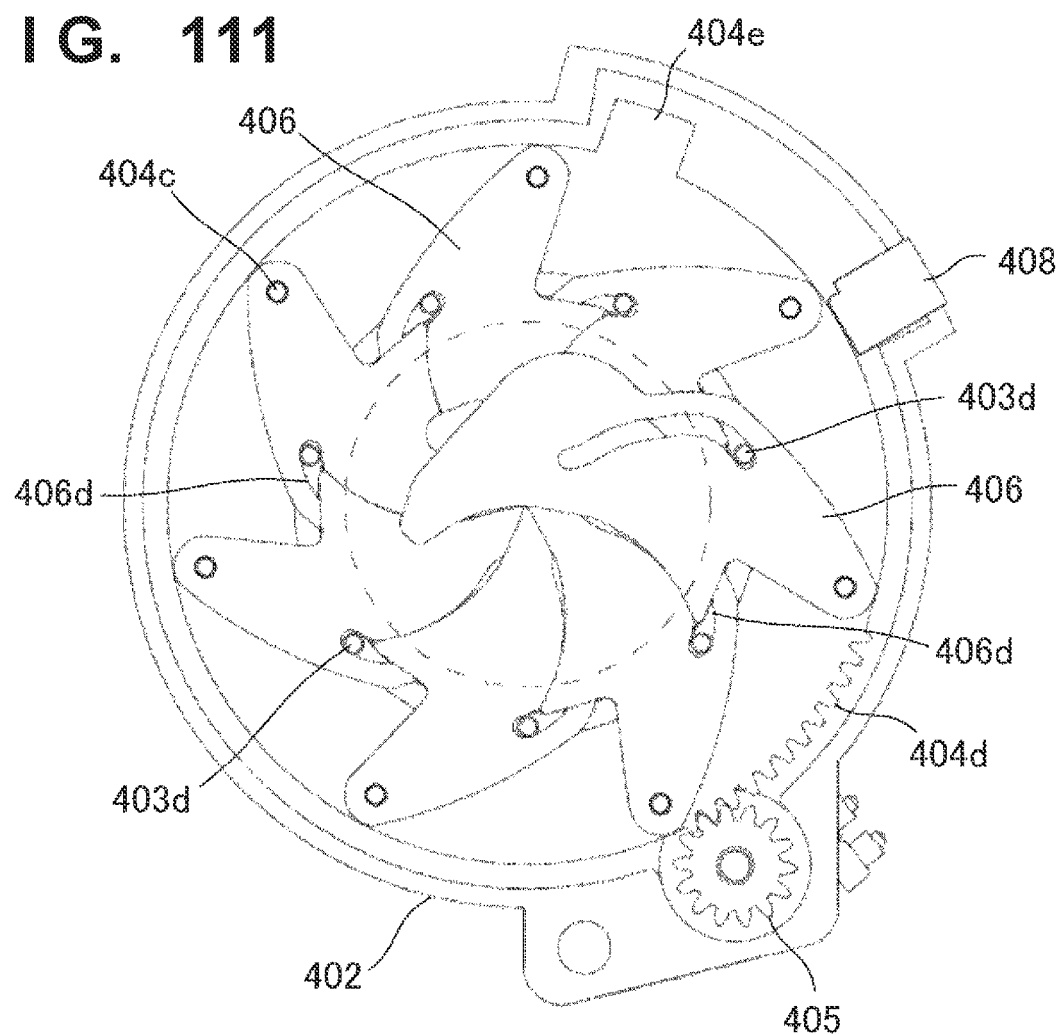
FIG. 111 is an explanatory view of the operation of the diaphragm device according to the embodiment.

FIG. 109 is an exploded perspective view of a blade driving device according to the fourth embodiment of the present invention. FIGS. 110 and 111 are explanatory views of the operation. Reference numeral 400 denotes an optical axis center of the blade driving device. The fourth embodiment is an embodiment with a shutter function. The basic arrangement is the same as in the first embodiment, and corresponding components are given reference numerals in 400s with the same final numbers.

The fourth embodiment is different from the first embodiment in the manner diaphragm blades 406 are assembled. In the fourth embodiment, the diaphragm blades 406 are annularly stacked. Unlike the first embodiment, the diaphragm blades are not assembled by placing the distal end of the blade to be finally knitted under the first blade and knitting them. In the fourth embodiment, the opening can completely be covered with the plurality of diaphragm blades 406 (FIG. 111). For this reason, this blade driving device can also be used as a shutter unit. Since a driving ring 404 that drives the diaphragm blades 406 is a sheet-shaped member, the device is thin and usable as a high-speed shutter unit.

Additionally, in this fourth embodiment, the holding sheet member 103 is omitted, and guide pins 103d are provided on a fixing ring 402. This contributes to reduction of the number of components and reduction of the thickness.

Summary of Embodiment B

This embodiment is directed to a blade driving device comprising a blade configured to enter or exit from a light passing path, a driving ring configured to drive the blade, a holding sheet member configured to rotatably hold the driving ring, and a fixing ring configured to fix the holding sheet member and cover an outside of a driving range of the blade and the driving ring, wherein each of the driving ring and the holding sheet member is formed from an ultrathin sheet-shaped member.

According to the embodiment, since each of the driving ring and the holding sheet member is formed from the ultrathin sheet-shaped member, the structure is effective in thickness reduction in the light passing direction.

The blade driving device according to the embodiment is wherein each of the driving ring and the holding sheet member is formed from the ultrathin sheet-shaped member having a spring characteristic.

According to the embodiment, form stability can be increased in a non-pivotal movement (in driving standby) or pivotal movement of the driving ring. The structure also contributes to improvement of posture stability in the pivotal movement.

The blade driving device according to the embodiment is wherein each of the driving ring and the holding sheet member is formed from the ultrathin sheet-shaped member including a surface layer serving as a slidability improving layer on at least one surface of a sheet base.

According to the embodiment, it is possible to increase the slidability between the driving ring and another member.

The blade driving device according to the embodiment is wherein each of the driving ring and the holding sheet member is formed from the ultrathin sheet-shaped member including a surface layer serving as an antistatic layer on at least one surface of a sheet base.

According to the embodiment, it is possible to effectively prevent driving performance from lowering due to static electricity between the driving ring and another member.

The blade driving device according to the embodiment is wherein the surface layer is provided on each surface of the sheet base, and the surface layers are provided in substantially the same thickness.

According to the embodiment, it is possible to sufficiently ensure the flatness of the driving ring and the holding sheet member.

The blade driving device according to the embodiment is wherein each of the driving ring and the holding sheet member is formed from the ultrathin sheet-shaped member whose thickness is substantially not more than a thickness of the blade.

According to the embodiment, since each of the driving ring and the holding sheet member is formed from a very thin sheet-shaped member whose thickness is not more than the thickness of the blade, the structure is effective in further thickness reduction.

The blade driving device according to the embodiment is wherein a pivotal posture of the driving ring is held by a plurality of support portions provided on the holding sheet member.

According to the embodiment, since the driving ring is stably supported at a plurality of points of a holding substrate, it is possible to implement the pivotal posture in a substantially flat state.

The blade driving device according to the embodiment is wherein the holding sheet member includes a first holding sheet member arranged on one surface side of the driving ring, and a second holding sheet member arranged on the other surface side of the driving ring, and a driving space of the driving ring formed between the first holding sheet member and the second holding sheet member is regulated by the fixing ring.

According to the embodiment, since the driving ring is supported while substantially being sandwiched between the first holding sheet member and the second holding sheet member which face each other, the pivotal movement of the driving ring is further stabilized.

The blade driving device according to the embodiment is wherein a surface of the blade on a side of the driving ring is provided with an engaging projecting portion configured to engage with a through hole provided in the driving ring, and a surface of the blade on a side of a first substrate is provided with a cam groove engaging projecting portion configured to engage with a cam groove provided in the first substrate.

According to the embodiment, since it is only necessary to provide, for the driving ring, the engaging projecting portion engaging with the blade, the structure of the driving ring can be simplified.

The blade driving device according to the embodiment is wherein a surface of the blade on a side of the driving ring is provided with a cam groove engaging projecting portion configured to engage with a cam groove provided in the driving ring and a rotation center axis to be inserted into an insertion portion provided on a second substrate, both of which project. According to the embodiment, when the cam groove is provided in the driving ring, the weight of the driving ring 104 can further be reduced, and the structure is advantageous in driving the driving ring at a high speed.

The blade driving device according to the embodiment is wherein a surface of driving ring on a side of the blade is provided with a plurality of engaging projecting portions as separate members each configured to engage with one of an engaging hole and an engaging cam groove of the blade.

According to the embodiment, the plurality of engaging projecting portions from separate members are provided on the driving ring as portions where the driving ring engages with the blade, thereby optimizing the functionality (slidability, antistatic properties, lightness, spring properties, and the like) in the driving ring and the functionality (rigidity and the like) in the engaging portion.

The blade driving device according to the embodiment is wherein the blades comprise a plurality of blade groups annularly arranged around an opening portion provided to extend through the holding member.

According to the embodiment, it is possible to easily reduce the thickness of a diaphragm device configured to narrow the light passing path by coordinately moving the plurality of blade groups by the driving ring that pivots.

The blade driving device according to the embodiment is wherein a driving transmission member configured to transmit a driving force of the driving ring is connected to an outer peripheral portion of the driving ring.

According to the embodiment, it is possible to implement reliable driving transmission by a relatively simple arrangement for the driving ring formed from the ultrathin sheet-shaped member.

The blade driving device according to the embodiment is wherein the driving transmission member comprises a pinion gear attached to a rotating shaft of a driving motor, and a thickness of the driving ring is smaller than a height of the pinion gear.

According to the embodiment, it is possible to implement reliable driving connection between the driving ring and the driving transmission member (pinion gear).

Note that the embodiment is not limited to the blade driving device, and can also be applied to a blade driving system in an image capturing device such as a camera and broadly includes image capturing devices in the target.

Embodiment C

Figure 73:
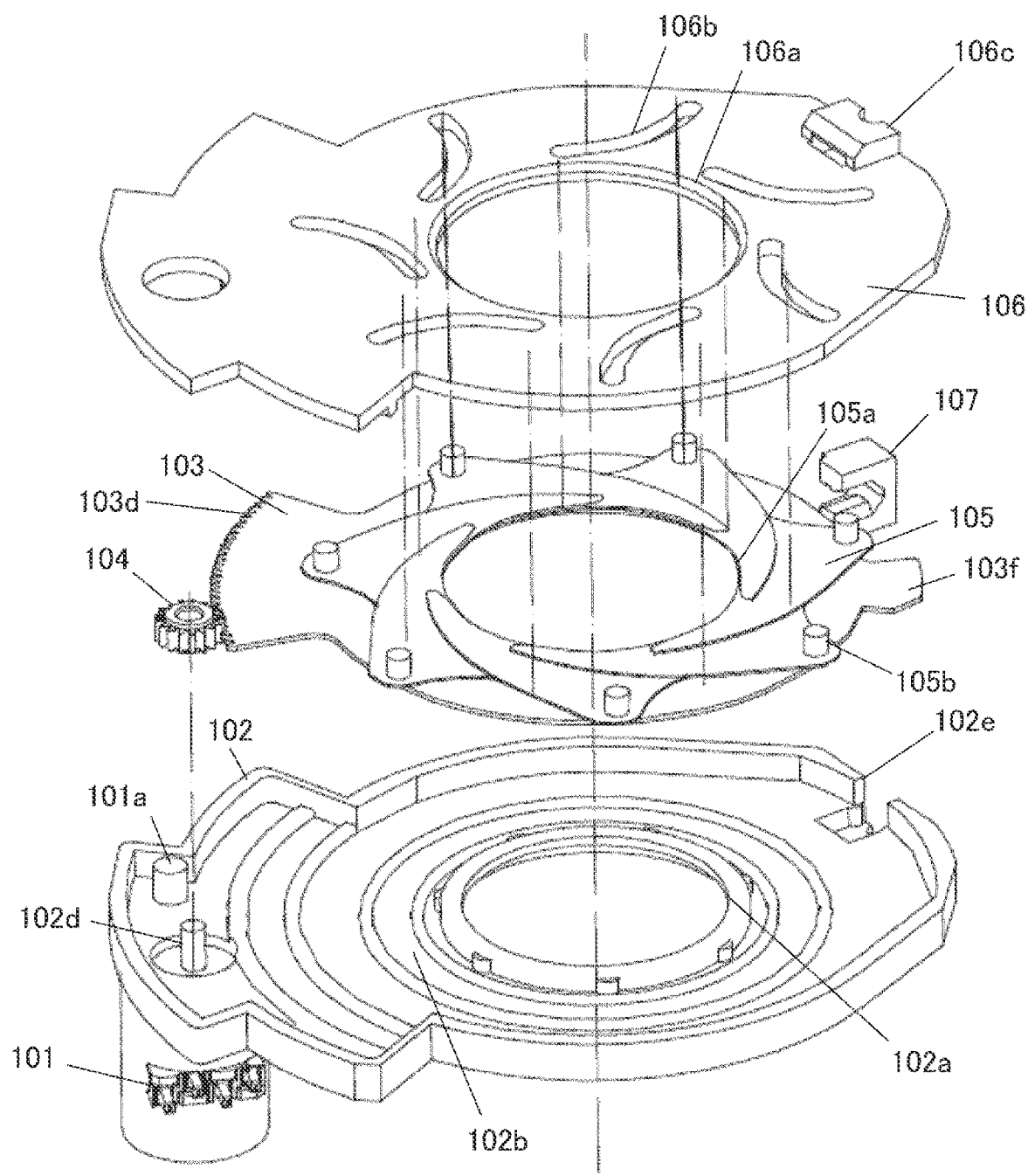
FIG. 73 is an exploded perspective view of a light amount adjusting device according to still another embodiment.
Figure 74:
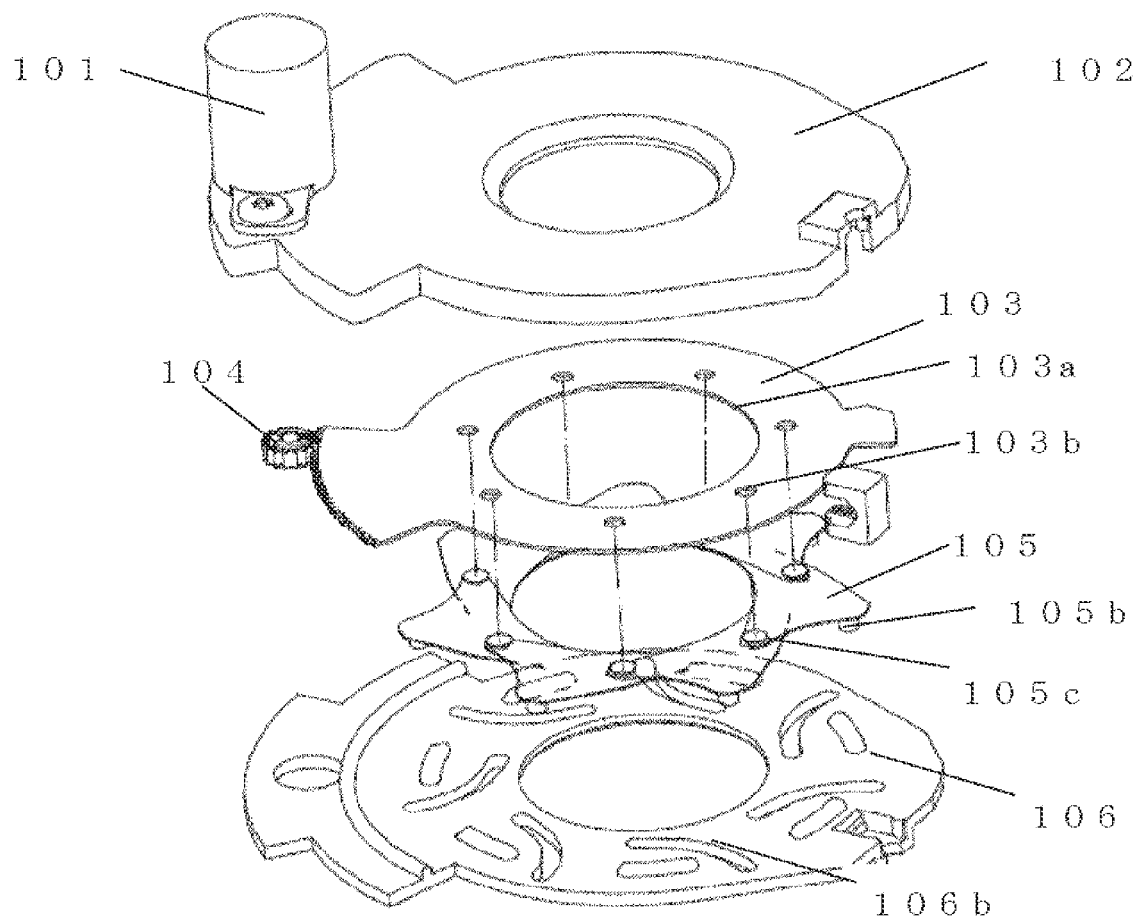
FIG. 74 is an exploded perspective view of a light amount adjusting device according to the embodiment.

FIGS. 73 and 74 are exploded perspective views of a light amount adjusting device according to this embodiment.

Reference numeral 102 denotes a base member with an opening portion 102*a* formed at the center. The base member 102 is provided with an engaging hole portion 102*d* to which a driving unit 101 is attached. Reference numeral 102*b* denotes a rail; and 102*e*, a holding shape. The driving unit 101 is an actuator such as a stepping motor or a galvanometer. The driving unit 101 is provided with a rotating shaft 101*a* which is inserted into a pinion 104 by light press-fitting. When the driving unit 101 is energized, the rotating shaft 101a and the pinion 104 integrally rotate. The base member 102 is provided with a plurality of engaging projecting portions 102c arranged on the circumference around the opening portion 102a. The engaging projecting portions 102c are fitted in engaging holes 103b of a driving ring 103. The driving ring 103 includes a gear portion 103d which meshes with the teeth of the pinion 104. The driving force of the driving unit 101 is transmitted to the gear portion 103d of the driving ring 103 via the pinion 104, and the driving ring 103 rotates about the center of the opening portion 102a. Reference numeral 103f denotes a light-shielding portion.

The driving ring 103 is provided with the engaging hole portions 103b at equal angular intervals on the circumference. The engaging hole portions 103b engage with engaging pins 105c of blades 105 to set a pivotal state.

Figure 75:
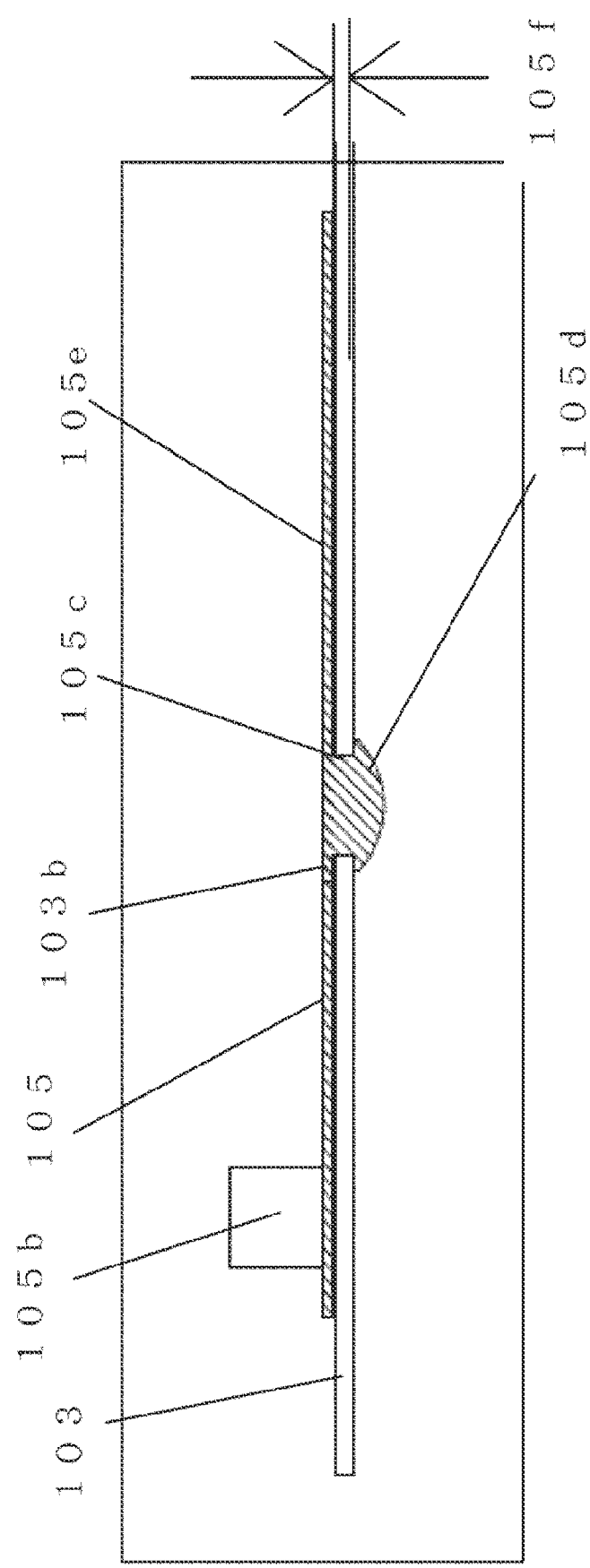
FIG. 75 is a cutaway view of an engaging portion according to the embodiment.

FIG. 75 is a cutaway view of a state in which the blades 105 engage with the driving ring 103. As the driving ring 103, a blade material of a thin plate is used. The blades 105 are formed from components made of a resin. The driving ring 103 is set in the mold of an injection molding machine, and injection molding is performed by insert-molding using the mold of the blades 105. At the time of molding, the resin passes through each engaging hole 103b of the driving ring 103, goes around to fill both surfaces of the driving ring 103, and are molded to sandwich the driving ring 103, thereby forming the engaging pin 105c and a distal end projecting shape 105d. After the distal end projecting shapes 105d are formed, the blades 105 and the driving ring 103 are integrated. Hence, the blades 105 are never disengaged from the driving ring 103. After the filling of the resin of the blades 105, the diameter of each engaging portion 105c is reduced by mold shrinkage of the resin. Hence, an appropriate fitting play is provided for the driving ring 103 and the blades 105. A clearance 105f between a flat portion 105e and the distal end projecting shape 105d of the blade 105 is extended by the mold shrinkage, and a play is formed for the driving ring 103 and the blade 105. Hence, by the appropriate play amount, the driving force transmitted from the motor 101 to the driving ring 103 and the blades 105 via the pinion 104 can be transmitted without a torque loss caused by sliding friction or the like. At this time, the driving ring 103 may be made of a resin or a metal.

Reference numeral 106 in FIGS. 73 and 74 denotes a cover member that covers the driving ring 103 and the blades 105. The cover member 106 includes an opening portion 106a at the center. The cover member 106 is provided with cam grooves 106b at equal intervals on the circumference. The engaging pins 105d of the blades 105 engage with the cam grooves 106b. The driving force generated by the driving unit 101 is transmitted to the pinion 104 and the driving ring 103, and the plurality of blades 105 pivot about an opening portion 103a of the driving ring 103. At this time, each of the blades 105 that also engage with the cam groove portions 106b of the cover member 106 pivots about the engaging pin 105c and pivots in accordance with the shape of the cam groove portions 106b.

Figure 76:
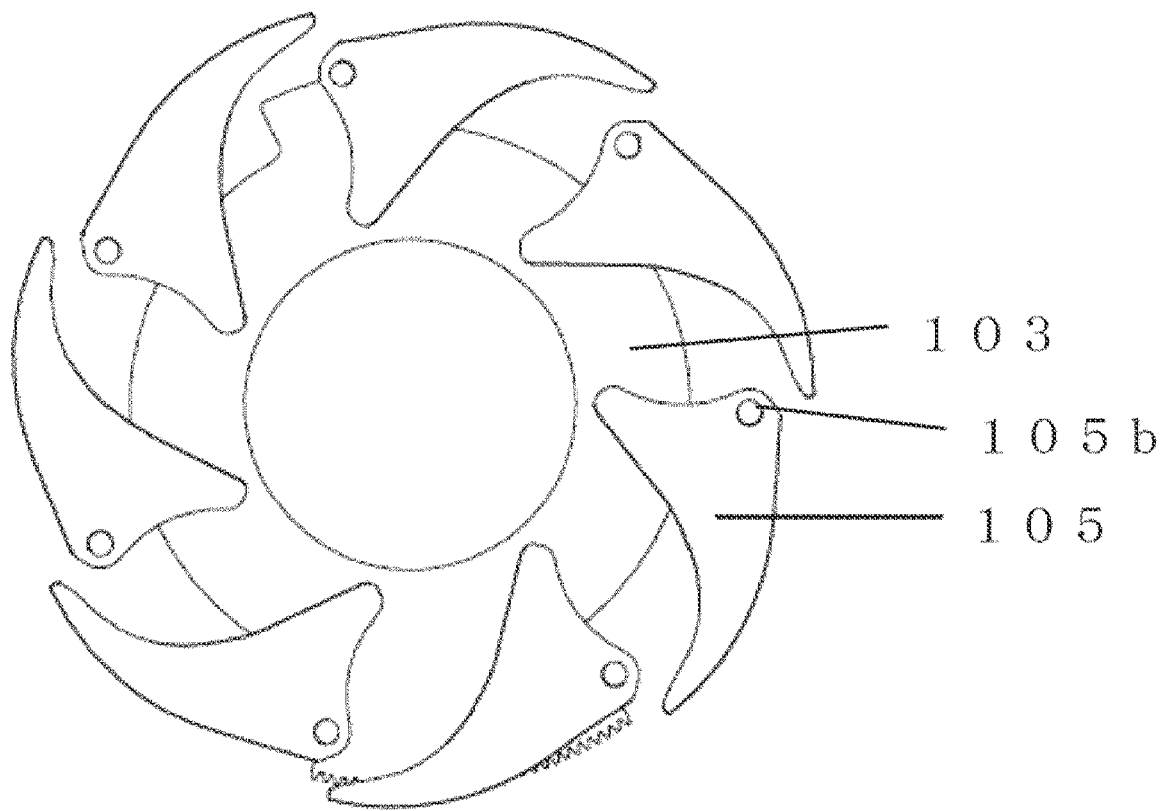
FIG. 76 is a state diagram after blade molding according to the embodiment.

FIG. 76 shows a state in which the blades 105 and the driving ring 103 are integrated after insert-molding. The above-described engaging holes 103b engage with the engaging portions 105b. The plurality of molded blades 105 are formed almost evenly in the circumferential direction.

Figure 77:
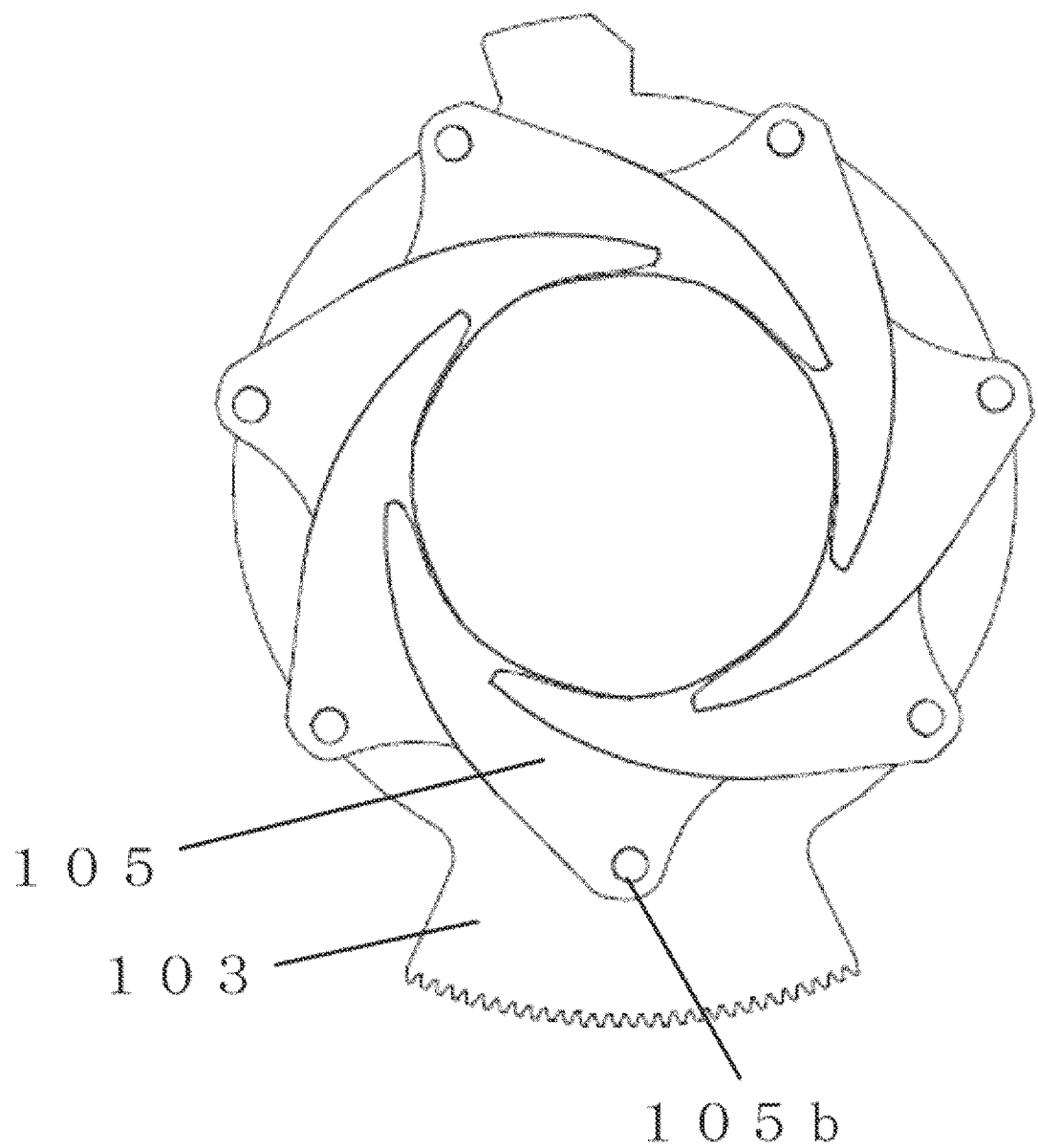
FIG. 77 is a state diagram before cover assembly according to the embodiment.
Figure 78:
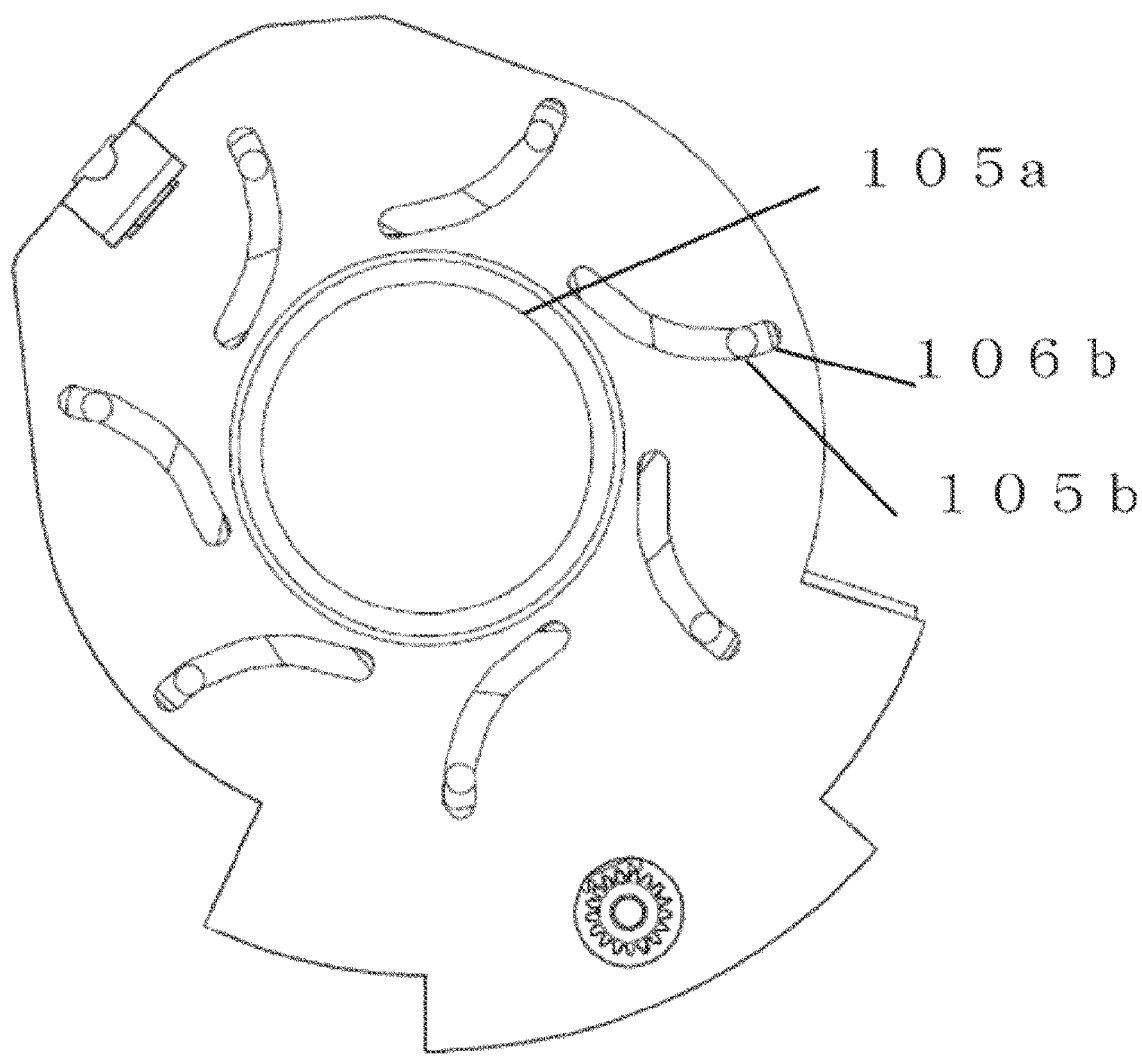
FIG. 78 is a state diagram after cover assembly according to the embodiment.

FIG. 77 shows a state in which the blades 105 are rotated to appropriate positions to assemble the cover 106. At this time, the blades adjacent to each other in the blades 105 are stacked counterclockwise on the sides of the engaging portions 105d. The blades 105 are fixed by the distal end projecting shapes 105d, and are therefore not disengaged upon stacking. FIG. 78 shows a state in which the blades 105 and the driving ring 103, which are integrated by the above-described method, are assembled with base member 102 and the cover 106.

Figure 79:
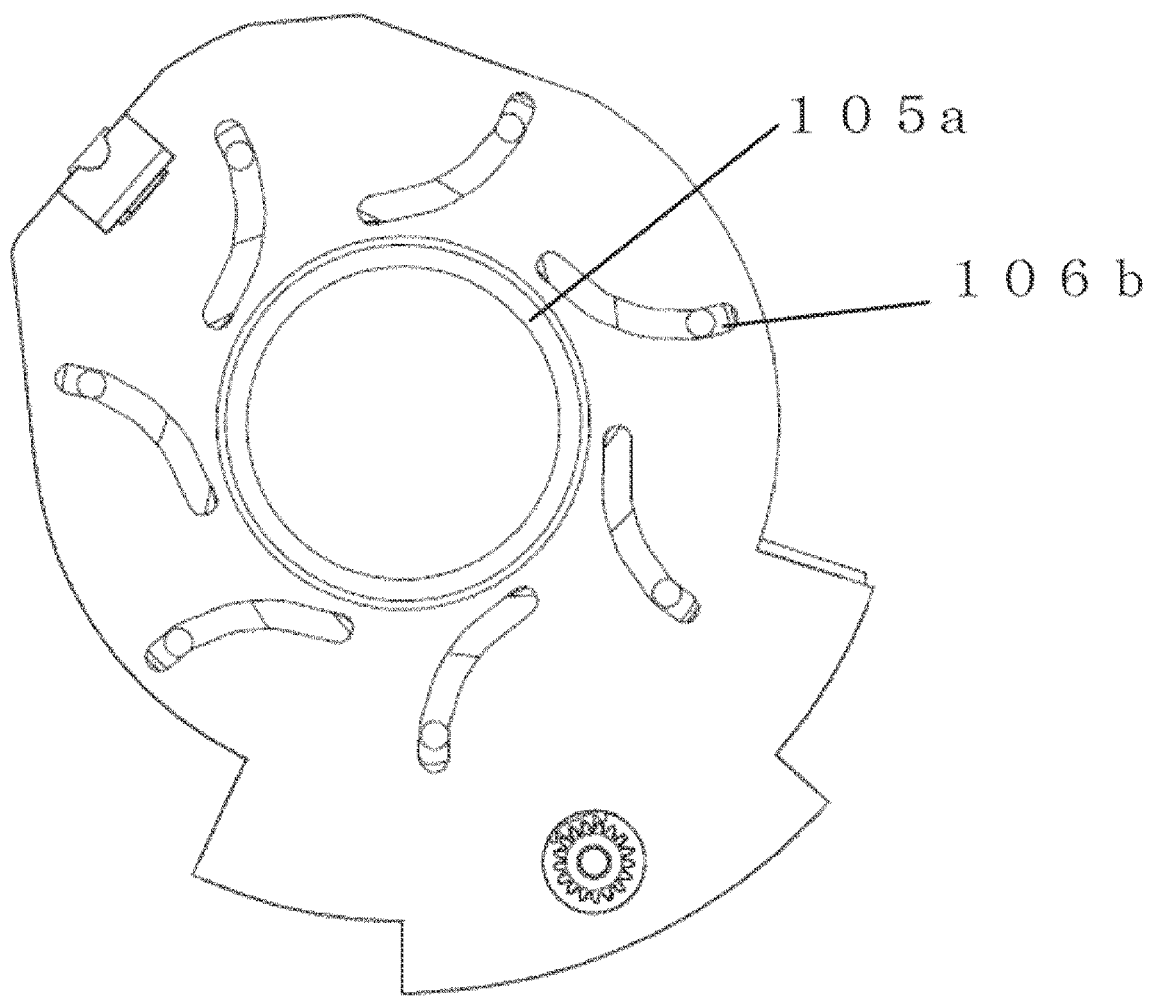
FIG. 79 is a view showing the blade open state of the light amount adjusting device according to the embodiment.
Figure 80:
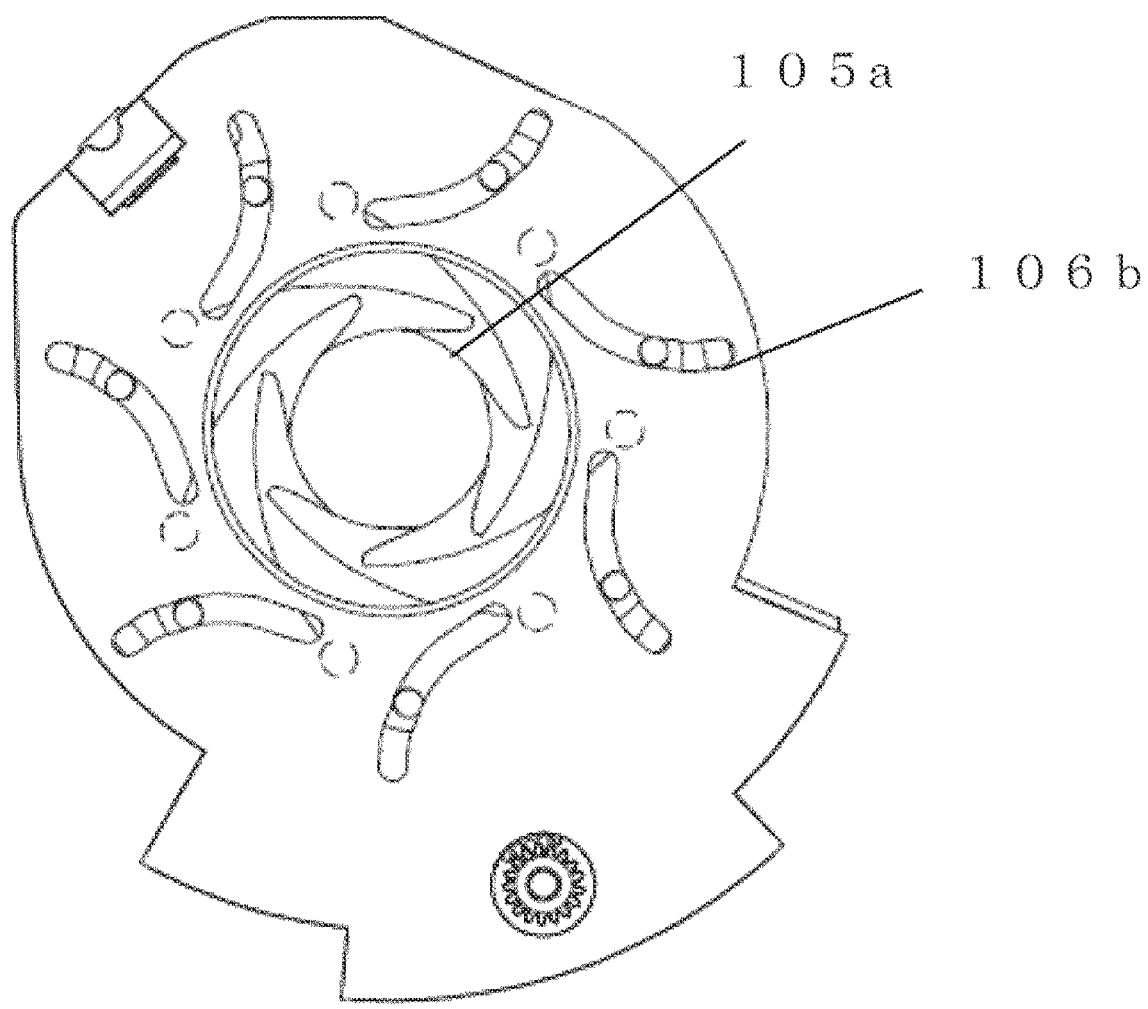
FIG. 80 is a view showing the intermediate blade open state of the light amount adjusting device according to the embodiment.
Figure 81:
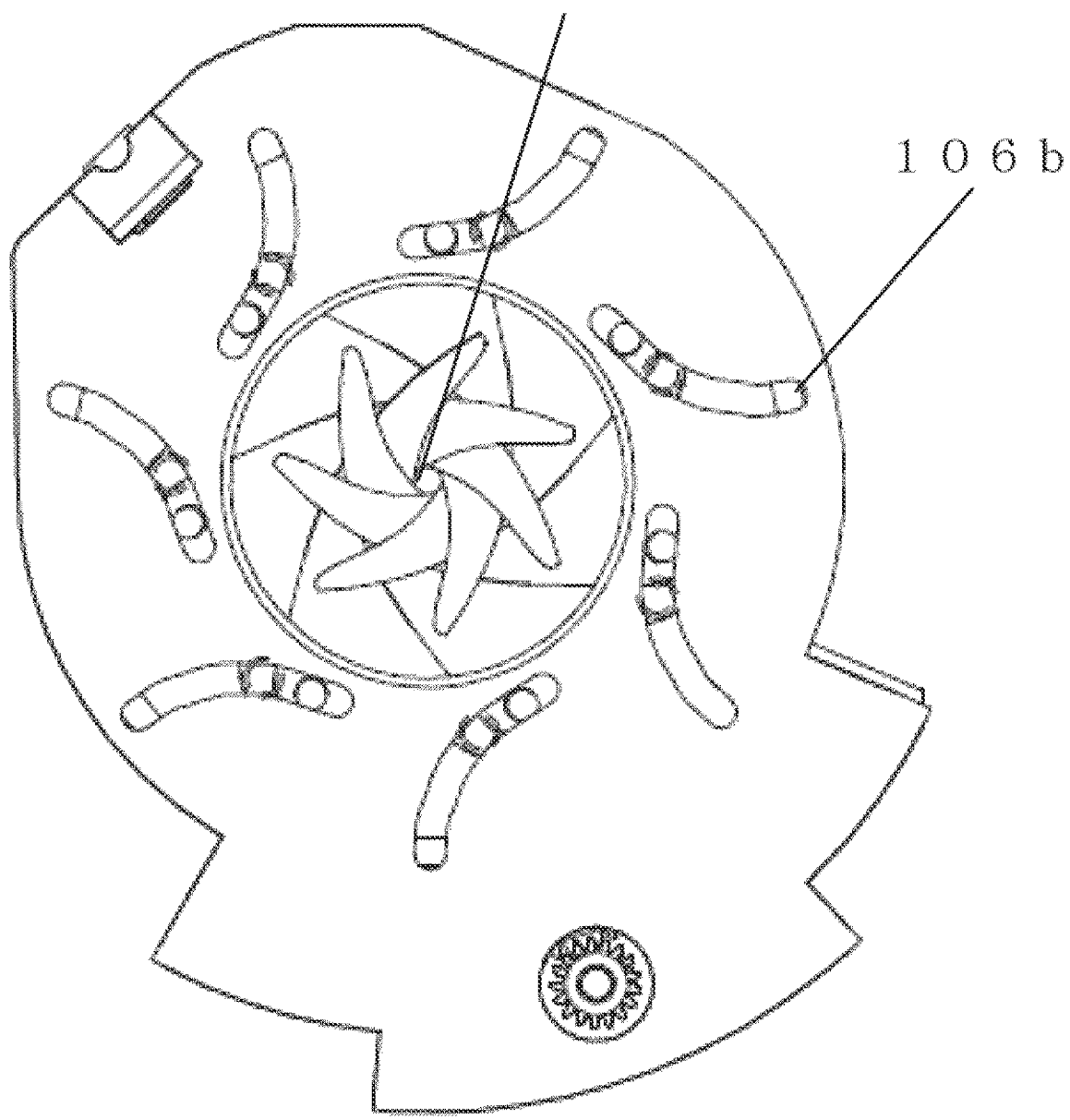
FIG. 81 is a view showing the small blade open state of the light amount adjusting device according to the embodiment.

FIGS. 79 to 81 show the opening states of the blades 105. FIG. 79 shows the open state of the blades 105. FIG. 80 shows an intermediate open state. FIG. 81 shows a small open state. Since the plurality of cam groove portions 106b are provided at almost equal intervals in the same shape, an opening shape surrounded by ridgelines 105a of the plurality of blades 105 is an almost regular polygonal shape. The cam grooves 106b are formed such that an opening area made by the ridgelines 105a of the blades 105 almost evenly changes in accordance with the rotation angle of the motor 101.

Reference numeral 107 in FIG. 73 denotes a photointerrupter. The photointerrupter 107 is held by the holding shape 102e of the base member 102 and a holding shape 106c of the cover 106. The driving ring 103 rotated via the pinion 104 by the driving of the motor 101 rotates integrally with the light-shielding portion 103f and is inserted into the light passing portion of the photointerrupter 107 to shield light. Whether the diaphragm blades 105 are completely located in the open state is detected by an electric circuit (not shown) via the photointerrupter 107.

Summary of Embodiment C

A light amount adjusting device according to this embodiment is comprising a holding substrate including a light passing path, a driving ring rotatably engaging with the holding substrate, and a blade configured to enter or exit from the light passing path and engaging with the holding substrate, wherein the blade is provided with an engaging portion configured to pivotally engage with the driving ring, a distal end of the engaging portion is provided with a distal end projecting shape that faces a flat portion of the blade and is larger than the engaging portion, the driving ring is arranged so as to be sandwiched between the flat portion of the blade and the distal end projecting shape, and the blade and the driving ring are integrated. In addition, the light amount adjusting device is wherein the driving ring is formed by a blade material.

According to the embodiment, since the distal end projecting shape is provided to sandwich the blade and the driving ring using the engaging portion provided on the blade, the blade is never removed from the driving ring. According to the present invention, it is possible to minimize the engagement amount and reduce the thickness of the device as compared to a means for increasing the engagement amount between the driving ring and the engaging portion of the blade without the distal end projecting shape. Since it is unnecessary to provide a separate member to prevent removal or separately provide an engaging component for a pivotal movement of the blade, the number of components can be decreased. Since the engaging component is integrated with the blade, the man-hour needed to engage the engaging portion of the blade with the engaging portion of the driving ring can be decreased. Since the engaging component is integrated with the blade, the play formed by the engagement between the engaging portion and the driving ring or between the engaging portion and the holding substrate can be minimized, and the light amount adjusting accuracy of the light amount adjusting device can be improved.

Embodiment D

First Embodiment

Figure 82:
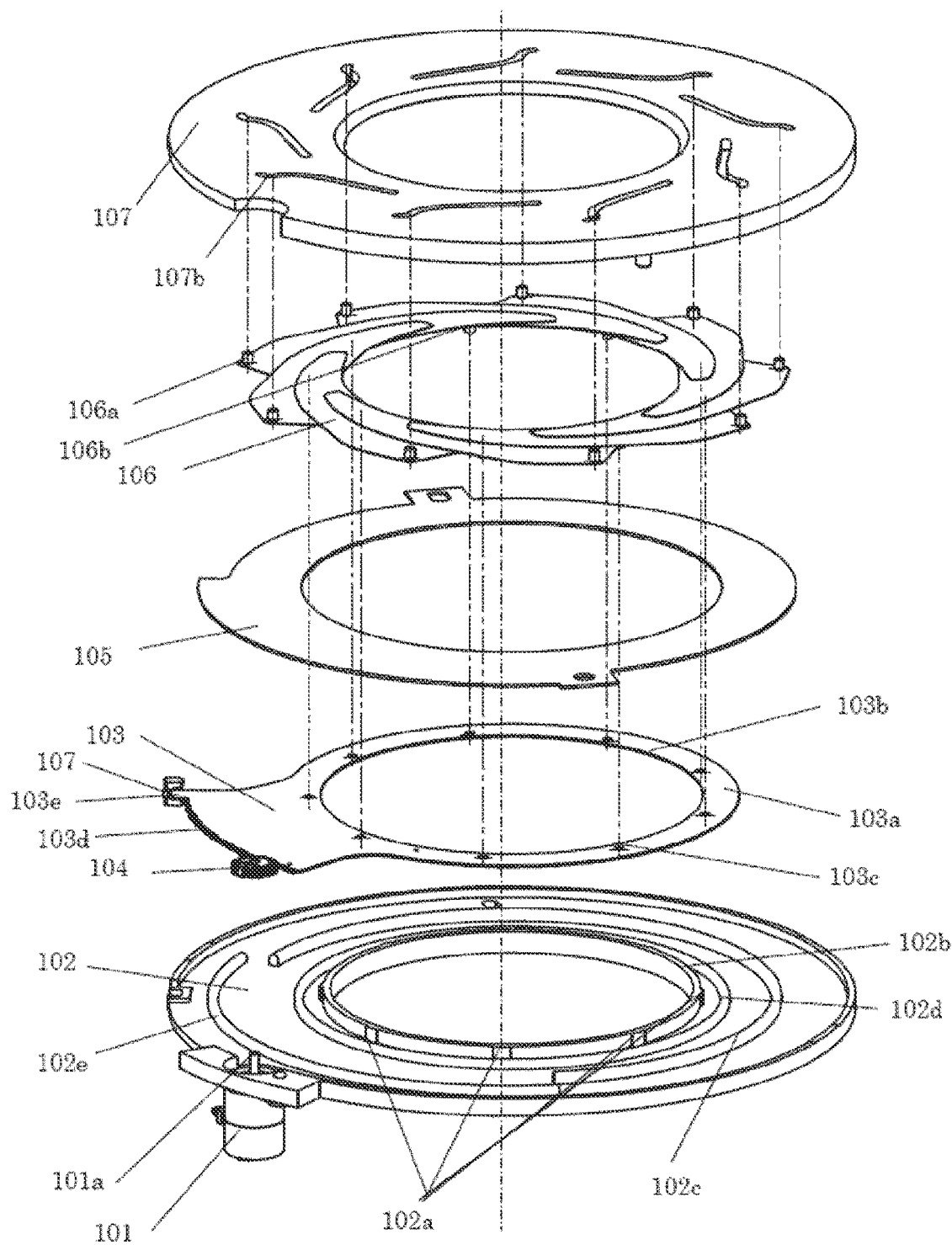
FIG. 82 is an exploded perspective view of a diaphragm device according to still another embodiment.

FIG. 82 is an exploded perspective view of a diaphragm device serving as a light amount adjusting device that is an example of a blade driving device according to the first embodiment of the present invention.

Figure 83:
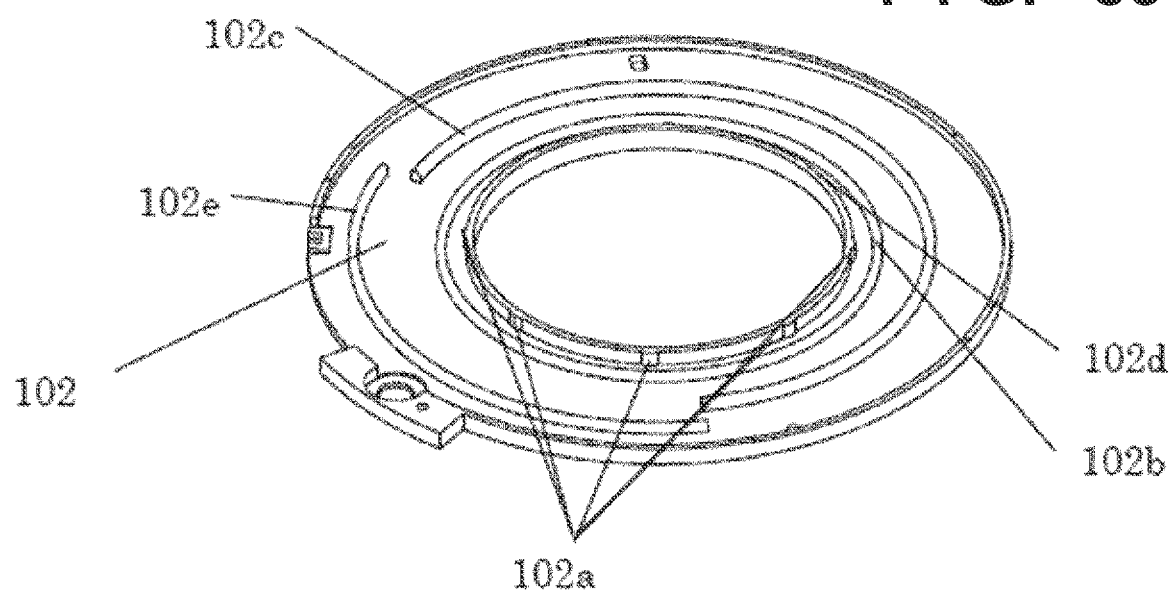
FIG. 83 is a perspective view of a holding substrate used in a blade driving device according to the embodiment.

Referring to FIG. 82, reference numeral 102 denotes a holding substrate 102 with an opening portion formed at the center. FIG. 83 is a perspective view of the holding substrate 102. The holding substrate 102 includes a rail 102c that supports a partition member 105 to be described later, and a rail 102b that supports a driving ring 103 to be described later. The holding substrate 102 is made by resin molding. A driving unit 101 is attached to the holding substrate 102. As the driving unit 101, for example, a stepping motor or a galvanometer is used. A pinion 104 is attached to a rotating shaft 101a of the driving unit 101.

Figure 84:
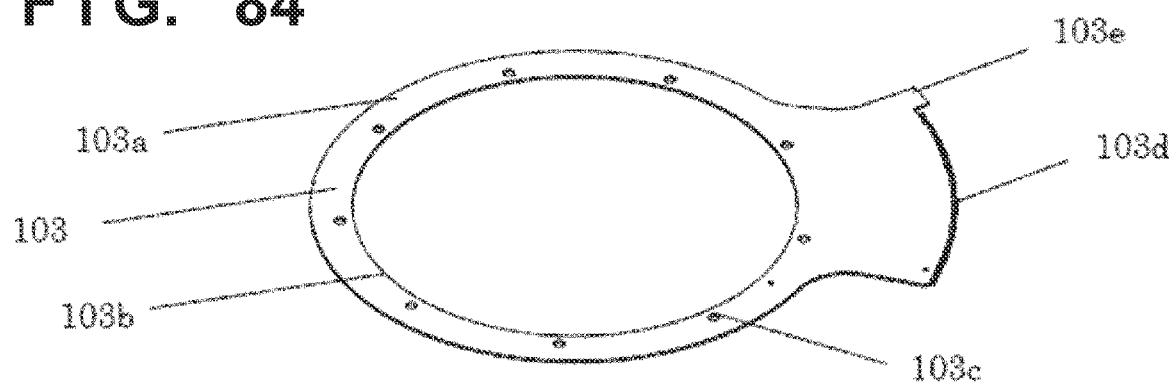
FIG. 84 is a perspective view of a driving ring used in the blade driving device according to the embodiment.

FIG. 84 is a perspective view of the driving ring 103. The driving ring 103 includes a through hole configured to form at least a part of a light passing path, is formed from an annular member (endless ring-shaped member) that surrounds the path (light passing path) to pass light, and pivots about the light passing path. Diaphragm blades 106 to be described later engage with the driving ring 103. That is, the driving ring 103 is a member (power transmission member) configured to drive the diaphragm blades 106 because it is configured such that the diaphragm blades 106 enter or exit from the light passing path coordinately along with the pivotal movement of the driving ring 103. The driving ring 103 includes a base 103a, an inner engaging portion 103b, driving holes 103c, and a driven portion 103d. When the base 103a has a substantially even thickness, the influence of air resistance upon rotation of the driving ring hardly exerts. It is therefore possible to reduce the operation load and improve high-speed responsiveness and noise reduction.

The driving ring 103 is made by resin molding. Alternatively, the driving ring 103 is made by, for example, press-working a resin film (PET sheet material or the like). If press working is possible, the accuracy of form can be made higher than the accuracy of form of resin molding. For this reason, the diaphragm accuracy can be increased. Here, when producing the driving ring 103 by press-working a sheet, an R-shaped portion is provided throughout the outer periphery at each of the inner edge portion (the inner edge portion of the through hole) on the inner side in the radial direction of the driving ring 103 and the outer edge portion on the outer side in the radial direction. Since the R-shaped portion is tapered such that the thickness substantially decreases toward the edge portion, the edge portion defines the shape of the opening portion of the driving ring 103. The driving ring 103 according to this embodiment is assembled in the diaphragm device such that the R-shaped portions face the blade side. Since this substantially reduces the sliding portion with respect to the diaphragm blades, in particular, the sliding portion on the inner periphery on the inner edge side of the driving ring 103, the mobility of the blades improves. Note that the R-shaped portion may be provided only at the inner edge portion of the driving ring 103 or only at the outer edge portion.

As for the thickness of the resin film, a material having a thickness of 0.03 mm to 0.30 mm can be used. When the base 103a is made as thin as possible, the inertia in rotation can be decreased, and the diaphragm device can perform a high-speed operation. The driving ring 103 is supported by the holding substrate 102 and an opening forming member 107 so as to be optimally movable in both the thrust direction and the radial direction. This minimizes the deformation of the driving ring 103 even if the base 103a is made thin.

For the base 103a of the driving ring 103, a material whose one surface or both surfaces have undergone a surface treatment is preferably used. Examples of the surface treatment are slip coating, antistatic treatment, and antireflection treatment. When slip coating is performed, friction with the holding substrate 102 and the partition member 105 to be described later, which are components sliding with respect to the driving ring 103, can be reduced, and an operation at lower power can be performed. When an antireflection treatment is performed, it is possible to suppress reflection of light that has entered the light amount adjusting device and prevent generation of ghosting, flare, or the like when the light amount adjusting device is assembled in a lens barrel.

The inner engaging portion 103b of the driving ring 103 engages with engaging portions 102a of the holding substrate 102. The engaging portion 102a of the holding substrate 102 may have a circular shape serving as a rotation center. In the first embodiment, the engaging portions 102a are formed by a plurality of convex portions and engage with the inner engaging portion 103b of the driving ring 103. The driving ring 103 and the holding substrate 102 are engaged in a relationship in which the driving ring 103 is arranged outside, and the holding substrate 102 is arranged inside. Since the inner engaging portion 103b of the driving ring 103 is supported by the engaging portions 102a of the holding substrate 102 in this relationship, the deformation of the driving ring 103 in the circumferential direction can be suppressed. It is therefore possible to perform an operation without deformation even if the base 103a of the driving ring 103 is thin.

Since the engagement length between the driving ring 103 and the holding substrate 102 in the radial direction can be decreased to the thickness (0.03 mm to 0.3 mm) of the base 103a of the driving ring 103, the frictional resistance can be reduced, and a smooth operation and an operation at low power can be implemented.

The driving ring 103 includes a gear portion that is the driven portion 103d. The driven portion 103d meshes with the pinion 104. When a rotating force generated by the driving unit 101 is transmitted from the pinion 104 to the driven portion 103d, the driving ring 103 rotates. In the meshing between the gear portion 103d of the driving ring 103 and the gear of the pinion 104, since the gear portion 103d is thin, and the gear meshing area is small, the meshing sound between the gears is small. Additionally, since the mass difference between the pinion 104 and the driving ring 103 is large, the meshing sound, reversing sound, and the like between the gears are small even if the pinion 104 has backlash to the gear portion 103d.

Figure 85:
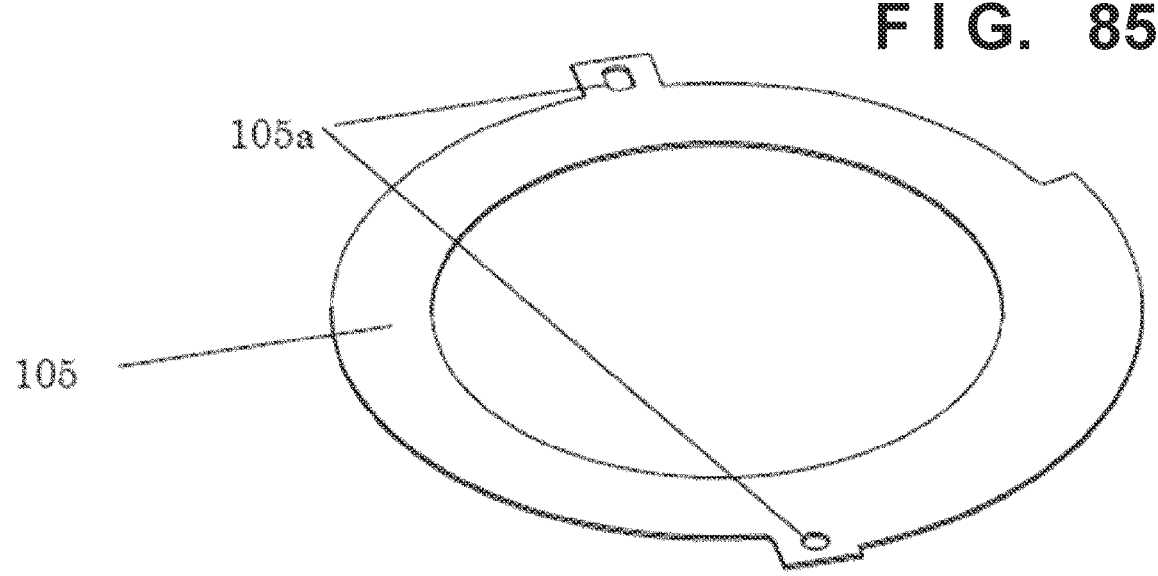
FIG. 85 is a perspective view of a partition member used in the blade driving device according to the embodiment.

FIG. 85 is a perspective view of the partition member 105. The partition member 105 includes an opening portion at the center. Engaging holes 105a of the partition member 105 engage with engaging portions 107c of the opening forming member 107 to be described later, and accordingly, the partition member 105 is supported in the radial direction. The partition member 105 is supported by being sandwiched in the thrust direction between a plurality of projecting portions 107a of the opening forming member 107 to be described later and the rail 102c serving as a plurality of support portions of the holding substrate 102. Since the partition member 105 can press cam pins 106b of the blades 106, the cam pins 106b can be prevented from dropping from cams 107b of the opening forming member 107. In addition, since the driving ring 103 is sandwiched between the partition member 105 and the rail 102b of the holding substrate 102, the driving ring 103 need only have a minimum outer shape that can be sandwiched. Hence, since the driving ring 103 can be made compact, the inertia in rotation decreases, and the structure is effective for high-speed driving. The partition member 105 is made by resin molding. Alternatively, the partition member 105 is made by, for example, press-working a resin film (PET sheet material or the like).

Reference numeral 103e denotes a light-shielding portion. The light-shielding portion 103e enters or exits from the slit of the photointerrupter 107, thereby functioning as a sensor. The light-shielding portion 103e is used to initialize the light amount adjusting device.

Figure 86:
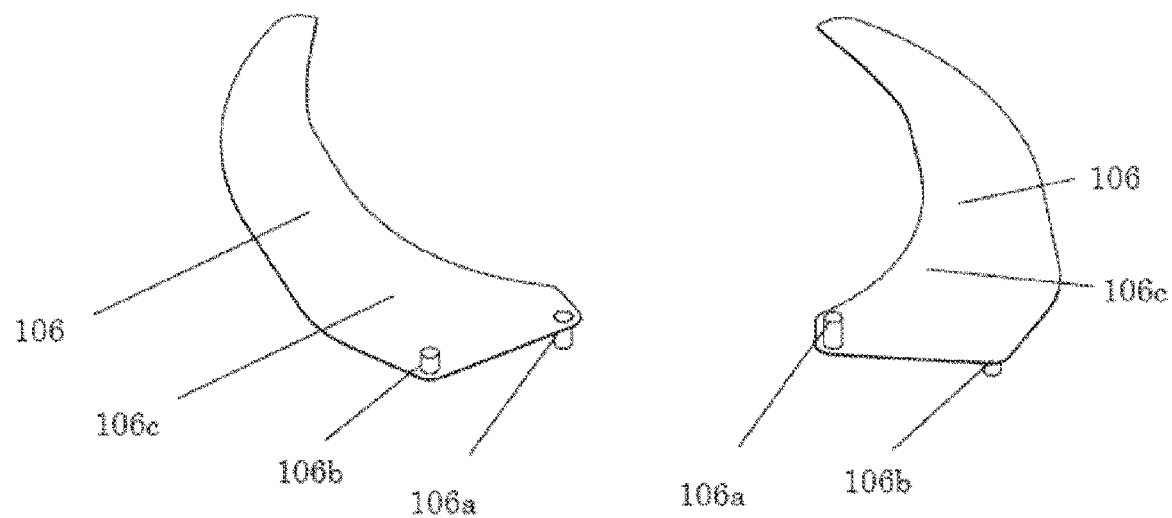
FIG. 86 is a perspective view of diaphragm blades used in the blade driving device according to the embodiment.

FIG. 86 is a perspective view of the diaphragm blades 106. A driving pin 106a and the cam pin 106b are attached to a blade portion 106c. For the diaphragm blade 106, the blade portion 106c, the driving pin 106a, and the cam pin 106b are integrally made by resin molding.

The blade portion 106c may be made using a sheet member that has undergone a light-shielding treatment, and the driving pin 106a and the cam pin 106b may be made by resin molding and integrated with the blade portion 106c by bonding, welding, or outsert-molding. Alternatively, the driving pin 106a and the cam pin 106b may be formed by metal pins and integrated with the blade portion 106c by bonding, welding, or caulking.

Figure 87:
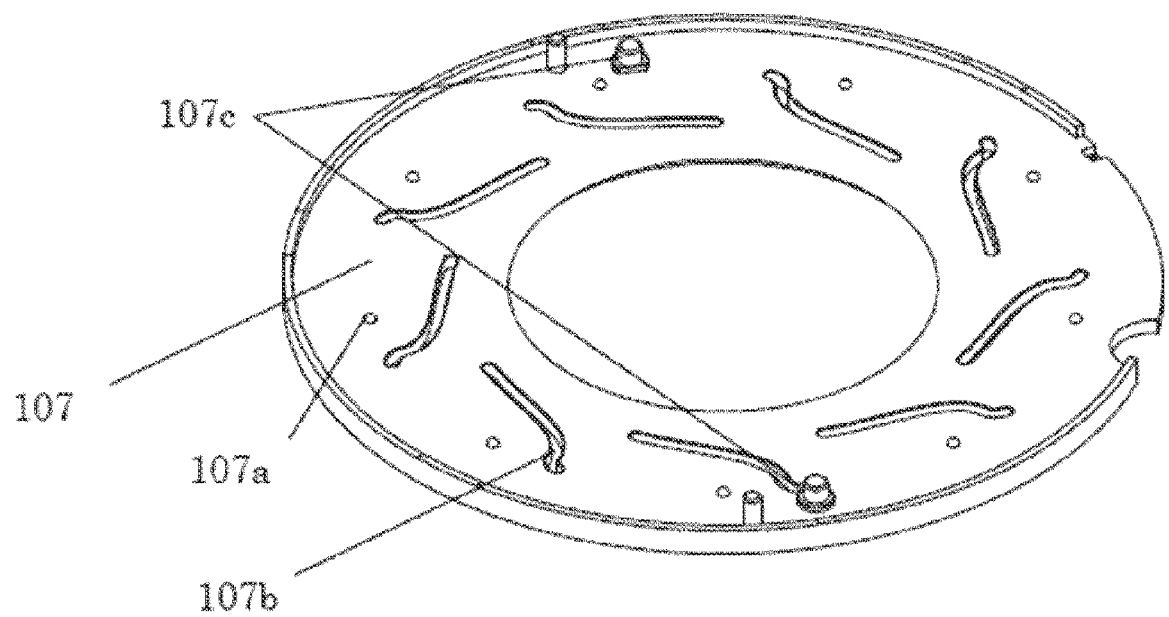
FIG. 87 is a perspective view of an opening forming member used in the blade driving device according to the embodiment.

FIG. 87 shows the opening forming member 107. The opening forming member 107 includes projecting portions serving as a plurality of support portions that support the partition member 105, and the plurality of cams (cam grooves) 107b. The driving ring 103 is driven in a space formed by the holding substrate 102 and the partition member 105, and the diaphragm blades 106 are driven in a space formed by the partition member 105 and the opening forming member 107.

The driving pin 106a serving as the rotation center of the diaphragm blade 106 engages with the driving hole 103c of the driving ring 103. The pinion 104 rotates, a force is applied to the driven portion 103d of the driving ring 103, and the driving ring 103 rotates. When the driving ring 103 rotates, a driving force is applied from the engaging holes 103c of the driving ring 103 to the driving pins 106a of the diaphragm blades 106, and the diaphragm blades 106 are driven. The cam pins 106b of the diaphragm blades 106 engage with the cams 107b formed in the opening forming member 107. By the cams 107b, the diaphragm blades 106 enter or exit from the opening of the holding substrate 102. The diaphragm shape can be adjusted by the plurality of diaphragm blades 106.

The base 103a of the driving ring 103 substantially has an even thickness, and extra unevenness or holes do not exist. It is therefore possible to prevent an operation error from occurring due to, for example, the diaphragm blades 106 caught on the driving ring 103 during an opening/closing operation.

Figure 88:
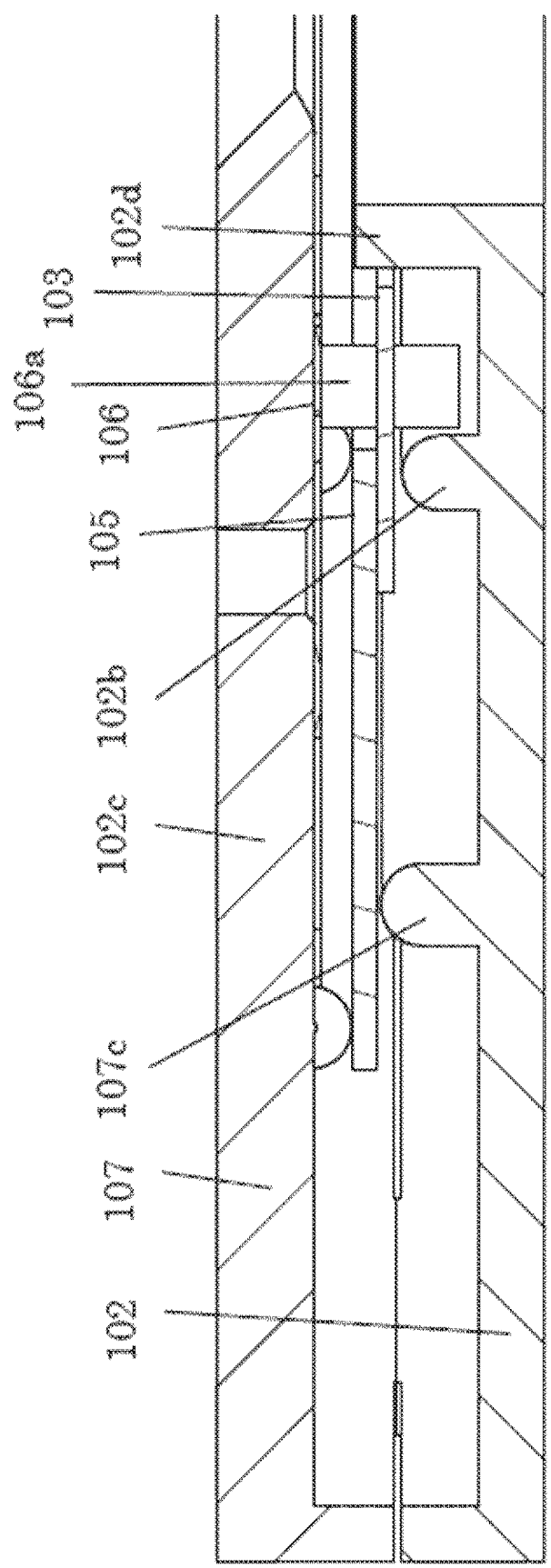
FIG. 88 is a sectional view of the blade driving device according to the embodiment.

FIG. 88 is a sectional view of the light amount adjusting device according to the first embodiment. FIG. 89 is an exploded view seen from the side of the opening forming member 107. The driving ring 103 is rotatably supported by the rail 102b formed on the holding substrate 102. Since the driving ring 103 is supported by the rail 102b of the holding substrate, the surfaces of the driving ring 103 and the holding substrate 102 do not come into tight contact. It is therefore possible to prevent sticking of the driving ring by static electricity or the like.

In the driving ring 103, loads are applied to the portions of the engaging holes 103c engaging with the diaphragm blades 106. Particularly, in a small open state, the diaphragm blades are knitted, and therefore, large loads are applied to the engaging holes 103c serving as the support portions of the diaphragm blades 106. For this reason, the driving ring 103 is deformed in the direction of the holding substrate 102. A rail 102d formed on the holding substrate 102 supports the vicinities of the engaging holes 103c of the driving ring 103. The rail 102d supports the inner side of the engaging holes 103c in the radial direction. The rail 102b supports the outer side of the engaging holes 103c in the radial direction. That is, the holding substrate 102 is provided with the rails 102b and 102d abutting against the peripheries of the driving holes (engaging portions) 103c of the driving ring 103 with which the diaphragm blades 106 engage. Even if the base 103a is thin, and the driving holes 103c receive a force, these rails can prevent the driving ring 103 from being deformed. If the base 103a has a sufficient strength, the driving ring 103 may be supported by only one of the rails 102b and 102d. In the first embodiment, each of the rails 102b and 102d continues circumferentially. However, the same effect can be obtained even when the driving ring 103 is supported by a plurality of convex portions each having a semispherical shape.

A rail 102e formed on the holding substrate 102 will be described next. The rail 102e is a rail that supports the periphery of the driven portion 103d of the driving ring 103. A force is transmitted between the pinion 104 and the driven portion 103d of the driving ring 103 by meshing of the gears. When the rail 102e supports the driven portion 103d, the driving ring 103 can be prevented from being deformed even if the base 103a is thin, and the driven portion 103d receives a force. The rail 102e is an arcuate rail. However, the same effect can be obtained even when the driving ring 103 is supported by a plurality of convex portions each having a semispherical shape.

If the base 103a of the driving ring 103 has a sufficient strength, the rails 102b, 102c, 102d, and 102e may appropriately be decreased. If the strength of the driving ring 103 is extremely low, rails may be added.

Concerning the driving ring 103, support of the diaphragm blades 106 will be described next. As shown in FIG. 89, the plurality of diaphragm blades 106 are arranged evenly in the circumferential direction. In this embodiment, as shown in FIG. 90, when the driving ring 103 pivots, the plurality of diaphragm blades 106 can coordinately move to change the size of the light passing opening.

Concerning the driving ring 103, a support method in the thrust direction on the diaphragm blade side will be described. Rails 107b1 formed on the opening forming member 107 support the partition member. The driving ring 103 is supported on the holding substrate side of the partition member. Since the driving ring 103 is supported by the partition member 105 in the thrust direction within the movable range of the diaphragm blades 106, the outer shape of the driving ring 103 can be made smaller than the movable range of the diaphragm blades 106. Since the outer shape of the driving ring 103 can be made smaller than the movable range of the diaphragm blades 106, the structure is advantageous in high-speed driving. Each of the plurality of rails 107b1 shown in the drawing has a circumferential shape. However, the driving ring 103 may be supported by a plurality of convex portions each having a semispherical shape.

Concerning the driving ring 103, a support method in the thrust direction on the holding substrate side will be described. The driving ring 103 is supported in the thrust direction by the rail 102b formed on the holding substrate 102.

As described above, the driving ring 103 is appropriately supported within the blade movable range by the holding substrate 102, the opening forming member 107, the partition member 105, and the diaphragm blades 106. Even if the driving ring is formed by the thin base 103a, it can perform a high-speed operation or a low-noise operation without being deformed.

Second Embodiment

Figure 91:
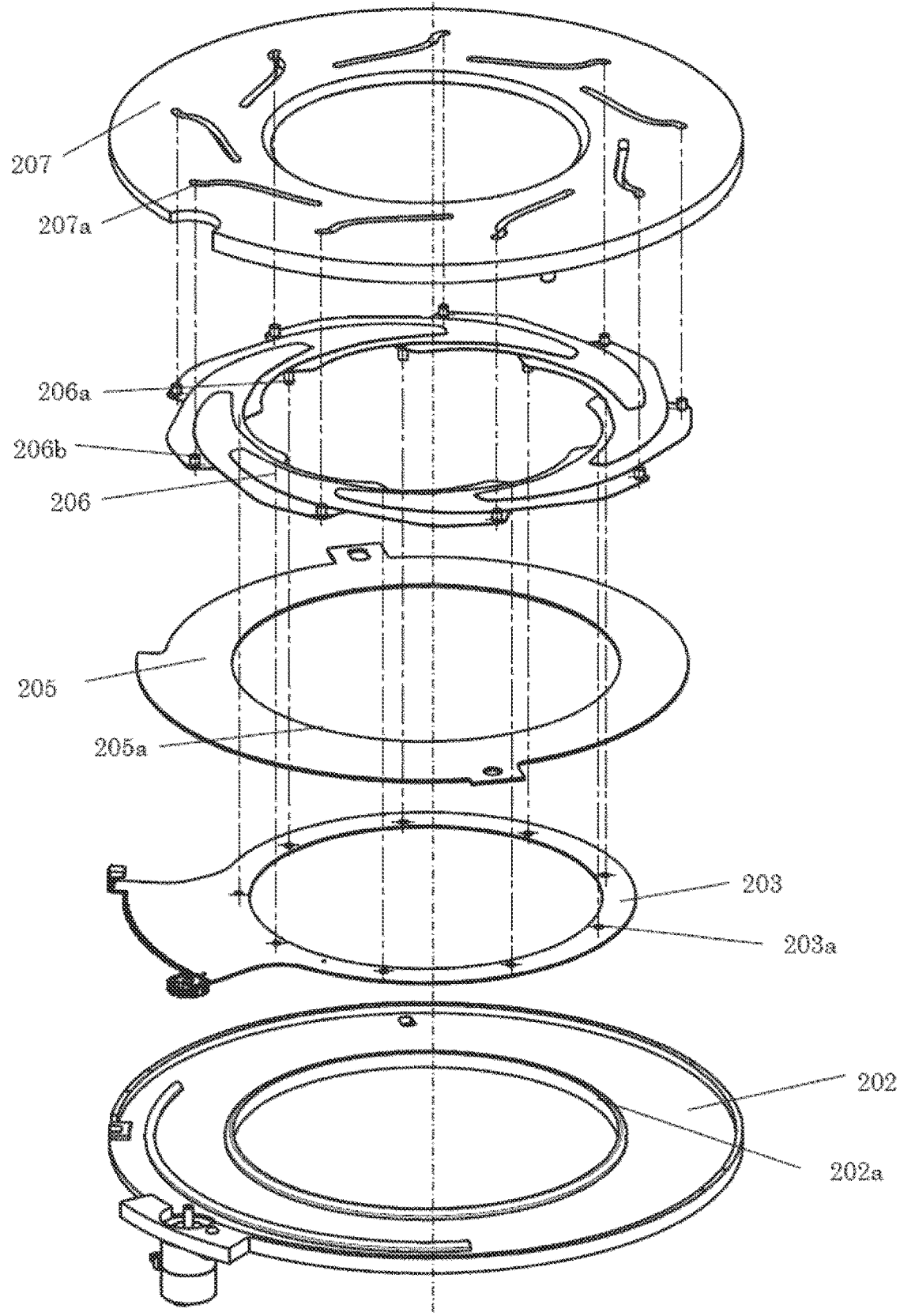
FIG. 91 is an exploded perspective view of a blade driving device according to still another embodiment.
Figure 92:
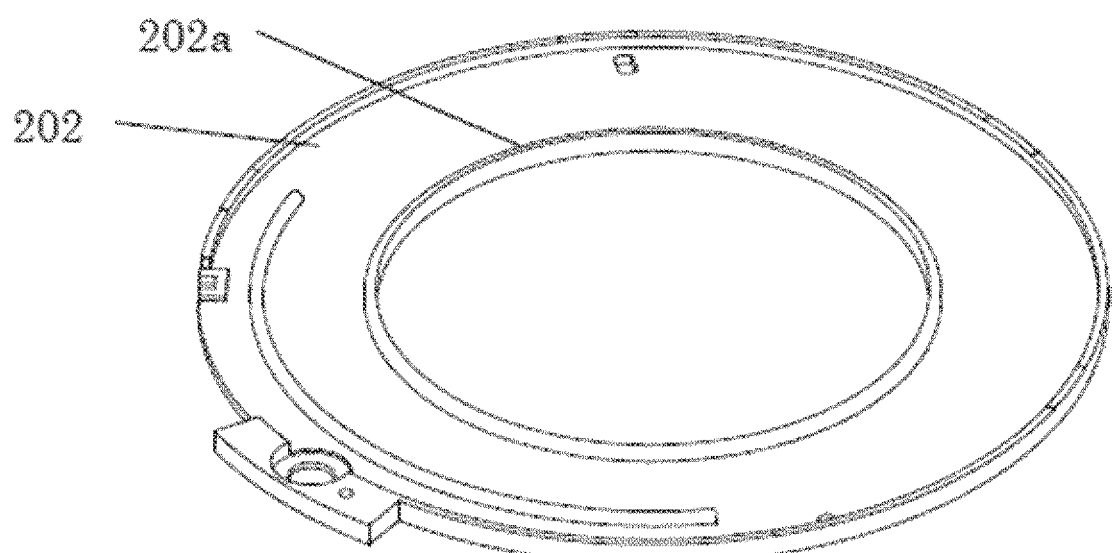
FIG. 92 is a perspective view of a holding substrate used in the blade driving device according to the embodiment.

FIG. 91 is an exploded perspective view of a diaphragm device serving as a light amount adjusting device according to the second embodiment of the present invention. FIG. 92 is a perspective view of a holding substrate. Reference numerals in the drawings are 100s in the first embodiment and 200s in this embodiment.

In the diaphragm device according to this embodiment, a plurality of cam grooves 207a corresponding to diaphragm blades 206 are provided on an opening forming member 207. Each diaphragm blade 206 is provided with an engaging pin 206b engaging with the cam groove 207a and a driving pin 206a engaging with an engaging portion 203a provided on a driving ring 203. The driving pin 206a extends through the driving ring 203. In a state in which the driving ring 203 is sandwiched between the opening forming member 207 and the diaphragm blades 206, the driving pins 206a are in slidable contact with an inner diameter portion 202a of a holding substrate 202, thereby defining the positions of the driving ring 203 and the diaphragm blades 206 in the radial direction. When the driving ring 203 receives a driving force by a driving unit fixed to the holding substrate 202 and rotates about the opening portion, the diaphragm blades 206 enter or exit from the opening portion to adjust the diaphragm aperture. Note that in FIG. 91, the driving pins 206a of the pivoting diaphragm blades 206 are radially fitted in the inscribed circle 202a of the holding substrate 202. However, the position of the driving ring 203 can also be defined between the driving pins 206a of the pivoting diaphragm blades 206 and an inner diameter portion 205a of a partition member 205. The driving pins 206a of the diaphragm blades 206 need to be long to prevent the driving ring 203 from being disengaged. When the driving pins 206a of the diaphragm blades 206 are in slidable contact with the inner diameter portion 202a of the holding substrate 202, the driving ring 203 is hardly disengaged from the driving pins 206a of the diaphragm blades 206. This enables stable driving. In addition, since the length of the driving pins 206a can be minimized, the structure is effective in making the unit thin. Note that the driving ring 203 is made by resin molding. Alternatively, the driving ring 203 is made by, for example, press-working a resin film (PET sheet material or the like).

Figure 93:
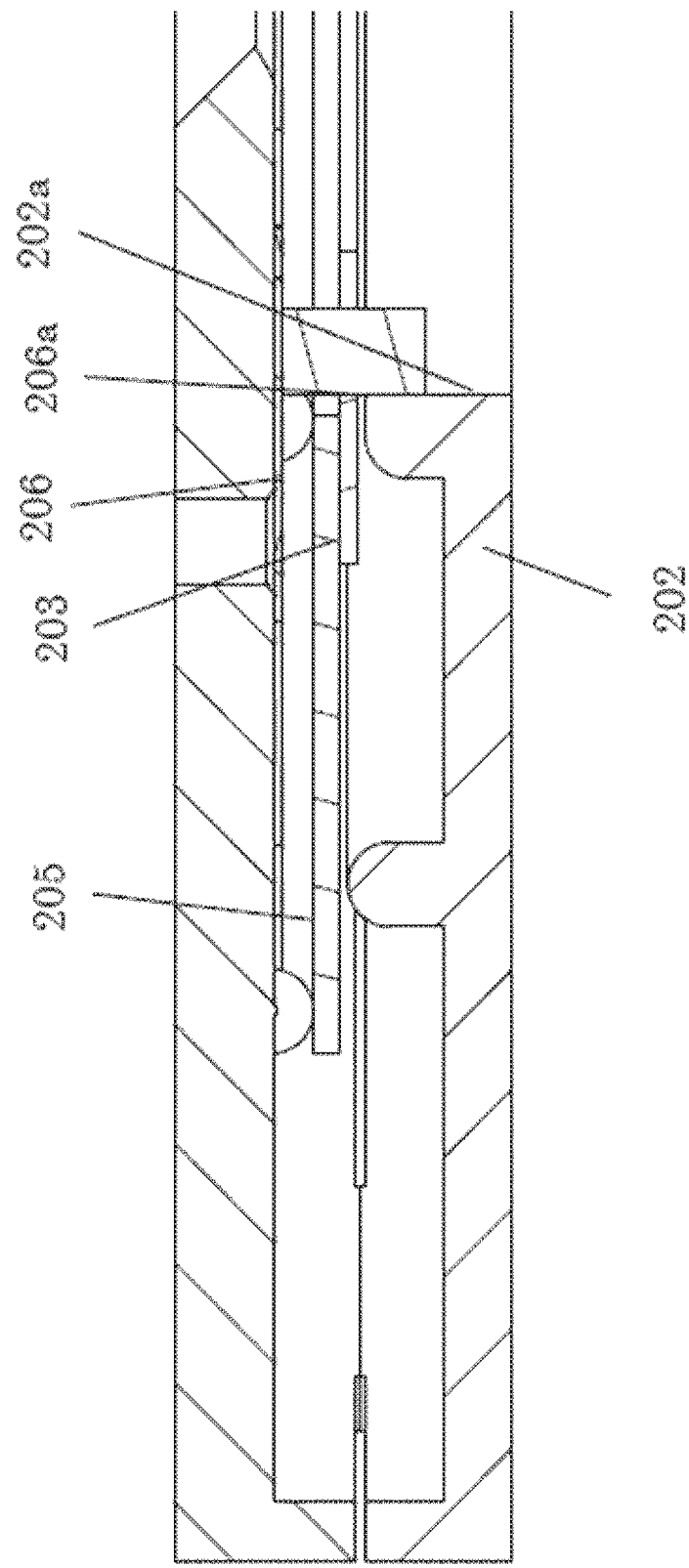
FIG. 93 is an exploded view of the blade driving device according to the embodiment.

FIG. 93 is a sectional view of the light amount adjusting device according to the second embodiment. Since the contact area between the driving ring 203 and the holding substrate 202 can be reduced, sticking of the driving ring 203 by static electricity or the like can be prevented.

In the light amount adjusting device according to the second embodiment, the driving pins 206a of the diaphragm blades 206 are fitted in the inner diameter portion 202a of the holding substrate 202. Accordingly, the blade traveling space formed by the partition member 205 and the opening forming member 207 need not be made large, and a characteristic change caused by the posture difference can be suppressed.

Third Embodiment

Figure 94:
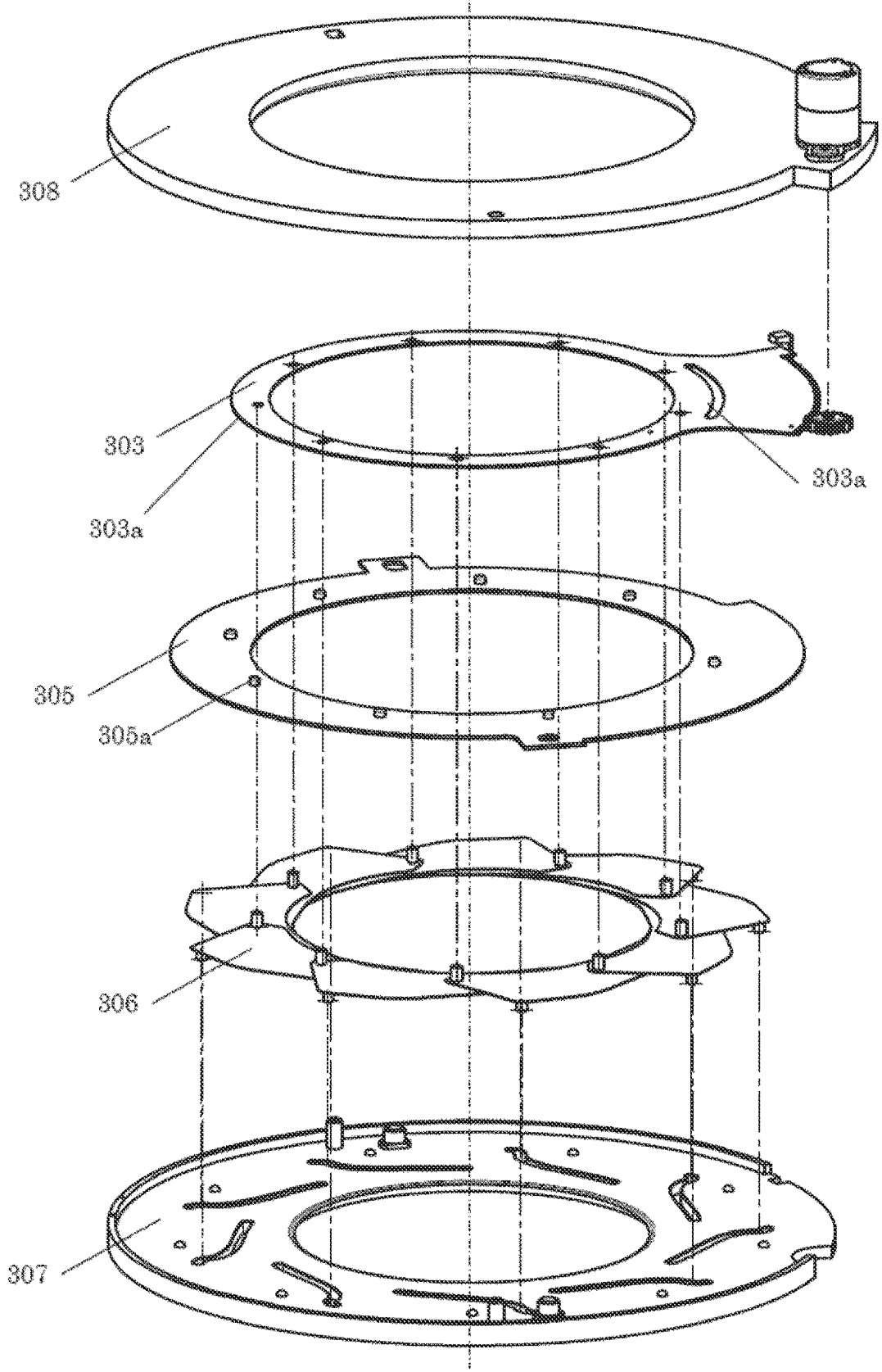
FIG. 94 is an exploded perspective view of a blade driving device according to still another embodiment.

FIG. 94 is an exploded perspective view of a diaphragm device serving as a light amount adjusting device according to the third embodiment of the present invention.

In the above-described first embodiment, a structure has been described in which the inner engaging hole 103b of the driving ring 103 engages with a circumscribed circle formed by the plurality of engaging portions 102a of the holding substrate 102, thereby radially regulating the driving ring 103. In this embodiment, an outer engaging portion 303b of a driving ring 303 engages with an inscribed circle formed by a plurality of engaging pins 305a of a partition member 305, thereby radially regulating the driving ring 303. The remaining components are basically the same as in the first embodiment. Reference numerals in the drawings are 100s in the first embodiment and 300s in this embodiment.

Figure 95:
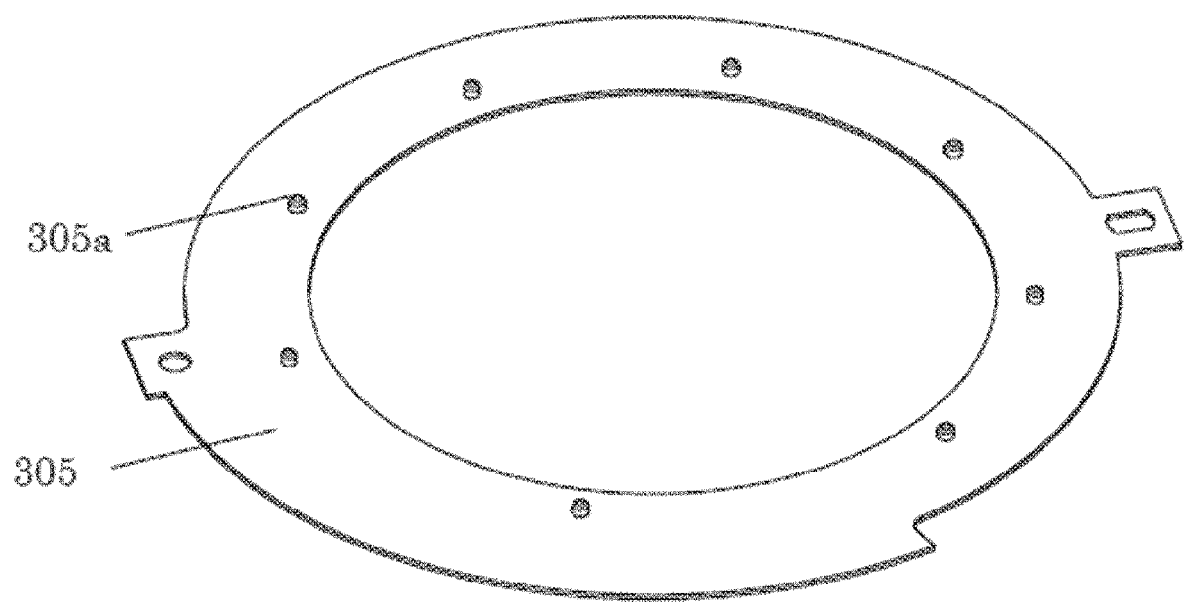
FIG. 95 is a perspective view of a partition member used in the blade driving device according to the embodiment.
Figure 96:
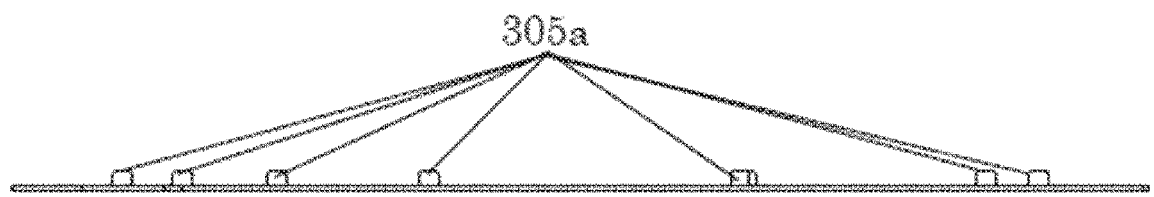
FIG. 96 is a side view of the partition member used in the blade driving device according to the embodiment.

FIGS. 95 and 96 show the partition member 305. The plurality of engaging pins 305a provided on the partition member 305 engage with outer engaging portions 303a of the driving ring 303, thereby making the driving ring 303 slide in a pivotal state. In this embodiment, the outer engaging portions 303a of the driving ring 303 engage with an inscribed circle (305a) formed by the eight engaging pins of the partition member 305. The number of engaging pins 305a can be arbitrary as long as a plurality of engaging pins are included.

The driving ring 303 is made by resin molding. Alternatively, the driving ring 303 is made by, for example, press-working a resin film (PET sheet material or the like).

Figure 97:
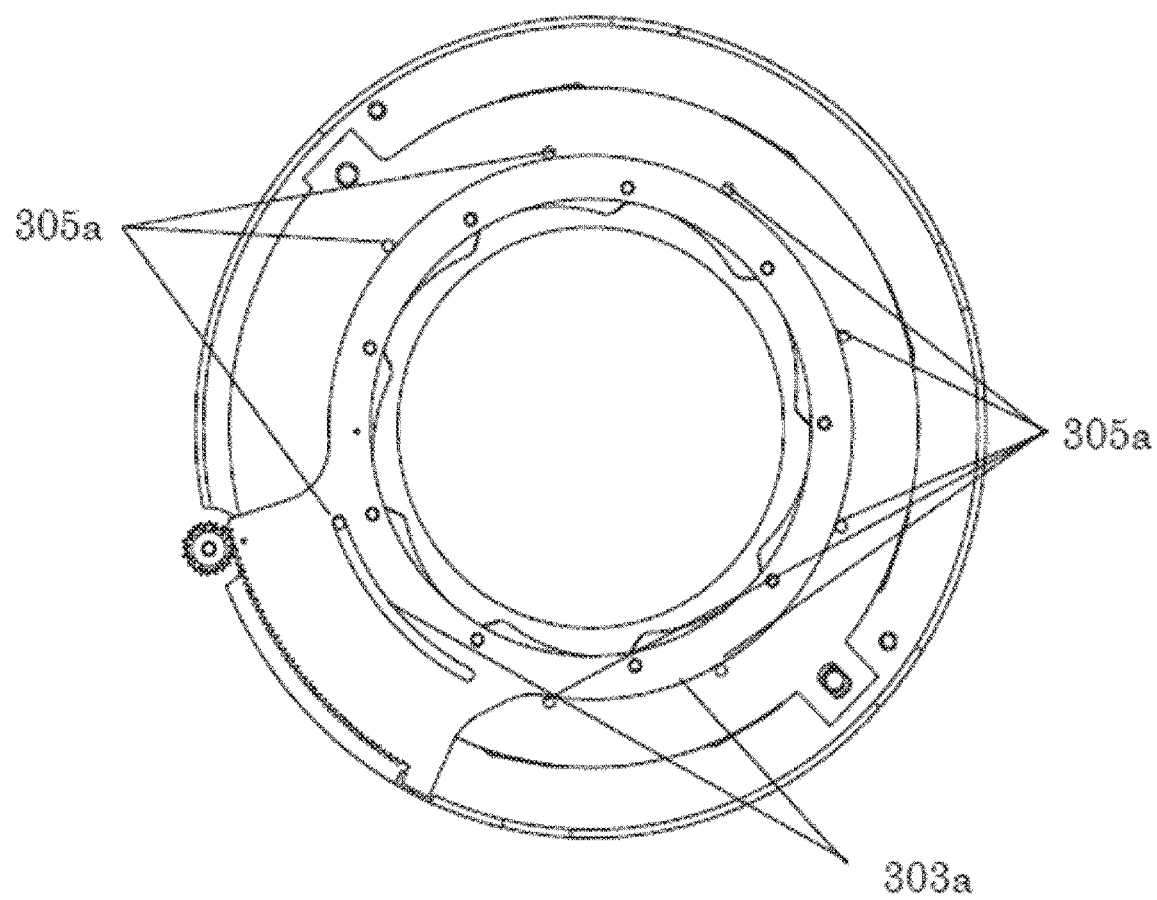
FIG. 97 is an exploded view of the blade driving device according to the embodiment.

Radial engagement of the driving ring 303, which is a characteristic feature of the third embodiment, will be explained here. FIG. 97 is a front view of a state in which a holding substrate 302 is detached, which is seen from the holding substrate side. In the driving ring 303, the outer engaging portions 303a are in slidable contact with the inscribed circle formed by the plurality of engaging pins 305a of the partition member 305. Note that the same effect as described above can be obtained even if the inner engaging portion of the driving ring 303 is in slidable contact with a circumscribed circle formed by the plurality of pins 305a of the partition member 305 in a rotatable state. When radial regulation of the driving ring 303 is implemented by the outer shape or inner diameter in the above-described way, the driving ring 303 can be simplified.

Fourth Embodiment

Figure 98:
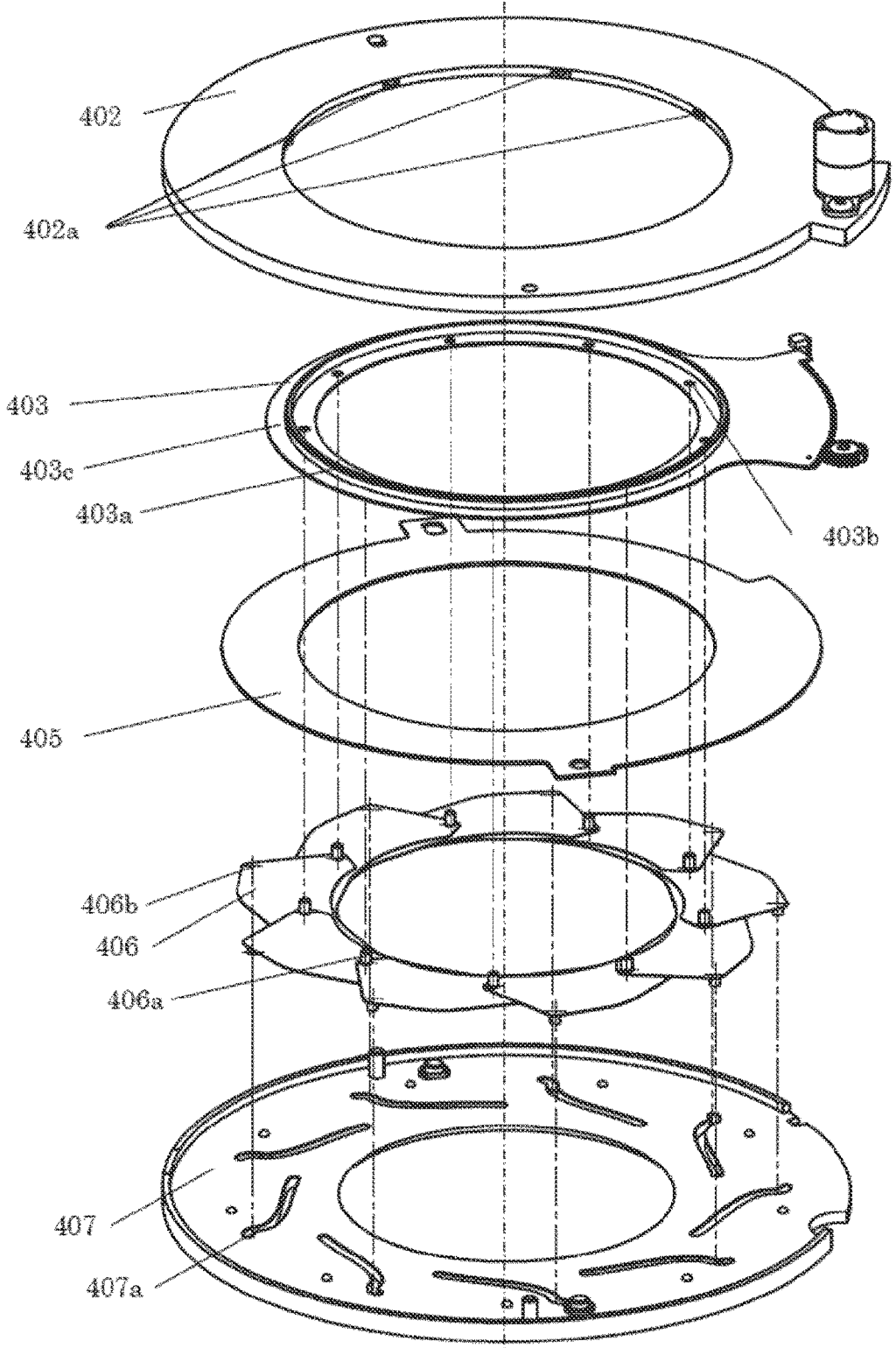
FIG. 98 is an exploded perspective view of a blade driving device according to still another embodiment.

FIG. 98 is an exploded perspective view of a diaphragm device serving as a light amount adjusting device according to the fourth embodiment of the present invention. Reference numerals in the drawings are 100s in the first embodiment and 400s in this embodiment.

As shown in FIG. 98, the diaphragm device according to this embodiment has a structure in which a plurality of cam grooves 407a corresponding to diaphragm blades 406 are provided on an opening forming member 407, each blade 406 is provided with a driving pin 406a engaging with the cam groove 407a and a driving pin 406b engaging with an engaging hole 403b provided in a driving ring 403, and an outer wall 403a of the driving ring is radially fitted on projections 402a of a holding substrate 402. Note that the member fitted in the outer wall 403a of the driving ring 403 may be an opening forming member 402.

Figure 99:
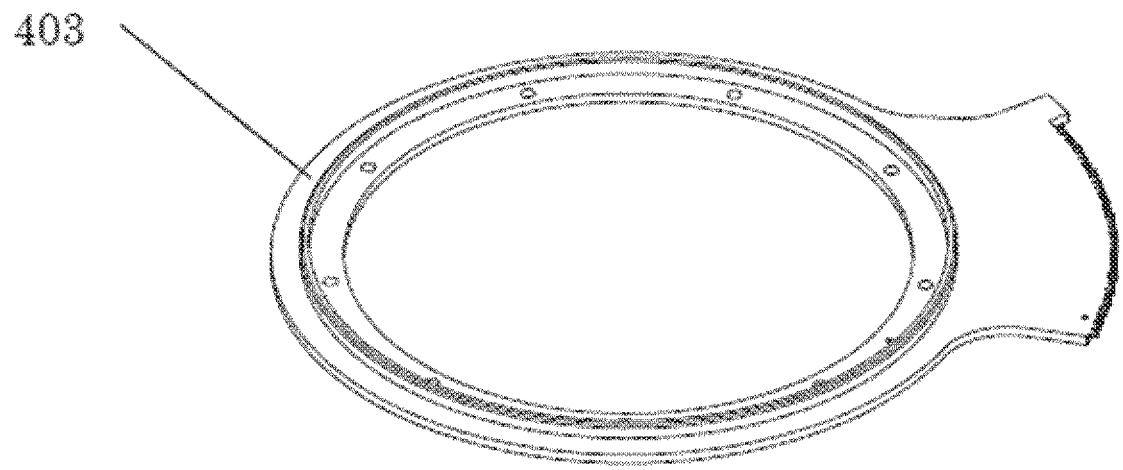
FIG. 99 is a perspective view of a driving ring used in the blade driving device according to the embodiment.

A base 403c of the driving ring 403 is made by, for example, press-working a resin film (PET sheet material or the like). When performing press-working, the outer wall 403a of the driving ring is formed on the base 403c by outsert-molding. Additionally, as shown in FIG. 99, the driving ring 403 can also be made by resin molding.

Figure 100:
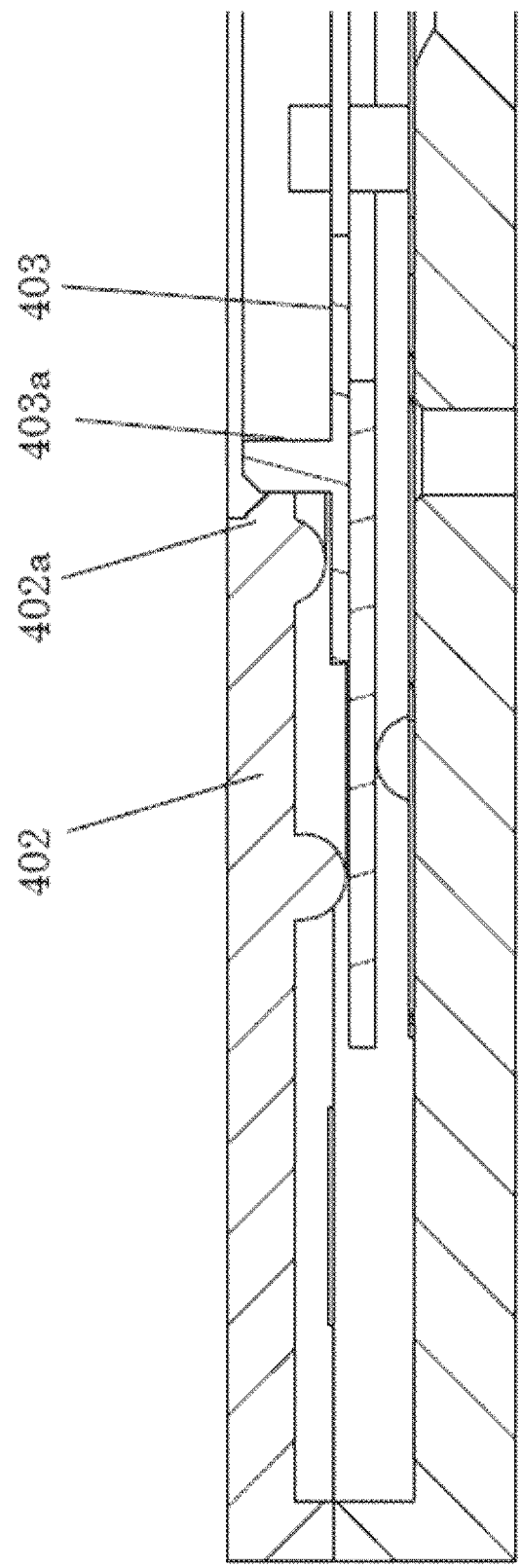
FIG. 100 is a sectional view of the blade driving device according to the embodiment.

Radial engagement of the driving ring 403, which is a characteristic feature of the fourth embodiment, will be explained here. FIG. 100 is a sectional view of the light amount adjusting device according to the fourth embodiment. In the driving ring 403, the outer wall 403a provided on the driving ring is in slidable contact with the projections 402a of the holding substrate 402 in a rotatable state, thereby radially fitting.

Fifth Embodiment

Figure 101:
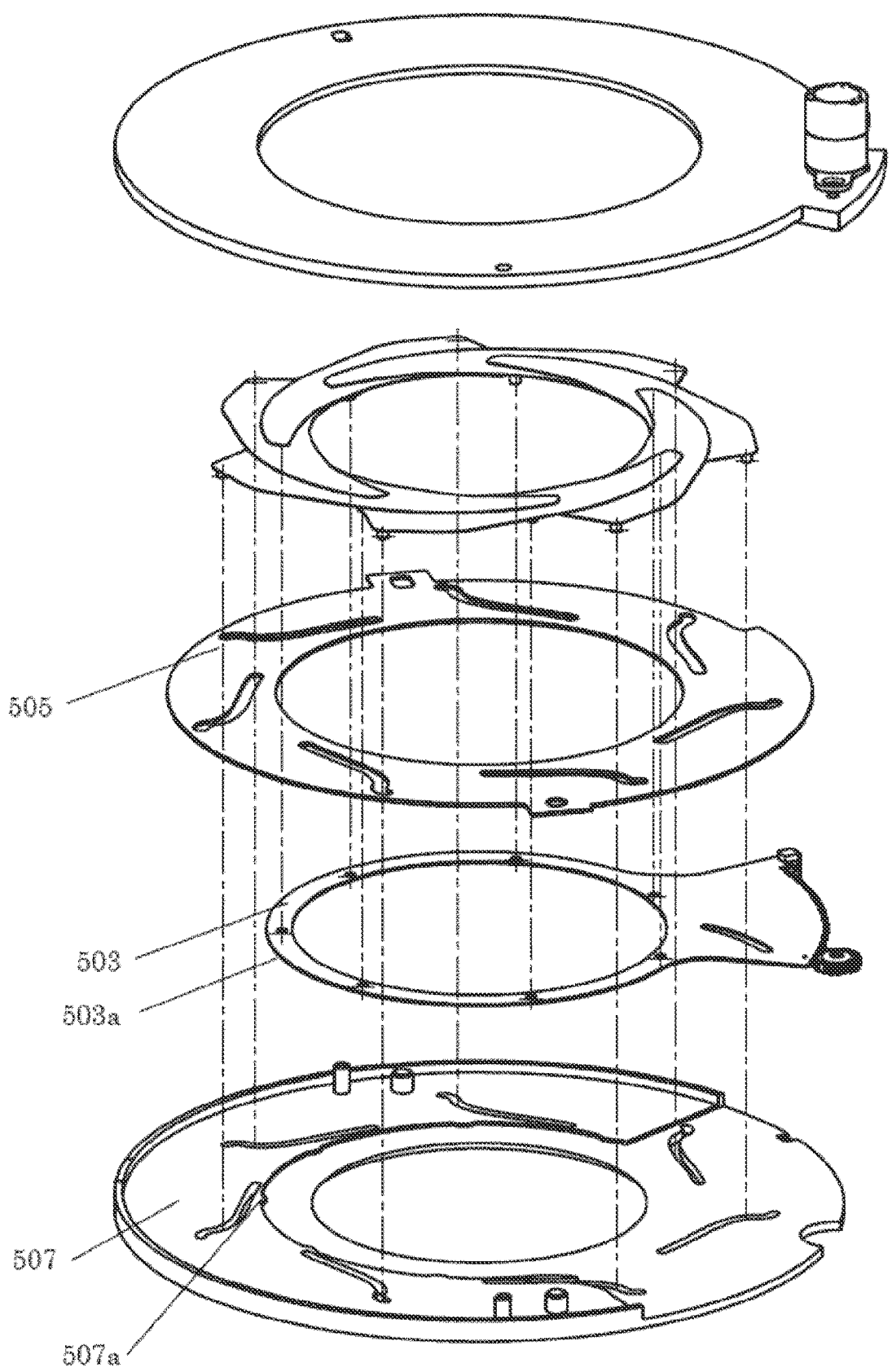
FIG. 101 is an exploded perspective view of a blade driving device according to still another embodiment.

FIG. 101 is an exploded perspective view of a diaphragm device serving as a light amount adjusting device according to the fifth embodiment of the present invention. Reference numerals in the drawings are 100s in the first embodiment and 500s in this embodiment.

As shown in FIG. 101, the diaphragm device according to this embodiment has a structure in which projecting portions 507a are provided on an opening forming member 507 at a plurality of points (six points in this embodiment) in the circumferential direction on the diaphragm blade side, and an outer engaging portion 503a of a driving ring 503 engages with h projecting portions 507a of the opening forming member. The driving ring 503 is sandwiched between the opening forming member 507 and a partition member 505, thereby being rotatably supported in the thrust direction.

Figure 102:
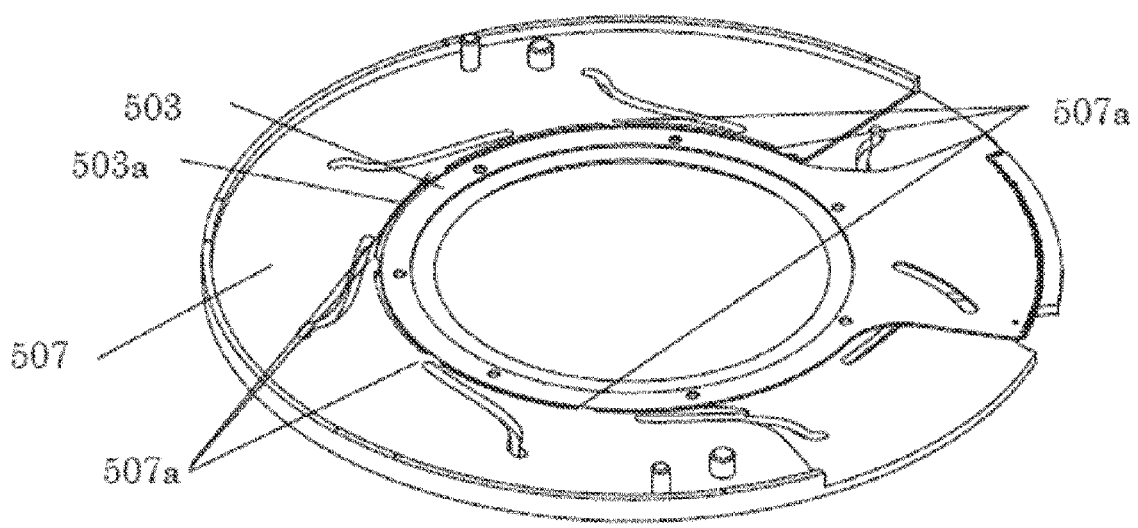
FIG. 102 is a perspective view of the blade driving device according to the embodiment.

Additionally, as shown in FIG. 102, the projecting portions 507a of the opening forming member engage with the outer engaging portion 503a of the driving ring, thereby radially fitting.

Figure 103:
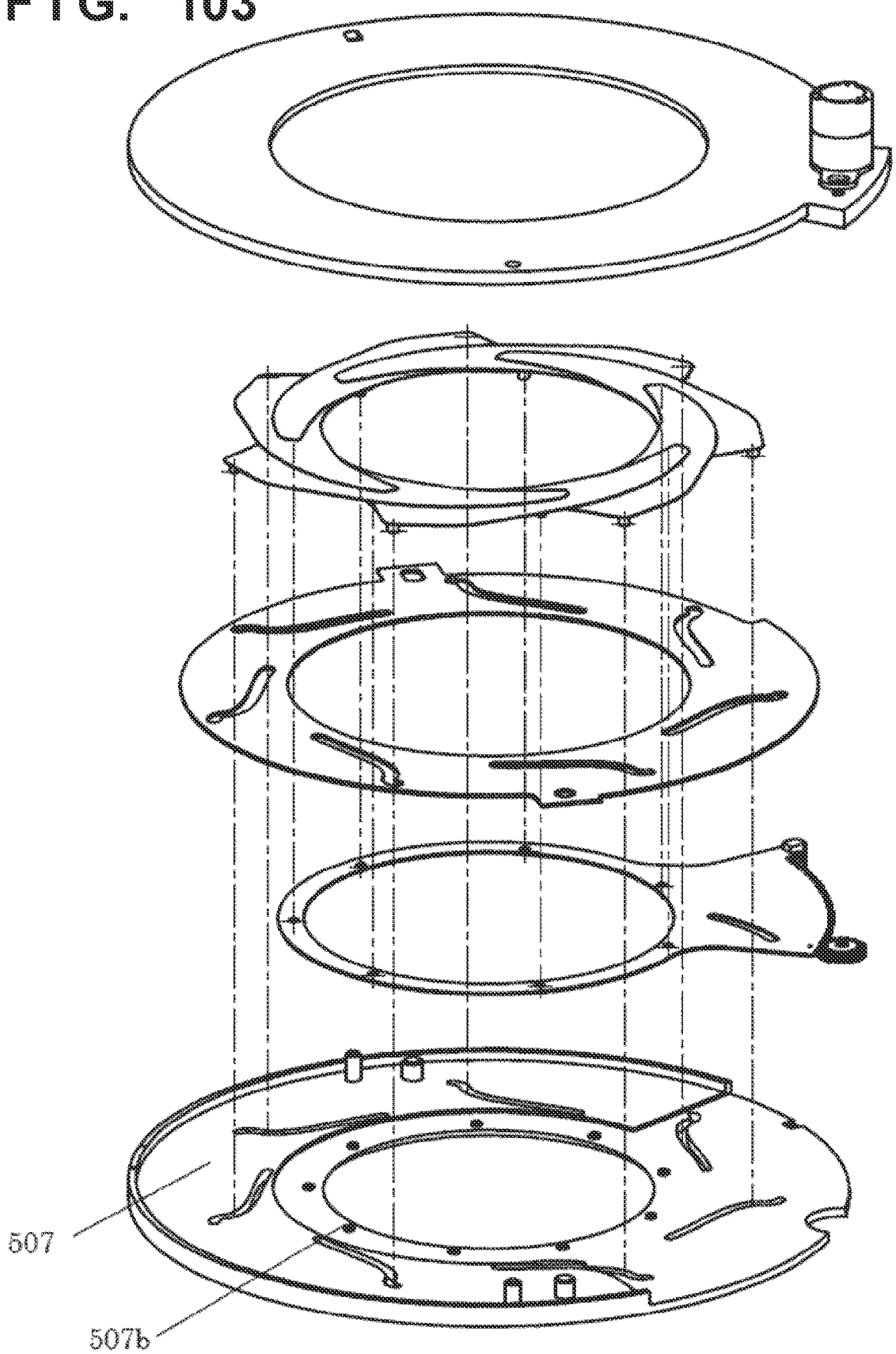
FIG. 103 is an exploded perspective view of the blade driving device according to the embodiment.

In this embodiment, the outer engaging portion 503a of the driving ring engages with the projecting portions 507a of the opening forming member, thereby radially fitting. However, as shown in FIGS. 103 and 23, the same effect as described above can be obtained even when the inner engaging portion of the driving ring engages with the engaging pins of the opening forming member.

Sixth Embodiment

Figure 105:
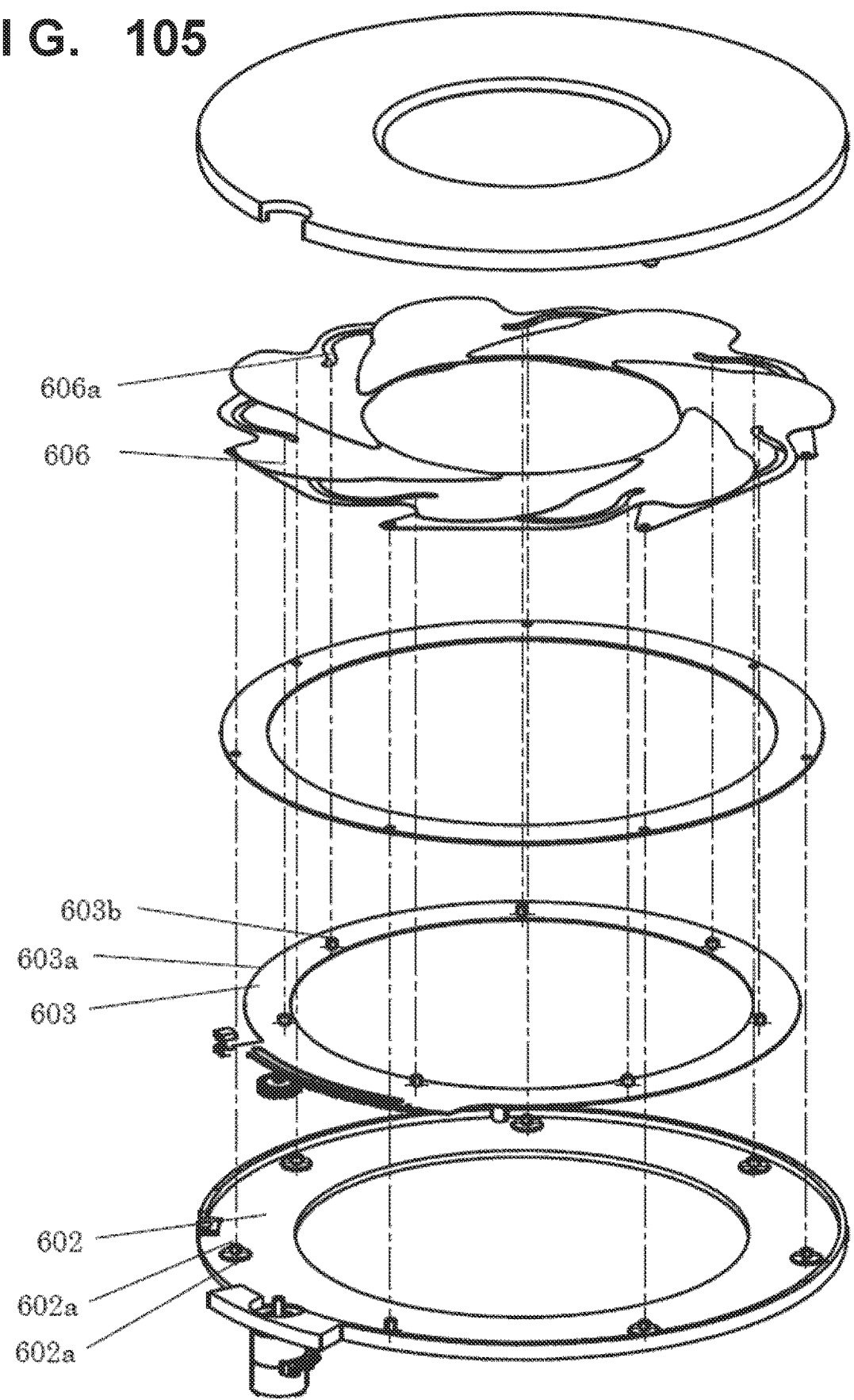
FIG. 105 is an exploded perspective view of a blade driving device according to still another embodiment.

FIG. 105 is an exploded perspective view of a diaphragm device serving as a light amount adjusting device according to the sixth embodiment of the present invention. Reference numerals in the drawings are 100s in the first embodiment and 600s in this embodiment.

Figure 106:
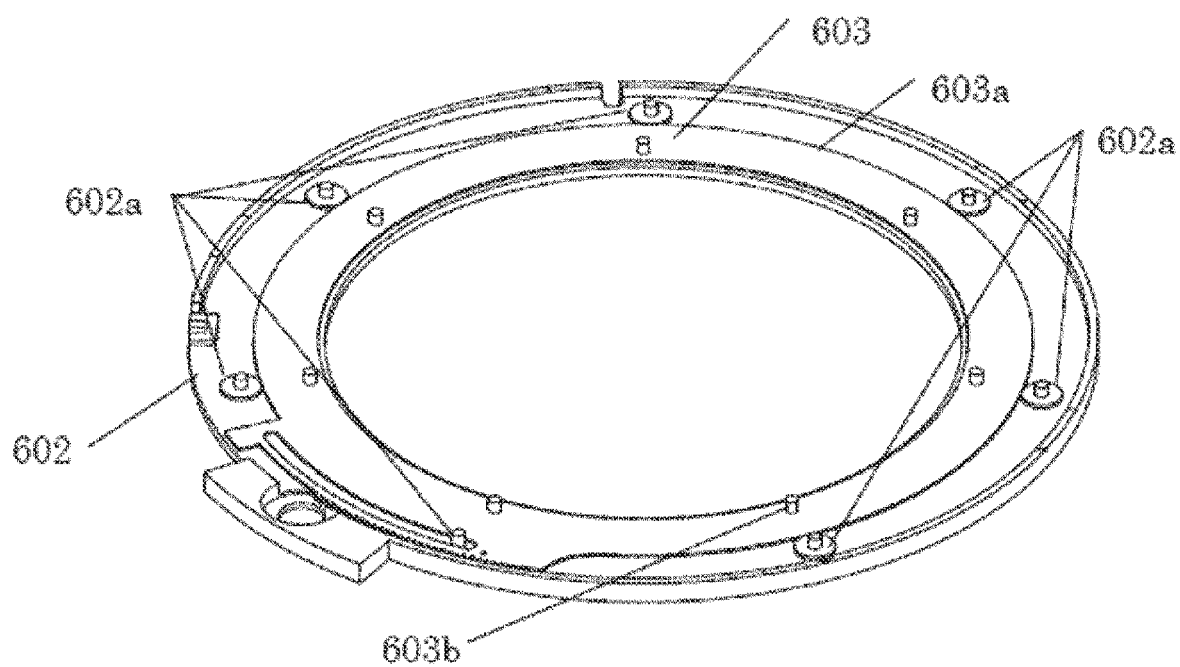
FIG. 106 is a perspective view of the blade driving device according to the embodiment.

As shown in FIG. 105, in the diaphragm device according to this embodiment, a plurality of engaging pins 602a corresponding to diaphragm blades are provided on a holding substrate 602. In addition, projecting portions 602b engaging with an outer engaging portion 603a of a driving ring 603 are provided. Each diaphragm blade 606 is provided with a cam groove 606a engaging with a driving pin 603b provided on the driving ring 603. As shown in FIG. 106, the outer engaging portion 603a of the driving ring engages with the inscribed circle of the projecting portions 602a of the holding substrate, thereby radially fitting.

Seventh Embodiment

Figure 107:
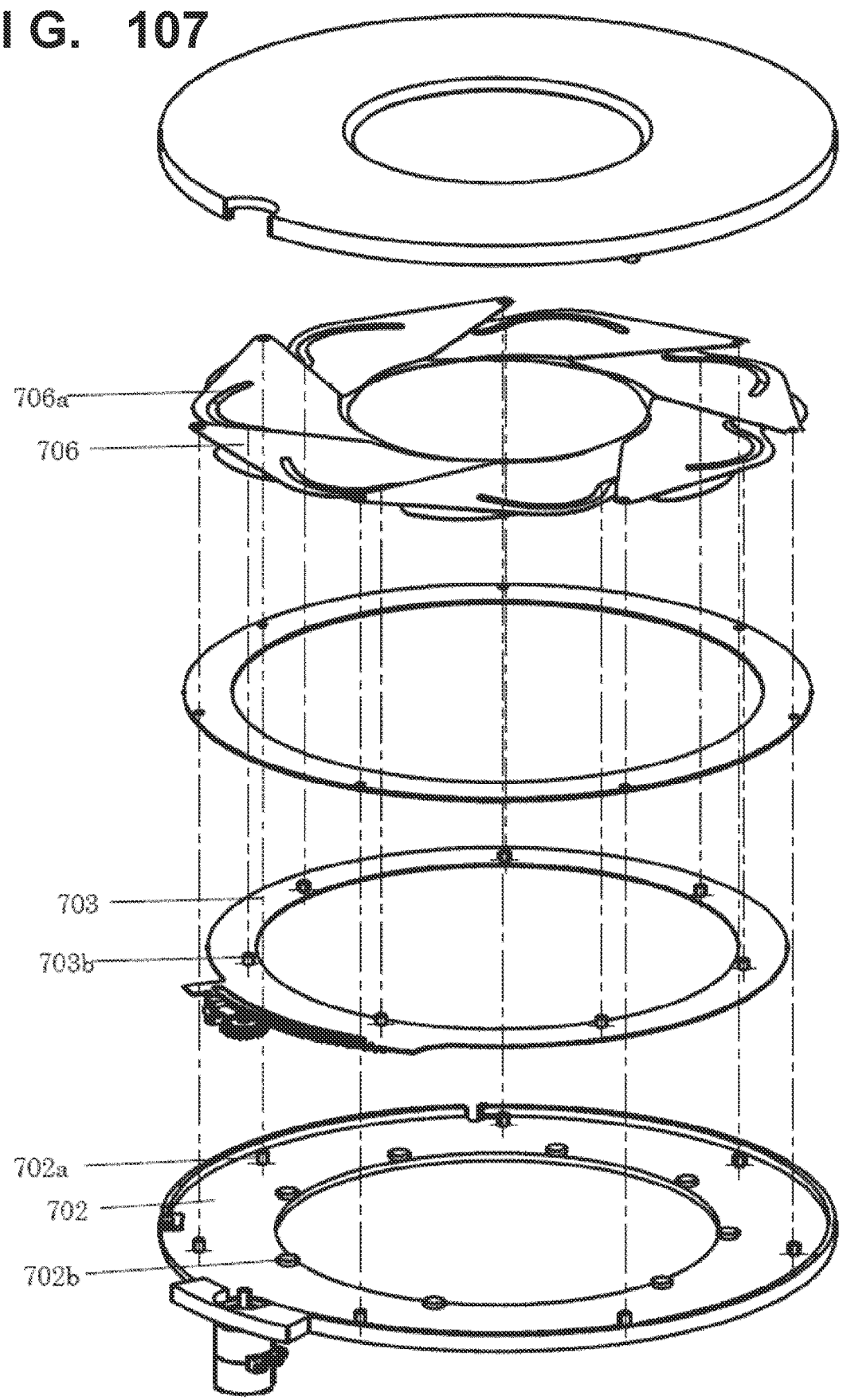
FIG. 107 is an exploded perspective view of a blade driving device according to still another embodiment.

FIG. 107 is an exploded perspective view of a diaphragm device serving as a light amount adjusting device according to the seventh embodiment of the present invention.

Reference numerals in the drawings are 100s in the first embodiment and 700s in this embodiment.

Figure 108:
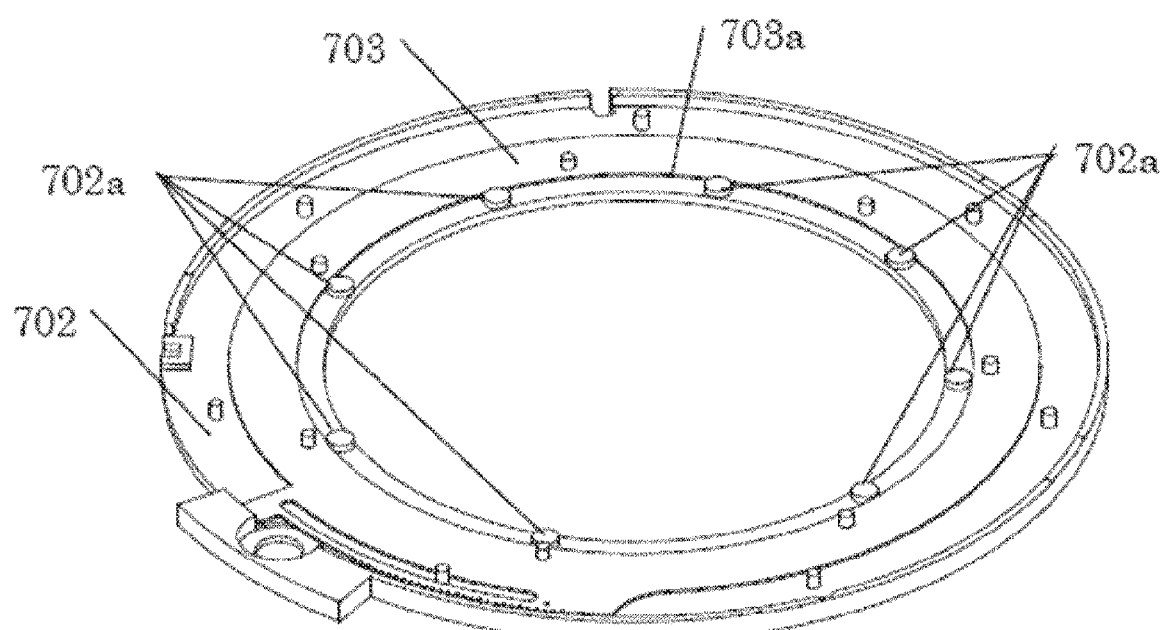
FIG. 108 is a perspective view of the blade driving device according to the embodiment.

As shown in FIG. 107, in the diaphragm device according to this embodiment, a plurality of engaging pins 702a corresponding to the diaphragm blades are provided on a holding substrate 702. In addition, engaging pins 702b engaging with an inner engaging portion 703a of a driving ring 703 are provided. Each diaphragm blade 706 is provided with a cam groove 706a engaging with a driving pin 703b provided on the driving ring 703. As shown in FIG. 108, the inner engaging portion 703a of the driving ring engages with the circumscribed circle of the projecting portions 702a of the holding substrate, thereby radially fitting.

Summary of Embodiment D

A blade driving device according to this embodiment is a blade driving device that adjusts a size of an opening to pass light by a plurality of blade members, comprising a first opening forming member and a second opening forming member which form an opening, a plurality of diaphragm blades configured to enter or exit from a light passing path, a driving ring configured to drive the diaphragm blades, and a partition member including a light passing port having a size not less than the opening portion between the diaphragm blades and the driving ring, wherein the driving ring is sandwiched at a position to overlap in an optical axis direction within a movable range of the diaphragm blades and pivots.

According to the embodiment, since the driving ring can be sandwiched at the position to overlap in a light passing direction within the movable range of the blades, the outer shape of the driving ring can be made smaller than the movable range of the blades, and the structure is effective for high-speed driving.

The blade driving device according to the embodiment is wherein the driving ring is formed from the ultrathin sheet-shaped member having a spring characteristic.

According to the embodiment, form stability can be increased in a non-pivotal movement (in driving standby) or pivotal movement of the driving ring. The structure also contributes to improvement of posture stability in the pivotal movement.

The blade driving device according to the embodiment is wherein the driving ring is formed from the ultrathin sheet-shaped member including a surface layer that is a slidability improving layer on at least one surface of a sheet base.

According to the embodiment, it is possible to increase the slidability between the driving ring and another member.

The blade driving device according to the embodiment is wherein the driving ring is formed from the ultrathin sheet-shaped member including a surface layer that is an antistatic layer on at least one surface of a sheet base.

According to the embodiment, it is possible to effectively prevent driving performance from lowering due to static electricity between the driving ring and another member.

The blade driving device according to the embodiment is wherein the surface layers are provided on both surfaces of the sheet base, and the surface layers are provided in substantially the same thickness.

According to the embodiment, it is possible to sufficiently ensure the flatness of the driving ring.

The blade driving device according to the embodiment is wherein the driving ring is formed from the ultrathin sheet-shaped member whose thickness is not more than a half of a thickness of the holding substrate.

According to the embodiment, since the driving ring is formed from a sheet-shaped member that is much thinner than the holding substrate, the structure is effective in further thickness reduction.

The blade driving device according to the embodiment is wherein the driving ring is formed from the ultrathin sheet-shaped member that is thinner than the holding substrate and thicker than the blades.

According to the embodiment, since the driving ring is formed from a sheet-shaped member that is thinner than the holding substrate and thicker than the blades, the structure is effective in further thickness reduction.

The blade driving device according to the embodiment is wherein the driving ring is formed from the ultrathin sheet-shaped member whose thickness is substantially not more than a thickness of the blades.

According to the embodiment, since the driving ring is formed from a very thin sheet-shaped member whose thickness is not more than the thickness of the blades, the structure is effective in further thickness reduction.

The blade driving device according to the embodiment is wherein a pivotal posture of the driving ring is held in a state in which the driving ring can be driven in a driving space defined between the holding substrate arranged on one surface side of the driving ring and the partition member arranged on the other surface side of the driving ring.

According to the embodiment, since the driving ring is supported while substantially being sandwiched between the holding substrate and the partition member which face each other, the structure is effective for stabilizing the pivotal posture of the driving ring.

The blade driving device according to the embodiment is wherein the blades are arranged between the partition member and the opening forming member, and when the driving ring is driven in the driving space, the blades travel only in a space between the partition member and the opening forming member.

According to the embodiment, since a predetermined blade traveling space can be ensured by the partition member, rattling of the blades in the light passing direction can be regulated.

In the blade driving device according to the embodiment, the opening forming member is provided with a first abutting portion configured to abut against a portion on the one surface side of the partition member other than a traveling region where the blades travel, and the holding substrate is provided with a second abutting portion configured to abut against the partition member and a third abutting portion configured to abut against a periphery of an engaging portion of the driving ring with which the blades engage. The blade driving device is wherein the partition member is held between the first abutting portion and the second abutting portion, and the pivotal posture of the driving ring is held between the partition member and the third abutting portion.

According to the embodiment, it is possible to stably hold the pivotal posture of the driving ring by partial contact by the abutting portions provided on the partition member and the holding substrate without limiting the traveling of the blades.

The blade driving device according to the embodiment is wherein an opening portion configured to form a part of the light passing path is provided to extend through the holding substrate, and an edge of the opening portion is provided with a regulating portion that is configured to abut against an inner surface of a through hole, which is provided with the driving ring and serves as the light passing path, and to regulate a movement of the driving ring in a direction orthogonal to an optical axis direction.

According to the embodiment, the position of the driving ring in a planar direction (the direction orthogonal to the optical axis direction) with respect to the light passing path can be regulated by the regulating portion of the holding substrate.

The blade driving device according to the embodiment is wherein a surface of each blade on a side of the driving ring is provided with an engaging projecting portion configured to engage with a through hole provided in the driving ring, and a surface of each blade on a side of the opening forming member is provided with a cam groove engaging projecting portion configured to engage with a cam groove provided in the opening forming member.

According to the embodiment, since it is only necessary to provide, for the driving ring, the engaging projecting portion engaging with the blade, the structure of the driving ring can be simplified.

The blade driving device according to the embodiment is wherein a surface of each blade on a side of the driving ring is provided with a cam groove engaging projecting portion configured to engage with a cam groove provided in the driving ring and a rotation center axis to be inserted into an insertion portion provided on the opening forming member, both of which project. According to the embodiment, when the cam groove is provided in the driving ring, the weight of the driving ring 104 can further be reduced, and the structure is advantageous in driving the driving ring at a high speed.

The blade driving device according to the embodiment is wherein the blades comprise a plurality of blade groups annularly arranged around an opening portion provided to extend through the holding member.

According to the embodiment, it is possible to easily reduce the thickness of a diaphragm device configured to narrow the light passing path by coordinately moving the plurality of blade groups by the driving ring that pivots.

The blade driving device according to the embodiment is wherein a driving transmission member configured to transmit a driving force of the driving ring is connected to an outer peripheral portion of the driving ring.

According to the embodiment, it is possible to implement reliable driving transmission by a relatively simple arrangement for the driving ring formed from the ultrathin sheet-shaped member.

The blade driving device according to the embodiment is wherein the driving transmission member comprises a pinion gear attached to a rotating shaft of a driving motor, and a thickness of the driving ring is smaller than a height of the pinion gear.

According to the embodiment, it is possible to implement reliable driving connection between the driving ring and the driving transmission member (pinion gear).

The blade driving device according to the embodiment is wherein the driving ring includes a through hole configured to form at least a part of the light passing path, and an edge portion of the through hole on a side where the blades engage forms an R-shaped portion. According to the embodiment, since a sliding portion with respect to the blades is substantially reduced, mobility of the blades improves.

Note that the embodiment is not limited to the blade driving device, and can also be applied to a blade driving system in an image capturing device such as a camera and broadly includes image capturing devices in the target.

Embodiment E

Figure 112:
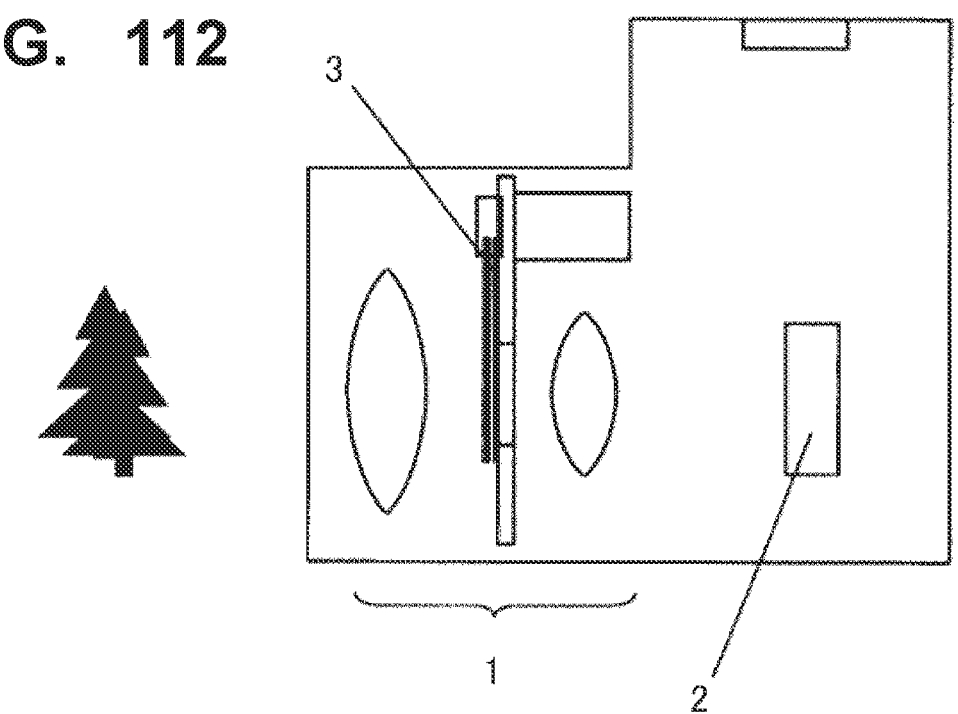
FIG. 112 is an explanatory view of an image capturing device according to still another embodiment.

FIG. 112 is an explanatory view of an image capturing device according to the embodiment of the present invention. The image capturing device shown in FIG. 112 is, for example, a digital camera, and includes an optical system 1, and an image sensor 2. The optical system 1 includes a lens and a light amount adjusting device 3. The light amount adjusting device 3 is a light amount adjusting device, a blade driving device, or a diaphragm device described in one of the embodiments A to D. Light that has passed through the optical system 1 forms an image on the image sensor 2, and an electronic image is obtained.

The light amount adjusting device 3 includes a base plate 11, opening/closing portions 13A and 13B, a lid portion 12, and a driving unit 14.

OTHER EMBODIMENTS

The present invention is not limited to the above embodiments, and various changes and modifications can be made within the spirit and scope of the present invention. Therefore, to apprise the public of the scope of the present invention, the following claims are made.

The invention claimed is:

1. A blade driving device comprising:
an opening forming member configured to form an opening portion to pass light along an optical axis;
a pivotal member including an opening through which the light passes and configured to pivot about a center of the opening portion;
a plurality of blades configured to enter or exit from the opening portion upon receiving power transmitted from the pivotal member;
a cover member arranged so that the plurality of blades and the pivotal member are located between the cover member and the opening forming member; and
a separate member including an opening through which the light passes and arranged between the plurality of blades and the pivotal member in a direction of the optical axis,
wherein each of the plurality of blades includes:
(a) a first engaging portion which engages with the opening forming member or the cover member; and
(b) a second engaging portion which engages with the pivotal member,
wherein the separate member overlaps the plurality of the blades in an area adjacent to the first engaging portion and the second engaging portion in the direction of the optical axis, and
wherein the opening provided with the separate member is larger than the opening provided with the pivotal member.

2. The device according to claim 1, wherein the pivotal member has an outline larger than the opening provided with the separate member, and
wherein a portion of the pivotal member overlaps a portion of the separate member in the direction of the optical axis so as to be sandwiched between the portion of the separate member and the opening forming member or the cover member.

3. The device according to claim 2, wherein each of the pivotal member and the separate member includes a ring-shaped portion which defines an opening, and
wherein an outer diameter of the ring-shaped portion of the pivotal member is larger than an inner diameter of the ring-shaped portion of the separate member but is smaller than an outer diameter of the ring-shaped portion of the separate member.

4. A blade driving device comprising:
an opening forming member configured to form an opening portion to pass light along an optical axis;
a pivotal member configured to pivot about a center of the opening portion;
a plurality of blades configured to enter or exit from the opening portion upon receiving power transmitted from the pivotal member;
a cover member arranged so that the plurality of blades and the pivotal member are located between the cover member and the opening forming member, and
a separate member arranged between the plurality of blades and the pivotal member in a direction of the optical axis,
wherein each of the plurality of blades includes:
(a) a first engaging portion which engages with the opening forming member or the cover member; and
(b) a second engaging portion which engages with the pivotal member,
wherein the separate member overlaps the plurality of the blades in an area adjacent to the first engaging portion and the second engaging portion in the direction of the optical axis,
wherein the first engaging portion is an engaging pin which is engaged with a cam groove provided with the opening forming member or the cover member,
wherein the second engaging portion is a pivot-center pin which is engaged with a center hole provided with the pivotal member, and
wherein the pivot-center pin and an inner edge of an opening provided with the separate member slidingly contact with each other.

5. The device according to claim 4, wherein the pivotal member and a peripheral portion defining the opening in the opening forming member slidingly contact with each other.

6. The device according to claim 5, wherein a plurality of convex portions projecting in a direction orthogonal to the optical axis is provided with the peripheral portion defining the opening in the opening forming member, and
wherein the plurality of convex portions and an inner edge defining an opening in the pivotal member slidingly contact with each other.

7. The device according to claim 4, wherein the pivotal member and an inner peripheral portion defining an opening in the cover member slidingly contact with each other.

8. The device according to claim 7, wherein a wall portion provided with the pivotal member and projecting in the direction of the optical axis and a plurality of projection portions provided with the inner peripheral portion defining the opening in the cover member and projecting in a direction orthogonal to the optical axis slidingly contact with each other.

9. The device according to claim 4, wherein the pivot-center pin and a peripheral portion defining the opening in the opening forming member slidingly contact with each other.

10. The device according to claim 4, wherein the separate member includes a projection portion which projects in the direction of the optical axis, and
   wherein the projection portion and an outer peripheral portion of the pivotal member slidingly contact with each other.

11. The device according to claim 4, wherein the opening forming member includes a projection portion which projects toward the pivotal member in the direction of the optical axis and positions the pivotal member in a direction orthogonal to the optical axis by slidingly contacting with pivotal member.

12. A blade driving device comprising:
   an opening forming member configured to form an opening portion to pass light along an optical axis;
   a pivotal member configured to pivot about a center of the opening portion;
   a plurality of blades configured to enter or exit from the opening portion upon receiving power transmitted from the pivotal member;
   a cover member arranged so that the plurality of blades and the pivotal member are located between the cover member and the opening forming member; and
   a separate member arranged between the plurality of blades and the pivotal member in a direction of the optical axis,
   wherein each of the plurality of blades includes:
   (a) a first engaging portion which engages with the opening forming member or the cover member; and
   (b) a second engaging portion which engages with the pivotal member,
   wherein the separate member overlaps the plurality of the blades in an area adjacent to the first engaging portion and the second engaging portion in the direction of the optical axis,
   wherein the first engaging portion is a center hole which is engaged with a pivot-center pin provided with the opening forming member or the cover member,
   wherein the second engaging portion is a cam groove which is engaged with a driving pin provided with the pivot member,
   wherein the separate member includes a through hole through which the pivot-center pin passes, and
   wherein (a) an inner peripheral portion defining an opening, through which the light passes, in the separate member and (b) the driving pin slidingly contact with each other.

13. The device according to claim 12, wherein an outer peripheral portion in the pivotal member and the pivot-center pin slidingly contact with each other.

14. The device according to claim 12, wherein an inner peripheral portion in the pivotal member and a projection portion which projects in the direction of the optical axis and which is provided with the opening forming member slidingly contact with each other.

* * * * *